US011750250B2

(12) United States Patent
Wang et al.

(10) Patent No.: US 11,750,250 B2
(45) Date of Patent: *Sep. 5, 2023

(54) COMMUNICATIONS METHOD AND DEVICE

(71) Applicant: HUAWEI TECHNOLOGIES CO., LTD., Guangdong (CN)

(72) Inventors: Ting Wang, Shanghai (CN); Jinyao Liang, Shenzhen (CN); Shengyue Dou, Shanghai (CN); Yuanjie Li, Shanghai (CN); Yan Cheng, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/692,736

(22) Filed: Mar. 11, 2022

(65) Prior Publication Data

US 2022/0200668 A1 Jun. 23, 2022

Related U.S. Application Data

(63) Continuation of application No. 16/814,463, filed on Mar. 10, 2020, now Pat. No. 11,290,156, which is a
(Continued)

(30) Foreign Application Priority Data

Sep. 11, 2017 (CN) .......................... 201710812735.8
Nov. 14, 2017 (CN) .......................... 201711125639.2

(51) Int. Cl.
*H04B 7/06* (2006.01)
*H04B 7/0417* (2017.01)
(Continued)

(52) U.S. Cl.
CPC ......... *H04B 7/0417* (2013.01); *H04B 7/0486* (2013.01); *H04B 7/0626* (2013.01);
(Continued)

(58) Field of Classification Search
CPC .. H04B 7/0417; H04B 7/0486; H04B 7/0626; H04B 7/0632; H04B 7/0639;
(Continued)

(56) References Cited

U.S. PATENT DOCUMENTS 11,290,156 B2 * 3/2022 Wang .................. H04B 7/0639
2012/0320774 A1 12/2012 Dai et al.
(Continued)

FOREIGN PATENT DOCUMENTS

CN 101789849 A 7/2010
CN 101867447 A 10/2010
(Continued)

OTHER PUBLICATIONS

Ericsson, CSI feedback for multi-TRP 3GPP TSG-RAN WG1 #90, Prague, Czech Republic, Aug. 21-25, 2017, R1-1714286, 7 pages.
(Continued)

*Primary Examiner* — Minh Trang T Nguyen
(74) *Attorney, Agent, or Firm* — WOMBLE BOND DICKINSON (US) LLP

(57) ABSTRACT

Disclosed are a communications method and device. The method includes: sending, by a network device, configuration information to a terminal device; determining, by the terminal device, channel state information CSI measurement behavior and/or CSI feedback related information, where the channel state information CSI measurement behavior and/or the CSI feedback related information are/is related to the configuration information; and performing, by the terminal device, CSI measurement based on the configuration information and the CSI measurement behavior and/or the CSI feedback related information, to obtain at least one piece of CSI, and sending all or some of the at least one piece of CSI to the network device. It can be learned that, in a scenario in which a plurality of transmission modes are supported,
(Continued)

according to the foregoing method, the terminal device can measure CSI, and feed back the measured CSI to the network device.

28 Claims, 12 Drawing Sheets

Related U.S. Application Data continuation of application No. PCT/CN2018/105094, filed on Sep. 11, 2018.

(51) Int. Cl.
*H04B 7/0456* (2017.01)
*H04L 5/00* (2006.01)
*H04W 80/08* (2009.01)

(52) U.S. Cl.
CPC ......... *H04B 7/0632* (2013.01); *H04B 7/0639* (2013.01); *H04L 5/0051* (2013.01); *H04W 80/08* (2013.01)

(58) Field of Classification Search
CPC .... H04B 7/0628; H04B 7/024; H04B 7/0456; H04B 7/063; H04L 5/0051; H04W 80/08
See application file for complete search history.

(56) References Cited

U.S. PATENT DOCUMENTS

| | | |
|---|---|---|
| 2013/0064128 A1 | 3/2013 | Li et al. |
| 2014/0369291 A1 | 12/2014 | Zhang et al. |
| 2015/0236801 A1 | 8/2015 | Sun et al. |
| 2018/0241525 A1 | 8/2018 | Ouchi |
| 2019/0089423 A1 | 3/2019 | Davydov |
| 2020/0244425 A1 | 7/2020 | Wu |

FOREIGN PATENT DOCUMENTS

| | | |
|---|---|---|
| CN | 102281128 A | 12/2011 |
| CN | 102546110 A | 7/2012 |
| CN | 103036655 A | 4/2013 |
| CN | 108039903 A | 5/2018 |
| GB | 2562098 A | 11/2018 |
| WO | 2010147416 A2 | 12/2010 |
| WO | 2017048049 A1 | 3/2017 |
| WO | 2017078785 A1 | 5/2017 |

OTHER PUBLICATIONS

Huawei, HiSilicon, Introduction of FeCoMP into 36.212. 3GPP TSG-RAN WG1 Meeting #91, Reno, USA, Nov. 27 Dec. 1, 2017, R1-1720986, 93 pages.
Alexei Davydov, Status Report to TSG. 3GPP TSG RAN meeting #77 , Sapporo, Japan, Sep. 11-14, 2017, RP-171817, 5 pages.
CATT, "Beam selection indicator on PUSCH for CSI reporting class B",3GPP TSG RAN WG1 Meeting #82bis, R1-155216,Malmo, Sweden, Oct. 5-9, 2015, total 4 pages.
3GPP TS 36.212 V14.3.0 (Jun. 2017),3rd Generation Partnership Project;Technical Specification Group Radio Access Network;Evolved Universal Terrestrial Radio Access (E-UTRA); Multiplexing and channel coding(Release 14), total 198 pages.
3GPP TS 36.213 V14.3.0 (Jun. 2017),3rd Generation Partnership Project;Technical Specification Group Radio Access Network;Evolved Universal Terrestrial Radio Access (E-UTRA); Physical layer procedures(Release 14), total 460 pages.
3GPP TS 36.306 V14.3.0 (Jun. 2017),3rd Generation Partnership Project;Technical Specification Group Radio Access Network;Evolved Universal Terrestrial Radio Access (E-UTRA);User Equipment (UE) radio access capabilities (Release 14), total 79 pages.
3GPP TS 36.331 V14.3.0 (Jun. 2017),3rd Generation Partnership Project;Technical Specification Group Radio Access Network;Evolved Universal Terrestrial Radio Access (E-UTRA); Radio Resource Control (RRC);Protocol specification (Release 14), total 745 pages.
Samsung, "Enhancements for non-coherent JT",3GPP TSG RAN WG1 #87,R1-1612413,Reno, USA, Nov. 14-18, 2016, total 3 pages.

* cited by examiner

COMMUNICATIONS METHOD AND DEVICE

CROSS-REFERENCE TO RELATED APPLICATIONS

This application is a continuation of U.S. patent application Ser. No. 16/814,463, filed on Mar. 10, 2020, which is a continuation of International Application No. PCT/CN2018/105094, filed on Sep. 11, 2018, The International Application claims priority to Chinese Patent Application No. 201711125639.2, filed on Nov. 14, 2017 and Chinese Patent Application No. 201710812735.8, filed on Sep. 11, 2017. All of the afore-mentioned patent applications are hereby incorporated by reference in their entireties.

TECHNICAL FIELD

The present disclosure relates to the field of communications technologies, and in particular, to a communications method and device.

BACKGROUND

Currently, transmission between a terminal device and a network device supports a single-point transmission mode and a coordinated multi point (CoMP) transmission/reception mode. The single-point transmission mode means that one transmission point independently completes data transmission with one terminal device, and the coordinated multipoint transmission/reception mode means that a plurality of transmission points in separated geographic positions jointly complete data transmission with one terminal device. A transmission point may be understood as a network device, or may be a base station, or may be a radio frequency unit of a base station, for example, a remote radio unit (RRU), or may be a panel of a base station or a transmission point, or the like. One base station or one transmission point may include one or more panels. Data transmission includes data sending and receiving.

In a long term evolution (LTE) communications system, in the prior art, one channel state information (CSI) process is configured for a scenario in which one transmission mode is supported, and for the CSI process, the terminal device only needs to measure and feed back CSI corresponding to the transmission mode. An enhanced CSI process is configured for a scenario in which a plurality of transmission modes are supported, and for the enhanced CSI process, the terminal device needs to measure CSI in the plurality of transmission modes, and then indicate, by feeding back the measured CSI to the network device, which one of the single-point transmission mode and the coordinated multipoint transmission/reception mode has better performance. Processes of measuring CSI by the terminal device and processes of feeding back the measured CSI to the network device vary depending on transmission modes. However, in the prior art, the terminal device cannot determine whether a CSI process is an enhanced CSI process, to be specific, the terminal device cannot determine a specific transmission mode in which CSI measurement and feedback need to be performed. Consequently, the terminal device cannot perform a CSI measurement process and a CSI feedback process. In a fifth generation (5G) system, for the scenario in which a plurality of transmission modes are supported, no technical solution is currently available for the terminal device to perform CSI measurement and feedback.

In conclusion, a technical solution for CSI measurement and feedback in a scenario in which a plurality of transmission modes are supported is urgently needed.

SUMMARY

Embodiments of the present disclosure provide a communications method and device, to enable a terminal device to measure CSI and feed back the measured CSI to a network device in a scenario in which a plurality of transmission modes are supported.

According to a first aspect, an embodiment of the present disclosure provides a communications method. In the method, a network device sends configuration information to a terminal device; after receiving the configuration information, the terminal device determines channel state information CSI measurement behavior and/or CSI feedback related information, where the channel state information CSI measurement behavior and/or the CSI feedback related information are/is related to the configuration information; and the terminal device performs CSI measurement based on the configuration information and the CSI measurement behavior and/or the CSI feedback related information, to obtain at least one piece of CSI, and sends all or some of the at least one piece of CSI to the network device.

The CSI measurement behavior instructs the terminal device how to measure CSI, and the CSI feedback related information is related information used when the terminal device feeds back the CSI to the network device. For example, the CSI feedback related information may include at least one of the following information: content (for example, at least one of a CRI, an RI, a PMI, or a CQI) of the fed back CSI, bit information (for example, the bit information includes a bit width and/or a rule for determining a bit width) of the content of the fed back CSI, a coding scheme (for example, independent encoding or joint encoding) used by the content of the fed back CSI, an interleaving mode (for example, independent interleaving or joint interleaving), and a mapping mode (for example, a mapped time-frequency resource and/or a mapping rule).

In the foregoing method, the network device determines a manner in which the terminal device is required to perform CSI measurement and feedback, to be specific, the network device determines a transmission mode in which the terminal device is required to perform CSI measurement and feedback, and then the network device determines the configuration information based on the manner in which the terminal device is required to perform CSI measurement and feedback. The terminal device may learn, based on the configuration information, how to perform CSI measurement and feedback, where the configuration information is related to the CSI measurement behavior and/or the CSI feedback related information. Therefore, according to the foregoing method, even if the terminal device cannot determine the transmission mode in which CSI measurement and feedback need to be performed, the terminal device may also learn, based on the configuration information sent by the network device, how to perform CSI measurement and/or feedback, so that in a scenario in which a plurality of transmission modes are supported, the terminal device measures CSI, and feeds back the measured CSI to the network device. In the foregoing method, the terminal device and the network device determine the CSI measurement behavior and/or the CSI feedback related information based on the existing configuration information, thereby reducing signaling overheads. When a resource is configured in the configuration information, the terminal device can perform CSI measurement and feedback in the plurality of transmission modes. Compared with configuration of CSI measurement and feedback in one transmission mode once, signaling overheads can be reduced, reference signal overheads can be reduced, a delay of CSI measurement and feedback can be reduced, and performance can be improved. If the terminal device feeds back only CSI in a transmission mode with optimal transmission performance, feedback overheads can be reduced, and the network device is assisted in performing data scheduling based on the optimal transmission mode. Alternatively, if the terminal device can feed back CSI in the plurality of transmission modes, the network device may obtain transmission performance statuses in the plurality of transmission modes, to assist data scheduling and improve performance.

In a design, the network device determines the CSI measurement behavior and/or the CSI feedback related information of the terminal device, and then receives the CSI from the terminal device based on the CSI measurement behavior and/or the CSI feedback related information.

In the foregoing method, the network device receives the CSI from the terminal device by using a method corresponding to a method for performing CSI measurement and feedback by the terminal device. To be specific, the network device receives the CSI from the terminal device based on the CSI measurement behavior and/or the CSI feedback related information. It should be noted that, when the network device learns of the method for performing CSI measurement and feedback by the terminal device, a method for receiving the CSI by the network device may be the same as that in the prior art.

In a design, based on the fact that the network device determines that the terminal device is required to perform CSI measurement and feedback in a hybrid mode (which may also be referred to as a hybrid transmission mode) of a single-point transmission mode+a coordinated multipoint transmission/reception mode, the configuration information and the channel state information CSI measurement behavior and/or the CSI feedback related information are as follows:

The configuration information meets at least one of the following conditions:

(1) The configuration information includes N1 non-zero power channel state information-reference signal NZP CSI-RS resources of a class A, where N1 is a positive integer greater than or equal to 2.

In an LTE communications system, that the configuration information includes N1 NZP CSI-RS resources of a class A means that the configuration information includes configuration information of one CSI process. In an NR communications system, that the configuration information includes N1 NZP CSI-RS resources of a class A may mean that the configuration information includes one CSI reporting setting (reporting setting), where the reporting setting is associated with R pieces of association information (link) used for channel measurement, to be specific, associated with R reference signal settings (RS setting), each RS setting includes at least one NZP CSI-RS resource of the class A, and the R RS settings include the N1 NZP CSI-RS resources of the class A; or the configuration information includes one reporting setting, where the reporting setting is associated with one piece of association information, namely, a link, used for channel measurement, to be specific, associated with one RS setting, and the RS setting includes the N1 NZP CSI-RS resources of the class A.

(2) The configuration information includes N2 NZP CSI-RS resources of a class B and CSI measurement behavior indication information and/or CSI feedback related information indication information, where N2 is a positive integer greater than or equal to 2, the CSI measurement behavior indication information indicates the CSI measurement behavior, and the CSI feedback related information indication information indicates the CSI feedback related information.

(3) The configuration information includes CSI measurement behavior indication information and/or CSI feedback related information indication information.

In the foregoing conditions (2) and (3), the CSI measurement behavior indication information indicates the CSI measurement behavior, and the CSI measurement behavior is behavior of performing CSI measurement by the terminal device in the hybrid mode; and the CSI feedback related information indication information indicates the CSI feedback related information, and the CSI feedback related information is related information used when the terminal device feeds back the CSI in the hybrid mode. Information related to the behavior of performing CSI measurement by the terminal device in the hybrid mode and the related information used when the terminal device feeds back the CSI in the hybrid mode are described below.

The terminal device and the network device may directly determine the CSI measurement behavior and/or the CSI feedback related information based on the configuration information that meets the condition (3), so that the terminal device does not need to perform determining and selection, thereby reducing complexity of the terminal device.

(4) The configuration information includes a quasi-co-location (QCL) type of an antenna port that is a type C.

In one embodiment, when the QCL type is the type C, the CSI measurement behavior and/or the CSI feedback related information may alternatively be determined with reference to another condition, for example, at least one condition in (1) to (12) or another condition. This is not specifically limited herein.

(5) The configuration information includes a QCL type of an antenna port that is a type C and a CSI process quantity that is 1.

The condition (5) is applicable to the LTE communications system. When the configuration information meets the condition (5), it may be determined that the network device requires the terminal device to perform CSI measurement and feedback in the hybrid mode.

(6) The configuration information includes a physical downlink shared channel mapping and quasi-co-location indicator PQI that indicates that a QCL quantity is greater than M, where M is a positive integer greater than or equal to 1.

(7) The configuration information includes a PQI that indicates that a parameter group quantity is greater than P, where P is a positive integer greater than or equal to 1.

(8) The configuration information includes at least one of bit information for CSI-reference signal resource indicator, CRI, reporting, bit information for CRI and RI reporting, and bit information for RI reporting.

If at least one of bit information for CRI reporting, bit information for CRI and RI reporting, and bit information for RI reporting that are used when the network device requires the terminal device to perform CSI measurement and feedback in the single-point transmission mode may be a predefined value, the configuration information does not need to include at least one of the bit information for CRI reporting, the bit information for CRI and RI reporting, and the bit information for RI reporting, so that when the configuration information meets the condition (8), it may be determined that the network device requires the terminal device to perform CSI measurement and feedback in the hybrid mode. If one or more of the bit information for CRI reporting, the bit information for CRI and RI reporting, and the bit information for RI reporting that are used when the network device requires the terminal device to perform CSI measurement and feedback in the single-point transmission mode are also configured by using the configuration information, when the configuration information meets the condition (8), it is further determined, with reference to other information in the configuration information, that the network device requires the terminal device to perform CSI measurement and feedback in the hybrid mode.

(9) The configuration information includes that when bit information for CRI reporting is L and there are K NZP CSI-RS resources, $L \neq \lceil \log_2 K \rceil$.

In one embodiment, the NZP CSI-RS resource may be a resource for channel measurement, a resource for interference measurement, a resource for both channel measurement and interference measurement, or a total resource including a resource for channel measurement and a resource for interference measurement. This is not specifically limited herein.

When the configuration information meets the condition (9), it may be determined that the network device requires the terminal device to perform CSI measurement and feedback in the hybrid mode. The bit information for CRI reporting may be configured by using higher layer signaling or physical layer signaling. The higher layer signaling may be RRC signaling or MAC layer signaling. This is not specifically limited herein.

(10) The configuration information includes one CSI reporting setting reporting setting, where the reporting setting is associated with at least one of Q channel links, T reference signal settings RS settings, and S reference signal sets RS sets, where Q is a positive integer greater than or equal to 2, T is a positive integer greater than or equal to 2, and S is a positive integer greater than or equal to 2.

(11) The configuration information includes a first resource and a second resource, where the first resource is a resource used to measure at least one of first CSI, second CSI, and third CSI, and the second resource is a resource used to measure fourth CSI.

The first CSI is obtained based on interference power; the second CSI is obtained based on interference that is obtained by using a preset algorithm when a resource used for channel measurement is the same as a resource used for interference measurement; the third CSI is obtained based on interference power and interference that is obtained by using a preset algorithm when a resource used for channel measurement is the same as a resource used for interference measurement; the preset algorithm may be that interference is equal to a difference between a received signal and a wanted signal; and the fourth CSI is obtained based on inter-stream interference or inter-codeword interference.

Measurement of at least one of the first CSI, the second CSI, and the third CSI indicates that the terminal device needs to perform CSI measurement and feedback in the single-point transmission mode, and measurement of the fourth CSI indicates that the terminal device needs to perform CSI measurement and feedback in the coordinated multipoint transmission/reception mode. Therefore, when the configuration information includes the first resource and the second resource, it indicates that the terminal device needs to perform CSI measurement and feedback in the hybrid mode.

(12) The configuration information includes second indication information, where the second indication information instructs the terminal device to perform CSI measurement and feedback in the hybrid transmission mode. The second indication information indicates that a current CSI process is a CSI process in the coordinated multipoint transmission/reception mode, and the terminal device learns, based on the indication information, to perform CSI measurement and feedback in the hybrid transmission mode.

In one embodiment, the second indication information may be signaling. For example, in the LTE communications system, the second indication information is an NCJT CSI process indication, and when higher layer signaling CoMP-Process=TRUE, it indicates that a current CSI process is a CSI process in the coordinated multipoint transmission/reception mode, so that the terminal device is instructed to perform CSI measurement and feedback in the hybrid transmission mode. For another example, in the NR communications system, when higher layer signaling CoMP-Process=TRUE, it indicates that the terminal device performs CSI measurement and feedback in the hybrid transmission mode. The higher layer signaling may be included in a measurement configuration MeasConfig, or may be included in a reporting configuration ReportConfig.

In one embodiment, the second indication information may indicate a first resource and a second resource, the first resource is a resource used to measure at least one of first CSI, second CSI, and third CSI, and the second resource is a resource used to measure fourth CSI.

When the configuration information meets at least one of the foregoing conditions (1) to (12), related CSI measurement behavior and/or CSI feedback related information is as follows:

The CSI measurement behavior includes measurement of at least one of the first CSI, the second CSI, and the third CSI, and measurement of the fourth CSI; and/or the CSI feedback related information includes use of joint encoding or independent encoding for channel state information-reference signal resource indicator CRI and a rank indicator RI, and/or a mapping mode of mapping a CRI and an RI to a time-frequency resource. The use of joint encoding or independent encoding for the CRI and the RI means that the CRI and the RI are jointly encoded or separately encoded. Whether joint encoding is performed on other information and the CRI and/or the RI is not limited.

In a design, the CSI measurement behavior indication information instructs to measure at least one of the first CSI, the second CSI, and the third CSI, and instructs to measure the fourth CSI.

In this way, the terminal device may directly determine the CSI measurement behavior based on the configuration information, so that the terminal device does not need to perform determining and selection, thereby reducing complexity of the terminal device.

In a design, the CSI feedback related information indication information indicates use of joint encoding for the CRI and the RI, or indicates use of independent encoding for the CRI and the RI; and/or the CSI feedback related information indication information indicates the mapping mode of mapping the CRI and the RI to the time-frequency resource.

In this way, the terminal device may directly determine the CSI feedback related information based on the configuration information, so that the terminal device does not need to perform determining and selection, thereby reducing complexity of the terminal device.

In a design, the fourth CSI is further obtained based on interference power; or the fourth CSI is further obtained based on interference that is obtained by using a preset algorithm when a resource used for channel measurement is the same as a resource used for interference measurement; or the fourth CSI is further obtained based on interference power and interference that is obtained by using a preset algorithm when a resource used for channel measurement is the same as a resource used for interference measurement.

In a design, the CSI feedback related information further includes at least one of the bit information for CRI reporting, the bit information for CRI and RI reporting, and the bit information for RI reporting; and at least one of the bit information for CRI reporting, the bit information for CRI and RI reporting, and the bit information for RI reporting may be determined in the following manner:

Preset rule 1: At least one of the bit information for CRI reporting, the bit information for CRI and RI reporting, and the bit information for RI reporting is determined based on a maximum bit width of the CRI and the RI.

Preset rule 2: At least one of the bit information for CRI reporting, the bit information for CRI and RI reporting, and the bit information for RI reporting is determined in consideration of both the CRI and the RI.

Preset rule 3: In the NR communications system, at least one of the bit information for CRI reporting, the bit information for CRI and RI reporting, and the bit information for RI reporting may be determined based on a quantity of links or a quantity of measurement channels.

In a design, the configuration information includes second indication information, where the second indication information instructs the terminal device to perform CSI measurement and feedback in the hybrid transmission mode, or indicates that a current CSI process is a CSI process in the coordinated multipoint transmission/reception mode; and the terminal device may determine the CSI feedback related information based on the second indication information, where the CSI feedback related information includes at least one of a coding scheme for a CRI and an RI, a bit width of a CRI, a bit width of an RI, a bit meaning of a CRI, or a bit meaning of an RI. For the network device, the CSI feedback related information includes at least one of the coding scheme for the CRI and the RI, the bit width of the CRI, the bit width of the RI, the bit meaning of the CRI, or the bit meaning of the RI, and that the configuration information is related to the CSI measurement behavior and/or the CSI feedback related information includes: at least one of the coding scheme for the CRI and the RI, the bit width of the CRI, the bit width of the RI, the bit meaning of the CRI, or the bit meaning of the RI is related to the second indication information.

In the foregoing method, the network device determines a transmission mode in which the terminal device is required to perform CSI measurement and feedback, and then the network device determines the second indication information based on the transmission mode in which the terminal device is required to perform CSI measurement and feedback. The terminal device may learn, based on the second indication information, of the transmission mode in which CSI measurement and feedback are performed, where the second indication information is related to at least one of the coding scheme for the CRI and the RI, the bit width of the CRI, the bit width of the RI, the bit meaning of the CRI, or the bit meaning of the RI. Therefore, according to the foregoing method, even if the terminal device cannot determine the transmission mode in which CSI measurement and feedback need to be performed, the terminal device may also learn, based on the second indication information sent by the network device, of the transmission mode in which CSI measurement and/or feedback are/is performed, so that in a scenario in which a plurality of transmission modes are supported, the terminal device measures CSI, and feeds back the measured CSI to the network device.

In a design, the determined coding scheme for the CRI and the RI is: use of joint encoding or independent encoding for the CRI and the RI.

In a design, the determining the CSI feedback related information based on the second indication information includes: determining at least one of the bit width of the CRI, the bit width of the RI, the bit meaning of the CRI, or the bit meaning of the RI based on the second indication information; or determining at least one of the bit width of the CRI or the bit width of the RI based on the second indication information and at least one of a quantity of NZP CSI-RS resources, a quantity of antenna ports for an NZP CSI-RS, capability information of the terminal device, or a value of the CRI; or determining at least one of the bit meaning of the CRI or the bit meaning of the RI based on the second indication information and at least one of a quantity of NZP CSI-RS resources, a quantity of antenna ports for an NZP CSI-RS, capability information of the terminal device, the bit width of the RI, or a value of the CRI. Correspondingly, that at least one of the coding scheme for the CRI and the RI, the bit width of the CRI, the bit width of the RI, the bit meaning of the CRI, or the bit meaning of the RI is related to the second indication information includes: at least one of the bit width of the CRI, the bit width of the RI, the bit meaning of the CRI, or the bit meaning of the RI is related to the second indication information; or at least one of the bit width of the CRI or the bit width of the RI is related to the second indication information and at least one of the quantity of NZP CSI-RS resources, the quantity of antenna ports for an NZP CSI-RS, the capability information of the terminal device, or the value of the CRI; or at least one of the bit meaning of the CRI or the bit meaning of the RI is related to the second indication information and at least one of the quantity of NZP CSI-RS resources, the quantity of antenna ports for an NZP CSI-RS, the capability information of the terminal device, the bit width of the RI, or the value of the CRI.

In this embodiment of the present disclosure, the CSI feedback related information may be determined in a plurality of different manners. This is relatively flexible.

In a design, the determining at least one of the bit width of the CRI, the bit width of the RI, the bit meaning of the CRI, or the bit meaning of the RI based on the second indication information includes at least one of the following cases: determining the bit width of the CRI and/or the bit width of the RI based on the second indication information; or determining the bit meaning of the CRI and/or the bit meaning of the RI based on the second indication information. Correspondingly, that at least one of the bit width of the CRI, the bit width of the RI, the bit meaning of the CRI, or the bit meaning of the RI is related to the second indication information includes at least one of the following cases: the bit width of the CRI and/or the bit width of the RI are/is related to the second indication information; or the bit meaning of the CRI and/or the bit meaning of the RI are/is related to the second indication information.

In this manner, when the RI and the CRI are jointly fed back or jointly encoded, the bit width of the RI is enabled to be independent of the value of the CRI, to be specific, it can be ensured that the bit width of the CRI and the bit width of the RI are fixed, so that the network device can correctly and jointly receive or jointly decode the CRI and the RI.

In a design, the determining at least one of the bit width of the CRI or the bit width of the RI based on the second indication information and at least one of a quantity of NZP CSI-RS resources, a quantity of antenna ports for an NZP CSI-RS, capability information of the terminal device, or a value of the CRI includes at least one of the following cases: determining the bit width of the CRI based on the quantity of NZP CSI-RS resources and the second indication information; or determining the bit width of the RI based on the second indication information and the quantity of antenna ports for an NZP CSI-RS and/or the capability information of the terminal device; or determining the bit width of the RI based on the second indication information, the value of the CRI, and the quantity of antenna ports for an NZP CSI-RS and/or the capability information of the terminal device; or determining the bit width of the RI based on the second indication information and the value of the CRI. Correspondingly, that at least one of the bit width of the CRI or the bit width of the RI is related to the second indication information and at least one of the quantity of NZP CSI-RS resources, the quantity of antenna ports for an NZP CSI-RS, the capability information of the terminal device, or the value of the CRI includes at least one of the following cases: the bit width of the CRI is related to the quantity of NZP CSI-RS resources and the second indication information; or the bit width of the RI is related to the second indication information and the quantity of antenna ports for an NZP CSI-RS and/or the capability information of the terminal device; or the bit width of the RI is related to the second indication information, the value of the CRI, and the quantity of antenna ports for an NZP CSI-RS and/or the capability information of the terminal device; or the bit width of the RI is related to the second indication information and the value of the CRI.

In this embodiment of the present disclosure, at least one of the bit width of the CRI and the bit width of the RI may be determined in a plurality of different manners. This is relatively flexible.

According to the foregoing method, when the RI and the CRI are jointly fed back or jointly encoded, the bit width of the RI is enabled to be independent of the value of the CRI, to be specific, it can be ensured that the bit width of the CRI and the bit width of the RI are known by both the network device and the terminal device, so that the network device can correctly and jointly receive or jointly decode the CRI and the RI. In addition, because the bit width of the RI is related to the quantity of antenna ports and/or a capability of the terminal device, overheads for the bit width of the RI are relatively low.

In a design, the determining at least one of the bit meaning of the CRI or the bit meaning of the RI based on the second indication information and at least one of a quantity of NZP CSI-RS resources, a quantity of antenna ports for an NZP CSI-RS, capability information of the terminal device, the bit width of the RI, or a value of the CRI includes at least one of the following cases: determining the bit meaning of the CRI based on the second indication information and the value of the CRI; or determining the bit meaning of the RI based on the value of the CRI, the second indication information, and at least one of the quantity of antenna ports for an NZP CSI-RS, the capability information of the terminal device, or the bit width of the RI; or determining the bit meaning of the RI based on the second indication information and the bit width of the RI; or determining the bit meaning of the RI based on the second indication information and the value of the CRI; or determining the bit meaning of the CRI based on the second indication information and the quantity of NZP CSI-RS resources. Correspondingly, that at least one of the bit meaning of the CRI or the bit meaning of the RI is related to the second indication information and at least one of the quantity of NZP CSI-RS resources, the quantity of antenna ports for an NZP CSI-RS, the capability information of the terminal device, the bit width of the RI, or the value of the CRI includes at least one of the following cases: the bit meaning of the RI is related to the second indication information and the value of the CRI; or the bit meaning of the RI is related to the value of the CRI, the second indication information and at least one of the quantity of antenna ports for an NZP CSI-RS, the capability information of the terminal device, or the bit width of the RI; or the bit meaning of the RI is related to the second indication information and the bit width of the RI; or the bit meaning of the RI is related to the second indication information and the value of the CRI; or the bit meaning of the CRI is related to the second indication information and a quantity of NZP CSI-RS resources.

In a design, the terminal device determines, based on the second indication information, to feed back at least two CSI sets, where the at least two CSI sets include a first set of CSI and a second set of CSI; a feedback sequence of the at least two CSI sets includes one of the following cases: a CQI of the first set and a CQI of the second set are sequentially fed back; or a CQI of the first set, a CQI of the second set, and a PMI of the first set are sequentially fed back; or a CQI of the first set, a CQI of the second set, a PMI of the first set, and a PMI of the second set are sequentially fed back; or a CQI of the first set, a PMI of the first set, and a CQI of the second set are sequentially fed back; or a CQI of the first set, a CQI of the second set, and a PMI of the second set are sequentially fed back; or a CQI of the first set, a PMI of the first set, a CQI of the second set, and a PMI of the second set are sequentially fed back; and the first set of CSI corresponds to CSI for the first NZP CSI-RS resource, and the second set of CSI corresponds to CSI for the second NZP CSI-RS resource; or the first set of CSI corresponds to CSI for the first codeword, and the second set of CSI corresponds to CSI for the second codeword. Correspondingly, the network device determines that the at least two CSI sets fed back by the terminal device are related to the second indication information, where the at least two CSI sets include the first set of CSI and the second set of CSI; the feedback sequence of the at least two CSI sets includes one of the following cases: the CQI of the first set and the CQI of the second set are sequentially fed back; or the CQI of the first set, the CQI of the second set, and the PMI of the first set are sequentially fed back; or the CQI of the first set, the CQI of the second set, the PMI of the first set, and the PMI of the second set are sequentially fed back; or the CQI of the first set, the PMI of the first set, and the CQI of the second set are sequentially fed back; or the CQI of the first set, the CQI of the second set, and the PMI of the second set are sequentially fed back; or the CQI of the first set, the PMI of the first set, the CQI of the second set, and the PMI of the second set are sequentially fed back; and the first set of CSI corresponds to the CSI for the first NZP CSI-RS resource, and the second set of CSI corresponds to the CSI for the second NZP CSI-RS resource; or the first set of CSI corresponds to the CSI for the first codeword, and the second set of CSI corresponds to the CSI for the second codeword.

If there are the at least two CSI sets, there may be a plurality of feedback sequences of the at least two CSI sets, and a specific feedback sequence to be used may be specified by the network device in advance, or specified in a protocol.

In a design, the terminal device further sends third indication information to the network device, where the third indication information indicates a QCL type supported by the terminal device, or indicates that FeCoMP-based CSI measurement and/or feedback are/is supported. Correspondingly, the network device receives the third indication information from the terminal device, where the third indication information indicates the QCL type supported by the terminal device, or indicates that FeCoMP-based CSI measurement and/or feedback are/is supported.

The CSI measurement behavior in this embodiment of the present disclosure includes FeCoMP-based CSI measurement. A FeCoMP feature is introduced to the protocol release R15. In this case, for terminal devices supporting the protocol release R15, because of different capabilities of the terminal devices, some terminal devices may not support FeCoMP due to limitations of capabilities such as hardware storage or processing capabilities, and some terminal devices have a strong capability and can support FeCoMP. Therefore, this embodiment of the present disclosure provides a solution: When accessing a network, the terminal device may report, by using the third indication information, whether FeCoMP-based CSI measurement is supported, as a capability of the terminal device to the network device, so that the network device can learn whether the terminal device supports FeCoMP-based CSI measurement. The third indication information may further indicate the QCL type supported by the terminal device, for example, whether a QCL type C is supported.

According to a second aspect, an embodiment of the present disclosure provides a communications apparatus. The communications apparatus has a function of implementing the method according to the first aspect. The function of the communications apparatus may be implemented by hardware, or may be implemented by hardware executing corresponding software. The hardware or the software includes one or more modules corresponding to the foregoing function. A device corresponding to the communications apparatus may be a terminal device or a network device.

In a design, when the device corresponding to the communications apparatus is the terminal device, the communications apparatus includes a processing unit and a transceiver unit. The processing unit is configured to support the terminal device in performing a corresponding function in the foregoing method. The transceiver unit is configured to support communication between the terminal device and another device (including a network device). The terminal device may further include a storage unit. The storage unit is configured to couple to the processing unit, and stores a program instruction and data that are suitable for the terminal device.

In another design, when the device corresponding to the communications apparatus may be the terminal device, the communications apparatus includes a memory, a processor, and an input/output port. The memory is configured to store a computer-readable program. The processor invokes an instruction stored in the memory, to perform the foregoing method performed by the terminal device according to the first aspect. The input/output port is configured to perform receiving and/or sending under control of the processor.

In another design, when the device corresponding to the communications apparatus is the network device, the communications apparatus includes a processing unit and a transceiver unit. The processing unit is configured to support the network device in performing a corresponding function in the foregoing method. The transceiver unit is configured to support communication between the network device and another device (including a terminal device). The network device may further include a storage unit. The storage unit is coupled to the processing unit, and stores a program instruction and data that are suitable for the network device.

In another design, when the device corresponding to the communications apparatus is the network device, the communications apparatus includes a memory, a processor, and an input/output port. The memory is configured to store a computer-readable program. The processor is configured to invoke the instruction stored in the memory, to perform the foregoing method performed by the network device according to the first aspect. The input/output port is configured to perform receiving and/or sending under control of the processor.

For example, the processing unit may be a processor, the transceiver unit may be an input/output port, and the storage unit may be a memory. The input/output port may be a plurality of elements, that is, includes a transmitter and a receiver, or includes a communications interface. The communications interface has receiving and sending functions.

According to a third aspect, an embodiment of the present disclosure further provides a computer storage medium. The storage medium stores a software program or instruction, and when being read and executed by one or more processors, the software program or instruction can implement the communications method according to the first aspect.

According to a fourth aspect, an embodiment of the present disclosure further provides a computer program product including an instruction. When the computer program product is run on a computer, the computer is enabled to perform the communications method according to the first aspect.

According to a fifth aspect, an embodiment of the present disclosure further provides a communications system. The communications system includes a terminal device and a network device.

According to a sixth aspect, an embodiment of the present disclosure further provides a communications method. In the communications method, a network device sends first indication information to a terminal device; the network device determines CSI feedback related information, and receives CSI feedback from the terminal device based on the CSI feedback related information, where the CSI feedback related information is related to the first indication information; the terminal device may determine the CSI feedback related information based on the first indication information, where the CSI feedback related information includes at least one of a coding scheme for a CRI and an RI, a bit width of a CRI, a bit width of an RI, a bit meaning of a CRI, or a bit meaning of an RI, and the first indication information is used to enable FeCoMP-based CSI feedback, or enable coordinated multipoint transmission/reception-based CSI feedback, or enable CSI feedback in a hybrid transmission mode.

In the foregoing method, the network device determines a transmission mode in which the terminal device is required to perform CSI measurement and feedback, and then the network device determines the first indication information based on the transmission mode in which the terminal device is required to perform CSI measurement and feedback. The terminal device may learn, based on the first indication information, of the transmission mode in which CSI measurement and feedback are performed, where the first indication information is related to at least one of the coding scheme for the CRI and the RI, the bit width of the CRI, the bit width of the RI, the bit meaning of the CRI, or the bit meaning of the RI. Therefore, according to the foregoing method, even if the terminal device cannot determine the transmission mode in which CSI measurement and feedback need to be performed, the terminal device may also learn, based on the first indication information sent by the network device, of the transmission mode in which CSI measurement and/or feedback are/is performed, so that in a scenario in which a plurality of transmission modes are supported, the terminal device measures CSI, and feeds back the measured CSI to the network device.

In a design, the determined coding scheme for the CRI and the RI is: use of joint encoding or independent encoding for the CRI and the RI.

In a design, the determining the CSI feedback related information based on the first indication information includes: determining at least one of the bit width of the CRI, the bit width of the RI, the bit meaning of the CRI, or the bit meaning of the RI based on the first indication information; or determining at least one of the bit width of the CRI or the bit width of the RI based on the first indication information and at least one of a quantity of NZP CSI-RS resources, a quantity of antenna ports for an NZP CSI-RS, capability information of the terminal device, or a value of the CRI; or determining at least one of the bit meaning of the CRI or the bit meaning of the RI based on the first indication information and at least one of a quantity of NZP CSI-RS resources, a quantity of antenna ports for an NZP CSI-RS, capability information of the terminal device, the bit width of the RI, or a value of the CRI. Correspondingly, that at least one of the coding scheme for the CRI and the RI, the bit width of the CRI, the bit width of the RI, the bit meaning of the CRI, or the bit meaning of the RI is related to the first indication information includes: at least one of the bit width of the CRI, the bit width of the RI, the bit meaning of the CRI, or the bit meaning of the RI is related to the first indication information; or at least one of the bit width of the CRI or the bit width of the RI is related to the first indication information and at least one of the quantity of NZP CSI-RS resources, the quantity of antenna ports for an NZP CSI-RS, the capability information of the terminal device, or the value of the CRI; or at least one of the bit meaning of the CRI or the bit meaning of the RI is related to the first indication information and at least one of the quantity of NZP CSI-RS resources, the quantity of antenna ports for an NZP CSI-RS, the capability information of the terminal device, the bit width of the RI, or the value of the CRI.

In this embodiment of the present disclosure, the CSI feedback related information may be determined in a plurality of different manners. This is relatively flexible.

In a design, the determining at least one of the bit width of the CRI, the bit width of the RI, the bit meaning of the CRI, or the bit meaning of the RI based on the first indication information includes at least one of the following cases: determining the bit width of the CRI and/or the bit width of the RI based on the first indication information; or determining the bit meaning of the CRI and/or the bit meaning of the RI based on the first indication information. Correspondingly, that at least one of the bit width of the CRI, the bit width of the RI, the bit meaning of the CRI, or the bit meaning of the RI is related to the first indication information includes at least one of the following cases: the bit width of the CRI and/or the bit width of the RI are/is related to the first indication information; or the bit meaning of the CRI and/or the bit meaning of the RI are/is related to the first indication information.

In this manner, when the RI and the CRI are jointly fed back or jointly encoded, the bit width of the RI is enabled to be independent of the value of the CRI, to be specific, it can be ensured that the bit width of the CRI and the bit width of the RI are fixed, so that the network device can correctly and jointly receive or jointly decode the CRI and the RI.

In a design, the determining at least one of the bit width of the CRI or the bit width of the RI based on the first indication information and at least one of a quantity of NZP CSI-RS resources, a quantity of antenna ports for an NZP CSI-RS, capability information of the terminal device, or a value of the CRI includes at least one of the following cases: determining the bit width of the CRI based on the quantity of NZP CSI-RS resources and the first indication information; or determining the bit width of the RI based on the first indication information and the quantity of antenna ports for an NZP CSI-RS and/or the capability information of the terminal device; or determining the bit width of the RI based on the first indication information, the value of the CRI, and the quantity of antenna ports for an NZP CSI-RS and/or the capability information of the terminal device; or determining the bit width of the RI based on the first indication information and the value of the CRI. Correspondingly, that at least one of the bit width of the CRI or the bit width of the RI is related to the first indication information and at least one of the quantity of NZP CSI-RS resources, the quantity of antenna ports for an NZP CSI-RS, the capability information of the terminal device, or the value of the CRI includes at least one of the following cases: the bit width of the CRI is related to the quantity of NZP CSI-RS resources and the first indication information; or the bit width of the RI is related to the first indication information and the quantity of antenna ports for an NZP CSI-RS and/or the capability information of the terminal device; or the bit width of the RI is related to the first indication information, the value of the CRI, and the quantity of antenna ports for an NZP CSI-RS and/or the capability information of the terminal device; or the bit width of the RI is related to the first indication information and the value of the CRI.

In this embodiment of the present disclosure, at least one of the bit width of the CRI and the bit width of the RI may be determined in a plurality of different manners. This is relatively flexible.

According to the foregoing method, when the RI and the CRI are jointly fed back or jointly encoded, the bit width of the RI is enabled to be independent of the value of the CRI, to be specific, it can be ensured that the bit width of the CRI and the bit width of the RI are known by both the network device and the terminal device, so that the network device can correctly and jointly receive or jointly decode the CRI and the RI. In addition, because the bit width of the RI is related to the quantity of antenna ports and/or a capability of the terminal device, overheads for the bit width of the RI are relatively low.

In a design, the determining at least one of the bit meaning of the CRI or the bit meaning of the RI based on the first indication information and at least one of a quantity of NZP CSI-RS resources, a quantity of antenna ports for an NZP CSI-RS, capability information of the terminal device, the bit width of the RI, or a value of the CRI includes at least one of the following cases: determining the bit meaning of the CRI based on the first indication information and the value of the CRI; or determining the bit meaning of the RI based on the value of the CRI, the first indication information, and at least one of the quantity of antenna ports for an NZP CSI-RS, the capability information of the terminal device, or the bit width of the RI; or determining the bit meaning of the RI based on the first indication information and the bit width of the RI; or determining the bit meaning of the RI based on the first indication information and the value of the CRI; or determining the bit meaning of the CRI based on the first indication information and the quantity of NZP CSI-RS resources. Correspondingly, that at least one of the bit meaning of the CRI or the bit meaning of the RI is related to the first indication information and at least one of the quantity of NZP CSI-RS resources, the quantity of antenna ports for an NZP CSI-RS, the capability information of the terminal device, the bit width of the RI, or the value of the CRI includes at least one of the following cases: the bit meaning of the RI is related to the first indication information and the value of the CRI; or the bit meaning of the RI is related to the value of the CRI, the first indication information, and at least one of the quantity of antenna ports for an NZP CSI-RS, the capability information of the terminal device, or the bit width of the RI; or the bit meaning of the RI is related to the first indication information and the bit width of the RI; or the bit meaning of the CRI is related to the first indication information and the value of the CRI; or the bit meaning of the CRI is related to the first indication information and the quantity of NZP CSI-RS resources.

In a design, the terminal device determines, based on the first indication information, to feed back at least two CSI sets, where the at least two CSI sets include a first set of CSI and a second set of CSI; a feedback sequence of the at least two CSI sets includes one of the following cases: a CQI of the first set and a CQI of the second set are sequentially fed back; or a CQI of the first set, a CQI of the second set, and a PMI of the first set are sequentially fed back; or a CQI of the first set, a CQI of the second set, a PMI of the first set, and a PMI of the second set are sequentially fed back; or a CQI of the first set, a PMI of the first set, and a CQI of the second set are sequentially fed back; or a CQI of the first set, a CQI of the second set, and a PMI of the second set are sequentially fed back; or a CQI of the first set, a PMI of the first set, a CQI of the second set, and a PMI of the second set are sequentially fed back; and the first set of CSI corresponds to CSI for the first NZP CSI-RS resource, and the second set of CSI corresponds to CSI for the second NZP CSI-RS resource; or the first set of CSI corresponds to CSI for the first codeword, and the second set of CSI corresponds to CSI for the second codeword. Correspondingly, the network device determines that the at least two CSI sets fed back by the terminal device are related to the first indication information, where the at least two CSI sets include the first set of CSI and the second set of CSI; the feedback sequence of the at least two CSI sets includes one of the following cases: the CQI of the first set and the CQI of the second set are sequentially fed back; or the CQI of the first set, the CQI of the second set, and the PMI of the first set are sequentially fed back; or the CQI of the first set, the CQI of the second set, the PMI of the first set, and the PMI of the second set are sequentially fed back; or the CQI of the first set, the PMI of the first set, and the CQI of the second set are sequentially fed back; or the CQI of the first set, the CQI of the second set, and the PMI of the second set are sequentially fed back; or the CQI of the first set, the PMI of the first set, the CQI of the second set, and the PMI of the second set are sequentially fed back; and the first set of CSI corresponds to the CSI for the first NZP CSI-RS resource, and the second set of CSI corresponds to the CSI for the second NZP CSI-RS resource; or the first set of CSI corresponds to the CSI for the first codeword, and the second set of CSI corresponds to the CSI for the second codeword.

If there are the at least two CSI sets, there may be a plurality of feedback sequences of the at least two CSI sets, and a specific feedback sequence to be used may be specified by the network device in advance, or specified in a protocol.

In a design, the terminal device further sends third indication information to the network device, where the third indication information indicates that the terminal device supports FeCoMP-based CSI measurement and/or feedback. Correspondingly, the network device receives the third indication information from the terminal device, where the third indication information indicates a QCL type supported by the terminal device, or indicates that FeCoMP-based CSI measurement and/or feedback are/is supported.

The CSI measurement behavior in this embodiment of the present disclosure includes FeCoMP-based CSI measurement. A FeCoMP feature is introduced to the protocol release R15. In this case, for terminal devices supporting the protocol release R15, because of different capabilities of the terminal devices, some terminal devices may not support FeCoMP due to limitations of capabilities such as hardware storage or processing capabilities, and some terminal devices have a strong capability and can support FeCoMP. Therefore, this embodiment of the present disclosure provides a solution: When accessing a network, the terminal device may report, by using the third indication information, whether FeCoMP-based CSI measurement is supported, as a capability of the terminal device to the network device, so that the network device can learn whether the terminal device supports FeCoMP-based CSI measurement. The third indication information may further indicate the QCL type supported by the terminal device.

The first indication information according to the sixth aspect and the second indication information according to the first aspect may be same indication information.

According to a seventh aspect, an embodiment of the present disclosure provides a communications apparatus. The communications apparatus has a function of implementing the method according to the sixth aspect. The function of the communications apparatus may be implemented by hardware, or may be implemented by hardware executing corresponding software. The hardware or the software includes one or more modules corresponding to the foregoing function. A device corresponding to the communications apparatus may be a terminal device or a network device.

In a design, when the device corresponding to the communications apparatus is the terminal device or a chip that can be disposed in the terminal device, the communications apparatus includes a processing unit and a transceiver unit. The processing unit is configured to support the terminal device in performing a corresponding function in the foregoing method. The transceiver unit is configured to support communication between the terminal device and another device (including a network device). The terminal device may further include a storage unit. The storage unit is configured to couple to the processing unit, and stores a program instruction and/or data that are/is suitable for the terminal device.

In another design, when the device corresponding to the communications apparatus may be the terminal device, the communications apparatus includes a memory, a processor, and an input/output port. The memory is configured to store a computer-readable program or an instruction. The processor runs the program or the instruction stored in the memory, to perform the foregoing method performed by the terminal device according to the sixth aspect. The input/output port is configured to perform receiving and/or sending under control of the processor.

In another design, when the device corresponding to the communications apparatus is the network device, the communications apparatus includes a processing unit and a transceiver unit. The processing unit is configured to support the network device in performing a corresponding function in the foregoing method according to the sixth aspect. The transceiver unit is configured to support communication between the network device and another device (including a terminal device). The network device may further include a storage unit. The storage unit is configured to couple to the processing unit, and stores a program instruction and/or data that are/is suitable for the network device.

In another design, when the device corresponding to the communications apparatus is the network device or a chip that can be disposed in the network device, the communications apparatus includes a memory, a processor, and an input/output port. The memory is configured to store a computer-readable program or an instruction. The processor runs the program or the instruction stored in the memory, to perform the foregoing method performed by the network device according to the sixth aspect. The input/output port is configured to perform receiving and/or sending under control of the processor.

For example, the processing unit may be a processor, the transceiver unit may be an input/output port, and the storage unit may be a memory. The input/output port may include a transmitter and a receiver, or include a communications interface, for example, an input/output port of the chip. The communications interface has receiving and sending functions.

According to an eighth aspect, an embodiment of the present disclosure further provides a computer storage medium. The storage medium stores a software program or instruction, and when being read and executed by one or more processors, the software program or instruction can implement the communications method according to the sixth aspect.

According to a ninth aspect, an embodiment of the present disclosure further provides a computer program product including an instruction. When the computer program product is run on a computer, the computer is enabled to perform the communications method according to the sixth aspect.

According to a tenth aspect, an embodiment of the present disclosure further provides a communications system. The communications system includes a terminal device and a network device.

In the technical solutions provided in the embodiments of the present disclosure, because the network device determines, based on a manner in which the terminal device is required to perform CSI measurement and feedback, namely, a transmission mode in which the terminal device is required to perform CSI measurement and feedback, to send the configuration information to the terminal device, and the terminal device may learn, based on the configuration information, how to perform CSI measurement and feedback. Therefore, in the technical solutions, the terminal device may learn, based on the configuration information sent by the network device, how to perform CSI measurement and/or feedback, so that in a scenario in which a plurality of transmission modes are supported, the terminal device measures CSI, and feeds back the measured CSI to the network device. In the technical solutions, the terminal device determines the CSI measurement behavior and/or the CSI feedback related information based on the configuration information, thereby reducing signaling overheads. Further, when a corresponding resource is configured in the configuration information, the terminal device can perform CSI measurement and feedback in the plurality of transmission modes. Compared with configuration of CSI measurement and feedback in one transmission mode once, signaling overheads can be reduced, reference signal overheads can be reduced, a delay of CSI measurement and feedback can be reduced, and performance can be improved. Further, if the terminal device feeds back only CSI in a transmission mode with optimal transmission performance, feedback overheads can be reduced, and the network device is assisted in performing data scheduling based on the optimal transmission mode. Alternatively, further, if the terminal device can feed back CSI in the plurality of transmission modes, the network device may obtain transmission performance statuses in the plurality of transmission modes, to assist data scheduling and improve performance.

BRIEF DESCRIPTION OF DRAWINGS

FIG. 5-1 is a schematic flowchart of a communications method according to an embodiment of the present disclosure;

FIG. 5-2 is a schematic diagram of a resource configuration for CSI according to an embodiment of the present disclosure;

FIG. 5-3 is a schematic flowchart of a communications method according to an embodiment of the present disclosure;

FIG. 7 is a schematic diagram of a second mapping mode according to an embodiment of the present disclosure;

FIG. 8 is a schematic diagram of a third mapping mode according to an embodiment of the present disclosure;

FIG. 9 is a schematic diagram of a fourth mapping mode according to an embodiment of the present disclosure;

DESCRIPTION OF EMBODIMENTS

Embodiments of the present disclosure provide a communications method and device, to enable a terminal device to measure CSI and feed back the measured CSI to a network device in a scenario in which a plurality of transmission modes are supported. The method and the device are based on a same inventive idea. Because problem resolving principles of the method and the device are similar, for implementation of the device and the method, mutual reference may be made, and repeated parts are not described in detail again.

The technical solutions provided in the embodiments of the present disclosure are applicable to a scenario in which transmission between a terminal device and a network device supports a plurality of transmission modes, where the plurality of transmission modes may include a single-point transmission mode and a coordinated multipoint transmission/reception mode. The single-point transmission mode means that data transmission between a single transmission point and a same terminal device can be supported in one time unit, and the coordinated multipoint transmission/reception mode means that data transmission between a plurality of transmission points and a same terminal device can be supported in one time unit. Data transmission includes data sending and receiving. A time unit may be a scheduling unit, and the scheduling unit may include at least one of one or more subframes, one or more slots, one or more mini-slots, and one or more symbols. This may be specifically determined based on system implementation or a protocol. In the embodiments of the present disclosure, the single-point transmission mode may be single-site transmission, dynamic point selection (DPS) transmission, dynamic point blanking (DPB) transmission, or another single-point transmission manner. This is not specifically limited herein. The coordinated multipoint transmission/reception mode may be coherent joint transmission (JT), non-coherent joint transmission (NCJT), or another joint transmission manner. This is not specifically limited herein.

Figure 1:
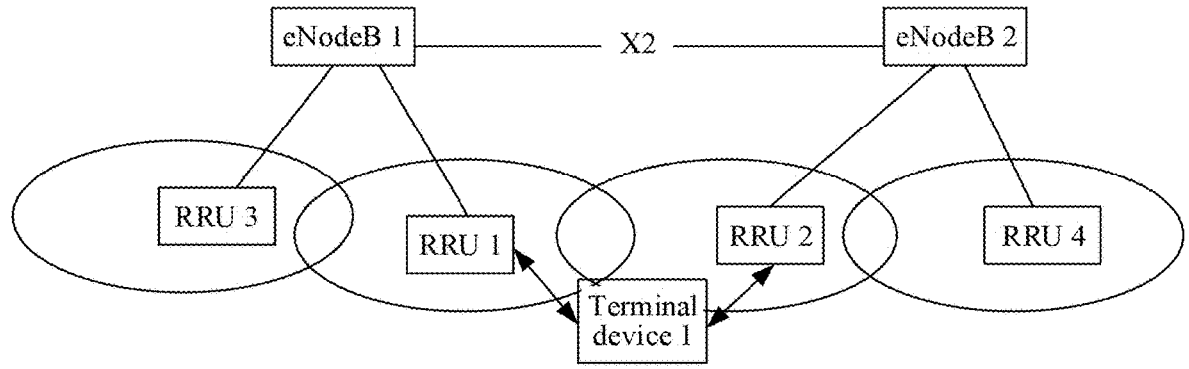
FIG. 1 is a schematic diagram of a network architecture in a coordinated multipoint transmission/reception mode according to an embodiment of the present disclosure.
Figure 2:
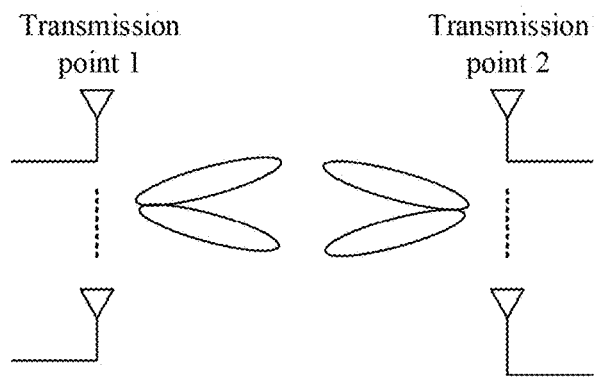
FIG. 2 is a schematic diagram of a network architecture in a coordinated multipoint multistream transmission/reception technology according to an embodiment of the present disclosure.

In the coordinated multipoint transmission/reception mode, a transmission point is a transmission point used for coordinated transmission, a transmission point used for coordinated transmission is a transmission point in a coordination set, and transmission points in the coordination set jointly complete data transmission with a terminal device. Signals sent by any two transmission points in the coordination set may be subject to different large-scale fading characteristics (that is, non-quasi-co-location), and the two transmission points may belong to a same cell or different cells. This is not limited in the embodiments of the present disclosure. For a definition of QCL in the embodiments of the present disclosure, refer to a definition in LTE. To be specific, signals sent through QCL-ed antenna ports are subject to same large-scale fading. The large-scale fading includes one or more of the following: a delay spread, a Doppler spread, a Doppler shift, an average channel gain, an average delay, and the like. In the embodiments of the present disclosure, for the definition of the QCL, further refer to a definition of the QCL in 5G. In a new radio NR system, a definition of the QCL is similar to that in an LTE system, but space domain information is added. For example, signals sent from QCL-ed antenna ports are subject to same large-scale fading. The large-scale fading includes one or more of the following parameters: a delay spread, a Doppler spread, a Doppler shift, an average channel gain, an average delay, a space domain parameter, and the like. The spatial domain parameter may be, for example, one of a radiation angle (AOA), a dominant radiation angle (Dominant AoA), an average angle of arrival (Average AoA), an angle of arrival (AOD), a channel correlation matrix, a power angle spread spectrum of an angle of arrival, an average angle of departure (Average AoD), a power angle spread spectrum of an angle of departure, a transmit channel correlation, a receive channel correlation, transmit beamforming, receive beamforming, a spatial channel correlation, a filter, a spatial filtering parameter, or a spatial receiving parameter. For example, FIG. 1 is a schematic diagram of a network architecture in a coordinated multipoint transmission/reception mode. In FIG. 1, a remote radio unit (RRU) is used as a transmission point, an RRU 1 and an RRU 2 jointly send data to a terminal device 1, the RRU 1 and the RRU 2 jointly receive data from the terminal device 1, and the RRU 1 and the RRU 2 perform coordinated scheduling or coordinated beamforming. Further, in the coordinated multipoint transmission/reception mode, a coordinated multipoint multistream transmission/reception technology is used. By using the technology, different transmission points independently perform precoding, the different transmission points transmit different data streams, different codewords, or different transport blocks. In the coordinated multipoint transmission/reception mode, in addition to the coordinated multipoint multistream transmission/reception technology, the different transmission points may alternatively transmit different data streams or same data streams/codewords/transport blocks, or the like. The same data streams/codewords/transport blocks transmitted by the different transmission points use different coding schemes, or the same transmitted data streams/codewords/transport blocks use a redundancy version. This is not specifically limited herein. It should be noted that, in the coordinated multipoint multistream transmission/reception technology, when channel quality indicator (CQI) of a data stream is calculated, an interference status of another data stream is considered. For example, FIG. 2 is a schematic diagram of a network architecture in a coordinated multipoint multistream transmission/reception technology. In FIG. 2, transmission points 1 are used as an example. A plurality of transmission points including the transmission points 1 jointly transmit data to a terminal device, different elliptical areas corresponding to the transmission points 1 indicate that the transmission points 1 transmit different data streams.

The network device in the embodiments of the present disclosure may be a device having a wireless receiving and sending function, and includes, but is not limited to, a base station, a relay station, an access point, a vehicle-mounted device, a wearable device, a network side device in a future 5G network or a network device in a future evolved public land mobile network (PLMN), an access point in a Wi-Fi system, user equipment (UE), and the like. For example, the network device may be a transmission point (TRP or TP) in the NR system, a gNodeB (gNB) in the NR system, or one antenna panel or a group of antenna panels (including a plurality of antenna panels) of a gNodeB in the 5G system. This is not particularly limited in the embodiments of the present disclosure.

The terminal device in the embodiments of the present disclosure is a device having a wireless receiving and sending function, and includes, but is not limited to, UE, an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, an unmanned aerial vehicle device, a smart appliance, a terminal device in a future network, a terminal device in a future evolved PLMN, or the like. This is not limited in the embodiments of the present disclosure.

The technical solutions provided in the embodiments of the present disclosure may be applied to a new radio (NR) communications technology. NR is a new generation radio access network technology, and may be applied to a future evolved network such as a 5G communications system. The technical solutions provided in the embodiments of the present disclosure may also be applied to wireless communications systems such as LTE and wireless fidelity (WIFI).

It may be understood that the wireless communications system is a network that provides a wireless communication function. The wireless communications system may use different communications technologies, such as code division multiple access (CDMA), wideband code division multiple access (WCDMA), time division multiple access (TDMA), frequency division multiple access (FDMA), orthogonal frequency-division multiple access (OFDMA), single carrier frequency division multiple access (single Carrier FDMA, SC-FDMA), and carrier sense multiple access with collision avoidance (CSMA/CA). Networks may be classified into a 2G network, a 3G network, a 4G network, or a future evolved network such as a 5G network based on factors such as capacities, rates, or delays of different networks. A typical 2G network includes a global system for mobile communications (GSM) network or a general packet radio service (GPRS) network. A typical 3G network includes a universal mobile telecommunications system (UMTS) network. A typical 4G network includes a long term evolution (LTE) network. The UMTS network sometimes may also be referred to as a universal terrestrial radio access network (UTRAN), and the LTE network sometimes may also be referred to as an evolved universal terrestrial radio access network (E-UTRAN). Based on different resource allocation manners, the networks may be classified into a cellular communications network and a wireless local area network (WLAN). The cellular communications network is dominated by scheduling, and the WLAN is dominated by contention. All the foregoing 2G, 3G, and 4G networks are cellular communications networks. With development of technologies, the technical solutions provided in the embodiments of the present disclosure may be applied to a 4.5G or 5G network, or another non-cellular communications network. It may be understood that with development of technologies, the technical solutions provided in the embodiments of the present disclosure may also be applied to a subsequent evolved network, such as 6G. This is not limited herein. For brevity, a wireless communications network sometimes is referred to as a network for short in the embodiments of the present disclosure. The cellular communications network is a type of wireless communications network, and connects a terminal device to a network device through a radio channel in a cellular wireless networking manner, so that users can communicate with each other in an activity.

An example in which the embodiments of the present disclosure are applied to the 5G communications system is used for description below. It should be noted that the solutions in the embodiments of the present disclosure may be further applied to another wireless communications network, and a corresponding name may also be replaced with a name of a corresponding function in the another wireless communications network.

Figure 3:
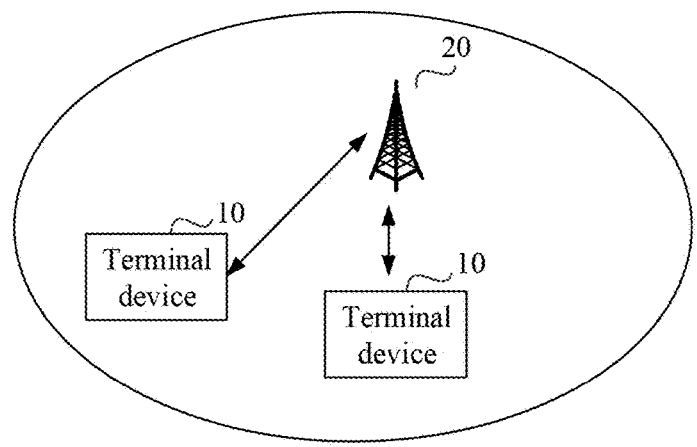
FIG. 3 is a schematic diagram of a network architecture of a 5G system according to an embodiment of the present disclosure.
Figure 4:
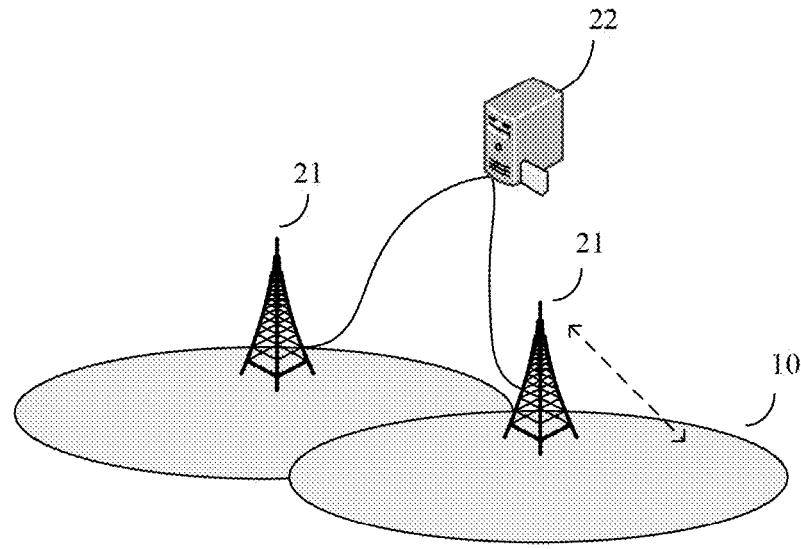
FIG. 4 is a schematic diagram of a network architecture of a 5G system according to an embodiment of the present disclosure.

The technical solutions provided in the embodiments of the present disclosure are applicable to the 5G communications system. FIG. 3 and FIG. 4 show schematic diagrams of two network architectures to which the technical solutions provided in the embodiments of the present disclosure are applicable to the 5G system. A network shown in FIG. 4 includes a network device and a terminal device 10, and FIG. 3 only shows one network device 20 and two terminal devices 10 that communicate with the network device 20. A difference between the network shown in FIG. 4 and a network shown in FIG. 3 lies in that, in the network shown in FIG. 4, some functions of the network device are implemented on a distributed unit (DU) 21, and the other functions of the network device are implemented on a centralized unit (CU) 22. For example, the CU implements functions of RRC (radio resource control) and PDCP (packet data convergence protocol) layers, and the DU implements functions of RLC (radio link control), MAC (media access control), and PHY (physical) layers. Information on the RRC layer eventually becomes information on the PHY layer, or is converted from information on the PHY layer. Therefore, in this architecture, higher layer signaling, such as RRC layer signaling or PHCP layer signaling, may also be considered as being sent by the DU or sent by the DU+the RU. A plurality of DUs 21 may be connected to a same CU 22. It should be noted that, each of the networks shown in FIG. 3 and FIG. 4 may include at least one network device, and there may be at least one terminal device that communicates with one network device. This is not limited to quantities of network devices shown in FIG. 3 and FIG. 4 and quantities of terminal devices shown in FIG. 3 and FIG. 4. It may be understood that the network device may be a CU node, a DU node, or a device including a CU node and a DU node. In addition, the CU may be categorized as a network device in a RAN, or the CU may be categorized as a network device in a core network CN. This is not limited herein. In one embodiment, the technical solutions provided in the embodiments of the present disclosure may be further applied to a terminal device-centered network.

Some nouns in the embodiments of the present disclosure are explained and described below, to facilitate understanding by a person skilled in the art.

(1) CSI is information for channel state measurement and/or reporting. For example, the CSI may include at least one of a CSI-reference signal resource indicator (CRI), a rank indicator (RI), a precoding matrix indicator (PMI), or channel quality indicator (CQI).

The terminal device and/or the network device can obtain CSI through CSI measurement and/or reporting, to perform data scheduling, thereby improving transmission performance.

(2) Quasi-Co-Location (QCL) Type

In an existing LTE communications system, two QCL types, namely, a type A and a type B, are defined. The type A defines that antenna ports of a TP meet a QCL relationship. The antenna port may be an antenna port for sending a reference signal, and the reference signal is, for example, at least one of a synchronization signal, a demodulation reference signal (DMRS), and a CSI-reference signal (CSI- RS). The type B defines a QCL configuration of antenna ports between a plurality of TPs. The QCL configuration of the antenna ports between the plurality of TPs may be indicated by using a physical downlink shared channel (PDSCH) resource mapping and quasi-colocation indicator (PDSCH RE mapping and quasi-co-location indicator, PQI) in downlink control information (DCI), and the PQI is of 2 bits. The PQI may be used to indicate a quasi-co-location relationship of antenna ports for one or more of a channel state information-reference signal (CSI-RS) which satisfies QCL, a DMRS, a phase tracking reference signal (PTRS), which is also referred to as a phase noise reference signal), and a synchronized signal block (SS block). The PTRS may also be referred to as a phase compensation reference signal (PCRS), the SS block includes one or more of a synchronization signal and a broadcast channel, and the synchronization signal includes a primary synchronization signal (PSS) and/or a secondary synchronization signal (SSS). In the embodiments of the present disclosure, the type A may correspond to a case of a same network device with a same antenna panel in the NR communications system, and the type B may correspond to a case of a same network device with different antenna panels in the NR communications system, or the Type-B may correspond to a case of different network devices in the NR communications system.

All DMRS antenna ports corresponding to the type A and the type B meet a QCL relationship. The type A and the type B may correspond to the single-point transmission mode. For example, the single-point transmission mode may be single-site transmission, DPS transmission, or DPB transmission. For example, antenna ports 7 to 14 corresponding to the type A or the type B all meet a QCL relationship.

When different data streams are transmitted for the terminal device, to distinguish quasi-co-location information of antenna ports corresponding to reference signals of the different data streams, different quasi-co-location information is configured for the antenna ports corresponding to the reference signals of the different data streams. Therefore, some antenna ports for a same reference signal are not quasi-co-located. When QCL indication information indicates a QCL type of a DMRS antenna port is a type C, it indicates that the terminal device and the network device use the coordinated multipoint transmission/reception mode. For example, the coordinated multipoint transmission/reception mode may be NCJT. A QCL relationship of DMRS antenna ports corresponding to the type C is different from a QCL relationship of DMRS antenna ports corresponding to the type A or the type B. For example, not all DMRS antenna ports of the type C have a QCL relationship. For example, corresponding to the type C, the antenna ports 7, 8, 11, and 13 meet a QCL relationship, and the antenna ports 9, 10, 12, and 14 meet a QCL relationship. However, any one of the antenna ports 7, 8, 11, and 13 and any one of the antenna ports 9, 10, 12, and 14 do not meet a QCL relationship.

It should be noted that, names of various QCL types may be corresponding names of the foregoing names, or may be replaced with other names of corresponding functions. This is not limited in the embodiments of the present disclosure.

(3) Interaction: Interaction in the embodiments of the present disclosure is a process in which two parties that perform the interaction transfer information to each other, where the information transferred herein may be the same or different. For example, if the two parties that perform the interaction are a base station 1 and a base station 2, the base station 1 may request information from the base station 2, and the base station 2 provides the base station 1 with the information requested by the base station 1. Certainly, the base station 1 and the base station 2 may request information from each other, and the information requested herein may be the same or may be different.

(4) "A plurality of" means two or more than two. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects. "At least one" means one or more. "At least one of A and B", similar to "A and/or B", describes an association relationship between associated objects and represents that three relationships may exist. For example, at least one of A and B may represent the following three cases: Only A exists, both A and B exist, and only B exists.

(5) Nouns "network" and "system" are usually interchangeably used, but meanings of the nouns can be understood by a person skilled in the art. Information, signal, message, and channel may be interchangeably used sometimes. It should be noted that meanings expressed by the terms are consistent when differences of the terms are not emphasized. "Of", "relevant", and "corresponding" may be interchangeably used sometimes. It should be noted that meanings expressed by the terms are consistent when differences of the terms are not emphasized.

The following describes the technical solutions provided in the present disclosure with reference to the accompanying drawings in this specification. It should be noted that, a presentation sequence of the embodiments in the present disclosure represents only a sequence of the embodiments, and does not represent priorities of the technical solutions provided in the embodiments.

Figures 1, 5:
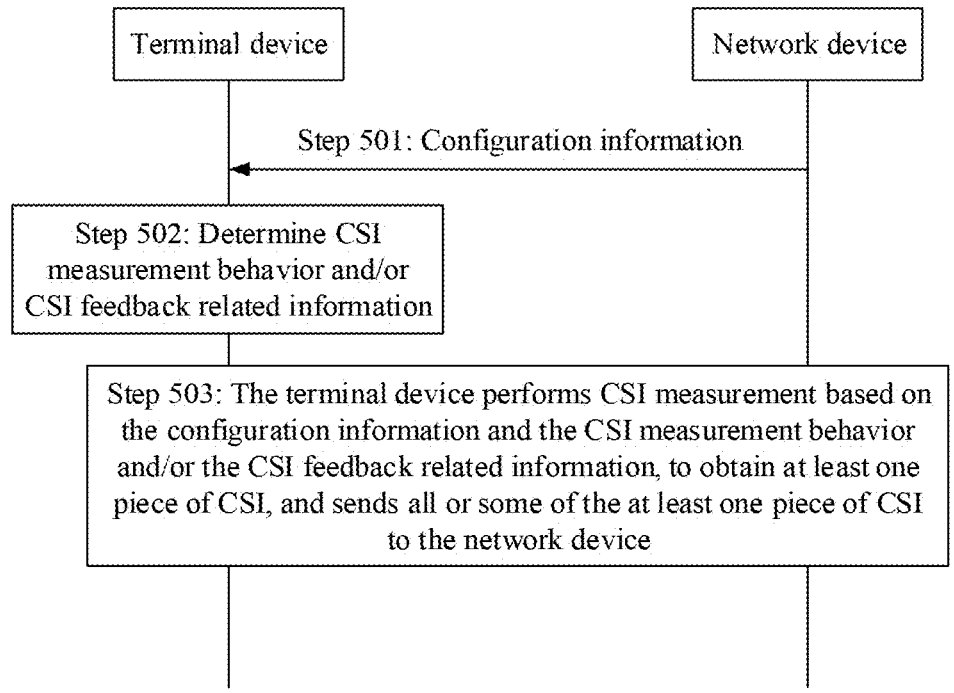
Figures 2, 5:
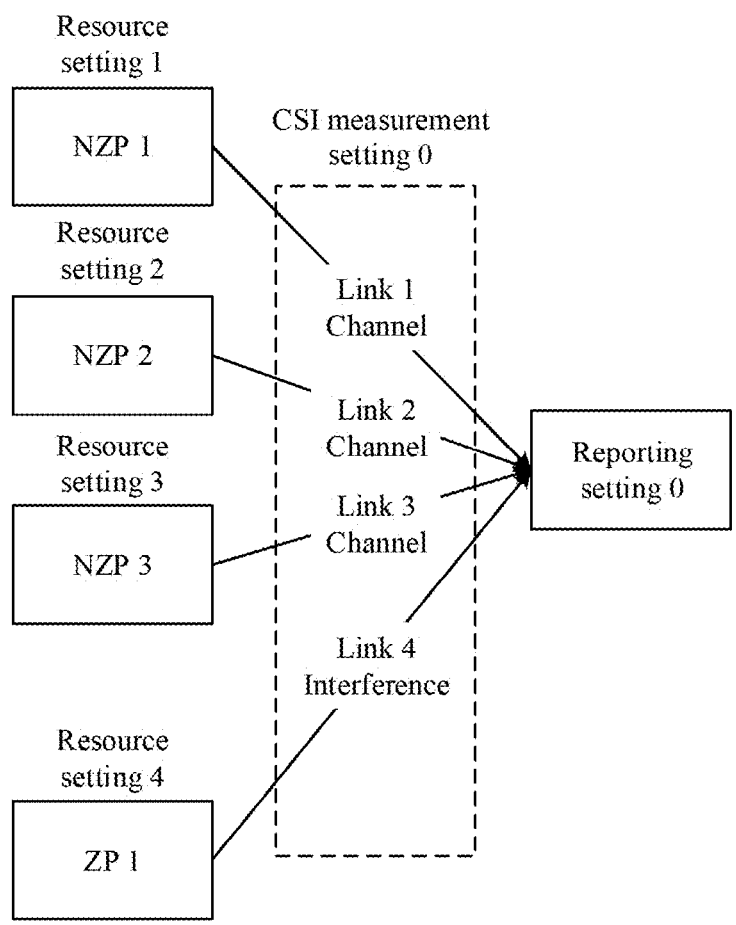
Figures 3, 5:
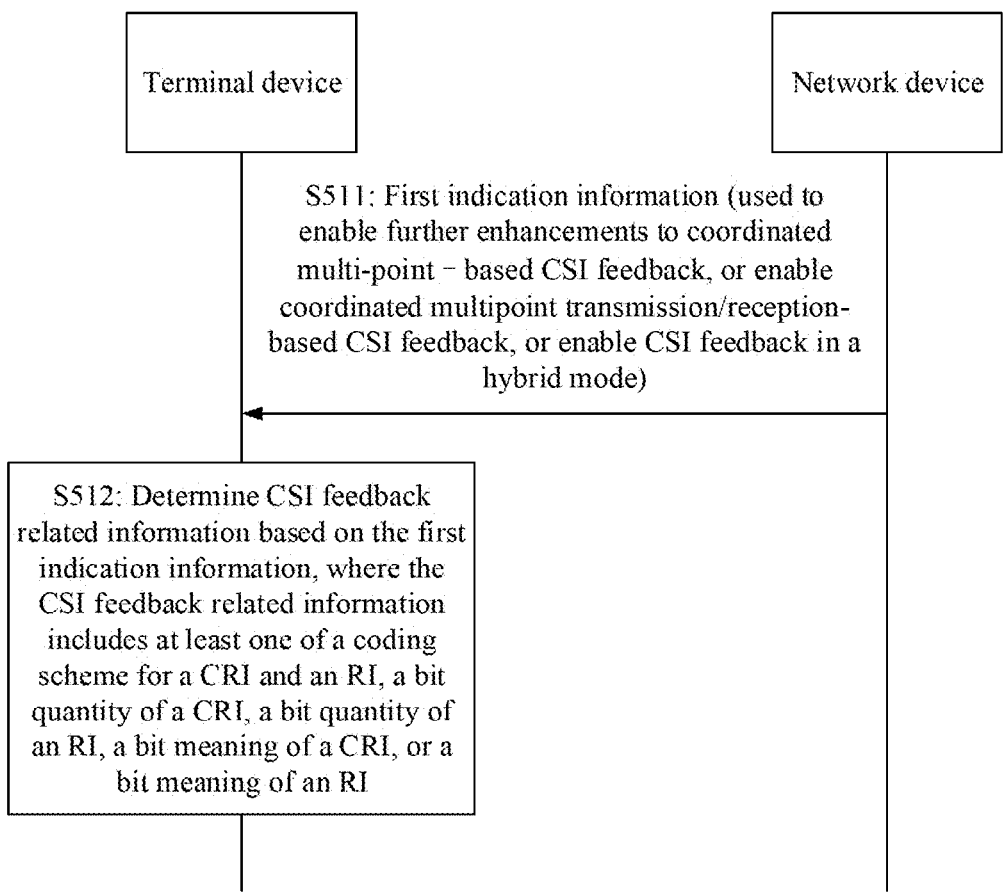

An embodiment of the present disclosure provides a communications method. FIG. 5-1 shows a procedure of interaction between a terminal device and a network device in the communications method, and the method includes the following operations.

Operation 501: The network device sends configuration information to the terminal device.

In this embodiment, the network device determines a manner in which the terminal device is required to perform CSI measurement and feedback, to be specific, the network device determines a transmission mode in which the terminal device is required to perform CSI measurement and feedback, and then the network device determines the configuration information based on the manner in which the terminal device is required to perform CSI measurement and feedback. The network device sends the configuration information to the terminal device through operation 501, and the terminal device may learn, based on the configuration information, how to perform CSI measurement and feedback, where the configuration information is related to CSI measurement behavior and/or CSI feedback related information.

In this embodiment, methods for performing CSI measurement and feedback by the terminal device vary depending on transmission modes. When the terminal device performs CSI measurement and feedback in the different transmission modes, configuration information determined by the network device is also different. The configuration information is used by the terminal device to learn how to perform CSI measurement and feedback. That the network device determines a transmission mode in which the terminal device is required to perform CSI measurement and feedback includes the following three cases: Case 1: The network device determines that the terminal device needs to perform CSI measurement and feedback in a hybrid mode of a single-point transmission mode+a coordinated multipoint transmission/reception mode. Case 2: The network device determines that the terminal device needs to perform CSI measurement and feedback in a single-point transmission mode. Case 3: The network device determines that the terminal device needs to perform CSI measurement and feedback in a coordinated multipoint transmission/reception mode. The three cases respectively correspond to different configuration information, and are described in detail below.

Operation 502: The terminal device determines the CSI measurement behavior and/or the CSI feedback related information, where the channel state information CSI measurement behavior and/or the CSI feedback related information are/is related to the configuration information.

The CSI measurement behavior instructs the terminal device how to measure CSI, and the CSI feedback related information is related information when the terminal device feeds back the CSI to the network device. For example, the CSI feedback related information may include at least one of the following information: content (for example, at least one of a CRI, an RI, a PMI, or a CQI) of the CSI feedback, bit information (for example, the bit information includes a bit width and/or a rule for determining a bit width) of the content of the CSI feedback, a coding scheme (for example, independent encoding or joint encoding) used by the content of the CSI feedback, an interleaving mode (for example, independent interleaving or joint interleaving), and a mapping mode (for example, a mapped time-frequency resource and/or a mapping rule).

Operation 503: The terminal device performs CSI measurement based on the configuration information and the CSI measurement behavior and/or the CSI feedback related information, to obtain at least one piece of CSI, and sends all or some of the at least one piece of CSI to the network device.

The terminal device determines the CSI measurement behavior and/or the CSI feedback related information based on operation 502. In one embodiment, operation 503 may be implemented in the following three manners:

Implementation 1: The terminal device determines the CSI measurement behavior and the CSI feedback related information based on the configuration information in operation 502. In this case, in operation 503, the terminal device may perform CSI measurement based on the configuration information and the determined CSI measurement behavior, to obtain the at least one piece of CSI, and then send all or some of the at least one piece of CSI to the network device based on the CSI feedback related information and the configuration information.

Implementation 2: The terminal device determines only the CSI measurement behavior based on the configuration information in operation 502. In this case, in operation 503, the terminal device may perform CSI measurement based on the configuration information and the determined CSI measurement behavior, to obtain the at least one piece of CSI, and then sends all or some of the at least one piece of CSI to the network device based on a predefined CSI feedback method. The predefined CSI feedback method may be defined in a protocol, or may be defined through negotiation between the terminal device and the network device. For example, the CSI feedback method that is predefined or defined through negotiation may be a CSI feedback method in the prior art. This is not limited in this embodiment. In one embodiment, the terminal device may send all or some of the at least one piece of CSI to the network device based on predefined CSI feedback method and the configuration information.

Implementation 3: The terminal device determines only the CSI feedback related information based on the configuration information in operation 502. In this case, in operation 503, the terminal device may perform CSI measurement based on a predefined CSI measurement method, to obtain the at least one piece of CSI, and then send all or some of the at least one piece of CSI to the network device based on the configuration information and the CSI feedback related information. The predefined CSI measurement method may be defined in a protocol, or may be predefined through negotiation between the terminal device and the network device, and may alternatively be a CSI measurement method in the prior art. This is not limited in this embodiment. In one embodiment, the terminal device may perform CSI measurement based on the predefined CSI measurement method and the configuration information, to obtain the at least one piece of CSI.

In one embodiment, the configuration information may be determined based on Case 1. In Case 1, the network device determines that the terminal device needs to perform CSI measurement and feedback in the hybrid mode of the single-point transmission mode+the coordinated multipoint transmission/reception mode, and in operation 503, the terminal device perform CSI measurement, to obtain two or more pieces of CSI, and the terminal device sends some or all of the obtained pieces of CSI to the network device. When feeding back some of the pieces of CSI, the terminal device may feed back, to the network device, at least one of a measurement manner, a measurement resource, or a transmission mode corresponding to the some of the pieces of CSI that are currently fed back. In this way, which one of the single-point transmission mode and the coordinated multipoint transmission/reception mode has better performance can be indicated to the network device.

In one embodiment, the configuration information may be determined based on Case 2. In Case 2, the network device determines that the terminal device needs to perform CSI measurement and feedback in the single-point transmission mode, and in operation 503, the terminal device performs CSI measurement, to obtain one or more pieces of CSI, and the terminal device sends some or all of the obtained pieces of CSI to the network device, to indicate performance of the single-point transmission mode to the network device.

In one embodiment, the configuration information may be determined based on Case 3. In Case 3, the network device determines that the terminal device needs to perform CSI measurement and feedback in the coordinated multipoint transmission/reception mode, and in operation 503, the terminal device performs CSI measurement, to obtain one or more pieces of CSI, and the terminal device sends all or some of the obtained pieces of CSI to the network device, to indicate performance of the coordinated multipoint transmission/reception mode to the network device.

In a process in which the network device receives the CSI from the terminal device through operation 503, because the CSI measurement behavior and/or the CSI feedback related information are/is related to the configuration information, and the configuration information is sent by the network device to the terminal device, the network device can correctly receive (for example, at least one of decode or de-interleave) the CSI from the terminal device based on the CSI measurement behavior and/or the CSI feedback related information that are/is indicated by the network device to the terminal device. The network device receives the CSI from the terminal device by using a method corresponding to a method for performing CSI measurement and feedback by the terminal device. To be specific, the network device receives the CSI from the terminal device based on the CSI measurement behavior and/or the CSI feedback related information. It should be noted that, when the network device learns of the method for performing CSI measurement and feedback by the terminal device, a method for receiving the CSI by the network device may be the same as that in the prior art. Details are not described herein again.

In the communications method shown in FIG. 5-1, because the network device determines, based on a manner in which the terminal device is required to perform CSI measurement and feedback, namely, a transmission mode in which the terminal device is required to perform CSI measurement and feedback, to send the configuration information to the terminal device, and the terminal device may learn, based on the configuration information, how to perform CSI measurement and feedback. Therefore, according to the communications method shown in FIG. 5-1, even if the terminal device cannot determine the transmission mode in which CSI measurement and feedback need to be performed, the terminal device may also learn, based on the configuration information sent by the network device, how to perform CSI measurement and/or feedback, so that in a scenario in which a plurality of transmission modes are supported, the terminal device measures CSI, and feeds back the measured CSI to the network device. In the communications method shown in FIG. 5-1, the terminal device determines the CSI measurement behavior and/or the CSI feedback related information based on the existing configuration information, thereby reducing signaling overheads. When a resource is configured in the configuration information, the terminal device can perform CSI measurement and feedback in the plurality of transmission modes. Compared with configuration of CSI measurement and feedback in one transmission mode once, signaling overheads can be reduced, reference signal overheads can be reduced, a delay of CSI measurement and feedback can be reduced, and performance can be improved. If the terminal device feeds back only CSI in a transmission mode with optimal transmission performance, feedback overheads can be reduced, and the network device is assisted in performing data scheduling based on the optimal transmission mode. Alternatively, if the terminal device can feed back CSI in the plurality of transmission modes, the network device may obtain transmission performance statuses in the plurality of transmission modes, to assist data scheduling and improve performance.

The configuration information and the corresponding CSI measurement behavior and/or CSI feedback related information in various cases are described in detail below based on the foregoing three cases.

An assumed scenario is that the terminal device supports CSI measurement and feedback in the hybrid mode, and supports CSI measurement and feedback in the single-point transmission mode. In this scenario, based on Case 1, to be specific, the network device determines that the terminal device needs to perform CSI measurement and feedback in the hybrid mode of the single-point transmission mode+the coordinated multipoint transmission/reception mode, the configuration information sent by the network device to the terminal device meets at least one of the following conditions (1) to (12), and the terminal device may learn, based on the configuration information that meets at least one of the following conditions (1) to (12), how to perform CSI measurement and feedback, that is, learn to perform CSI measurement and feedback in the hybrid mode of the single-point transmission mode+the coordinated multipoint transmission/reception mode.

The hybrid mode of the single-point transmission mode+the coordinated multipoint transmission/reception mode is referred to as a hybrid mode (which may also be referred to as a hybrid transmission mode) for short below.

(1) The configuration information includes N1 non-zero power (NZP) CSI-RS resources of a class A, where N1 is a positive integer greater than or equal to 2.

In one embodiment, in an LTE communications system, that the configuration information includes N1 NZP CSI-RS resources of a class A means that the configuration information includes configuration information of one CSI process. That the network device sends the configuration information means that the network device sends configuration information of one CSI process. N1 NZP CSI-RS resources of the class A are configured in the CSI process. For example, N1 may be 2. If two NZP CSI-RS resources of the class A are not configured in a CSI process corresponding to single-point transmission mode, the configuration information including one CSI process in which two NZP CSI-RS resources of the class A are configured may be used to determine that the network device requires the terminal device to perform CSI measurement and feedback in the hybrid mode. If the two NZP CSI-RS resources configured in the CSI process are not limited to being of the class A in the configuration information, the two NZP CSI-RS resources may be of the class A or a class B or the class A+a class B. Therefore, other information in the configuration information further needs to be used to indicate that the network device requires the terminal device to perform CSI measurement and feedback in the hybrid mode.

In an NR communications system, that the configuration information includes N1 NZP CSI-RS resources of a class A may mean that the configuration information includes one CSI reporting setting, where the reporting setting is associated with R pieces of association information (link) used for channel measurement, to be specific, associated with R reference signal settings (RS setting), each RS setting includes at least one NZP CSI-RS resource of the class A, and the R RS settings include the N1 NZP CSI-RS resources of the class A; or the configuration information includes one reporting setting, where the reporting setting is associated with one piece of association information, namely, a link, used for channel measurement, to be specific, associated with one RS setting, and the RS setting includes the N1 NZP CSI-RS resources of the class A. For example, N1 may be 2.

In this embodiment, an NZP CSI-RS resource of the class A is a non-beamformed CSI-RS resource, namely, a CSI-RS resource on which a beamforming or precoding operation is not performed before the CSI-RS resource is sent.

An NZP CSI-RS resource of the class B is a beamformed CSI-RS resource, namely, a CSI-RS resource on which a beamforming or precoding operation is performed before the CSI-RS resource is sent.

(2) The configuration information includes N2 NZP CSI-RS resources of a class B and CSI measurement behavior indication information and/or CSI feedback related information indication information, where N2 is a positive integer greater than or equal to 2.

When how to perform CSI measurement and feedback is determined based on a resource included in the configuration information, if the configuration information includes N2 NZP CSI-RS resources of the class B, it cannot be determined, based only on the condition, that the network device requires the terminal device to perform CSI measurement and feedback in the hybrid mode. In this case, the CSI measurement behavior indication information and/or the CSI feedback related information indication information further need/needs to be used to determine that the network device requires the terminal device to perform CSI measurement and feedback in the coordinated multipoint transmission/reception mode. The N2 NZP CSI-RS resources of the class B that are included in the configuration information may be used for both channel measurement and interference measurement, and the terminal device may perform CSI measurement on the resources, to obtain CSI.

In one embodiment, if the configuration information includes N3 NZP CSI-RS resources of the class B, where N3 is a positive integer greater than or equal to 2, and it is predefined in a protocol that when there are N3 NZP CSI-RS resources of the class B, the terminal device performs CSI measurement and feedback in the hybrid mode, the CSI measurement behavior indication information and/or the CSI feedback related information indication information may not be used to determine that the network device requires the terminal device to perform CSI measurement and feedback in the coordinated multipoint transmission/reception mode. That is, the CSI measurement behavior and/or the CSI feedback related information are/is determined based on the N3 NZP CSI-RS resources of the class B.

(3) The configuration information includes CSI measurement behavior indication information and/or CSI feedback related information indication information.

In the foregoing conditions (2) and (3), the CSI measurement behavior indication information indicates the CSI measurement behavior, and the CSI measurement behavior is behavior of performing CSI measurement by the terminal device in the hybrid mode; and the CSI feedback related information indication information indicates the CSI feedback related information, and the CSI feedback related information is related information used when the terminal device feeds back the CSI in the hybrid mode. Information related to the behavior of performing CSI measurement by the terminal device in the hybrid mode and the related information used when the terminal device feeds back the CSI in the hybrid mode are described below.

The terminal device may directly determine the CSI measurement behavior and/or the CSI feedback related information based on the configuration information that meets the condition (3), so that the terminal device does not need to perform determining and selection, thereby reducing complexity of the terminal device.

(4) The configuration information includes a QCL type of an antenna port that is a type C.

In the LTE communications system, when the configuration information includes the QCL type of the antenna port that is the type C, if the configuration information includes the CSI process quantity that is 1, it may be determined, based on the QCL type that is the type C, that the network device requires the terminal device to perform CSI measurement and feedback in the hybrid mode. The reason is as follows: It may be determined, based on the QCL type that is the type C, that a current CSI process is a CSI process in the coordinated multipoint transmission/reception mode. A feature of the CSI process is that K NZP CSI-RS resources and one CSI-interference measurement (CSI-IM) resource are configured. K is an integer not less than 2.

In the LTE communications system, when the configuration information includes the QCL type of the antenna port that is the type C, if the configuration information includes more than one CSI process, it cannot be determined, based on the QCL type that is the type C, that the network device requires the terminal device to perform CSI measurement and feedback in the hybrid mode, and other information in the configuration information may be further used for determining, for example, the condition (1) may be used for determining. To be specific, if the configuration information includes the QCL type of the antenna port that is the type C, the configuration information includes the CSI process quantity that is 1, and N1 NZP CSI-RS resources of a class A are configured in the CSI process, it may be determined that the network device requires the terminal device to perform CSI measurement and feedback in the hybrid mode. When more than one CSI process is included, it is determined, based on both the QCL type of the antenna port that is the type C and a quantity of NZP CSI-RS resources configured in the plurality of CSI processes, that a current CSI process is a CSI process in the coordinated multipoint transmission/reception mode.

In one embodiment, when the QCL type is the type C, the CSI measurement behavior and/or the CSI feedback related information may alternatively be determined with reference to another condition, for example, at least one item in the configuration information in (1) to (12) or another condition. This is not specifically limited herein.

In the NR communications system, for a QCL type of an antenna port, only one QCL type, for example, a QCL type C, may be defined. Alternatively, similar to the LTE communications system, a plurality of QCL types, for example, three QCL types, namely, a type A, a type B, and a type C, may be defined. Other QCL types may be further defined, or QCL types may be classified based on other features. This is not specifically limited herein. In this way, when a plurality of QCL types are defined, the CSI measurement behavior and/or the CSI feedback related information may alternatively be determined in the NR communications system based on the QCL types.

The terminal device determines the CSI measurement behavior and/or the CSI feedback related information based on the configuration information that meets the condition (4), in other words, based on the existing configuration information, to implement CSI measurement and feedback. Compared with a case in which dedicated information is configured to indicate the CSI measurement behavior and/or the CSI feedback related information, the foregoing method can reduce signaling overheads.

(5) The configuration information includes a QCL type of an antenna port that is a type C and a CSI process quantity that is 1.

The condition (5) is applicable to the LTE communications system. When the configuration information meets the condition (5), it may be determined that the network device requires the terminal device to perform CSI measurement and feedback in the hybrid mode.

(6) The configuration information includes a PQI that indicates that a QCL quantity is greater than M, where M is a positive integer greater than or equal to 1.

(7) The configuration information includes a PQI that indicates that a parameter group quantity is greater than P, where P is a positive integer greater than or equal to 1.

(8) The configuration information includes at least one of bit information for CRI reporting, bit information for CRI and RI reporting, and bit information for RI reporting.

If at least one of bit information for CRI reporting, bit information for CRI and RI reporting, and bit information for RI reporting that are used when the network device requires the terminal device to perform CSI measurement and feedback in the single-point transmission mode may be a predefined value, the configuration information does not need to include at least one of the bit information for CRI reporting, the bit information for CRI and RI reporting, and the bit information for RI reporting, so that when the configuration information meets the condition (8), it may be determined that the network device requires the terminal device to perform CSI measurement and feedback in the hybrid mode, and the bit information included in the configuration information is bit information used when the terminal device performs CSI measurement and feedback in the hybrid mode. If one or more of the bit information for CRI reporting, the bit information for CRI and RI reporting, and the bit information for RI reporting that are used when the network device requires the terminal device to perform CSI measurement and feedback in the single-point transmission mode are also configured by using the configuration information, when the configuration information meets the condition (8), it is further determined, with reference to other information in the configuration information, for example, with reference to the configuration information in at least one of other conditions than (8) in (1) to (12) or another condition, that the network device requires the terminal device to perform CSI measurement and feedback in the hybrid mode. This is not specifically limited herein, for example, a quantity of NZP CSI-RS resources is not limited.

(9) The configuration information includes that when bit information for CRI reporting is L and there are K NZP CSI-RS resources, $L \neq \lceil \log_2 K \rceil$.

In one embodiment, the NZP CSI-RS resource may be a resource for channel measurement, a resource for interference measurement, or a resource for both channel measurement and interference measurement, or may include a total resource including a resource for channel measurement and a resource for interference measurement. This is not specifically limited herein.

When the configuration information meets the condition (9), it may be determined that the network device requires the terminal device to perform CSI measurement and feedback in the hybrid mode, and the bit information for CRI reporting that is included in the configuration information is bit information for CRI reporting that is used when the terminal device performs CSI measurement and feedback in the hybrid mode.

The bit information for CRI reporting may be configured by using higher layer signaling or physical layer signaling. The higher layer signaling may be RRC signaling or MAC (media access control) layer signaling. This is not specifically limited herein.

For example, higher layer signaling CRI-bitsize=2 indicates that the bit information for CRI reporting is 2. For another example, bit information of a plurality of CRIs is configured by using higher layer signaling, and bit information of one CRI is triggered (activated) in the bit information of the plurality of CRIs by using physical layer signaling, as the bit information for CRI reporting.

In one embodiment, for example, in the LTE communications system, when the bit information for CRI reporting is L, there are K NZP CSI-RS resources, and $L \neq \lceil \log_2 K \rceil$ is met, the terminal device determines whether a current CSI process is a CSI process in the coordinated multipoint transmission/reception mode, to be specific, whether CSI measurement and feedback need to be performed in the hybrid mode. For example, if the bit information for CRI reporting is 2, and there are two NZP CSI-RS resources, because $L \neq \lceil \log_2 K \rceil$ is met, it may be determined that CSI measurement and feedback need to be performed in the hybrid mode.

In one embodiment, for example, in the NR communications system, higher layer signaling may be configured in a reporting setting. For example, higher layer signaling CRI-bit-size is included in ReportConfig. When the bit information for CRI reporting is L, there are K NZP CSI-RS resources, and $L \neq \lceil \log_2 K \rceil$ is met, the terminal device determines that CSI measurement and feedback need to be performed in the hybrid mode.

The CSI measurement behavior and/or CSI feedback related information are/is determined based on the configuration information, in other words, based on the existing configuration information, to implement CSI measurement and/or feedback. Compared with a case in which dedicated information is configured to indicate the CSI measurement behavior and/or the CSI feedback related information, signaling overheads can be reduced.

(10) The configuration information includes one reporting setting, where the reporting setting is associated with at least one of Q channel links, T RS settings, and S RS sets, where Q is a positive integer greater than or equal to 2, T is a positive integer greater than or equal to 2, and S is a positive integer greater than or equal to 2. The network device configures three sets for the terminal device, which are respectively a CSI reporting setting, a reference signal setting (RS setting), and a CSI measurement setting. The CSI measurement setting includes association information (link), and each piece of association information corresponds to one CSI reporting setting and one resource setting.

The reporting setting is used to indicate reporting parameter information, for example, at least one of a CSI reporting parameter (for example, at least one of an RI, a PMI, a CQI, or a CRI), a CSI type (for example, a type I and/or a type II), codebook configuration information (for example, codebook limitation information), time domain behavior, a frequency domain granularity (for example, at least one of a PMI and/or CQI reporting granularity, a full bandwidth, a subband, or a partial subband), or a measurement limitation configuration.

Each RS setting includes at least one reference signal set (RS set, which may also be referred to as an RS resource set (reference signal resource set)), and each reference signal set includes at least one reference signal resource. For example, for the CSI-RS, one RS setting may include at least one CSI-RS resource set, and each CSI resource set may include at least one CSI-RS resource. The configuration information includes at least one of mapped resource elements REs, a quantity of antenna ports, time domain behavior, or the like.

Each piece of association information in the measurement setting includes one or more of a CSI reporting setting identifier, a resource setting identifier, or a measurement attribute (for example, a channel or interference).

That the configuration information includes one reporting setting, where the reporting setting is associated with at least one of Q channel links, T RS settings, and S RS sets, where Q is a positive integer greater than or equal to 2, T is a positive integer greater than or equal to 2, and S is a positive integer greater than or equal to 2 means that, the configuration information includes one reporting setting, where the reporting setting is associated with the Q channel links and/or the T RS settings and/or the S RS sets. That the configuration information includes one reporting setting that is associated with at least one of the Q channel links, the T RS settings, and the S RS sets should not be understood as any one of the following three descriptions: The configuration information includes one reporting setting that is associated with at least one of the Q channel links, the configuration information includes one reporting setting that is associated with at least one of the T RS settings, and the configuration information includes one reporting setting that is associated with at least one of the S RS sets. For example, a value of Q may be 2.

(11) The configuration information includes a first resource and a second resource, where the first resource is a resource used to measure at least one of first CSI, second CSI, and third CSI, and the second resource is a resource used to measure fourth CSI.

The first CSI is obtained based on interference power; the second CSI is obtained based on interference that is obtained by using a preset algorithm when a resource used for channel measurement is the same as a resource used for interference measurement; the third CSI is obtained based on interference power and interference that is obtained by using a preset algorithm when a resource used for channel measurement is the same as a resource used for interference measurement; the preset algorithm may be that interference is equal to a difference between a received signal and a wanted signal; and the fourth CSI is obtained based on inter-stream interference or inter-codeword interference. Explanations of the first CSI, the second CSI, the third CSI, and the fourth CSI in this embodiment are applicable to other embodiments of the present disclosure.

In one embodiment, for example, interference to the first CSI may be obtained through measurement performed only by configuring an interference measurement resource as a ZP CSI-RS resource. To be specific, interference power is measured by using the ZP CSI-RS resource, and CSI is calculated based on the interference power.

In one embodiment, for example, interference to the second CSI may be obtained through measurement performed by configuring a resource for channel measurement and a resource for interference measurement as a same CSI-RS resource. The terminal device processes a received signal and a wanted signal based on the CSI-RS resource, to obtain interference information, for example, subtract the wanted signal from the received signal, to obtain the interference information.

In one embodiment, for example, for interference to the third CSI, a first interference measurement resource may be configured as a ZP CSI-RS resource, a second interference measurement resource may also be configured, and the second interference measurement resource is a resource for both channel measurement and interference measurement. First interference information, namely, interference power, is obtained by using the first interference measurement resource, second interference information is obtained based on the second interference measurement resource, and total interference information is obtained based on the first interference information and the second interference information. For example, the interference power is added to the second interference information to obtain the total interference information.

In one embodiment, for example, interference to the fourth CSI may be obtained by configuring an NZP CSI-RS resource for interference measurement. In one embodiment, when interference measurement is performed by using the NZP CSI-RS resource, interference may be obtained after a channel that is measured by using the resource and a precoding matrix corresponding to the resource are processed.

Measurement of at least one of the first CSI, the second CSI, and the third CSI indicates that the terminal device needs to perform CSI measurement and feedback in the single-point transmission mode, and measurement of the fourth CSI indicates that the terminal device needs to perform CSI measurement and feedback in the coordinated multipoint transmission/reception mode. Therefore, when the configuration information includes the first resource and the second resource, it indicates that the terminal device needs to perform CSI measurement and feedback in the hybrid mode.

This embodiment provides a method for determining CSI measurement and/or feedback corresponding to a resource. This part may be applied in combination with another part of this embodiment, or may be independently applied. The method is specifically described as follows:

In one embodiment, in the NR communications system, if one reporting setting is associated with more than Q links, the network device may notify, by using the configuration information in a manner in the condition (11), the terminal device of resources used for CSI measurement in the single-point transmission mode and resources used for CSI measurement in the coordinated multipoint transmission/reception mode in the associated links.

If one reporting setting is associated with more than Q links, resources used for CSI measurement in the single-point transmission mode and resources used for CSI measurement in the coordinated multipoint transmission/reception mode in the associated links may alternatively be predefined. For example, it is determined, by using resource identifier information, that the resource is a resource that is used for performing CSI measurement and/or feedback in the hybrid mode. For example, two channel measurement resources with smaller index numbers that are connected to a resource set are predefined as resources used for CSI measurement in the coordinated multipoint transmission/reception mode. Example 1: One reporting setting is associated with three channel measurement resources that are respectively an NZP CSI-RS 1, an NZP CSI-RS 2, and an NZP CSI-RS 3. In this case, the NZP CSI-RS 1 and the NZP CSI-RS 2 may be predefined as resources used for CSI measurement in the coordinated multipoint transmission/reception mode, or the NZP CSI-RS 2 and the NZP CSI-RS 3 may be predefined as resources used for CSI measurement in the coordinated multipoint transmission/reception mode. Example 2: One reporting setting is associated with three links that are respectively a link 1, a link 2, and a link 3. In this case, the link 1 and the link 2 may be predefined as resources used for CSI measurement in the coordinated multipoint transmission/reception mode, or the link 1 and the link 2 may be predefined as resources used for CSI measurement in the single-point transmission mode.

In one embodiment, indication information may be configured to indicate resources used for CSI measurement in the single-point transmission mode and resources used for CSI measurement in the coordinated multipoint transmission/reception mode. Example 1: An example in which indication information is configured in resource configurations of an NZP CSI-RS 1 and an NZP CSI-RS 2 is used. The indication information in the resource configuration of the NZP CSI-RS 1 is "joint measurement=TRUE" (for example, a corresponding information element or field has a specific value, such as 1), and the indication information in the resource configuration of the NZP CSI-RS 2 is "joint measurement=TRUE" (for example, a corresponding information element or field has a specific value, such as 1). When the indication information is "joint measurement= TRUE", it indicates that the resource is a resource used for CSI measurement in the coordinated multipoint transmission/reception mode. Example 2: An example in which indication information is configured in resource configurations of a link 1 and a link 2 is used. The indication information of the link 1 is "joint measurement=TRUE" (for example, a corresponding information element or field has a specific value, such as 1), and the indication information of the link 2 is "joint measurement=TRUE (for example, a corresponding information element or field has a specific value, such as 1)". When the indication information is "joint measurement=TRUE", it indicates that the link resource is a resource used for CSI measurement in the coordinated multipoint transmission/reception mode.

A schematic diagram of a resource configuration shown in FIG. 5-2 is used as an example: NZP 1 is a channel measurement resource, ZP 1 is an interference measurement resource, and after performing CSI measurement, the terminal device calculates a CSI report 1, and the terminal device feeds back a CRI=1 and the CSI report 1. The CRI=1 indicates that a channel measurement resource for the CSI report 1 is a measurement resource with an index of 1. NZP 2 is a channel measurement resource, the ZP 1 is an interference measurement resource, and after performing CSI measurement, the terminal device calculates a CSI report 2, and the terminal device feeds back a CRI=2 and the CSI report 2. NZP 3 is a channel measurement resource, the ZP 1 is an interference measurement resource, and after performing CSI measurement, the terminal device calculates a CSI report 3, and the terminal device feeds back a CRI=3 and the CSI report 3. Both the NZP 1 and the NZP 2 are channel measurement resources, and the ZP 1 is an interference measurement resource. The terminal device separately uses the NZP 1 and the NZP 2 to calculate a channel. A channel part of a CQI of a CSI report a is a measurement value on the NZP 1, and an interference part is a sum of a measurement value on the NZP 2 and a measurement value on the ZP 1. A channel part of a CQI of a CSI report b is a measurement value on the NZP 2, and an interference part is a sum of a measurement value on the NZP 1 and a measurement value on the ZP 1. The terminal device feeds back a CRI=4, the CSI report a, and the CSI report b. The CSI report 1 and the CSI report 2 may be measurement results in a DPS mode, and the CSI report a and the CSI report b may be measurement results in an NCJT mode, where a and b are numbers of CSI information, and are used to distinguish from other CSI information, and specific values are not limited herein.

Actually, the terminal device may obtain at least one of the CSI report 1, the CSI report 2, the CSI report 3, the CSI report a, or the CSI report b through measurement, and may selectively report CSI with optimal transmission performance.

For example, if the NZP CSI-RS resource 1 has the optimal performance, the terminal device reports the CRI=1 and CSI corresponding to the CSI report 1. If the NZP CSI-RS resource 2 has the optimal performance, the terminal device reports the CRI=2 and CSI corresponding to the CSI report 2. If the NZP CSI-RS resource 3 has the optimal performance, the terminal device reports the CRI=3 and CSI corresponding to the CSI report 3. If joint transmission of the NZP CSI-RS resource 1 and the NZP CSI-RS resource 2 has the optimal performance, the terminal device reports the CRI=4 and CSI corresponding to the CSI report a and the CSI report b.

(12) The configuration information includes indication information, where the indication information instructs the terminal device to perform CSI measurement and feedback in the hybrid transmission mode. The indication information indicates that a current CSI process is a CSI process in the coordinated multipoint transmission/reception mode, and the terminal device learns, based on the indication information, to perform CSI measurement and feedback in the hybrid transmission mode.

In one embodiment, the indication information may be signaling. For example, in the LTE communications system, the indication information may be an NCJT CSI process indication, and when higher layer signaling CoMP-Process=TRUE (for example, a corresponding information element or field has a specific value, such as 1), it indicates that a current CSI process is a CSI process in the coordinated multipoint transmission/reception mode, so that the terminal device is instructed to perform CSI measurement and feedback in the hybrid transmission mode. For another example, in the NR communications system, when higher layer signaling CoMP-Process=TRUE (for example, a corresponding information element or field has a specific value, such as 1), it indicates that the terminal device performs CSI measurement and feedback in the hybrid transmission mode. The higher layer signaling may be included in a measurement configuration MeasConfig, or may be included in a reporting configuration ReportConfig.

In one embodiment, the indication information may indicate a first resource and a second resource, the first resource is a resource used to measure at least one of first CSI, second CSI, and third CSI, and the second resource is a resource used to measure fourth CSI.

In one embodiment, indication information may be configured to indicate resources used for CSI measurement in the single-point transmission mode and resources used for CSI measurement in the coordinated multipoint transmission/reception mode. Example 1: An example in which indication information is configured in resource configurations of an NZP CSI-RS 1 and an NZP CSI-RS 2 is used. The indication information in the resource configuration of the NZP CSI-RS 1 is "joint measurement=TRUE" (for example, a corresponding information element or field has a specific value, such as 1), and the indication information in the resource configuration of the NZP CSI-RS 2 is "joint measurement=TRUE" (for example, a corresponding information element or field has a specific value, such as 1). When the indication information is "joint measurement= TRUE", it indicates that the resource is a resource used for CSI measurement in the coordinated multipoint transmission/reception mode. Example 2: An example in which indication information is configured in resource configurations of a link 1 and a link 2 is used. The indication information of the link 1 is "joint measurement=TRUE" (for example, a corresponding information element or field has a specific value, such as 1), and the indication information of the link 2 is "joint measurement=TRUE (for example, a corresponding information element or field has a specific value, such as 1)". When the indication information is "joint measurement=TRUE", it indicates that the link resource is a resource used for CSI measurement in the coordinated multipoint transmission/reception mode.

It should be noted that, when it is determined, based on the fact that the configuration information meets at least one of the foregoing conditions (1) to (12), that the network device requires the terminal device to perform CSI measurement and feedback in the hybrid mode, an applicable scenario is that the terminal device supports CSI measurement and feedback in the hybrid mode, and supports CSI measurement and feedback in the single-point transmission mode. If the scenario is that the terminal device supports CSI measurement and feedback in the hybrid mode, supports CSI measurement and feedback in the single-point transmission mode, and supports CSI measurement and feedback in the coordinated multipoint transmission/reception mode, when the configuration information meets at least one of the foregoing conditions (1) to (12), the network device may require the terminal device to perform CSI measurement and feedback in the hybrid mode, or the network device may require the terminal device to perform CSI measurement and feedback in the coordinated multipoint transmission/reception mode. Therefore, other information may be further used to indicate one of the two possibilities, for example, 1-bit information is used for indication, 0 indicates the former possibility, and 1 indicates the latter possibility.

The terminal device may learn, based on the configuration information that meets at least one of the foregoing conditions (1) to (12), how to perform CSI measurement and feedback, which may also be understood as learning to perform CSI measurement and feedback in the hybrid mode. The terminal device may determine all or some CSI measurement behavior and/or all or some CSI feedback related information based on the configuration information that meets at least one of the foregoing conditions (1) to (12), that is, the CSI measurement behavior and/or the CSI feedback related information are/is related to at least one of the foregoing conditions (1) to (12). It may be understood that, the CSI measurement behavior and/or the CSI feedback related information mentioned in the present disclosure do/does not represent all CSI measurement behavior and/or all CSI feedback related information of the terminal device, and may be one or more of the CSI measurement behavior and/or the CSI feedback related information, namely, all or some of the CSI measurement behavior and/or the CSI feedback related information.

In one embodiment, the determined CSI measurement behavior and/or CSI feedback related information are/is described below. It may be understood that, the determined CSI measurement behavior and/or CSI feedback related information are/is different from a design in the prior art. The CSI measurement behavior and/or the CSI feedback related information may be applied in combination with the foregoing configuration information, or may be separately applied, to provide a CSI measurement and/or feedback method. The determined CSI measurement behavior and/or CSI feedback related information may be as follows:

1. The determined CSI measurement behavior includes measurement of at least one of the first CSI, the second CSI, and the third CSI, and measurement of the fourth CSI. The first CSI is obtained based on the interference power; the second CSI is obtained based on the interference that is obtained by using the preset algorithm when the resource used for channel measurement is the same as the resource used for interference measurement; the third CSI is obtained based on the interference power and the interference that is obtained by using the preset algorithm when the resource used for channel measurement is the same as the resource used for interference measurement; the preset algorithm may be that interference is equal to the difference between the received signal and the wanted signal; and the fourth CSI is obtained based on the inter-stream interference or the inter-codeword interference. Measurement of at least one of the first CSI, the second CSI, and the third CSI is measurement behavior when the terminal device performs CSI measurement in the single-point transmission mode, and measurement of the fourth CSI is measurement behavior when the terminal device performs CSI measurement in the coordinated multipoint transmission/reception mode.

In one embodiment, this part may be applied in combination with another part of this embodiment, or may be independently applied, to provide a CSI measurement method.

If the configuration information includes the CSI measurement behavior indication information, and the CSI measurement behavior indication information indicates the CSI measurement behavior, the terminal device may determine the CSI measurement behavior based on the CSI measurement behavior indication information. In an implementation, if the CSI measurement behavior indication information instructs to measure at least one of the first CSI, the second CSI, and the third CSI, and measure the fourth CSI, it is determined that the CSI measurement behavior includes measurement of at least one of the first CSI, the second CSI, and the third CSI, and measurement of the fourth CSI. Further, the CSI measurement behavior indication information may instruct to measure which one or combination of more of the first CSI, the second CSI, and the third CSI and measure the fourth CSI. For example, the CSI measurement behavior indication information instructs to measure the first CSI and the fourth CSI; in this case, the CSI measurement behavior includes measurement of the first CSI and measurement of the fourth CSI. For another example, the CSI measurement behavior indication information instructs to measure the first CSI and the second CSI and measure the fourth CSI; in this case, the CSI measurement behavior includes measurement of the first CSI, the second CSI, and the fourth CSI.

In one embodiment, if measurement of the fourth CSI is determined based on the configuration information, the CSI measurement behavior indication information may instruct to measure which one or combination of more of the first CSI, the second CSI, and the third CSI. For example, the CSI measurement behavior indication information instructs to measure the first CSI; in this case, the CSI measurement behavior includes measurement of the first CSI and measurement of the fourth CSI. For another example, the CSI measurement behavior indication information instructs to measure the first CSI and the second CSI; in this case, the CSI measurement behavior includes measurement of the first CSI, the second CSI, and the fourth CSI. This is not specifically limited herein.

Alternatively, the terminal device may determine, based on the configuration information, that the network device requires the terminal device to perform CSI measurement and CSI feedback in the hybrid mode, and determine preconfigured CSI measurement behavior in the hybrid mode as CSI measurement behavior used by the terminal device. For example, the CSI measurement behavior includes measurement of at least one of the first CSI, the second CSI, and the third CSI, and measurement of the fourth CSI. Further, measurement of which one or combination of more of the first CSI, the second CSI, and the third CSI that is included in the CSI measurement behavior may be determined based on the configuration information. For example, a method is as follows:

The first CSI is obtained based on the interference power. Therefore, if an interference measurement resource included in the configuration information includes a zero power CSI-RS resource, the CSI measurement behavior includes measurement of the first CSI.

The second CSI is obtained based on the interference that is obtained by using the preset algorithm when the resource used for channel measurement is the same as the resource for interference measurement. Therefore, if an interference measurement resource included in the configuration information includes a channel measurement resource and an interference measurement resource that are the same, the CSI measurement behavior includes measurement of the second CSI.

The third CSI is obtained based on the interference power and the interference that is obtained by using the preset algorithm when the resource used for channel measurement is the same as the resource used for interference measurement. Therefore, if the configuration information includes the first interference measurement resource and the second interference measurement resource, the first interference measurement resource is a zero power CSI-RS resource, and the second interference measurement resource is a resource that is the same as a channel measurement resource, it may be predefined that the CSI measurement behavior includes measurement of only the third CSI, or it may be predefined that the CSI measurement behavior includes measurement of the first CSI and the third CSI, or it may be predefined that the CSI measurement behavior includes measurement of the second CSI and the third CSI, or it may be predefined that the CSI measurement behavior includes measurement of the first CSI, the second CSI, and the third CSI.

In one embodiment, on the basis that the fourth CSI is obtained based on the inter-stream interference or the inter-codeword interference, the fourth CSI may alternatively be obtained in a plurality of manners. This is not limited in this embodiment. For example, the fourth CSI may be obtained in the following four manners. First manner: The fourth CSI may be obtained based only on the inter-stream interference or the inter-codeword interference.

Second manner: The fourth CSI may be obtained based on the inter-stream interference or the inter-codeword interference, and may be further obtained based on interference power. That is, the fourth CSI is obtained based on the interference power and the inter-stream interference or the inter-codeword interference.

Third manner: The fourth CSI may be obtained based on the inter-stream interference or the inter-codeword interference, and may be further obtained based on interference that is obtained by using a preset algorithm when a resource used for channel measurement is the same as a resource used for interference measurement. That is, the fourth CSI is obtained based on the interference that is obtained by using the preset algorithm when the resource used for channel measurement is the same as the resource used for interference measurement, and the inter-stream interference or the inter-codeword interference. The preset algorithm may be that the interference is equal to a difference between a received signal and a wanted signal.

Fourth manner: The fourth CSI may be obtained based on the inter-stream interference or the inter-codeword interference, and may be further obtained based on interference power and interference that is obtained by using a preset algorithm when a resource used for channel measurement is the same as a resource used for interference measurement. That is, the fourth CSI is obtained based on the interference power, the interference that is obtained by using the preset algorithm when the resource used for channel measurement is the same as the resource used for interference measurement, and the inter-stream interference or the inter-codeword interference.

Further, a specific manner of obtaining the fourth CSI in the foregoing manners may be predefined, or the network device may notify the terminal device of a specific manner of obtaining the fourth CSI in the foregoing manners. For example, the network device may notify, by using an interference measurement resource related to the fourth CSI in the configuration information, the terminal device of the specific manner of obtaining the fourth CSI in the foregoing manners. For example, if the interference measurement resource related to the fourth CSI in the configuration information includes a zero power CSI-RS resource, the fourth CSI is further obtained based on the interference power. That is, the fourth CSI is obtained in the foregoing second manner.

It may be understood that, descriptions of one or more of the first CSI to the fourth CSI included in the CSI measurement behavior may be independently applied, or may be applied in combination.

2. The determined CSI feedback related information includes use of joint encoding or independent encoding for a CRI and an RI, and/or a mapping mode of mapping a CRI and an RI to a time-frequency resource. The use of joint encoding or independent encoding for the CRI and the RI means that the CRI and the RI are jointly encoded or separately encoded. Whether joint encoding is performed on other information and the CRI and/or the RI is not limited.

In one embodiment, this part may be applied in combination with another part of this embodiment, or may be independently applied, to provide a CSI feedback method.

The terminal device may determine the CSI feedback related information based on the CSI feedback related information indication information included in the configuration information. If the configuration information includes the CSI feedback related information indication information, and the CSI feedback related information indication information indicates the CSI feedback related information, the terminal device may determine the CSI feedback related information based on the CSI feedback related information indication information. In an implementation, if the CSI feedback related information indication information indicates use of joint encoding for the CRI and the RI, and/or the CSI feedback related information indication information indicates the mapping mode of mapping the CRI and the RI to the time-frequency resource, it is determined that the CSI feedback related information includes use of joint encoding for the CRI and the RI, and/or the CSI feedback related information indication information indicates the mapping mode of mapping the CRI and the RI to the time-frequency resource. In another implementation, the CSI feedback related information indication information indicates use of independent encoding for the CRI and the RI, and/or the CSI feedback related information indication information indicates the mapping mode of mapping the CRI and the RI to the time-frequency resource, it is determined that the CSI feedback related information includes use of independent encoding for the CRI and the RI, and/or the CSI feedback related information indication information indicates the mapping mode of mapping the CRI and the RI to the time-frequency resource.

Alternatively, the terminal device may determine, based on the configuration information, that the network device requires the terminal device to perform CSI measurement and CSI feedback in the hybrid mode, and determine preconfigured CSI feedback related parameter in the hybrid mode as a CSI feedback related parameter used by the terminal device. The determined CSI feedback related information includes use of joint encoding or independent encoding for the CRI and the RI/or the mapping mode of mapping the CRI and the RI to the time-frequency resource. In the CSI feedback related information, a coding scheme used for the CRI and the RI is joint encoding or independent encoding. A specific coding scheme may be predefined, or may be notified by the network device to the terminal device, for example, a specific coding scheme is notified by using other information in the configuration information.

In one embodiment, the CSI feedback related information may further include at least one of the bit information for CRI reporting, the bit information for CRI and RI reporting, and the bit information for RI reporting. When the CSI feedback related information includes use of independent encoding for the CRI and the RI, the CSI feedback related information may include the bit information for CRI reporting and the bit information for RI reporting. In this way, after performing CSI measurement, the terminal device determines a CRI that meets the bit information for CRI reporting and an RI that meets the bit information for RI reporting, then independently encodes the CRI and the RI, and finally maps the independently encoded CRI and RI to a time-frequency resource in the mapping mode included in the CSI feedback related information. When the CSI feedback related information includes use of joint encoding for the CRI and the RI, the CSI feedback related information may include the bit information for CRI and RI reporting, and the CSI feedback related information may also include the bit information for CRI reporting and the bit information for RI reporting. The bit information for CRI and RI reporting may be determined based on the bit information for CRI reporting and the bit information for RI reporting. In this way, after performing CSI measurement, the terminal device determines a CRI and an RI that meet the bit information for CRI and RI reporting, then jointly encodes the CRI and the RI, and finally maps the jointly encoded CRI and RI to a time-frequency resource in the mapping mode included in the CSI feedback related information.

A mapping mode used for mapping the CRI and the RI to the time-frequency resource is not limited in this embodiment. Some possible mapping modes are described below by using examples.

In one embodiment, this part may be applied in combination with another part of this embodiment, or may be independently applied, to provide a resource mapping method.

Example 1

In the LTE communications system, channel coding is performed on the CRI and channel coding is performed on the RI. To be specific, after the CRI and the RI are independently encoded, the CRI enters an interleaver to obtain an interleaved CRI, and the RI enters the interleaver to obtain an interleaved RI. That is, the CRI and the RI are separately interleaved. Then, the CRI and the RI are mapped to the time-frequency resource in any one of the following mapping modes. In this embodiment, it is not limited to first time domain mapping, first frequency domain mapping, or first layer mapping. The layer mapping is a concept in space domain, which is paratactic with a time domain and a frequency domain.

Figure 6:
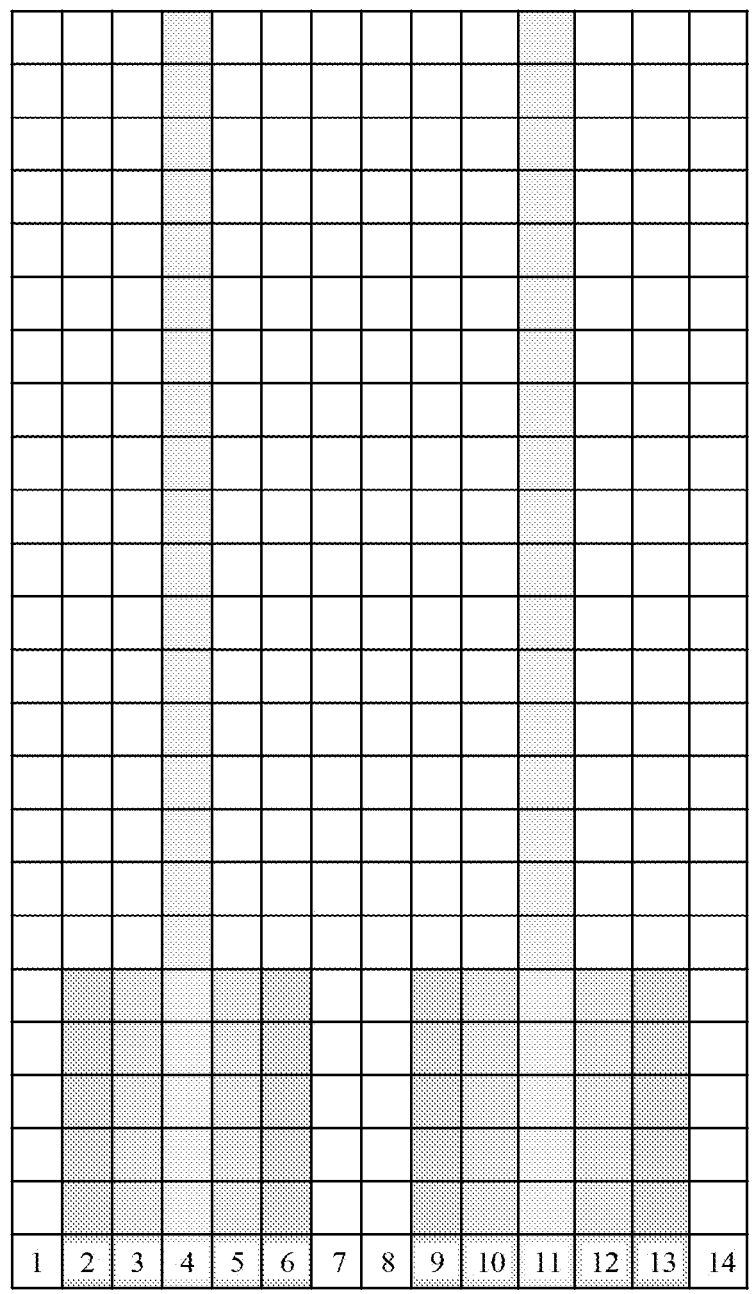
FIG. 6 is a schematic diagram of a first mapping mode according to an embodiment of the present disclosure.

Mapping mode 1: The CRI is mapped to a symbol next to an acknowledge instruction (acknowledge, ACK)/negative acknowledge instruction (negative acknowledge, NACK) symbol next to an uplink pilot symbol. ACK/NACK is referred to as A/N for short below. First time domain mapping and then frequency domain mapping may be performed on the CRI. The RI is mapped to the symbol next to the A/N symbol next to the uplink pilot symbol, but an RE occupied by the CRI is excluded. First time domain mapping and then frequency domain mapping may be performed on the RI. Symbols 1 to 7 in FIG. 6 are used as an example. The symbols 1 to 7 form a slot, an uplink pilot is mapped to the symbol 4, A/N is mapped to the symbol 3 and the symbol 5, and a CRI and an RI are mapped to the symbol 2 and the symbol 6. When the CRI and the RI are mapped to the symbol 2 and the symbol 6, the CRI is first mapped to the symbol 2 and the symbol 6 in time domain, and then the RI is mapped to resource elements (RE) other than REs to which the CRI is mapped in the symbol 2 and the symbol 6 in time domain. Alternatively, the CRI is first mapped to the symbol 2 and the symbol 6 in time domain, and then the CRI is mapped to resource elements (RE) other than REs to which the CRI is mapped in the symbol 2 and the symbol 6 in time domain. Specifically, whether CRI mapping is first performed or RI mapping is first performed may be predefined based on a protocol, or may be based on specific implementation of a system.

Mapping mode 2: The CRI is mapped to a symbol next to an A/N symbol next to an uplink pilot symbol. The RI is mapped to a symbol next to a CRI symbol next to the A/N symbol next to the uplink pilot symbol (that is, the CRI and the RI occupy different symbols on a same frequency resource). Symbols 1 to 7 in FIG. 6 are used as an example. An uplink pilot is mapped to the symbol 4, A/N is mapped to the symbol 3 and the symbol 5, a CRI is mapped to the symbol 2 and the symbol 6, and an RI is mapped to the symbol 1 and the symbol 7.

Mapping mode 3: The CRI is mapped to a symbol on a side next to an A/N symbol next to an uplink pilot symbol. The RI is mapped to a symbol on the other side next to the A/N symbol next to the uplink pilot symbol. It may be predefined that the CRI is mapped to the side next to the A/N symbol next to the uplink pilot symbol, and the RI is mapped to the other side next to the A/N symbol next to the uplink pilot symbol. For example, the CRI is mapped to a symbol with a smaller number on one side, and the RI is mapped to a symbol with a larger number on the other side.

For example, symbols 1 to 7 in FIG. 6 are used as an example. An uplink pilot is mapped to the symbol 4, A/N is mapped to the symbol 3 and the symbol 5, and a CRI is mapped to the symbol 2, and an RI is mapped to the symbol 6. Symbols 8 to 14 in FIG. 6 are used as an example. An uplink pilot is mapped to the symbol 11, A/N is mapped to the symbol 10 and the symbol 12, a CRI is mapped to the symbol 9, and an RI is mapped to the symbol 13. For another example, in FIG. 6, an uplink pilot is mapped to a symbol 4 and a symbol 11, and A/N is mapped to symbols 3, 5, 10, and 12. CRI and RI mapping may be as follows: A CRI is mapped to a symbol 2 and a symbol 13, and an RI is mapped to a symbol 6 and a symbol 9. The CRI and RI mapping may alternatively be as follows: An RI is mapped to a symbol 2 and a symbol 13, and a CRI is mapped to a symbol 6 and a symbol 9.

Example 2

In the NR communications system, channel coding is performed on the CRI and channel coding is performed on the RI. To be specific, after the CRI and the RI are independently encoded, the CRI enters an interleaver to obtain an interleaved CRI, and the RI enters the interleaver to obtain an interleaved RI. That is, the CRI and the RI are separately interleaved. The CRI is mapped to a PUCCH, for example, a long PUCCH; and the RI is mapped to an RE other than an RE occupied by the CRI in the PUCCH to which the CRI is mapped. Alternatively, the RI is mapped to another PUCCH, such as a short PUCCH, that is in a same scheduling unit in which the CRI is mapped but does not include a PUCCH to which the CRI is mapped. This embodiment is not limited to first time domain mapping, first frequency domain mapping, or first layer mapping; time domain mapping is not limited to front-to-back mapping or back-to-front mapping; frequency domain mapping is not limited to ascending mapping or descending mapping; layer mapping is not limited to ascending mapping or descending mapping; and a code block group (CBG) is not limited to ascending mapping or descending mapping.

Specifically, at least one of the following mapping methods may be included. Specific items to be used may be predefined in a protocol, or may be notified by the network device to the terminal device. To be specific, indication information is sent to indicate a specific mapping method. This is not specifically limited herein.

In one embodiment, this part may be applied in combination with another part of this embodiment, or may be independently applied, to provide a resource mapping method.

Mapping method 1: The CRI is mapped to a symbol next to an A/N symbol next to an uplink pilot symbol. The RI is mapped to an RE, other than an RE occupied by the CRI, in the symbol next to the A/N symbol next to the uplink pilot symbol. Symbols 1 to 7 in FIG. 6 are used as an example. An uplink pilot is mapped to the symbol 4, A/N is mapped to the symbol 3 and the symbol 5, and a CRI and an RI are mapped to the symbol 2 and the symbol 6. When the CRI and the RI are mapped to the symbol 2 and the symbol 6, the CRI is first mapped to the symbol 2 and the symbol 6 in time domain, and then the RI is mapped to REs other than REs to which the CRI is mapped in the symbol 2 and the symbol 6 in time domain. Alternatively, when the CRI and the RI are mapped to the symbol 2 and the symbol 6, the RI may be first mapped to the symbol 2 and the symbol 6 in time domain, and then the CRI may be mapped to resource elements (RE) other than REs to which the CRI is mapped in the symbol 2 and the symbol 6 in time domain.

For this solution, the CRI and the RI may be sequentially mapped to a same symbol and mapped to different REs.

Figure 7:
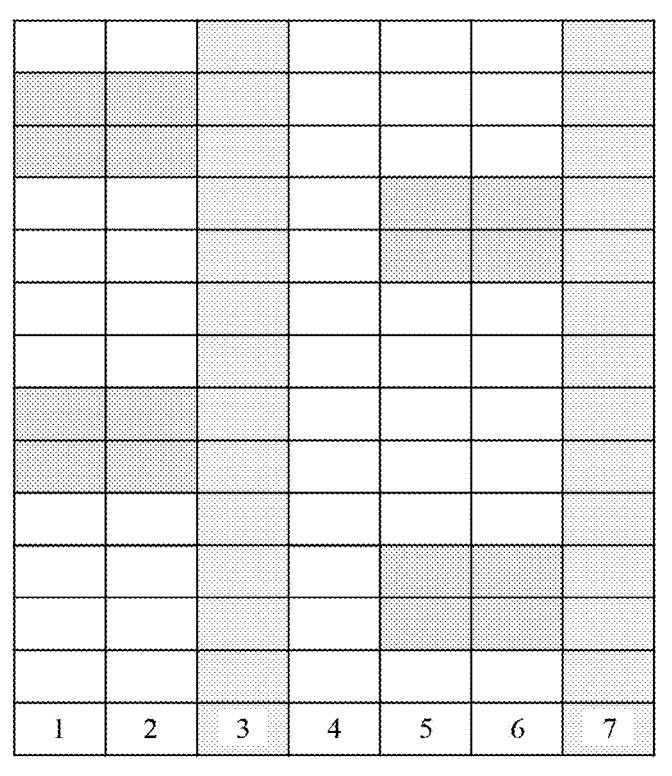

Symbols 1 to 7 in FIG. 7 are used as an example. A DMRS is mapped to the symbols 1, 2, 5, and 6, and a CRI and an RI are mapped to the symbol 3 and the symbol 7. The DMRS may be a basic (front-loaded) DMRS, or an additional DMRS. The CRI is mapped to a symbol next to the front-loaded DMRS and/or a symbol next to the additional DMRS, or the CRI is mapped to a symbol next to the front-loaded DMRS. That is, the CRI and the RI are mapped to the symbol 3.

Mapping method 2: The CRI is mapped to a symbol next to an A/N symbol next to an uplink pilot symbol. The RI is mapped to a symbol next to a CRI symbol next to the A/N symbol next to the uplink pilot symbol. Symbols 1 to 7 in FIG. 6 are used as an example. An uplink pilot is mapped to the symbol 4, A/N is mapped to the symbol 3 and the symbol 5, a CRI is mapped to the symbol 2 and the symbol 6, and an RI is mapped to the symbol 1 and the symbol 7.

For this solution, the CRI and the RI may be sequentially mapped to different symbols and mapped to different symbols.

Mapping method 3: The CRI is mapped to a symbol on a side next to an A/N symbol next to an uplink pilot symbol. The RI is mapped to a symbol on the other side next to the A/N symbol next to the uplink pilot symbol. It may be predefined that the CRI is mapped to the side next to the A/N symbol next to the uplink pilot symbol, and the RI is mapped to the other side next to the A/N symbol next to the uplink pilot symbol. For example, the CRI is mapped to a symbol with a smaller number on one side, and the RI is mapped to a symbol with a larger number on the other side.

Symbols 1 to 7 in FIG. 6 are used as an example. An uplink pilot is mapped to the symbol 4, and A/N is mapped to the symbol 3 and the symbol 5. CRI and RI mapping may be as follows: A CRI is mapped to the symbol 2, and an RI is mapped to the symbol 6. The CRI and RI mapping may alternatively be as follows: An RI is mapped to the symbol 2, and a CRI is mapped to the symbol 6.

For this solution, the CRI and the RI may be sequentially mapped to different symbols and mapped to different symbols.

Mapping method 4: The CRI and the RI are mapped to REs that are relatively close to an uplink pilot.

Figure 8:
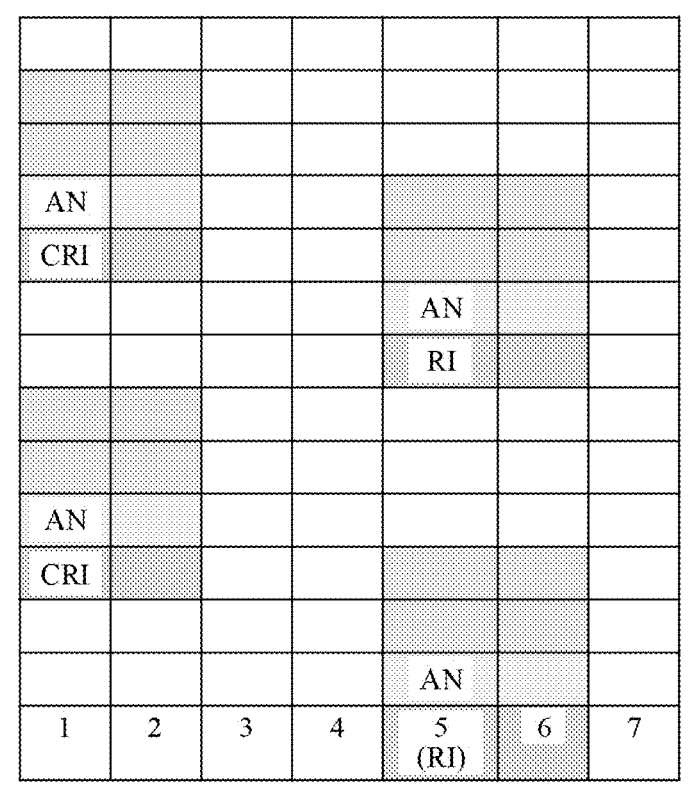
Figure 9:
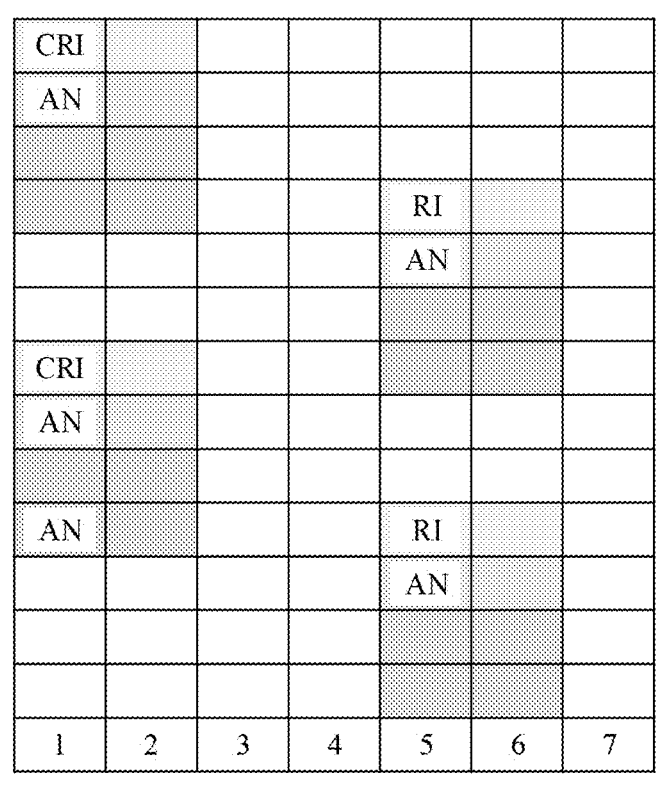

The CRI is mapped to a same symbol in which some REs occupied by the uplink pilot are located, and the RI is mapped to a same symbol in which the other REs occupied by the uplink pilot are located. The symbol to which the CRI and the RI are mapped may be predefined. For example, it is predefined that the CRI is mapped to the first half of the symbols occupied by the uplink pilot, and the RI is mapped to the second half of the symbols occupied by the uplink pilot. FIG. 8 and FIG. 9 are used as an example. A DMRS is mapped to symbols 1, 2, 5, and 6, so that a CRI is mapped to the symbol 1 and the symbol 2, and an RI is mapped to the symbol 5 and the symbol 6. REs to which the CRI and the RI are mapped may be mapped in ascending or descending order of sequence numbers of frequency domain units from a frequency domain position to which an uplink RS is mapped.

For this solution, the CRI and the RI may be sequentially mapped to a same symbol and mapped to different REs.

In this embodiment, when the terminal device determines to perform CSI measurement and feedback in the hybrid mode, when the CRI and the RI are encoded, interleaved, and mapped, CQI/PMI encoding, interleaving, and mapping solutions corresponding to a plurality of CSI reports may be the following method 1 or method 2.

In one embodiment, this part may be applied in combination with another part of this embodiment, or may be independently applied, to provide at least one of an encoding method, an interleaving method, or a mapping method.

Method 1: A sequence of encoding, interleaving, and mapping CQI/PMIs corresponding to RIs is consistent with a sequence of the RIs in an RI combination. For example, if the RI combination is {4, 3}, bits $O_0 O_1 \ldots O_{m-1}$ of a CQI/PMI corresponding to the RI=4 and bits $O_m O_{m+1} \ldots O_{n-1}$ of a CQI/PMI corresponding to the RI=3 form an $O_0 O_1 \ldots O_{n-1}$ input encoder. To be specific, a sequence of encoding the CQI/PMIs corresponding to the RIs is the same as a sequence for the RIs in the RI combination. The CQI/PMI corresponding to the RI=4 is first input into the encoder, and then the CQI/PMI corresponding to the RI=3 is input into the encoder. A sequence of interleaving and mapping the CQI/PMIs corresponding to the RIs is consistent with a sequence of the RIs in the RI combination.

Method 2: A sequence of encoding, interleaving, and mapping CQI/PMIs corresponding to RIs is consistent with a sequence of NZP CSI-RS resource IDs used in channel measurement. For example, a CQI 1/PMI 1 obtained by using the NZP CSI-RS 1 as a channel measurement resource and a CQI 2/PMI 2 obtained by using the NZP CSI-RS 2 as a channel measurement resource are sequentially input into an encoder and an interleaver as a combination and are mapped. To be specific, a CQI/PMI $O_0 O_1 \ldots O_{m-1}$ obtained through measurement by using a resource with a smaller NZP CSI-RS ID and a CQI/PMI $O_m O_{m+1} \ldots O_{n-1}$ obtained through measurement by using a resource with a larger NZP CSI-RS ID form an $O_0 O_1 \ldots O_{n-1}$ input encoder, and are interleaved and mapped.

The CSI may include at least one of a PMI, an RI, or a CQI, so that reporting of the CSI is related to reporting of at least one of the PMI, the RI, or the CQI. In this case, there is a reporting sequence of at least one of the PMI, the RI, or the CQI during reporting. The following describes an embodiment of a reporting sequence of the PMI and the CQI and a method for determining a bit width of content included in the CSI, for example, the PMI or the CQI. Methods for determining the reporting sequence and the bit width of the content included in the CSI in this embodiment may be independently implemented, or may be applied in combination, or may be separately combined with other embodiments in the present disclosure. This is not specifically limited herein.

In one embodiment, in this embodiment of the present disclosure, a first set may be CSI corresponding to the first NZP CSI-RS resource, and a second set may be CSI corresponding to the second NZP CSI-RS resource.

In one embodiment, in this embodiment of the present disclosure, a first set may be CSI corresponding to the first codeword (for example, a codeword 0), and a second set may be CSI corresponding to the second codeword (for example, a codeword 1).

In one embodiment, in this embodiment of the present disclosure, the first set, the first set, the first CSI set, the first set, and the first CSI set may have a same meaning, and may be replaced with each other. In addition, the first set may be replaced with the CSI for the first codeword (for example, the codeword 0), the CSI corresponding to the first NZP CSI-RS resource, or the like. This is not specifically limited herein.

In one embodiment, in this embodiment of the present disclosure, the second set, the second set, the second CSI set, the second set, and the second CSI set may have a same meaning, and may be replaced with each other. In addition, the second set may be replaced with the CSI for the second codeword (for example, the codeword 1), the CSI corresponding to the second NZP CSI-RS resource, or the like. This is not specifically limited herein.

There may be different reporting sequences (in this embodiment of the present disclosure, the reporting sequence may also be referred to as a feedback sequence) of PMIs and CQIs in a first set and a second set in one CSI process (or CSI reporting). For example, the terminal device determines, based on the first indication information, to feed back at least two CSI sets, where the at least two CSI sets include a first set of CSI and a second set of CSI, the first set of CSI includes a CQI of the first set and/or a PMI of the first set, and the second set of CSI includes a CQI of the second set and/or a PMI of the second set. Reporting method 1: A CQI (including the CQI of the first set and/or the CQI of the second set) is first reported, and then a PMI (including the PMI of the first set and/or the PMI of the second set) is reported. The method 1 further includes at least one of the following several methods:

Method 1.1: If the first set includes only the CQI, and the second set also includes only the CQI, the CQI of the first set and the CQI of the second set are sequentially reported.

Method 1.2: If the first set includes the CQI and the PMI, and the second set includes only the CQI, the CQI of the first set, the CQI of the second set, and the PMI of the first set are sequentially reported.

Method 1.3: If the first set includes the CQI and the PMI, and the second set includes the CQI and the PMI, the CQI of the first set, the CQI of the second set, the PMI of the first set, and the PMI of the second set are sequentially reported.

Method 1.4: If PMIs of each set include a first PMI and a second PMI, the first PMI (including the first PMI of the first set and/or the first PMI of the second set) is first reported, and then the second PMI (including the second PMI of the first set and/or the second PMI of the second set) is reported.

Method 1.5: If PMIs of each set include a first PMI and a second PMI, the first PMI and/or the second PMI of the first set are/is first reported, and then the first PMI and/or the second PMI of the second set are/is reported.

For example, in a wideband CQI reporting mode, if no PMI is fed back, a corresponding mode is a mode 1-0.

A specific mode to be used may be predefined in a protocol, or may be determined through interaction between a base station and the terminal, for example, notified by the base station to the terminal by using signaling.

For the reporting sequence of the PMI and the CQI, refer to the reporting method 1 described above. To be specific, the CQI (including the CQI of the first set and the CQI of the second set) is first reported, and then the PMI (including the PMI of the first set and the PMI of the second set) is reported. A reporting method 2 is described below.

Reporting method 2: The first set (including the CQI and/or the PMI of the first set) is first reported, and then the second set (including the CQI and/or the PMI of the second set) is reported. The method 2 further includes at least one of the following several specific methods:

Method 2.1: If the first set includes the CQI and the PMI, and the second set includes only the CQI, the CQI of the first set, the PMI of the first set, and the CQI of the second set are sequentially reported.

Method 2.2: If the first set includes the CQI, and the second set includes the CQI and the PMI, the CQI of the first set, the CQI of the second set, and the PMI of the second set are sequentially reported.

Method 2.3: If the first set includes the CQI and the PMI, and the second set includes the CQI and the PMI, the CQI of the first set, the PMI of the first set, the CQI of the second set, and the PMI of the second set are sequentially reported.

In one embodiment, in this embodiment, at least one of the bit information for CRI reporting, the bit information for CRI and RI reporting, and the bit information for RI reporting included in the CSI feedback related information may be determined in any one of the following manners.

In one embodiment, this part may be applied in combination with another part of this embodiment, or may be independently applied, to provide a CSI feedback method or a CSI feedback related information determining method.

Manner 1: At least one of the bit information for CRI reporting, the bit information for CRI and RI reporting, and the bit information for RI reporting is a predefined value, and both the network device and the terminal device already know the predefined value.

For example, the bit information for CRI reporting includes 2 bits, the bit information for RI reporting includes 4 bits, and the bit information for CRI and RI reporting includes 6 bits.

In the LTE communications system, in the single-point transmission mode, because a maximum layer quantity supported by the terminal device is 8, a maximum bit width for RI reporting for one piece of CSI is 3. In the coordinated multipoint transmission/reception mode, it is assumed that a base station 1 and a base station 2 perform coordinated transmission, an RI 1 corresponds to the base station 1, an RI 2 corresponds to the base station 2, and the RI 1 and the RI 2 are combined for reporting. Possible combination cases are as follows: {RI 1, RI 2}={1, 1}, {1, 2}, {2, 1}, {2, 2}, {2, 3}, {3, 2}{3, 3}, {3, 4}, {4, 3}, and {4, 4}. Therefore, a maximum bit width for RI reporting is 4. In conclusion, the bit information for RI reporting may be 4 bits.

Possible values of the CRI are 0, 1, and 2, and meanings are as follows: the CRI=0 indicates that the base station 1 corresponding to the first NZP CSI-RS resource is the optimal transmission performance; the CRI=1 indicates that the base station 2 corresponding to the second NZP CSI-RS resource has the optimal transmission performance; and the CRI=2 indicates that coordinated transmission of the base station 1 and the base station 2 corresponding to two NZP CSI-RS resources has the optimal performance. In conclusion, the bit information for CRI reporting may be 2 bits.

For example, in Manner 1, the bit width of the CRI and/or the bit width of the RI are/is determined based on second indication information.

In an example, in Manner 1, the bit width of the CRI and/or the bit width of the RI may be determined based on the second indication information. The configuration information includes the second indication information, where the second indication information instructs the terminal device to perform CSI measurement and feedback in the hybrid transmission mode, or indicates that a current CSI process is a CSI process in the coordinated multipoint transmission/reception mode.

The bit width of the RI may be determined based on the second indication information.

In one embodiment, in this embodiment of the present disclosure, the determining the bit width of the RI may be determining a bit width used when a single RI is reported and/or determining a total quantity of bits occupied by a plurality of RIs (or an RI combination) when the plurality of RIs (or the RI combination) are reported. This is not specifically limited herein.

Specifically, for example, when the second indication information instructs to enable FeCoMP-based CSI feedback, the bit width of the RI is fixed (for example, specified in a protocol), a CRI=0, a CRI=1, a CRI=2, and the like are not distinguished, and a quantity of antenna ports and/or a capability of the terminal device are/is not distinguished either.

The capability of the terminal device may be at least one of a maximum layer quantity supported by the terminal (short for the terminal device), a maximum antenna port quantity supported by the terminal, a maximum transmission rate supported by the terminal, a transmission mode (for example, an open-loop mode, a closed-loop mode, a single-cell mode, or a coordinated mode) supported by the terminal, or the like.

For example, for an example in which two NZP CSI-RS resources are configured, when the second indication information instructs to enable FeCoMP-based CSI feedback, the bit width of the RI may be fixed to 4. Certainly, another value is also feasible. This is not limited herein.

In this embodiment of the present disclosure, when a base station (the network device is described by using the base station as an example) determines to enable FeCoMP-based CSI feedback, the base station sends the second indication information, and determines that the bit width of the RI of the terminal is 4, to be specific, the bit width of the RI is related to the second indication information. When receiving the second indication information, the terminal may determine the bit width of the RI based on the second indication information. For example, the bit width of the RI is 4.

When determining not to enable FeCoMP-based CSI feedback, the base station does not send the second indication information, and determines the bit width of the RI based on the prior art. When not receiving the second indication information, the terminal may determine the bit width of the RI based on the prior art. The determining the bit width of the RI in the prior art is that, for example, the bit width of the RI is related to the quantity of antenna ports and the capability of the terminal device. Specifically, for example, if the quantity of antenna ports is 4, and the capability of the terminal device may support transmission of a maximum of four layers, the bit width of the RI is 2.

For descriptions of implementations of the terminal and the base station, refer to other parts in this embodiment. An implementation of the terminal is as an example for description below.

An example in which two NZP CSI-RS resources are configured is used below to describe determining the bit width of the CRI and/or the bit width of the RI based on a quantity of NZP CSI-RS resources and the second indication information.

Specifically, when two NZP CSI-RS resources are configured, and the second indication information indicates that CSI measurement and feedback are FeCoMP-based CSI feedback, it may be determined that the bit width of the RI is 4, and the bit width of the CRI is 2.

The value herein is merely an example, and another value is also feasible. This is not specifically limited.

Specifically, the terminal may determine, by using the method in the foregoing embodiment, that the CSI measurement behavior is FeCoMP-based CSI measurement. For example, the second indication information is configured, and the second indication information is used to enable FeCoMP-based CSI feedback, or enable coordinated multipoint transmission/reception-based CSI feedback, or enable hybrid transmission mode-based CSI feedback. For example, the second indication information is a higher layer parameter FeCoMPCSIEnabled, and determining is performed by configuring the higher layer parameter FeCoMPCSIEnabled or configuring FeCoMPCSIEnabled=TRUE (to be specific, determining is performed based on the second indication information). The following embodiment is specifically described by using a solution in which the higher layer parameter FeCoMPCSIEnabled is configured. A solution in which FeCoMPCSIEnabled=TRUE is configured is similar to this, and details are not described herein.

Bit mapping of the RI is described below, which may also be understood as that the bit meaning of the RI is described.

This embodiment provides a method for determining the bit meaning of the RI. The method may be combined with the method for determining the bit width of the RI in Manner 1. A manner of determining bit mapping of the RI, namely, the bit meaning of the RI may include one of the following implementations.

Implementation 1 (or referred to as Method 1.1): The bit meaning of the RI is determined based on the second indication information.

In this embodiment of the present disclosure, when receiving the second indication information, the terminal may determine the bit meaning of the RI based on the second indication information.

Implementation 2 (or referred to as Method 1.2): The bit meaning of the RI is determined based on the second indication information and a value of the CRI.

When the second indication information is set to FeCoMPCSIEnabled or a value of FeCoMPCSIEnabled is TRUE, the bit width of the RI may be determined, for example, is 4.

In view of this, Implementation 2 (namely, Method 1.2) may also be understood as follows: The bit meaning of the RI is determined based on the bit width of the RI and the value of the CRI. In other words, the determining the bit meaning of the RI based on the second indication information and a value of the CRI includes: determining the bit width of the RI based on the second indication information, and further determining the bit meaning of the RI based on the bit width of the RI and the value of the CRI.

This embodiment provides another method for determining the bit meaning of the RI. The determining method may be combined with another method for determining the bit width of the RI in this embodiment, for example, combined with the method for determining the bit width of the RI in Method 2.2 or Method 3, or may be combined with another method for determining the bit width of the RI. Details are not described herein.

In one embodiment, in this embodiment of the present disclosure, the determining the bit width of the RI may be determining a bit width of an RI used when a single RI is reported and/or determining a total quantity of bits occupied by a plurality of RIs (or an RI combination) when the plurality of RIs (or the RI combination) are reported. This is not specifically limited herein.

This embodiment may be independently implemented, or may be applied in combination with another embodiment. This is not specifically limited herein.

A. A Case in which the Bit Width of the RI is 2:

The bit meaning of the CRI and/or the bit meaning of the RI are/is determined based on the second indication information and at least one of a quantity of NZP CSI-RS resources, a quantity of antenna ports for an NZP CSI-RS, capability information of the terminal device, the bit width of the RI, or the value of the CRI. In an example, the bit meaning of the RI may be determined based on the value of the CRI, the second indication information, and at least one of the quantity of antenna ports for an NZP CSI-RS, the capability information of the terminal device, or the bit width of the RI.

In one embodiment, the terminal determines the bit meaning of the RI based on the quantity of antenna ports for an NZP CSI-RS resource, the value of the CRI, and the second indication information. For example, the terminal may determine the bit width of the RI based on the quantity of antenna ports for an NZP CSI-RS resource, and then determine the bit meaning of the RI based on the bit width of the RI, the value of the CRI, and the second indication information.

In one embodiment, the terminal determines the bit meaning of the RI based on the quantity of antenna ports for an NZP CSI-RS resource, the capability information of the terminal device, the value of the CRI, and the second indication information. For example, the terminal may determine the bit width of the RI based on the quantity of antenna ports for an NZP CSI-RS resource and the capability information of the terminal device, and then determine the bit meaning of the RI based on the bit width of the RI, the value of the CRI, and the second indication information.

In one embodiment, the terminal determines the bit meaning of the RI based on the bit width of the RI, the value of the CRI, and the second indication information.

B. A Case in which the Bit Width of the RI is 3:

At least one of the bit meaning of the CRI or the bit meaning of the RI is determined based on the second indication information and at least one of a quantity of NZP CSI-RS resources, a quantity of antenna ports for an NZP CSI-RS, capability information of the terminal device, the bit width of the RI, or the value of the CRI. In an example, the bit meaning of the RI may be determined based on the second indication information and the bit width of the RI.

C. A Case in which the Bit Width of the RI is 4:

Possible Manner 1:

At least one of the bit meaning of the CRI or the bit meaning of the RI is determined based on the second indication information and at least one of a quantity of NZP CSI-RS resources, a quantity of antenna ports for an NZP CSI-RS, capability information of the terminal device, the bit width of the RI, or the value of the CRI. In an example, the bit meaning of the RI may be determined based on the value of the CRI, the second indication information, and at least one of the quantity of antenna ports for an NZP CSI-RS, the capability information of the terminal device, or the bit width of the RI.

Possible Manner 2:

The bit meaning of the RI is determined based on the second indication information and at least one of a quantity of NZP CSI-RS resources, a quantity of antenna ports for an NZP CSI-RS, capability information of the terminal device, the bit width of the RI, or the value of the CRI. In an example, the bit meaning of the RI may be determined based on the second indication information and the bit width of the RI.

In one embodiment, the terminal may determine the bit meaning of the RI based on the second indication information and the bit width of the RI.

In one embodiment, the terminal may determine the bit meaning of the RI based on the bit width of the RI.

Possible Manner 2: When the RI and the CRI are jointly fed back or jointly encoded, the bit width of the RI is enabled to be independent of the value of the CRI, to be specific, it can be ensured that the bit width of the CRI and the bit width of the RI are known by both the network device and the terminal device, so that the network device can correctly receive or decode the CRI and the RI. In addition, because the bit width of the RI is related to the quantity of antenna ports and/or the capability of the terminal device, overheads for the bit width of the RI are relatively low.

For example, based on the fact that the bit information for RI reporting is 4 bits and the bit information for CRI reporting is 2 bits, the bit information for CRI and RI reporting is 6 bits. For example, meanings of bit values of the RI and the CRI are as follows:

When the CRI=0 or 1, 0000 indicates that the RI=1, 0001 indicates that the RI=2, and so on.

When the CRI=2, {RI 1, RI 2}={1, 1}, {1, 2}, {2, 1}, {2, 2}, {2, 3}, {3, 2}{3, 3}, {3, 4}, {4, 3}, and {4, 4}. 0000 indicates that {RI 1, RI 2}={1, 1}, 0001 indicates that {RI 1, RI 2}={1, 2}, and so on.

It should be noted that, a predefined value of at least one of the bit information for CRI reporting, the bit information for CRI and RI reporting, and the bit information for RI reporting in this embodiment is not limited to the predefined value described above, or may be another predefined value.

Manner 2: The network device determines at least one of the bit information for CRI reporting, the bit information for CRI and RI reporting, and the bit information for RI reporting, and notifies the terminal device of the determined bit information.

For example, the network device sends at least one of the bit information for CRI reporting, the bit information for CRI and RI reporting, and the bit information for RI reporting to the terminal device by using higher layer signaling. The signaling may be radio resource control (RRC) signaling or media access control (MAC) signaling. In the LTE communications system, the signaling may be in configuration information of a CSI process, or signaling for CQI reporting, or another signaling field. This is not limited in this embodiment. In the NR communications system, the signaling may be in configuration information of a reporting setting or another signaling field. This is not limited in this embodiment.

For example, an index may be notified, and the index corresponds to at least one of values of the bit information for CRI reporting, the bit information for CRI and RI reporting, and the bit information for RI reporting. For example, the index is 1, and corresponds to at least one of the bit information for CRI reporting that includes 2 bits, the bit information for RI reporting that includes 4 bits, or the bit information for CRI and RI reporting that includes 6 bits. For example, the index is 2 and corresponds to at least one of the bit information for CRI reporting that includes 1 bit, the bit information for RI reporting that includes 3 bits, or the bit information for CRI and RI reporting that includes 4 bits. When the index is another value, the index may further correspond to another case. This is not specifically limited herein.

In one embodiment, a manner in which the network device determines at least one of the bit information for CRI reporting, the bit information for CRI and RI reporting, and the bit information for RI reporting may be predefined in a protocol, or may be determined based on a preset rule.

Manner 3: The terminal device determines, based on a preset rule, at least one of the bit information for CRI reporting, the bit information for CRI and RI reporting, and the bit information for RI reporting included in the CSI feedback related information, and the network device determines, based on a preset rule that is the same as that used by the terminal device, at least one of the bit information for CRI reporting, the bit information for CRI and RI reporting, and the bit information for RI reporting.

The terminal device may determine the bit width of the CRI and/or the bit width of the RI based on the second indication information and at least one of a quantity of NZP CSI-RS resources, a quantity of antenna ports for an NZP CSI-RS, capability information of the terminal device, or the value of the CRI. In an example, the bit width of the RI may be determined based on the second indication information and the quantity of antenna ports and/or the capability information of the terminal device. In the second implementation, the bit width of the RI is determined based on the second indication information and the quantity of antenna ports and/or the capability information of the terminal device, without considering the value of the CRI. For example, the CRI=0, the CRI=1, and the CRI=2 are not distinguished.

An example in which more than one NZP CSI-RS resource is configured is used to describe determining the bit width of the RI based on the second indication information and a quantity of antenna ports and/or capability information of the terminal device.

Method 2.1: The bit width of the RI is determined based on the second indication information and whether the quantity of antenna ports is 1.

In the following description process, when the quantity of antenna ports is used, only two cases in which the quantity of antenna ports is 1 and the quantity of antenna ports is greater than 1 are distinguished.

In the present disclosure, when more than one NZP CSI-RS resource is configured, if there is no special description about an NZP CSI-RS resource to which the quantity of antenna ports corresponds, the quantity of antenna ports may be a maximum value of quantities of antenna ports corresponding to the more than one configured NZP CSI-RS resource.

For example, if the quantity of antenna ports is 1, it indicates that the maximum value of the quantities of antenna ports corresponding to the more than one configured NZP CSI-RS resource is 1, that is, a quantity of antenna ports corresponding to each NZP CSI-RS resource is 1. If the quantity of antenna ports is greater than 1, it indicates that the maximum value of the quantities of antenna ports corresponding to the more than one configured NZP CSI-RS resource is greater than 1, that is, a quantity of antenna ports for at least one NZP CSI-RS resource is greater than 1.

Specifically, when the quantity of antenna ports is 1, the RI is not fed back. When the quantity of antenna ports is greater than 1, a value of the bit width of the RI is specified, for example, 4.

That is, in this embodiment of the present disclosure, the terminal may determine, based on the second indication information and the quantity of antenna ports that is 1, not to feed back the RI, and feed back only the CRI. The terminal may determine, based on the second indication information and the quantity of antenna ports that is greater than 1, the bit width of the RI, for example, 4. The value of 4 of the bit width is merely an example, and another value is also feasible. This is not specifically limited herein.

In addition, for Manner 3, a more detailed solution is further provided.

Method 2.2: The bit width of the RI is determined based on the second indication information and at least one of a quantity of antenna ports for an NZP CSI-RS resource and the capability information of the terminal device (which is referred to as the capability of the terminal device for short).

In one embodiment, in this embodiment of the present disclosure, the determining the bit width of the RI may be determining a bit width of an RI used when a single RI is reported and/or determining a total quantity of bits occupied by a plurality of RIs (or an RI combination) when the plurality of RIs (or the RI combination) are reported. This is not specifically limited herein.

This embodiment may be independently implemented, or may be applied in combination with another embodiment. This is not specifically limited herein.

Specifically, for example, when the quantity of antenna ports for an NZP CSI-RS resource is 1, the RI is not fed back. When the quantity of antenna ports for an NZP CSI-RS resource is greater than 1, the bit width of the RI may be determined based on the second indication information and at least one of the quantity of antenna ports and the capability of the terminal device. For example, when the second indication information is configured and the quantity of antenna ports is 2 and/or the capability of the terminal device is that a supported maximum layer quantity is 2, the bit width of the RI is 2, or when the second indication information is configured and the quantity of antenna ports for an NZP CSI-RS resource is 4 and/or the capability of the terminal device is that a supported maximum layer quantity is 4, the bit width of the RI is 4.

In one embodiment, in this embodiment of the present disclosure, if a plurality of CSI-RS resources are configured, when the bit width of the RI is determined, the quantity of antenna ports for an NZP CSI-RS resource that is based on may be a maximum value of quantities of antenna ports corresponding to the configured NZP CSI-RS resources. For example, two NZP CSI-RS resources are configured, a quantity of antenna ports for one NZP CSI-RS resource is 2, and a quantity of antenna ports for the other NZP CSI-RS resource is 4. In this case, the bit width of the RI is determined based on the quantity of antenna ports that is 4. A quantity of antenna ports corresponding to a resource may be understood as a quantity of antenna ports used to transmit the resource.

The preset rule mentioned in Manner 2 or Manner 3 may be one or more of the following preset rules, and a specific preset rule or specific preset rules may be predefined in a protocol. In this case, the network device and/or the terminal device may have a corresponding configuration based on a definition of the protocol, or may perform determining based on specific implementation, or the terminal device may be notified, by using signaling, of a preset rule for determining, for example, by using higher layer information or a physical layer channel such as RRC signaling or MAC signaling. This is not specifically limited herein.

Preset rule 1: At least one of the bit information for CRI reporting, the bit information for CRI and RI reporting, and the bit information for RI reporting is determined based on a maximum bit width of the CRI and the RI.

For the bit information for CRI reporting, an example in which two NZP CSI-RSs (the first NZP CSI-RS resource and the second NZP CSI-RS resource) are configured is used. To measure CSI in a plurality of transmission modes, the value and a meaning of the CRI may be specified.

How to determine the bit width of the CRI and/or the bit meaning of the CRI is described below. Determining of the bit width of the CRI and/or the bit meaning of the CRI may be an independent embodiment, or may be combined with another embodiment. This is not specifically limited herein.

Determining method A: The bit width of the CRI and/or the bit meaning of the CRI are/is determined based on the second indication information.

Specifically, the terminal determines the bit width of the CRI based on the second indication information, and/or the terminal determines the bit meaning of the CRI based on the second indication information.

For example, when the terminal receives the second indication information, and FeCoMP-based CSI feedback is enabled, for example, when the second indication information is set to FeCoMPCSIEnabled or the value of FeCoMPCSIEnabled is TRUE, the terminal may determine the bit width of the CRI, for example, the bit width of the CRI is 2. When determining to enable FeCoMP-based CSI feedback for the terminal, the base station sends the second indication information, and determines that the bit width of the CRI of the terminal is 2. Herein, the bit width of the CRI that is 2 is merely an example, and another value is also feasible. This is not specifically limited.

For example, when the terminal receives the second indication information, and FeCoMP-based CSI feedback is enabled, for example, when the second indication information is set to FeCoMPCSIEnabled or the value of FeCoM-PCSIEnabled is TRUE, the terminal may determine the bit meaning of the CRI. For example, the bit meaning when the bit width of the CRI is 2 is specifically as follows: For example, 00 represents that the CRI=0, indicating that reported CSI is obtained through measurement based on the first NZP CSI-RS resource; 01 represents that the CRI=1, indicating that reported CSI is obtained through measurement based on the second NZP CSI-RS resource; and 11 represents that reported CSI is obtained through measurement based on the first NZP CSI-RS resource and the second NZP CSI-RS resource. When determining to enable FeCoMP-based CSI feedback, the base station sends the first indication information, and determines that the bit width of the CRI of the terminal is 2 and/or determines the bit meaning of the CRI. Herein, the bit width of the CRI that is 2 is merely an example, and another value is also feasible. This is not specifically limited.

In one embodiment, when the terminal does not receive the second indication information, for example, when the second indication information is not set to FeCoMPCSIEnabled or the value of FeCoMPCSIEnabled is FALSE, the bit width of the CRI may be determined based on the prior art, for example, determined based on a quantity K of configured NZP CSI-RS resources. For example, the bit width of the CRI is $\lceil \log_2(K) \rceil$. K is a positive integer, and $\lceil \ \rceil$ represents rounding up.

Determining method B: The bit width of the CRI and/or the bit meaning of the CRI are/is determined based on the second indication information and at least one of a quantity of NZP CSI-RS resources, a quantity of antenna ports for an NZP CSI-RS, capability information of the terminal device, or the value of the CRI.

In an example, the bit width of the CRI and/or the bit meaning of the CRI may be determined based on the second indication information and the quantity K of configured NZP CSI-RS resources.

Specifically, when the second indication information is set to FeCoMPCSIEnabled or the value of FeCoMPCSIEnabled is TRUE, the bit width of the CRI is determined based on the quantity of configured NZP CSI-RS resources. For example, if the quantity of configured NZP CSI-RS resources is 2, the bit width of the CRI is 2. When the second indication information is not set to FeCoMPCSIEnabled or the value of FeCoMPCSIEnabled is FALSE, the bit width of the CRI is determined based on the quantity K of configured NZP CSI-RS resources. For example, the bit width of the CRI is $\lceil \log_2(K) \rceil$. For example, if the quantity K of configured NZP CSI-RS resources is 2, the bit width of the CRI is 1.

In this embodiment of the present disclosure, a relationship between the quantity of configured NZP CSI-RS resources and the bit width of the CRI and/or the bit meaning of the CRI may include at least one of the following:

1. In coordinated multipoint transmission/reception (or FeCoMP or hybrid transmission mode or non-coherent transmission mode)-based CSI measurement and/or feedback, when the quantity of NZP CSI-RS resources is K, the bit width of the CRI may be $\lceil \log_2(K+C_K^2) \rceil$.

For example, four NZP CSI-RS resources are configured, and in coordinated multipoint transmission/reception (or FeCoMP or hybrid transmission mode or non-coherent transmission mode)-based CSI measurement and/or feedback, four cases may be included in a single-cell scenario. In a coordinated multipoint transmission/reception scenario or FeCoMP, any two resources are selected from the four NZP CSI-RS resources. To be specific, there may be $C_K^2$ cases. Therefore, the CRI needs to indicate a total of $K+C_K^2$, cases.

That is, the bit width of the CRI may be $\lceil\log_2(K+C_K^2)\rceil$. K is the quantity of NZP CSI-RS resources.

For example, K=4. In this case, a total of 4 bits are needed to indicate the value of the CRI. In this case, the bit meaning of the CRI may be at least one of the following, and a decimal system is used below to represent the value of the CRI. It may be understood that the value of the CRI may also be represented by using a binary, octal, or hexadecimal system. The value in this embodiment of the present disclosure is represented by using one number system, but is not limited to the enumerated number system:

The CRI=0 indicates that reported CSI is obtained through measurement based on the first NZP CSI-RS resource.

The CRI=1 indicates that reported CSI is obtained through measurement based on the second NZP CSI-RS resource.

The CRI=2 indicates that reported CSI is obtained through measurement based on the third NZP CSI-RS resource.

The CRI=3 indicates that reported CSI is obtained through measurement based on the fourth NZP CSI-RS resource.

The CRI=4 indicates that reported CSI is obtained through measurement based on the first and second NZP CSI-RS resources.

The CRI=5 indicates that reported CSI is obtained through measurement based on the first and third NZP CSI-RS resources.

The CRI=6 indicates that reported CSI is obtained through measurement based on the first and fourth NZP CSI-RS resources.

The CRI=7 indicates that reported CSI is obtained through measurement based on the second and third NZP CSI-RS resources.

The CRI=8 indicates that reported CSI is obtained through measurement based on the second and fourth NZP CSI-RS resources.

The CRI=9 indicates that reported CSI is obtained through measurement based on the third and fourth NZP CSI-RS resources.

In the foregoing embodiment, the value or the bit meaning of the CRI indicates a meaning of CSI feedback. In one embodiment, the meaning of CSI feedback may be indicated by using another piece of information, for example, first feedback information. In other words, the first feedback information is used to indicate the meaning of CSI feedback. The meaning of CSI feedback may be at least one of a CSI measurement result in coordinated multipoint transmission/reception, a measurement result in single-cell transmission, or a CSI measurement result in FeCoMP. Alternatively, the meaning of CSI feedback may be at least one of the first CSI, the second CSI, the third CSI, or the fourth CSI. The first CSI is obtained based on the interference power; the second CSI is obtained based on the interference that is obtained by using the preset algorithm when the resource used for channel measurement is the same as the resource used for interference measurement; the third CSI is obtained based on the interference power and the interference that is obtained by using the preset algorithm when the resource used for channel measurement is the same as the resource used for interference measurement; and the fourth CSI is obtained based on the inter-stream interference or the inter-codeword interference.

For example, the terminal may feed back the first feedback information. The first feedback information is used to indicate the meaning of CSI feedback. According to the method, the base station may determine, by receiving the first feedback information, a meaning of CSI feedback that corresponds to received CSI. The implementation may be an independent embodiment, or may be combined with another embodiment. This is not specifically limited herein.

In this embodiment of the present disclosure, when the terminal receives the second indication information, where the second indication information instructs to enable coordinated multipoint transmission/reception (or FeCoMP or hybrid transmission mode or non-coherent transmission mode)-based CSI measurement and/or feedback, the terminal determines, based on the second indication information and the quantity of NZP CSI-RS resources, that the bit width of the CRI is $\lceil\log_2(K+C_K^2)\rceil$. Similarly, for a base station side, when determining to enable FeCoMP-based CSI feedback for the terminal, the base station sends the second indication information, and determines that the bit width of the CRI of the terminal is $\lceil\log_2(K+C_K^2)\rceil$. K is the quantity of NZP CSI-RS resources.

When the terminal does not receive the second indication information, that is, coordinated multipoint transmission/reception (or FeCoMP or hybrid transmission mode or non-coherent transmission mode)-based CSI measurement and/or feedback are/is not enabled, for example, when normal measurement and feedback or single-cell measurement and feedback are performed, when the quantity of NZP CSI-RS resources is K, the bit width of the CRI may be $\lceil\log_2(K)\rceil$. K is a positive integer, and $$C_K^2 = \frac{K \times (K-1)}{2}.$$

2. In coordinated multipoint transmission/reception (or FeCoMP or hybrid transmission mode or non-coherent transmission mode)-based CSI measurement and feedback, when the quantity of NZP CSI-RS resources is K, the bit width of the CRI may be $\lceil\log_2(K+C_{K-1}^1)\rceil$ or another specified bit width, or is calculated based on another specified calculation formula. This is not specifically limited herein.

For example, K=4. In this case, a total of 3 bits are needed to indicate the value of the CRI. In this case, the bit meaning of the CRI may be at least one of the following, and a decimal system is used below to represent the value of the CRI. It may be understood that the value of the CRI may also be represented by using a binary, octal, or hexadecimal system. The value in this embodiment of the present disclosure is represented by using one number system, but is not limited to the enumerated number system:

The CRI=0 indicates that reported CSI is obtained through measurement based on the first NZP CSI-RS resource.

The CRI=1 indicates that reported CSI is obtained through measurement based on the second NZP CSI-RS resource.

The CRI=2 indicates that reported CSI is obtained through measurement based on the third NZP CSI-RS resource.

The CRI=3 indicates that reported CSI is obtained through measurement based on the fourth NZP CSI-RS resource.

The CRI=4 indicates that reported CSI is obtained through measurement based on the first and second NZP CSI-RS resources.

The CRI=5 indicates that reported CSI is obtained through measurement based on the first and third NZP CSI-RS resources.

The CRI=6 indicates that reported CSI is obtained through measurement based on the first and fourth NZP CSI-RS resources.

During normal measurement such as single-cell measurement and feedback, when the quantity of NZP CSI-RS resources is K, the bit width of the CRI may be $\lceil \log_2(K) \rceil$.

Example 1: For example, the CRI=0 indicates that the first NZP CSI-RS resource has the optimal transmission performance. In this case, the foregoing case may correspond to a DPS transmission mode. The CRI=1 indicates that the second NZP CSI-RS resource has the optimal transmission performance. In this case, the foregoing case may correspond to the DPS transmission mode. The CRI=2 indicates that joint transmission of the first NZP CSI-RS and the second NZP CSI-RS has the optimal performance. In this case, the foregoing case may correspond to the coordinated multipoint transmission/reception mode. When the value of the CRI is 0, 1, or 2, the maximum bit width of the CRI is 2.

Example 2: The CRI=3 and the CRI=4 are added based on Example 1 in which the CRI=0, 1, or 2. The CRI=3 indicates that the first NZP CSI-RS resource has the optimal transmission performance, and there is no interference to a transmission point corresponding to the second NZP CSI-RS resource. In this case, the foregoing case may correspond to a transmission mode of DPS+DPB. The CRI=4 indicates that the second NZP CSI-RS resource has the optimal transmission performance, and there is no interference to a transmission point corresponding to the first NZP CSI-RS resource. In this case, the foregoing case may correspond to the transmission mode of DPS+DPB. When the value of the CRI is 0, 1, 2, 3, or 4, the maximum bit width of the CRI is 3.

The bit information for RI reporting may be determined based on a maximum bit width of the RI in one or more of the following manners. A specific manner or specific manners to be used may be specified based on a protocol or determined based on specific implementation.

Manner 1: In the LTE communications system, in the single-point transmission mode, because a maximum layer quantity supported by all terminal devices is 8, a maximum bit width for RI reporting for one piece of CSI is 3, that is, the bit information for RI reporting is 3 bits.

Manner 2: The maximum bit width of the RI is determined based on a maximum quantity of antenna ports for a configured NZP CSI-RS resource. For example, if the maximum quantity of antenna ports is 1, the maximum bit width of the RI is 1, that is, the bit information for RI reporting is 1 bit. For another example, if the quantity of antenna ports is 2 or 4, the maximum bit width of the RI is 2, that is, the bit information for RI reporting is 2 bits. For another example, if the maximum quantity of antenna ports is 8, the maximum bit width of the RI is 3, that is, the bit information for RI reporting is 3 bits.

Manner 3: The maximum bit width of the RI is determined based on a maximum layer quantity supported by a terminal device that performs CSI measurement and feedback. For example, if the supported maximum layer quantity is 1, the maximum bit width of the RI is 1, that is, the bit information for RI reporting is 1 bit. For another example, if the supported layer quantity is 2 or 4, the maximum bit width of the RI is 2, that is, the bit information for RI reporting is 2 bits. For another example, if the supported maximum layer quantity is 8, the maximum bit width of the RI is 3, that is, the bit information for RI reporting is 3 bits.

Manner 4: When a plurality of RIs need to be reported in the coordinated multipoint transmission/reception mode, a maximum bit width of an RI corresponding to each NZP CSI-RS resource may be calculated for the resource, to obtain the maximum bit width of each RI, and then the maximum bit quantities of the RIs are added to obtain the bit information for RI reporting.

If there are a plurality of CSI-RS resources, a maximum quantity of antenna ports for these resources is determined as a quantity of antenna ports that is related to the RI. Another method for determining the quantity of antenna ports that is related to the RI is further described below. This embodiment may be used as an independent embodiment, or may be combined with another embodiment. This is not specifically limited herein. It may be understood that a more detailed determining method is described below:

For coordinated multipoint transmission/reception mode (or FeCoMP or hybrid transmission mode or non-coherent transmission mode)-based CSI measurement and/or feedback, the bit width of the RI is determined based on a quantity of antenna ports for each CSI-RS resource.

In one embodiment, when a quantity of antenna ports for one CSI-RS resource is 1, and a quantity of antenna ports for another CSI-RS resource is M, the bit width of the RI may be 1 or $\lceil \log_2 M \rceil$. Whether a specific bit width of the RI is 1 or $\lceil \log_2 M \rceil$ may be predefined in a protocol, or notified by the base station by using signaling. This is not specifically limited herein.

For example, there are two CSI-RS resources, a quantity of antenna ports for one CSI-RS resource is 1, and a quantity of antenna ports for the other CSI-RS resource is M, where M is greater than 1. In this case, the bit width of the RI may be 1 or $\lceil \log_2 M \rceil$.

When the bit width of the RI is 1, the 1 bit may be used to respectively indicate two values of the RI (or an RI combination) when the CRI=0, 1, or 2. For example, the RI=1 or 2 when the CRI=0 or 1 and the RI={1, 1} or {1, 2} when the CRI=2 are supported.

When the bit width of the RI is $\lceil \log_2 M \rceil$, the $\lceil \log_2 M \rceil$ bits may be used to respectively indicate M values of the RI (or an RI combination) when the CRI=0, 1, or 2. For example, the RI=1, 2, . . . , or M when the CRI=0 is supported, the RI=1, 2, . . . , or M when the CRI=1 is supported, and the RI={1, 1}, {1, 2}, . . . , or {1, M} when the CRI=2 is supported.

In one embodiment, when a quantity of antenna ports for one CSI-RS resource is M1, and a quantity of antenna ports for at least one CSI-RS resource is M2, the bit width of the RI may be a maximum bit width of the RI in consideration of various values of the CRI.

Specifically, the terminal and/or the base station may determine the maximum bit width of the RI in the case of various values of the CRI based on a bit width of the RI that corresponds to each CSI-RS resource, and then determine the bit width of the RI that is fed back.

For example, there are two CSI-RS resources, a quantity of antenna ports for one CSI-RS resource is 2, and a quantity of antenna ports for the other CSI-RS resource is 4. In this case, the bit width of the RI may be 2 or 3, which meets the maximum bit width of the RI in the case of various values of the CRI. Whether a specific bit width of the RI is 2 or 3 may be predefined in a protocol, or notified by the base station by using signaling. This is not specifically limited herein.

A Case in which the Bit Width of the RI is 2:

When a quantity of antenna ports for the first CSI-RS resource is 2, and CSI corresponding to the first CSI-RS resource is fed back (for example, the CRI=0), a corresponding RI needs to be fed back by using 1 bit, and the 1 bit may be used to indicate that the RI=1 or 2. An example in which a quantity of antenna ports for the second CSI-RS resource is 4 is used. When CSI corresponding to the second CSI-RS resource is fed back (for example, the CRI=1), a corresponding RI needs to be fed back by using 2 bits, and the 2 bits may be used to indicate that the RI=1, 2, 3, or 4. When CSI corresponding to the first CSI-RS resource and CSI corresponding to the second CSI-RS resource are fed back (for example, the CRI=2), corresponding RIs need to be fed back by using 2 bits, and the 2 bits may be used to indicate that the RIs={1, 1}, {1, 2}, {2, 1}, or {2, 3}. Therefore, in consideration of the maximum bit width of the RI in the case of various values of the CRI, it may be determined that the bit width for RI feedback is 2 bits. For example, the RI=1 or 2 when the CRI=0, the RI=1, 2, 3, or 4 when the CRI=1, and {1, 1}, {1, 2}, {2, 1}, or {2, 3} when the CRI=2 are supported.

A case in which the bit width of the RI is 3:

When a quantity of antenna ports for the first CSI-RS resource is 2, and CSI corresponding to the first CSI-RS resource is fed back (for example, the CRI=0), a corresponding RI needs to be fed back by using 1 bit, and the 1 bit may be used to indicate that the RI=1 or 2. An example in which a quantity of antenna ports for the second CSI-RS resource is 4 is used. When CSI corresponding to the second CSI-RS resource is fed back (for example, the CRI=1), a corresponding RI needs to be fed back by using 2 bits, and the 2 bits may be used to indicate that the RI=1, 2, 3, or 4. When CSI corresponding to the first CSI-RS resource and CSI corresponding to the second CSI-RS resource are fed back (for example, the CRI=2), corresponding RIs need to be fed back by using 3 bits, and the 3 bits may be used to indicate that the RIs={1, 1}, {1, 2}, {2, 1}, {2, 3}, {1, 3}, {1, 4}, or {2, 4}. Therefore, in consideration of the maximum bit width of the RI in the case of various values of the CRI, it may be determined that the bit width for RI feedback that is 3 bits can be supported. For example, the RI=1 or 2 when the CRI=0, the RI=1, 2, 3, or 4 when the CRI=1, and {1, 1}, {1, 2}, {2, 1}, {2, 3}, {1, 3}, {1, 4}, or {2, 4} when the CRI=2 are supported.

Manner 5: When a plurality of RIs need to be combined and reported in the coordinated multipoint transmission/reception mode, the bit information for RI reporting may be determined based on a quantity of combinations supported for combination and reporting of the plurality of RIs. For example, when the RI 1 and the RI 2 are combined for reporting, {RI 1, RI 2}={1, 1}, {1, 2}, {2, 1}, {2, 2}, {2, 3}, {3, 2}{3, 3}, {3, 4}, {4, 3}, or {4, 4}, that is, the quantity of combinations supported for RI combination and reporting is 10. In this case, the bit information for RI reporting is 4 bits. For another example, when the RI 1 and the RI 2 are combined for reporting, {RI 1, RI 2}={1, 1}, {1, 2}, {2, 1}, {2, 2}, {2, 3}, {3, 2}, {1, 4}, {4, 1}, {3, 3}, {2, 4114, 2}, {1, 5}, {5, 1}, {3, 4}, {4, 3}, {2, 5}, {5, 2}, {4, 4}, {3, 5}, {5, 3}, {2, 6}, or {6, 2}, that is, the quantity of combinations supported for RI combination and reporting is 22. In this case, the bit information for RI reporting is 5 bits. For another example, when the RI 1 and the RI 2 are combined for reporting, {RI 1, RI 2}=at least one of {1, 0}, {0, 1}, {2, 0}, {0, 2}, {3, 0}, {0, 3}, {4, 0}, {0, 4}, {5, 0}, {0, 5}, {6, 0}, {0, 6}, {7, 0}, {0, 7}, {7, 0}, {0, 7}, {8, 0}, {0, 8}, {1, 1}, {1, 2}, {2, 1}, {2, 2}, {2, 3}, {3, 2}, {1, 4}, {4, 1}, {3, 3}, {2, 4114, 2}, {1, 5}, {5, 1}, {3, 4}, {4, 3}, {2, 5}, {5, 2}, {4, 4}, {3, 5}, {5, 3}, {2, 6}, {6, 2}, {7, 1}, or {1, 7}. For example, when some of the values are selected, when the quantity of combinations supported for RI combination and reporting is 22, the bit information for RI reporting is 5 bits.

After the bit information for CRI reporting and the bit information for RI reporting are determined by using Preset rule 1, the bit information for CRI and RI reporting may be equal to a sum of the bit information for CRI reporting and the bit information for RI reporting.

Preset rule 2: At least one of the bit information for CRI reporting, the bit information for CRI and RI reporting, and the bit information for RI reporting is determined in consideration of both the CRI and the RI. An example is used below for description.

When DPS is considered for feedback, when the CRI=0, the maximum bit width for RI reporting may be determined based on the quantity of antenna ports for the first NZP CSI-RS resource, for example, the maximum bit width of the RI is 3. When the CRI=1, the maximum bit width for RI reporting may be determined based on the quantity of antenna ports for the second NZP CSI-RS resource, for example, the maximum bit width for RI reporting is 2. Therefore, for Case 1 for the CRI, the bit information for CRI reporting is 1 bit, the bit information for RI reporting is 3 bits, and the bit information for CRI and RI reporting is 4 bits.

When the DPS and coordinated multipoint transmission/reception modes are considered for feedback, the CRI=2 is added based on the fact that only the CRI=0 or 1 is considered in DPS for feedback above. When the CRI=2, the maximum bit width for RI reporting may be determined based on the quantity of antenna ports for the first NZP CSI-RS resource and the quantity of antenna ports for the second NZP CSI-RS resource. For example, a plurality of RIs are independently reported or a plurality of RIs are combined for reporting. In this case, it is assumed that the maximum bit width for RI reporting is 4. Therefore, for Case 2 for the CRI, the bit information for CRI reporting is 2 bits, the bit information for RI reporting is 4 bits, and the bit information for CRI and RI reporting is 6 bits.

When the DPS, DPB, and coordinated multipoint transmission/reception modes are considered for feedback, the CRI=3 or 4 is added based on the fact that only the CRI=0, 1, or 2 is considered in the DPS and coordinated multipoint transmission/reception modes for feedback above. When the CRI=3, the maximum bit width for RI reporting may be determined based on the quantity of antenna ports for the first NZP CSI-RS resource, and it is assumed that the maximum bit width for RI reporting is 2. When the CRI=4, the maximum bit width for RI reporting may be determined based on the quantity of antenna ports for the second NZP CSI-RS resource, and it is assumed that the maximum bit width for RI reporting is 2. Therefore, for Case 3 for the CRI, the bit information for CRI reporting is 3 bits, the bit information for RI reporting is 4 bits, and the bit information for CRI and RI reporting is 7 bits.

Preset rule 3: In the NR communications system, at least one of the bit information for CRI reporting, the bit information for CRI and RI reporting, and the bit information for RI reporting may be determined based on a quantity of links or a quantity of measurement channels.

For example, if the quantity of links or the quantity of measurement channels is 2, for a value of the bit information of the CRI, there may be three cases. For example, when the CRI=0, it indicates that CSI obtained through measurement based on an NZP CSI-RS resource corresponding to the first link or a link of the first measurement channel has the optimal performance. For example, when the CRI=1, it indicates that CSI obtained through measurement based on an NZP CSI-RS resource corresponding to the second link or a link of the second measurement channel has the optimal performance. For example, when the CRI=2, it indicates that CSI obtained through measurement based on joint transmission of an NZP CSI-RS resource corresponding to the first link or a link of the first measurement channel and an NZP CSI-RS resource corresponding to the second link or a link of the second measurement channel has the optimal performance. In this case, there may be 2 bits for CRI reporting.

For another example, if the quantity of links or the quantity of measurement channels is 3, for a value of the bit information of the CRI, there may be three cases. For example, when the CRI=0, it indicates that CSI obtained through measurement based on an NZP CSI-RS resource corresponding to the first link or a link of the first measurement channel has the optimal performance. For example, when the CRI=1, it indicates that CSI obtained through measurement based on an NZP CSI-RS resource corresponding to the second link or a link of the second measurement channel has the optimal performance. For example, when the CRI=2, it indicates that CSI obtained through measurement based on an NZP CSI-RS resource corresponding to the third link or a link of the third measurement channel has the optimal performance. In this case, there may be 2 bits for CRI reporting.

A value of the bit information of the RI may be determined based on a quantity of antenna ports for an NZP CSI-RS resource corresponding to each link. There may be another determining manner. This is not limited herein.

In this embodiment, the CSI fed back by the terminal device includes information used to indicate a resource with better transmission performance (that is, CSI obtained in which measurement behavior is fed back), which may be the same as or different from that in the prior art. Descriptions are provided below. In this embodiment, this part may be used in combination with another part, or may be independently applied, to provide a CSI feedback method. In the prior art, the CRI fed back in the single-point transmission mode is a CSI-RS resource indication, used to indicate a resource with better transmission performance. In the coordinated multipoint transmission/reception mode, the CRI is used to indicate a resource with better transmission performance or indicate a plurality of resources with better joint transmission performance.

In this embodiment, one or more of a resource setting index, a resource set index, and a resource index may be fed back to indicate a resource with better transmission performance or indicate a plurality of resources with better joint transmission performance. Descriptions are respectively provided below for different scenarios. A feedback index is a feedback indication, and one feedback index indicates a resource transmission indication in one definition. Specifically, the foregoing feedback operation may be at least one of the following designs. A specific design or a combination of specific designs may be defined in a protocol, or determined based on a system design:

Design 1: One reporting setting is associated with a plurality of resource settings, one resource setting includes one resource set, and one resource set includes one channel measurement resource, or one resource set includes one or more resources related to one CSI measurement result. In this case, a feedback index corresponding to a resource setting index may be fed back to indicate a resource with better transmission performance or indicate a plurality of resources with better joint transmission performance.

Figure 10A:
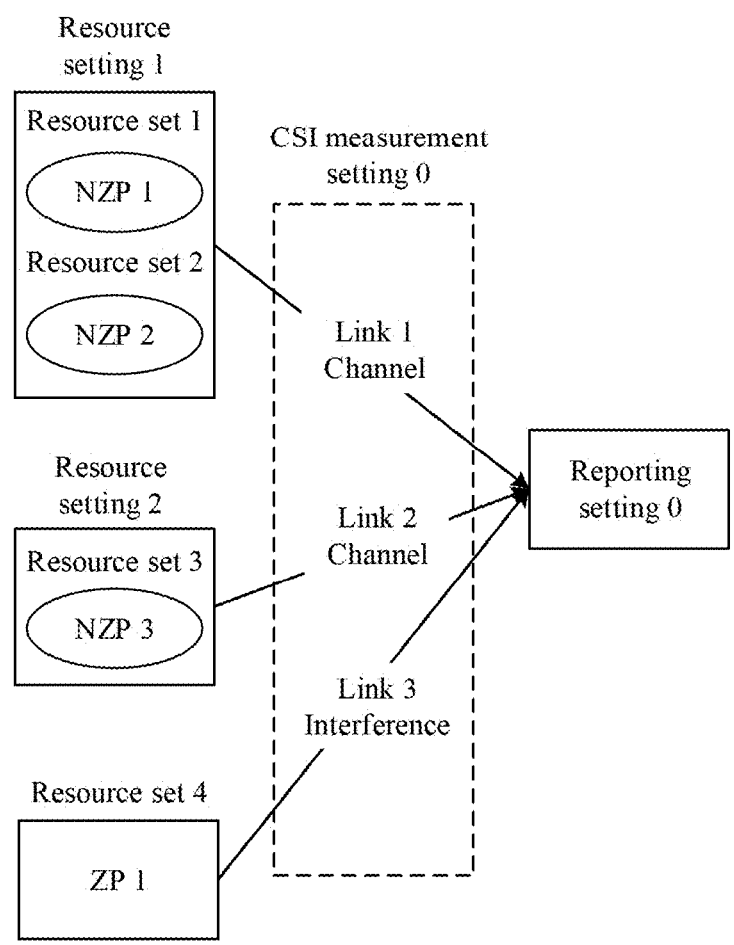
FIG. 10A is another schematic diagram of a resource configuration for CSI according to an embodiment of the present disclosure.

A schematic diagram of a resource configuration for CSI shown in FIG. 10A is used as an example. When a feedback index=2 is fed back, it indicates that a channel part of a CSI report that is fed back by the terminal device and that is in a measurement resource in a resource setting index=2 has better transmission performance. If the resource setting index=2 corresponds to one channel measurement resource, or a resource related to one CSI measurement result included in the resource setting index=2 includes one channel measurement resource, it indicates that transmission performance in the single-point transmission mode for the resource is better. If the resource related to the CSI measurement result corresponding to the resource setting index=2 includes more than one channel measurement resource, it indicates that transmission performance in the coordinated multipoint transmission/reception mode for the plurality of resources is better. When a feedback index=1 and a feedback index=2 are fed back, it indicates that a channel part of a CSI report that is fed back by the terminal device and that is in a measurement resource in the resource setting index=1 and the resource setting index=2 has better transmission performance in the coordinated multipoint transmission/reception mode.

Design 2: One reporting setting is associated with a plurality of resource settings, one resource setting includes one or more resource sets, and one resource set includes one channel measurement resource, or one resource set includes one or more resources related to one CSI measurement result. In this case, a feedback index corresponding to a resource setting index and a resource set index may be fed back to indicate a resource with better transmission performance or indicate a plurality of resources with better joint transmission performance. A manner of feeding back the resource setting index and the resource set index may use a joint indication or an independent indication. A specific feedback manner to be used may be configured by the network device or predefined.

A schematic diagram of a resource configuration for CSI shown in FIG. 10A is used as an example. When a feedback index=0110, it indicates that a channel part of a CSI report that is fed back by the terminal device and that is in a measurement resource in a resource set index=2 in a resource setting index=1 has better transmission performance. The first two bits 01 in the feedback index=0110 indicates the resource setting index, and the last two bits 10 in the feedback index=0110 indicates the resource set index. If the resource set index=2 in the resource setting index=1 corresponds to one channel measurement resource, or a resource related to one CSI measurement result corresponding to the resource set index=2 in the resource setting index=1 includes one channel measurement resource, it indicates that transmission performance in the single-point transmission mode for the resource is better. If a resource related to one CSI measurement result corresponding to the resource set index=2 in the resource setting index=1 includes more than one channel measurement resource, it indicates that transmission performance in the coordinated multipoint transmission/reception mode for the plurality of resources is better.

Design 3: One reporting setting is associated with a plurality of resource settings, one resource setting includes one or more resource sets, one resource set includes one or more channel measurement resources, or one resource set includes resources related to one or more CSI measurement results, and a resource related to each CSI measurement result may include one or more resources. In this case, a feedback index corresponding to a resource setting index, a resource set index, and a resource index is fed back to indicate a resource with better transmission performance or indicate a plurality of resources with better joint transmission performance. A manner of feeding back the resource setting index, the resource set index, and the resource index may use a joint indication or an independent indication, or two of the three indexes may use a joint indication. A specific feedback manner to be used and a specific mapping and encoding sequence may be configured by the network device or predefined.

A schematic diagram of a resource configuration for CSI shown in FIG. 10A is used as an example. When a feedback index=011001, it indicates that a channel part of a CSI report that is fed back by the terminal device and that is in a measurement resource in a resource index=1 in a resource set index=2 in a resource setting index=1 has better transmission performance. The first two bits 01 in the feedback index=011001 indicates the resource setting index, the two bits 10 in the middle in the feedback index=011001 indicates the resource set index, and the last two bits 10 in the feedback index=011001 indicates the resource index. If the resource index=1 in the resource set index=2 in the resource setting index=1 corresponds to one channel measurement resource, or the resource index=1 in the resource set index=2 in the resource setting index=1 corresponds to a resource related to one CSI measurement result, and the resource related to the CSI measurement result includes one channel measurement resource, it indicates that the transmission performance in the single-point transmission mode for the resource is better. If the resource index=1 in the resource set index=2 in the resource setting index=1 corresponds to a resource related to one CSI measurement result, and the resource related to the CSI measurement result includes more than one channel measurement resources, or the resource index=1 in the resource set index=2 in the resource setting index=1 corresponds to resources related to a plurality of (more than one) CSI measurement results, and a resource related to each CSI measurement result includes one or more channel measurement resources, it indicates that transmission performance in the coordinated multipoint transmission/reception mode for the plurality of resources is better.

Design 4: One reporting setting is associated with one resource setting, the resource setting includes one or more resource sets, and each resource set includes one channel measurement resource, or each resource set includes one or more resources related to one CSI measurement result. In this case, a feedback index corresponding to a resource set index is fed back to indicate a resource with better transmission performance or indicate a plurality of resources with better joint transmission performance.

A schematic diagram of a resource configuration for CSI shown in FIG. 10A is used as an example. When a feedback index=2 is fed back, it indicates that a channel part of a CSI report that is fed back by the terminal device and that is in a measurement resource in a resource set index=2 has better transmission performance. If the resource set index=2 corresponds to one channel measurement resource, or a resource related to one CSI measurement result corresponding to the resource set index=2 includes one channel measurement resource, it indicates that transmission performance in the single-point transmission mode for the resource is better. If the resource related to the CSI measurement result corresponding to the resource set index=2 includes more than one channel measurement resource, it indicates that transmission performance in the coordinated multipoint transmission/reception mode for the plurality of resources is better. When a resource set index=1 and a resource set index=2 are fed back, it indicates that a channel part of a CSI report that is fed back by the terminal device and that is in a measurement resource in the resource set index=1 and the resource set index=2 has better transmission performance in the coordinated multipoint transmission/reception mode.

Design 5: One reporting setting is associated with one resource setting, the resource setting includes one or more resource sets, each resource set includes one or more channel measurement resources, or each resource set includes resources related to one or more CSI measurement results, and there is one or more resources related to each CSI measurement result. In this case, a feedback index corresponding to a resource set index and a resource index is fed back to indicate a resource with better transmission performance or indicate a plurality of resources with better joint transmission performance. A manner of feeding back the resource set index and the resource index may use a joint indication or an independent indication.

Design 6: One reporting setting is associated with a plurality of resource settings, each resource setting includes one resource set, the resource set includes one or more channel measurement resources, or the resource set includes resources related to one or more CSI measurement results, and there is one or more resources related to each CSI measurement result. A feedback index corresponding to a resource setting index and a resource index is fed back to indicate a resource with better transmission performance or indicate a plurality of resources with better joint transmission performance.

In the foregoing six designs, when the resource setting index is fed back, a new feedback variable such as a resource set identifier (resource setting index, RSI) may be defined, or a name of a feedback variable for the CRI may continue to be used. When the resource set index is fed back, a new feedback variable such as an RSI 1 may be defined, or a name of a feedback variable for the CRI continues to be used. When the resource index is fed back, the CRI may be used. This is not limited in this embodiment. A feedback manner and/or a mapping and encoding sequence used by the feedback index may be configured by the base station or predefined. This is not limited in this embodiment.

Further, this embodiment of the present disclosure further provides an assumed scenario: the terminal device supports CSI measurement and feedback in the hybrid mode, and supports CSI measurement and feedback in the single-point transmission mode. In this scenario, based on Case 2, to be specific, the network device determines that the terminal device needs to perform CSI measurement and feedback in the single-point transmission mode, the configuration information sent by the network device to the terminal device meets at least one of the following conditions (1) to (8), and the terminal device may learn, based on the configuration information in at least one of the following conditions (1) to (8), how to perform CSI measurement and feedback, that is, learn to perform CSI measurement and feedback in the single-point transmission mode. It may be understood that, this part may be applied in combination with another part of this embodiment of the present disclosure, or may be independently applied.

The conditions (1) to (8) are respectively as follows:
(1) The configuration information includes one NZP CSI-RS resource of the class A.
(2) The configuration information includes M1 NZP CSI-RS resources of the class B and the CSI measurement behavior indication information and/or the CSI feedback related information indication information, where M1 is an integer greater than or equal to 1.

Alternatively, the configuration information includes M2 NZP CSI-RS resources of the class B, where M2 is an integer greater than or equal to 1. When the CSI measurement behavior indication information and the CSI feedback related information indication information are not configured, measurement and feedback in the single-point transmission mode may also be predefined in a protocol.

(3) The configuration information includes the CSI measurement behavior indication information and/or the CSI feedback related information indication information.

In the foregoing conditions (2) and (3), the CSI measurement behavior indication information indicates CSI measurement behavior in the single-point transmission mode, and the CSI feedback related information indication information indicates CSI feedback related information in the single-point transmission mode. For example, the CSI measurement behavior indication information instructs to measure at least one of the first CSI, the second CSI, and the third CSI, and the CSI feedback related information indication information includes use of joint encoding for the CRI and the RI. Related explanations of the first CSI, the second CSI, and the third CSI are already described above, and details are not described herein again.

(4) The configuration information includes a QCL type of an antenna port that is the type A or the type B.
(5) The configuration information includes a PQI that indicates that a QCL quantity is equal to 1.
(6) The configuration information includes a PQI that indicates that a parameter group quantity is equal to 1.
(7) The configuration information includes one reporting setting associated with one channel link or one RS setting or one RS set.
(8) The configuration information includes indication information, where the indication information instructs the terminal device to perform CSI measurement and feedback in the single-point transmission mode. For example, the indication information indicates that a current CSI process is a CSI process in the single-point transmission mode, and the terminal device learns, based on the indication information, to perform CSI measurement and feedback in the single-point transmission mode.

The determined CSI measurement behavior includes measurement of at least one of the first CSI, the second CSI, and the third CSI. Related explanations of the first CSI, the second CSI, and the third CSI are already described above, and details are not described herein again.

The determined CSI feedback related information includes use of joint encoding for the CRI and the RI.

It should be noted that, based on Case 2, the network device determines that the terminal device needs to perform CSI measurement and feedback in the single-point transmission mode. Related explanations and descriptions may be based on Case 1, to be specific, the network device determines that the terminal device needs to perform CSI measurement and feedback in the hybrid mode. Details are not described herein again.

Further, this embodiment of the present disclosure further provides an assumed scenario: When the terminal device supports CSI measurement and feedback in the coordinated multipoint transmission/reception mode, and supports CSI measurement and feedback in the single-point transmission mode, based on Case 3, to be specific, the network device determines that the terminal device needs to perform CSI measurement and feedback in the coordinated multipoint transmission/reception mode, the configuration information sent by the network device to the terminal device needs to meet a particular condition. Specifically, the configuration information meets at least one of the following conditions (1) to (11), and the terminal device may learn, based on the configuration information in at least one of the following conditions (1) to (11), how to perform CSI measurement and feedback, that is, learn to perform CSI measurement and feedback in the coordinated multipoint transmission/reception mode. It may be understood that, this part may be applied in combination with another part of this embodiment of the present disclosure, or may be independently applied.

The conditions (1) to (11) are respectively as follows:
(1) The configuration information includes N11 non-zero power (non-zero power, NZP) CSI-RS resources of the class A, where N11 is a positive integer greater than or equal to 2.
(2) The configuration information includes N21 NZP CSI-RS resources of the class B and the CSI measurement behavior indication information and/or the CSI feedback related information indication information, where N21 is a positive integer greater than or equal to 2.

Alternatively, the configuration information includes N22 NZP CSI-RS resources of the class B, where N22 is an integer greater than or equal to 1. When the CSI measurement behavior indication information and the CSI feedback related information indication information are not configured, measurement and/or feedback in the coordinated multipoint transmission/reception mode may also be predefined in a protocol.

(3) The configuration information includes the CSI measurement behavior indication information and/or the CSI feedback related information indication information.

In the foregoing conditions (2) and (3), the CSI measurement behavior indication information indicates CSI measurement behavior in the coordinated multipoint transmission/reception mode, and the CSI feedback related information indication information indicates CSI feedback related information in the coordinated multipoint transmission/reception mode. For example, the CSI measurement behavior indication information instructs to measure the fourth CSI, where the fourth CSI is obtained based on the inter-stream interference or the inter-codeword interference, and the CSI feedback related information indication information includes use of joint encoding or independent encoding for the CRI and the RI.

(4) The configuration information includes a QCL type of an antenna port that is the type C.
(5) The configuration information includes a QCL type of an antenna port that is the type C and a CSI process quantity that is 1.

(6) The configuration information includes a PQI that indicates that a QCL quantity is greater than M3, where M3 is a positive integer greater than or equal to 1.

(7) The configuration information includes a PQI that indicates that a parameter group quantity is greater than P1, where P1 is a positive integer greater than or equal to 1.

(8) The configuration information includes at least one of the bit information for CRI reporting, the bit information for CRI and RI reporting, and the bit information for RI reporting.

If bit information for CRI reporting, bit information for CRI and RI reporting, and bit information for RI reporting that are used when the network device requires the terminal device to perform CSI measurement and feedback in the single-point transmission mode are predefined values, the configuration information does not need to include at least one of the bit information for CRI reporting, the bit information for CRI and RI reporting, and the bit information for RI reporting, so that when the configuration information meets the condition (8), it may be determined that the network device requires the terminal device to perform CSI measurement and feedback in the coordinated multipoint transmission/reception mode, and the bit information included in the configuration information is bit information used when the terminal device performs CSI measurement and feedback in the coordinated multipoint transmission/reception mode. Otherwise, when the configuration information meets the condition (8), it is further determined, with reference to other information in the configuration information, that the network device requires the terminal device to perform CSI measurement and feedback in the coordinated multipoint transmission/reception mode.

(9) The configuration information includes that when the bit information for CRI reporting is L and there are K NZP CSI-RS resources, $L \neq \lceil \log_2 K \rceil$.

(10) The configuration information includes one reporting setting that is associated with at least one of Q channel links, T RS settings, and S RS sets, where Q is a positive integer greater than or equal to 2, T is a positive integer greater than or equal to 2, and S is a positive integer greater than or equal to 2.

(11) The configuration information includes indication information, where the indication information instructs the terminal device to perform CSI measurement and feedback in the coordinated multipoint transmission/reception mode. For example, the indication information indicates that a current CSI process is a CSI process in the coordinated multipoint transmission/reception mode, and the terminal device learns, based on the indication information, to perform CSI measurement and feedback in the coordinated multipoint transmission/reception mode.

The determined CSI measurement behavior includes measurement of the fourth CSI. The fourth CSI is obtained based on the inter-stream interference or the inter-codeword interference.

The determined CSI feedback related information includes use of joint encoding or independent coding for the CRI and the RI and/or the mapping mode of mapping the CRI and the RI to the time-frequency resource.

It should be noted that, based on Case 3, the network device determines that the terminal device needs to perform CSI measurement and feedback in the coordinated multipoint transmission/reception mode. Related explanations and descriptions may be based on Case 1, to be specific, the network device determines that the terminal device needs to perform CSI measurement and feedback in the hybrid mode. Details are not described herein again.

It may be understood that, a specific one of the foregoing several assumed scenarios that is to be used may be predefined in a protocol, or may be determined based on system implementation, or may be notified by the base station to the terminal by using signaling. This is not specifically limited herein.

An embodiment of the present disclosure further provides a communications method. FIG. 5-3 shows a procedure of interaction between a terminal device and a network device in the communications method, and the method includes the following operations.

Operation 511: The network device sends first indication information to the terminal device, and the terminal device receives the first indication information, where the first indication information is used to enable further enhancements to coordinated multi-point (FeCoMP)-based CSI feedback, or enable coordinated multipoint transmission/reception-based CSI feedback, or enable hybrid transmission mode-based CSI feedback.

Operation 512: The terminal device determines CSI feedback related information based on the first indication information, where the CSI feedback related information includes at least one of a coding scheme for a CRI and an RI, a bit width of a CRI, a bit width of an RI, a bit meaning of a CRI, or a bit meaning of an RI.

This embodiment is described by using the network device as a base station. All solutions may also be applied to a case in which the network device is another network device. The network device and the base station may be replaced with each other unless otherwise specified. The terminal device, a terminal, and UE may be replaced with each other unless otherwise specified. This embodiment may be an independent embodiment, or may be combined with another embodiment of the present disclosure. This is not specifically limited herein. It should be noted that, the numbers of the operations in this embodiment are merely used to distinguish from the numbers of the operations in FIG. 5-1, and it does not indicate that the operations in this embodiment are completed after the operations shown in FIG. 5-1.

That the first indication information is used to enable FeCoMP-based CSI feedback, or enable coordinated multipoint transmission/reception-based CSI feedback, or enable CSI feedback in a hybrid transmission mode may be understood as that the first indication information is used to enable FeCoMP-based CSI measurement and/or feedback, or enable coordinated multipoint transmission/reception-based CSI measurement and/or feedback, or enable hybrid transmission mode-based CSI measurement and/or feedback. It may also be understood that, the terminal device may determine CSI measurement behavior based on the first indication information.

The enabling FeCoMP-based CSI feedback means that at least FeCoMP-based CSI measurement and feedback are supported. For example, only CSI measurement and feedback in FeCoMP are supported, or both CSI measurement and feedback in FeCoMP and CSI measurement and feedback in a single cell are supported.

The enabling coordinated multipoint transmission/reception-based CSI measurement and/or feedback may be CSI measurement and/or feedback in at least one of non-coherent joint transmission, coherent transmission, or other coordinated multipoint transmission/reception, or may be CSI measurement and/or feedback based on another coordinated multipoint transmission/reception mode.

The enabling hybrid transmission mode-based CSI feedback means that CSI measurement and/or feedback in at least two transmission modes are/is supported, for example, CSI measurement and/or feedback in FeCoMP and a single cell, or CSI measurement and/or feedback in a single cell and coordinated multipoint transmission/reception, or CSI measurement and/or feedback based on any other two transmission modes.

CSI measurement (which may also be referred to as CSI measurement behavior) and CSI feedback (which may also be referred to as CSI reporting) may be related.

Specifically, the bit width of the CRI and/or the bit width of the RI may be determined based on the CSI measurement behavior and the CSI feedback related information.

The CSI measurement behavior may be FeCoMP-based CSI measurement.

FeCoMP-based CSI measurement may be understood as non-coherent joint transmission (JT)-based measurement. FeCoMP-based measurement includes, for example, inter-stream interference measurement and normal measurement (for example, single-cell measurement). Specific examples are as follows:

For one CSI process or one CSI measurement, the network device configures two NZP CSI-RS resources and one interference measurement resource (for example, a ZP CSI-RS resource) for the terminal device. FeCoMP-based CSI feedback may include the following cases:

If the CRI=0, it indicates that CSI reporting is specific to the first NZP CSI-RS resource, and CSI reporting may be performed by using a reporting method in the prior art.

If the CRI=1, it indicates that CSI reporting is specific to the second NZP CSI-RS resource, and CSI reporting may be performed by using a reporting method in the prior art.

If the CRI=2, it indicates that CSI reporting is specific to two NZP CSI-RS resources.

If the CRI=2, for the CSI process or the CSI measurement, the terminal device may calculate two CSI sets for two NZP CSI-RS resources. Each CSI set corresponds to one codeword. Specifically, the following method may be used for calculation: For each NZP CSI-RS resource or codeword, the terminal device determines an RI and/or a PMI, and calculates a CQI of each resource or codeword. Inter-codeword or inter-resource interference needs to be considered when the CQI is calculated. For example, the inter-codeword or inter-resource interference is obtained based on channel measurement and precoding matrix of the other resource or codeword in the two NZP CSI-RS resources. The precoding matrix may be a unit matrix, a measured PMI, or a PMI indicated by the base station. This is not specifically limited herein.

For example, if the CRI=2, a calculation method is as follows:

$$a\ CQI\ 1 = |H1W1|/(|H2W2| + I1),\text{ and a }CQI\ 2 = |H2W2|/(|H1W1| + I2).$$

H1 is a channel obtained through measurement by using the first NZP CSI-RS resource, W1 is a precoding matrix obtained through measurement by using the first NZP CSI-RS resource, H2 is a channel obtained through measurement by using the second NZP CSI-RS resource, W2 is a precoding matrix obtained through measurement by using the second NZP CSI-RS resource, and I1 and I2 are interference obtained by using an interference measurement resource. Another calculation method is not limited.

In one embodiment, in the foregoing example, FeCoMP-based CSI measurement includes normal measurement (for example, single-cell measurement). For example, measurement performed when the CRI=0 and measurement performed when the CRI=1 are single-cell measurement. In addition, FeCoMP-based CSI measurement behavior may not include normal measurement (for example, single-cell measurement). This is not specifically limited herein.

Normal measurement such as single-cell measurement in the present disclosure or a measurement and/or feedback method in the prior art may be CSI measurement and/or feedback without considering interference measurement that is performed by using an NZP (non zero power) CSI-RS resource. For example, only CSI measurement and/or feedback in interference measurement that is performed by using a ZP (zero power) CSI-RS resource may be considered.

In this embodiment of the present disclosure, for example, the first indication information may be implemented by using a parameter FeCoMPCSIEnabled. If the parameter exists (that is, the parameter is configured), or a value of the parameter is TRUE, it indicates that CSI measurement behavior indicated by the first indication information is FeCoMP-based CSI measurement. If the parameter does not exist (that is, the parameter is not configured), or a value of the parameter is FALSE, it indicates that CSI measurement behavior indicated by the first indication information is normal measurement that is not FeCoMP-based CSI measurement. That the first indication information is used to enable further enhancements to coordinated multi-point (further enhancement CoMP, FeCoMP)-based CSI feedback, or enable coordinated multipoint transmission/reception-based CSI feedback, or enable hybrid transmission mode-based CSI feedback may specifically mean that: if the parameter is configured, it indicates that further enhancements to coordinated multi-point (further enhancement CoMP, FeCoMP)-based CSI feedback is enabled, or coordinated multipoint transmission/reception-based CSI feedback is enabled, or hybrid transmission mode-based CSI feedback is enabled. Alternatively, if the value of the parameter is TRUE, further enhancements to coordinated multi-point (further enhancement CoMP, FeCoMP)-based CSI feedback is enabled, or coordinated multipoint transmission/reception-based CSI feedback is enabled, or hybrid transmission mode-based CSI feedback is enabled.

In this embodiment of the present disclosure, the CSI feedback related information may include a CSI reporting mode, for example, periodic reporting or aperiodic reporting, or semi-persistent reporting, or may be a reporting mode 1-0, 1-1, 2-0, 2-1, 2-2, 3-0, 3-1, or 3-2.

The CSI reporting mode may be a CSI reporting manner, for example, at least one of periodic reporting, aperiodic reporting, or semi-static reporting. Alternatively, the CSI reporting mode may be CSI reporting content, for example, at least one of CQI reporting, CQI and PMI reporting, wideband CQI reporting, subband CQI reporting, wideband PMI reporting, subband PMI reporting, UE selected subband reporting, or base station-configured subband reporting. Alternatively, the CSI reporting mode may be a set of a CSI reporting manner and reporting content.

In one embodiment, CSI in the aperiodic CSI reporting mode may be fed back on a PUSCH (physical uplink shared channel), and CSI in the periodic CSI reporting mode may be fed back on a PUCCH, or may be fed back on a PUSCH when both a PUCCH (physical uplink control channel) and a PUSCH exist.

The reporting mode may be similar to a reporting mode in LTE. A specific example is as follows:

TABLE 1

CQI and PMI feedback types in a PUSCH CSI reporting mode

|  |  | PMI Feedback Type | | |
|---|---|---|---|---|
|  |  | No PMI | Single PMI | Multiple PMIs |
| PUSCH CQI feedback type | Wideband CQI | Mode 1-0 | Mode 1-1 | Mode 1-2 |
|  | UE Selected subband CQI | Mode 2-0 |  | Mode 2-2 |
|  | Higher Layer-configured subband CQI feedback | Mode 3-0 | Mode 3-1 | Mode 3-2 |

As shown in the foregoing table, the reporting mode 1-0 refers to wideband CQI reporting and no PMI feedback. The reporting mode 1-1 refers to wideband CQI reporting and wideband PMI reporting. The reporting mode 1-2 refers to wideband CQI reporting and subband PMI reporting. The reporting mode 2-0 refers to CQI reporting in UE selected subband CQI reporting and no PMI feedback. The reporting mode 2-2 refers to CQI reporting in UE selected subband CQI reporting and subband PMI reporting. The reporting mode 3-0 refers to CQI reporting in higher layer-configured subband CQI reporting and no PMI feedback. The reporting mode 3-1 refers to CQI reporting in higher layer-configured subband CQI reporting and wideband PMI reporting. The reporting mode 3-2 refers to CQI reporting in higher layer-configured subband CQI reporting and subband PMI reporting.

In this embodiment of the present disclosure, there are two implementation possibilities for the reporting mode:

In the first possibility, the CSI measurement behavior is determined with reference to a reporting mode configuration. For example, if FeCoMPCSIEnabled is configured or the value of FeCoMPCSIEnabled is TRUE, and the aperiodic reporting mode is configured, FeCoMP-based CSI measurement and/or feedback are/is used. If FeCoMPCSIEnabled is configured or the value of FeCoMPCSIEnabled is TRUE, and the periodic reporting mode is configured, or if FeCoMPCSIEnabled is not configured or the value of FeCoMPCSIEnabled is FALSE, measurement and/or feedback are/is performed in a manner in the prior art.

In this possibility, when FeCoMPCSIEnabled is configured or the value of FeCoMPCSIEnabled is TRUE, and the aperiodic reporting mode is configured, at least one of the bit width of the CRI, the bit width of the RI, the bit meaning of the CRI, or the bit meaning of the RI may be determined in a manner that is to be provided below by this embodiment of the present disclosure; in other words, at least one of the bit width of the CRI, the bit width of the RI, the bit meaning of the CRI, or the bit meaning of the RI is related to the first indication information. Further, at least one of the bit width of the CRI, the bit width of the RI, the bit meaning of the CRI, or the bit meaning of the RI may be further related to the reporting mode.

In the second possibility, the CSI measurement behavior may be determined without requiring a reporting mode configuration. For example, the reporting mode is specified in advance. If FeCoMPCSIEnabled is configured or the value of FeCoMPCSIEnabled is TRUE, it is limited that only the aperiodic reporting mode can be configured. In this case, whether FeCoMP-based measurement and reporting are used may be determined depending on whether FeCoMPCSIEnabled is configured or whether the value of FeCoMPCSIEnabled is TRUE. That is, if FeCoMPCSIEnabled is configured or the value of FeCoMPCSIEnabled is TRUE, it is determined to use FeCoMP-based measurement and/or feedback. If the FeCoMPCSIEnabled is not configured or the value of FeCoMPCSIEnabled is FALSE, it is determined to perform measurement and/or feedback in a manner in the prior art.

In this possibility, when FeCoMPCSIEnabled is configured or the value of FeCoMPCSIEnabled is TRUE, at least one of the bit width of the CRI, the bit width of the RI, the bit meaning of the CRI, or the bit meaning of the RI may be determined in a manner that is to be provided below by this embodiment of the present disclosure; in other words, at least one of the bit width of the CRI, the bit width of the RI, the bit meaning of the CRI, or the bit meaning of the RI is related to the first indication information.

In this embodiment of the present disclosure, the terminal device may determine at least one of the bit width of the CRI or the bit width of the RI based on the first indication information and at least one of a quantity of NZP CSI-RS resources, a quantity of antenna ports for an NZP CSI-RS, capability information of the terminal device, or a value of the CRI. That is, the bit width of the CRI and/or the bit width of the RI are/is related to the first indication information and at least one of the quantity of NZP CSI-RS resources, the quantity of antenna ports for an NZP CSI-RS, the capability information of the terminal device, or the value of the CRI. Alternatively, the terminal device may determine the bit meaning of the CRI and/or the bit meaning of the RI based on the first indication information and at least one of a quantity of NZP CSI-RS resources, a quantity of antenna ports for an NZP CSI-RS, capability information of the terminal device, the bit width of the RI, or a value of the CRI. That is, the bit meaning of the CRI and/or the bit meaning of the RI are/is related to the first indication information and at least one of the quantity of NZP CSI-RS resources, the quantity of antenna ports for an NZP CSI-RS, the capability information of the terminal device, the bit width of the RI, or the value of the CRI.

In this embodiment of the present disclosure, the bit meaning may be an information feature included in a bit.

For example, the bit meaning of the RI may be reporting of a single RI, reporting of an RI in coordination (which is also referred to as an RI combination (RI Combination)), or reporting of a plurality of RIs. In addition, the bit meaning of the RI may also be a mapping from a value of the RI to a bit of the RI.

For example, the bit meaning of the RI may be a quantity of RIs that are to be fed back, for example, one RI, two RIs, or a plurality of RIS are to be fed back.

In one embodiment, a bit meaning of reporting of a single RI may be that the RI=1, 2, 3, . . . , or the like. For example, that the RI=1 means that the value of the RI is 1, and other cases are similar to this.

In one embodiment, a bit meaning of reporting of an RI combination means that an RI combination {RI 1, RI 2}={1, 1}, {1, 2}, {2, 1}, {2, 2}, . . . , or the like. For example, that {RI 1, RI 2}={1, 1} means that two RIs are to be reported, and values of the two RIs are both 1.

In one embodiment, a bit meaning of reporting of a plurality of RIs means that an RI 1=1, 2, 3, . . . , or the like; an RI 2=1, 2, 3, . . . , or the like; and so on.

The following describes determining of the CSI feedback related information based on the first indication information. There are three cases:

Case 1: For coordinated multipoint transmission/reception mode (or FeCoMP or hybrid transmission mode)-based CSI feedback, the CRI and the RI are jointly encoded.

Case 2: For coordinated multipoint transmission/reception mode (or FeCoMP or hybrid transmission mode)-based CSI feedback, the CRI and the RI are separately encoded.

Case 3: For coordinated multipoint transmission/reception mode (or FeCoMP or hybrid transmission mode)-based CSI feedback, if CSI includes at least two RIs, the CRI and at least one of the RIs included in the CSI are jointly encoded. A remaining RI included in the CSI may not be jointly encoded with the CRI.

How to determine the coding scheme for the CRI and the RI is described below. This embodiment may be an independent embodiment, or may be combined with another embodiment. This is not specifically limited herein.

In this embodiment of the present disclosure, the CSI feedback related information may include at least one of the following: the CRI and the RI are jointly encoded; the CRI and the RI are separately encoded; or the CRI includes at least two RIs, the CRI and at least one RI in the at least two RIs are jointly encoded. In one embodiment, in this manner, a remaining RI in the at least one RI is not jointly encoded with the CRI. For example, when there are two RIs, the CRI and one of the RIs may be jointly encoded, and the other RI is not jointly encoded with the CRI.

In this case, the terminal device may determine the coding scheme for the CRI and the RI based on the first indication information. For example, the determined coding scheme for the CRI and the RI is that: the CRI includes at least two RIs, and the CRI and at least one RI in the at least two RIs are jointly encoded; or the determined coding scheme for the CRI and the RI is that: the CRI and the RI are separately encoded. Specifically, whether "the CRI and at least one RI in the at least two RIs are jointly encoded" or the "CRI and the RI are separately encoded" may be determined based on a condition used in a protocol. For example, the coding scheme determined based on the first indication information is determined from two selections in which the CRI and one of the at least two RIs are jointly encoded and a remaining RI is not jointly encoded with the CRI, and the CRI and the RI are jointly encoded. That is, if the terminal receives the first indication information, the terminal determines, based on the first indication information, that the coding scheme is that the CRI and one of the at least two RIs are jointly encoded, and the remaining RI is not jointly encoded with the CRI. If the terminal does not receive the first indication information or receives other indication information, the terminal determines that the coding scheme is that the CRI and the RI are jointly encoded. Alternatively, the coding scheme determined based on the first indication information is determined from separate encoding of the CRI and the RI and joint encoding of the CRI and the RI. That is, when the terminal receives the first indication information, the terminal determines, based on the first indication information, that the coding scheme is that the CRI and the RI are separately encoded. If the terminal does not receive the first indication information or receives other indication information, the terminal determines that the coding scheme is that the CRI and the RI are jointly encoded. The foregoing coding scheme is merely an example, and another coding scheme is also feasible. This is not specifically limited herein.

In this embodiment of the present disclosure, joint encoding may also be joint feedback. In this embodiment of the present disclosure, independent encoding (which refers to independent encoding with X and is also referred to as non-joint encoding with X (or joint encoding without X) or separate encoding with X, for example, absolute independent encoding, which means that joint encoding is not performed with any other information, where X is other information or a set of other information) may be independent coding in joint feedback or may be independent feedback (which refers to independent feedback with Y and is also referred to as non-joint feedback with Y or separate feedback with Y, for example, absolute independent feedback, which means that joint feedback is not performed with any other information, where Y is other information or a set of other information).

Joint feedback may be feedback in a same time unit, or may be feedback on a same channel resource in a same time unit. Joint encoding may be channel coding performed after bit concatenation.

Independent feedback may be feedback in different time units, or may be feedback on different channel resources in a same time unit. Independent encoding may be independent channel coding.

In one embodiment, in this embodiment of the present disclosure, independent RI feedback and/or independent RI encoding may also be referred to as independent RI and CRI feedback and/or encoding, or may be non-joint feedback and/or non-joint encoding with the CRI, or may be separate feedback and/or separate encoding with the CRI. However, it is not limited that joint feedback and/or joint encoding may be performed with other CSI feedback information. For example, independent RI feedback and/or independent feedback may mean that the RI and the CRI are independently encoded and/or independently fed back, and the RI is not jointly fed back and/or jointly encoded with any CSI, or may mean that the RI and the CRI are independently encoded and/or independently fed back, and the RI and at least one piece of CSI such as a PMI, precoding type indicator (PTI), or a CQI may be further jointly fed back and/or joint encoded. This is not specifically limited herein.

Five implementations of determining the bit width of the CRI and/or the bit width of the RI are described below. The first implementation (Method 1) and the second implementation (Method 2) may be solutions specific to the foregoing Case 1, and the third implementation (Method 3) and the fourth implementation (Method 4) may be solutions specific to the foregoing Case 2. The fifth implementation (Method 5) may be a solution specific to the foregoing Case 3. Further, a method for determining the bit meaning of the CRI and/or the bit meaning of the RI is further described.

Various implementations or methods in this embodiment of the present disclosure may be independent embodiments, or may be combined with another embodiment. This is not specifically limited herein.

In one embodiment, in this embodiment of the present disclosure, a solution of determining based on the first indication information may be replaced with a solution of determining based on the CSI measurement behavior. For example, when the CSI measurement behavior can be determined without an indication by the first indication information, in this embodiment of the present disclosure, the solution of determining based on the first indication information may be replaced with the solution of determining based on the CSI measurement behavior. The solution of determining based on the CSI measurement action is not described in detail herein.

For example, in this embodiment of the present disclosure, the description "when the first indication information is set to FeCoMPCSIEnabled or the value of FeCoMPC-SIEnabled is TRUE" may also be replaced with "when the CSI measurement behavior is FeCoMP-based CSI measurement and/or feedback, or coordinated multipoint transmission/reception-based CSI measurement and/or feedback, or hybrid transmission mode-based CSI measurement and/or feedback". That is, "when the first indication information is set to FeCoMPCSIEnabled or the value of FeCoMPCSIEnabled is TRUE," is replaced with "when the CSI measurement behavior is FeCoMP-based CSI measurement and/or feedback, or coordinated multipoint transmission/reception-based CSI measurement and/or feedback, or hybrid transmission mode-based CSI measurement and/or feedback" is also applicable to this embodiment of the present disclosure. Details are not described.

In one embodiment, in this embodiment of the present disclosure, "FeCoMPCSIEnabled is configured", "the value of FeCoMPCSIEnabled is TRUE", and "FeCoMPCSIEnabled and cqi-ReportModeAperiodic are configured" may represent a same condition, and may be replaced with each other.

In this embodiment of the present disclosure, the coordinated multipoint transmission/reception-based CSI measurement and/or feedback are/is also applicable to FeCoMP-based CSI measurement and/or feedback, or also applicable to hybrid transmission mode-based CSI measurement and/or feedback, or also applicable to non-coherent transmission-based CSI measurement and/or feedback. This is not specifically limited herein.

First implementation (namely, Method 1): The bit width of the CRI and/or the bit width of the RI are/is determined based on the first indication information.

In an example, in the first implementation, the bit width of the CRI and/or the bit width of the RI may be determined based on the first indication information.

The bit width of the RI may be determined based on the first indication information.

In one embodiment, in this embodiment of the present disclosure, the determining the bit width of the RI may be determining a bit width used when a single RI is reported and/or determining a total quantity of bits occupied by a plurality of RIs (or an RI combination) when the plurality of RIs (or the RI combination) are reported. This is not specifically limited herein.

Specifically, for example, when the first indication information instructs to enable FeCoMP-based CSI feedback, the bit width of the RI is fixed (for example, specified in a protocol), a CRI=0, a CRI=1, a CRI=2, and the like are not distinguished, and a quantity of antenna ports and/or a capability of the terminal device are/is not distinguished either.

The capability of the terminal device may be at least one of a maximum layer quantity supported by the terminal (short for the terminal device), a maximum antenna port quantity supported by the terminal, a maximum transmission rate supported by the terminal, a transmission mode (for example, an open-loop mode, a closed-loop mode, a single-cell mode, or a coordinated mode) supported by the terminal, or the like.

For example, for an example in which two NZP CSI-RS resources are configured, when the first indication information instructs to enable FeCoMP-based CSI feedback, the bit width of the RI may be fixed to 4. Certainly, another value is also feasible. This is not limited herein.

In this embodiment of the present disclosure, when a base station (the network device is described by using the base station as an example) determines to enable FeCoMP-based CSI feedback, the base station sends the first indication information, and determines that the bit width of the RI of the terminal is 4, to be specific, the bit width of the RI is related to the first indication information. When receiving the first indication information, the terminal may determine the bit width of the RI based on the first indication information. For example, the bit width of the RI is 4.

When determining not to enable FeCoMP-based CSI feedback, the base station does not send the first indication information, and determines the bit width of the RI based on the prior art. When not receiving the first indication information, the terminal may determine the bit width of the RI based on the prior art. The determining the bit width of the RI in the prior art is that, for example, the bit width of the RI is related to the quantity of antenna ports and the capability of the terminal device. Specifically, for example, if the quantity of antenna ports is 4, and the capability of the terminal device may support transmission of a maximum of four layers, the bit width of the RI is 2.

For descriptions of implementations of the terminal and the base station, refer to other parts in this embodiment. An implementation of the terminal is as an example for description below.

How to determine the bit width of the CRI and/or the bit meaning of the CRI is described below. Determining of the bit width of the CRI and/or the bit meaning of the CRI may be an independent embodiment, or may be combined with another embodiment. This is not specifically limited herein.

Determining method A: The bit width of the CRI and/or the bit meaning of the CRI are/is determined based on the first indication information.

Specifically, the terminal determines the bit width of the CRI based on the first indication information, and/or the terminal determines the bit meaning of the CRI based on the first indication information.

For example, when the terminal receives the first indication information, and FeCoMP-based CSI feedback is enabled, for example, when the first indication information is set to FeCoMPCSIEnabled or the value of FeCoMPCSIEnabled is TRUE, the terminal may determine the bit width of the CRI, for example, the bit width of the CRI is 2. When determining to enable FeCoMP-based CSI feedback for the terminal, the base station sends the first indication information, and determines that the bit width of the CRI of the terminal is 2. Herein, the bit width of the CRI that is 2 is merely an example, and another value is also feasible. This is not specifically limited.

For example, when the terminal receives the first indication information, and FeCoMP-based CSI feedback is enabled, for example, when the first indication information is set to FeCoMPCSIEnabled or the value of FeCoMPCSIEnabled is TRUE, the terminal may determine the bit meaning of the CRI. For example, the bit meaning when the bit width of the CRI is 2 is specifically as follows: For example, 00 represents that the CRI=0, indicating that reported CSI is obtained through measurement based on the first NZP CSI-RS resource; 01 represents that the CRI=1, indicating that reported CSI is obtained through measurement based on the second NZP CSI-RS resource; and 11 represents that reported CSI is obtained through measurement based on the first NZP CSI-RS resource and the second NZP CSI-RS resource. When determining to enable FeCoMP-based CSI feedback, the base station sends the first indication information, and determines that the bit width of the CRI of the terminal is 2 and/or determines the bit meaning of the CRI. Herein, the bit width of the CRI that is 2 is merely an example, and another value is also feasible. This is not specifically limited.

In one embodiment, when the terminal does not receive the first indication information, for example, when the first indication information is not set to FeCoMPCSIEnabled or the value of FeCoMPCSIEnabled is FALSE, the bit width of the CRI may be determined based on the prior art, for example, determined based on a quantity K of configured NZP CSI-RS resources. For example, the bit width of the CRI is $\lceil \log_2(K) \rceil$. K is a positive integer, and $\lceil\ \rceil$ represents rounding up.

Determining method B: The bit width of the CRI and/or the bit meaning of the CRI are/is determined based on the first indication information and at least one of the quantity of NZP CSI-RS resources, the quantity of antenna ports for an NZP CSI-RS, the capability information of the terminal device, or the value of the CRI.

In an example, the bit width of the CRI and/or the bit meaning of the CRI may be determined based on the first indication information and the quantity K of configured NZP CSI-RS resources.

Specifically, when the first indication information is set to FeCoMPCSIEnabled or the value of FeCoMPCSIEnabled is TRUE, the bit width of the CRI is determined based on the quantity of configured NZP CSI-RS resources. For example, if the quantity of configured NZP CSI-RS resources is 2, the bit width of the CRI is 2. When the first indication information is not set to FeCoMPCSIEnabled or the value of FeCoMPCSIEnabled is FALSE, the bit width of the CRI is determined based on the quantity K of configured NZP CSI-RS resources. For example, the bit width of the CRI is $\lceil \log_2(K) \rceil$. For example, if the quantity K of configured NZP CSI-RS resources is 2, the bit width of the CRI is 1.

In this embodiment of the present disclosure, a relationship between the quantity of configured NZP CSI-RS resources and the bit width of the CRI and/or the bit meaning of the CRI may include at least one of the following:

1. In coordinated multipoint transmission/reception (or FeCoMP or hybrid transmission mode or non-coherent transmission mode)-based CSI measurement and/or feedback, when the quantity of NZP CSI-RS resources is K, the bit width of the CRI may be $\lceil \log_2 (K+C_K^2) \rceil$.

For example, four NZP CSI-RS resources are configured, and in coordinated multipoint transmission/reception (or FeCoMP or hybrid transmission mode or non-coherent transmission mode)-based CSI measurement and/or feedback, four cases may be included in a single-cell scenario. In a coordinated multipoint transmission/reception scenario or FeCoMP, any two resources are selected from the four NZP CSI-RS resources. To be specific, there may be $C_K^2$ cases. Therefore, the CRI needs to indicate a total of $K+C_K^2$ cases. That is, the bit width of the CRI may be $\lceil \log_2 (K+C_K^2) \rceil$. K is the quantity of NZP CSI-RS resources.

For example, K=4. In this case, a total of 4 bits are needed to indicate the value of the CRI. In this case, the bit meaning of the CRI may be at least one of the following, and a decimal system is used below to represent the value of the CRI. It may be understood that the value of the CRI may also be represented by using a binary, octal, or hexadecimal system. The value in this embodiment of the present disclosure is represented by using one number system, but is not limited to the enumerated number system:

The CRI=0 indicates that reported CSI is obtained through measurement based on the first NZP CSI-RS resource.

The CRI=1 indicates that reported CSI is obtained through measurement based on the second NZP CSI-RS resource.

The CRI=2 indicates that reported CSI is obtained through measurement based on the third NZP CSI-RS resource.

The CRI=3 indicates that reported CSI is obtained through measurement based on the fourth NZP CSI-RS resource.

The CRI=4 indicates that reported CSI is obtained through measurement based on the first and second NZP CSI-RS resources.

The CRI=5 indicates that reported CSI is obtained through measurement based on the first and third NZP CSI-RS resources.

The CRI=6 indicates that reported CSI is obtained through measurement based on the first and fourth NZP CSI-RS resources.

The CRI=7 indicates that reported CSI is obtained through measurement based on the second and third NZP CSI-RS resources.

The CRI=8 indicates that reported CSI is obtained through measurement based on the second and fourth NZP CSI-RS resources.

The CRI=9 indicates that reported CSI is obtained through measurement based on the third and fourth NZP CSI-RS resources.

4 bits may be used to indicate the value of the CRI, and specific bit mapping may be any item in the following table.

TABLE X21

| $O_0^{RI}, O_1^{RI}, O_2^{RI}, O_3^{RI}$ to CRI mapping | |
|---|---|
| $O_0^{RI}, O_1^{RI}, O_2^{RI}, O_3^{RI}$ | CRI |
| 0, 0, 0, 0 | 0 |
| 0, 0, 0, 1 | 1 |
| 0, 0, 1, 0 | 2 |
| 0, 0, 1, 1 | 3 |
| 0, 1, 0, 0 | 4 |
| 0, 1, 0, 1 | 5 |
| 0, 1, 1, 0 | 6 |
| 0, 1, 1, 1 | 7 |
| 1, 0, 0, 0 | 8 |
| 1, 0, 0, 1 | 9 |
| 1, 0, 1, 0 | Reserved |
| 1, 0, 1, 1 | Reserved |
| 1, 1, 0, 0 | Reserved |
| 1, 1, 0, 1 | Reserved |
| 1, 1, 1, 0 | Reserved |
| 1, 1, 1, 1 | Reserved |

The value of the bit width of the CRI herein is merely an example, the bit meaning of the CRI is also merely an example, and a correspondence between a bit value and the value of the CRI in the table is also merely an example. Another value or correspondence is not limited.

In the foregoing embodiment, the value or the bit meaning of the CRI indicates a meaning of CSI feedback. In one embodiment, the meaning of CSI feedback may be indicated by using another piece of information, for example, first feedback information. In other words, the first feedback information is used to indicate the meaning of CSI feedback. The meaning of CSI feedback may be at least one of a CSI measurement result in coordinated multipoint transmission/reception, a measurement result in single-cell transmission, or a CSI measurement result in FeCoMP. Alternatively, the meaning of CSI feedback may be at least one of first CSI, second CSI, third CSI, or fourth CSI. The first CSI is obtained based on interference power; the second CSI is obtained based on interference that is obtained by using a preset algorithm when a resource used for channel measurement is the same as a resource used for interference measurement; the third CSI is obtained based on interference power and interference that is obtained by using a preset algorithm when a resource used for channel measurement is the same as a resource used for interference measurement; and the fourth CSI is obtained based on inter-stream interference or inter-codeword interference.

For example, the terminal may feed back the first feedback information. The first feedback information is used to indicate the meaning of CSI feedback. According to the method, the base station may determine, by receiving the first feedback information, a meaning of CSI feedback that corresponds to received CSI. The implementation may be an independent embodiment, or may be combined with another embodiment. This is not specifically limited herein.

In this embodiment of the present disclosure, when the terminal receives the first indication information, where the first indication information instructs to enable coordinated multipoint transmission/reception (or FeCoMP or hybrid transmission mode or non-coherent transmission mode)-based CSI measurement and/or feedback, the terminal determines, based on the first indication information and the quantity of NZP CSI-RS resources, that the bit width of the CRI is $\lceil \log_2(K+C_K^2) \rceil$. Similarly, for a base station side, when determining to enable FeCoMP-based CSI feedback for the terminal, the base station sends the first indication information, and determines that the bit width of the CRI of the terminal is $\lceil \log_2(K+C_K^2) \rceil$. K is the quantity of NZP CSI-RS resources.

When the terminal does not receive the first indication information, that is, coordinated multipoint transmission/reception (or FeCoMP or hybrid transmission mode or non-coherent transmission mode)-based CSI measurement and/or feedback are/is not enabled, for example, when normal measurement feedback or single-cell measurement and feedback are performed, when the quantity of NZP CSI-RS resources is K, the bit width of the CRI may be $\lceil \log_2(K) \rceil$. K is a positive integer, and $$C_K^2 = \frac{K \times (K-1)}{2}.$$

2. In coordinated multipoint transmission/reception (or FeCoMP or hybrid transmission mode or non-coherent transmission mode)-based CSI measurement and feedback, when the quantity of NZP CSI-RS resources is K, the bit width of the CRI may be $\lceil \log_2(K+C_{K-1}^1) \rceil$ or another specified bit width, or is calculated based on another specified calculation formula. This is not specifically limited herein.

For example, K=4. In this case, a total of 3 bits are needed to indicate the value of the CRI. In this case, the bit meaning of the CRI may be at least one of the following, and a decimal system is used below to represent the value of the CRI. It may be understood that the value of the CRI may also be represented by using a binary, octal, or hexadecimal system. The value in this embodiment of the present disclosure is represented by using one number system, but is not limited to the enumerated number system:

The CRI=0 indicates that reported CSI is obtained through measurement based on the first NZP CSI-RS resource.

The CRI=1 indicates that reported CSI is obtained through measurement based on the second NZP CSI-RS resource.

The CRI=2 indicates that reported CSI is obtained through measurement based on the third NZP CSI-RS resource.

The CRI=3 indicates that reported CSI is obtained through measurement based on the fourth NZP CSI-RS resource.

The CRI=4 indicates that reported CSI is obtained through measurement based on the first and second NZP CSI-RS resources.

The CRI=5 indicates that reported CSI is obtained through measurement based on the first and third NZP CSI-RS resources.

The CRI=6 indicates that reported CSI is obtained through measurement based on the first and fourth NZP CSI-RS resources.

3 bits may be used to indicate the value of the CRI, and specific bit mapping may be any item in the following table.

TABLE X21

| $O_0^{RI}, O_1^{RI}, O_2^{RI}$ to CRI mapping | |
| --- | --- |
| $O_0^{RI}, O_1^{RI}, O_2^{RI}$ | CRI |
| 0, 0, 0 | 0 |
| 0, 0, 1 | 1 |
| 0, 1, 0 | 2 |
| 0, 1, 1 | 3 |
| 1, 0, 0 | 4 |
| 1, 0, 1 | 5 |
| 1, 1, 0 | 6 |
| 1, 1, 1 | Reserved |

The value of the bit width of the CRI herein is merely an example, the bit meaning of the CRI is also merely an example, and a correspondence between a bit value and the value of the CRI in the table is also merely an example. Another value or correspondence is not limited.

During normal measurement such as single-cell measurement and feedback, when the quantity of NZP CSI-RS resources is K, the bit width of the CRI may be $\lceil \log_2(K) \rceil$.

An example in which two NZP CSI-RS resources are configured is used below to describe determining the bit width of the CRI and/or the bit width of the RI based on a quantity of NZP CSI-RS resources and the first indication information.

Specifically, when two NZP CSI-RS resources are configured, and the first indication information indicates that CSI measurement and feedback are FeCoMP-based CSI feedback, it may be determined that the bit width of the RI is 4, and the bit width of the CRI is 2.

The value herein is merely an example, and another value is also feasible. This is not specifically limited.

Specifically, the terminal may determine, by using the method in the foregoing embodiment, that the CSI measurement behavior is FeCoMP-based CSI measurement. For example, the first indication information is configured, and the first indication information is used to enable FeCoMP-based CSI feedback, or enable coordinated multipoint transmission/reception-based CSI feedback, or enable hybrid transmission mode-based CSI feedback. For example, the first indication information is the higher layer parameter FeCoMPCSIEnabled, and determining is performed by configuring the higher layer parameter FeCoMPCSIEnabled or configuring FeCoMPCSIEnabled=TRUE (to be specific, determining is performed based on the first indication information). The following embodiment is specifically described by using a solution in which the higher layer parameter FeCoMPCSIEnabled is configured. A solution in which FeCoMPCSIEnabled=TRUE is configured is similar to this, and details are not described herein.

In one embodiment, for at least one of the three existing reporting modes, namely, at least one of wideband CQI reporting (that is, reporting a wideband CQI), higher layer-configured subband CQI reporting (that is, reporting a higher layer-configured subband CQI), or UE selected subband CQI reporting (that is, reporting a terminal selected subband CQI), respective bit quantities for CRI and/or RI feedback may be defined, or a bit width for CRI and/or RI feedback may be uniformly described. A unified description and a separate description may mean that the terminal and/or the base station may store a mapping relationship such as a mapping table, a mapping sequence, or a mapping formula for different reporting modes, or may store respective mapping relationships such as mapping tables, mapping sequences, or mapping formulas.

Specifically, the reporting mode in this embodiment of the present disclosure may alternatively be a reporting mode in NR (New Radio, new radio communications technology), 5G, or a future research system. This is not specifically limited herein.

In this embodiment of the present disclosure, a transmission mode 10 is used as an example in the table. That is, FeCoMP-based CSI measurement and/or feedback can be applied only to a terminal in the transmission mode 10 in an LTE system, but is not applicable to another transmission mode in the LTE system. In this embodiment of the present disclosure, FeCoMP-based CSI measurement and/or feedback are/is also applicable to a transmission mode in NR, 5G, or a future communications system, and is not limited to the transmission mode 10. In this case, the transmission mode 10 is merely an example, and another transmission mode is not limited herein. Alternatively, FeCoMP-based CSI measurement and/or feedback are/is also applicable to any transmission mode, that is, FeCoMP-based CSI measurement and/or feedback are/is unrelated to a transmission mode.

For example, for at least one of the three reporting modes, for a unified description manner, refer to at least one item in Table 5.2.2.6.3-3F:

When the terminal configures the transmission mode 10 and the higher layer parameter FeCoMPCSIEnabled, a bit width for joint CRI and RI feedback is shown in Table 5.2.2.6.3-3F. The terminal and/or the base station may store only one mapping table, mapping sequence, or mapping formula.

TABLE 5.2.2.6.3-3F

Scenarios for joint CRI and RI feedback (Fields for joint CRI and RI feedback) (the transmission mode 10 and the higher layer parameter FeCoMPCSIEnabled)

| Scenario/field | Bit width |
|---|---|
| CRI | 2 |
| Rank indication | 4 |

It can be learned from Table 5.2.2.6.3-3F that, when the terminal configures the higher layer parameter FeCoMPCSIEnabled, for at least one of the three reporting modes, the bit width of the CRI is 2, and the bit width of the RI is 4.

For example, for at least one of the three reporting modes, a separate description manner may be at least one of the following:

The terminal maintains mapping relationships such as mapping tables, mapping sequences, or mapping formulas corresponding to different transmission modes based on the reporting mode, for example, for at least one of the three reporting modes.

A. When the terminal configures FeCoMPCSIEnabled (or configures FeCoMPCSIEnabled and the aperiodic reporting mode), for wideband CQI reporting, a bit width for CRI and RI (or RI combination) feedback is fixed, and refer to Table 5.2.2.6.1-2F: For example, for wideband CQI reporting, the terminal may store Table 5.2.2.6.1-2F, that is, when wideband CQI reporting and the first indication information are configured, the terminal may use bit quantities of the CRI and the RI in Table 5.2.2.6.1-2F.

TABLE 5.2.2.6.1-2F

Scenarios for joint CRI and RI feedback for wideband CQI reporting (Fields for joint CRI and RI feedback for wideband CQI reports) (the transmission mode 10 and the higher layer parameter FeCoMPCSIEnabled)

| Field | Bit width |
|---|---|
| CRI | 2 |
| Rank indication | 4 |

B. When the terminal configures FeCoMPCSIEnabled (or configures FeCoMPCSIEnabled and the aperiodic reporting mode), for higher layer-configured subband CQI reporting, a bit width for CRI and RI (or RI combination) feedback is fixed, and refer to Table 5.2.2.6.2-3F1: For example, for higher layer-configured subband CQI reporting, the terminal may store Table 5.2.2.6.2-3F1, that is, when higher layer-configured subband CQI reporting and the first indication information are configured, the terminal may use bit quantities of the CRI and the RI in Table 5.2.2.6.2-3F1.

TABLE 5.2.2.6.2-3F1

Scenarios for joint CRI and RI feedback for higher layer-configured subband CQI reporting (Fields for joint CRI and RI feedback for higher layer configured subband CQI reports) (the transmission mode 10 and the higher layer parameter FeCoMPCSIEnabled)

| Field | Bit width |
|---|---|
| CRI | 2 |
| Rank indication | 4 |

C. When the terminal configures FeCoMPCSIEnabled (or configures FeCoMPCSIEnabled and the aperiodic reporting mode), for UE selected subband CQI reporting, a bit width for CRI and RI (or RI combination) feedback is fixed, and specifically refer to Table 5.2.2.6.3-3F2: For example, for UE selected subband CQI reporting, the terminal may store Table 5.2.2.6.3-3F2, that is, when UE selected subband CQI reporting and the first indication information are configured, the terminal may use bit quantities of the CRI and the RI in Table 5.2.2.6.3-3F2.

TABLE 5.2.2.6.3-3F2

Scenarios for joint CRI and RI feedback for UE selected subband CQI reporting (Fields for joint CRI and RI feedback for UE selected subband CQI reports) (the transmission mode 10 and the higher layer parameter FeCoMPCSIEnabled)

| Field | Bit width |
|---|---|
| CRI | 2 |
| Rank indication | 4 |

Through the first implementation described above, when the RI and the CRI are jointly fed back and/or jointly encoded, the bit width of the RI is enabled to be independent of the value of the CRI, to be specific, it can be ensured that the bit width of the CRI and the bit width of the RI are fixed, so that the base station can correctly receive and/or decode the CRI and the RI. Certainly, because the bit width of the RI is fixed, overheads for the bit width of the RI may be relatively high.

Second implementation (namely, Method 2): The bit width of the CRI and/or the bit width of the RI are/is determined based on the first indication information and at least one of the quantity of NZP CSI-RS resources, the quantity of antenna ports for an NZP CSI-RS, the capability information of the terminal device, or the value of the CRI. In an example, the bit width of the RI may be determined based on the first indication information and the quantity of antenna ports and/or the capability information of the terminal device. In the second implementation, the bit width of the RI is determined based on the first indication information and the quantity of antenna ports and/or the capability information of the terminal device, without considering the value of the CRI. For example, the CRI=0, the CRI=1, and the CRI=2 are not distinguished.

In one embodiment, in Method 1 to Method 4 in this embodiment of the present disclosure, the determining the bit width of the RI may be determining a bit width of an RI used when a single RI is reported and/or determining a total quantity of bits occupied by a plurality of RIs (or an RI combination) when the plurality of RIs (or the RI combination) are reported. This is not specifically limited herein.

An example in which more than one NZP CSI-RS resource is configured is used to describe determining the bit width of the RI based on the first indication information and the quantity of antenna ports and/or the capability information of the terminal device.

Method 2.1: The bit width of the RI is determined based on the first indication information and whether the quantity of antenna ports is 1.

In the following description process, when the quantity of antenna ports is used, only two cases in which the quantity of antenna ports is 1 and the quantity of antenna ports is greater than 1 are distinguished.

In the present disclosure, when more than one NZP CSI-RS resource is configured, if there is no special description about an NZP CSI-RS resource to which the quantity of antenna ports corresponds, the quantity of antenna ports may be a maximum value of quantities of antenna ports corresponding to the more than one configured NZP CSI-RS resource.

For example, if the quantity of antenna ports is 1, it indicates that the maximum value of the quantities of antenna ports corresponding to the more than one configured NZP CSI-RS resource is 1, that is, a quantity of antenna ports corresponding to each NZP CSI-RS resource is 1. If the quantity of antenna ports is greater than 1, it indicates that the maximum value of the quantities of antenna ports corresponding to the more than one configured NZP CSI-RS resource is greater than 1, that is, a quantity of antenna ports for at least one NZP CSI-RS resource is greater than 1.

Specifically, when the quantity of antenna ports is 1, the RI is not fed back. When the quantity of antenna ports is greater than 1, a value of the bit width of the RI is specified, for example, 4.

That is, in this embodiment of the present disclosure, the terminal may determine, based on the first indication information and the quantity of antenna ports that is 1, not to feed back the RI, and feed back only the CRI. The terminal may determine, based on the first indication information and the quantity of antenna ports that is greater than 1, the bit width of the RI, for example, 4. The value of 4 of the bit width is merely an example, and another value is also feasible. This is not specifically limited herein.

Examples are as follows:

In one embodiment, for at least one of the three existing reporting modes (wideband CQI reporting, higher layer-configured subband CQI reporting, and UE selected subband CQI reporting), bit quantities for CRI and/or RI feedback may be respectively defined, or a bit width for CRI and/or RI feedback may be uniformly described. A unified description and a separate description may mean that the terminal device and/or the base station may store one or more mapping tables, mapping sequences, or mapping formulas for different reporting modes, or may store respective mapping tables, mapping sequences, or mapping formulas.

Specifically, the reporting mode in this embodiment of the present disclosure may alternatively be a reporting mode in NR, 5G, or a future research system. This is not specifically limited herein.

In one embodiment, the table in this embodiment of the present disclosure is an example in which the terminal and/the base station are/is applicable to enabling of FeCoMP-based CSI measurement and/or feedback only in a condition in which a CSI-RS resource of a class B is configured. That is, the first indication information is configured only when a higher layer parameter eMIMO-Type is set to a class B and K>1 NZP CS-RS resources are configured. Alternatively, further, the first indication information is configured only when a higher layer parameter eMIMO-Type is set to a class B and two NZP CS-RS resources are configured. This condition is merely an example, and an applicable condition for enabling FeCoMP-based CSI measurement and/or feedback may also be another condition, for example, a condition in which a CSI-RS resource of a class A is configured is also applicable. This is not specifically limited herein. The NZP CSI-RS resource of the class B may be an NZP CSI-RS resource on which precoding or beamforming is performed, that is, a precoding or beamforming operation is performed on a CSI-RS before the CSI-RS is sent. The NZP CSI-RS resource of the class A may be an NZP CSI-RS resource on which precoding or beamforming is not performed, that is, no precoding or beamforming operation is performed on a CSI-RS before the CSI-RS is sent.

In one embodiment, when the table in this embodiment of the present disclosure is described, only the transmission mode 10 and configuration of a PMI/RI feedback condition are used as an example to describe the bit width of the CRI and/or the bit width of the RI. This condition is merely an example, and may also be another condition, for example, no PMI feedback is configured. This is not specifically limited herein.

For example, for a unified description manner, refer to at least one item in Table 5.2.2.6.1-2F1 and Table 5.2.2.6.1-2G1. Table 5.2.2.6.1-2F1 shows a case in which the quantity of antenna ports is greater than 1, and Table 5.2.2.6.1-2G1 shows a case in which the quantity of antenna ports is 1:

For example, for the configured first indication information and the quantity of antenna ports that is greater than 1, the terminal may determine the bit quantities of the CRI and the RI by using at least one item in Table 5.2.2.6.1-2F1. For the configured first indication information and the quantity of antenna ports that is 1, the terminal may determine the bit quantities of the CRI and the RI by using at least one item in Table 5.2.2.6.1-2G1.

TABLE 5.2.2.6.1-2F1

Scenarios for joint CRI and RI feedback (Fields for joint CRI and RI feedback) (the transmission mode 10 is configured with PMI/RI reporting and the higher layer parameter enhanced multiple-input multiple-output (eMIMO)-type, and eMIMO-Type is set to the 'CLASS B' configured with K > 1 CSI-RS resources and more than one antenna port for at least one CSI-RS resource and the higher layer parameter FeCoMPCSIEnabled)

| Field | Bit width |
|---|---|
| CRI | 2 |
| Rank indication | 4 |

TABLE 5.2.2.6.1-2G1

Scenarios for the CRI (Fields for CRI) (the transmission mode 10 is configured with PMI/RI reporting and the higher layer parameter eMIMO-Type, and eMIMO-Type is set to the 'CLASS B' configured with K > 1 CRI-RS resources and one antenna port for each CRI-RS resource and configured with the higher layer parameter FeCoMPCSIEnabled)

| Field | Bit width |
|---|---|
| CRI | 2 |

In the scenario of Table 5.2.2.6.1-2G1, the RI is not fed back, and therefore, it may be considered that the bit width of the RI is 0.

The unified description manner is described above. For example, for at least one of the three reporting modes, a separate description manner may be at least one of the following:

A. When FeCoMPCSIEnabled is configured (or FeCoMPCSIEnabled and the aperiodic reporting mode are configured), for wideband CQI reporting, a bit width for CRI and RI (or RI combination) feedback is specifically as follows:

For example, for wideband CQI reporting, the terminal may store at least one item in two tables such as Table 5.2.2.6.1-2F2 and Table 5.2.2.6.1-2G2. That is, when wideband CQI reporting is configured and the first indication information is configured and the quantity of antenna ports is greater than 1, the terminal may use bit quantities of the CRI and the RI in Table 5.2.2.6.1-2F2. When wideband CQI reporting is configured and the first indication information is configured and the quantity of antenna ports is 1, the terminal may use bit quantities of the CRI and the RI in Table 5.2.2.6.1-2G2.

TABLE 5.2.2.6.1-2F2

Scenarios for joint CRI and RI feedback for wideband CQI reporting (Fields for joint CRI and RI feedback for wideband CQI reports) (the transmission mode 10 is configured with PMI/RI reporting and the higher layer parameter eMIMO-Type, and eMIMO-Type is set to the 'CLASS B' configured with K > 1 CSI-RS resources and more than one antenna port for at least one CSI-RS resource and configured with the higher layer parameter FeCoMPCSIEnabled)

| Field | Bit width |
|---|---|
| CRI | 2 |
| Rank indication | 4 |

TABLE 5.2.2.6.1-2G2

Scenarios for CRI feedback for wideband CQI reporting (Fields for CRI feedback for wideband CQI reports) (the transmission mode 10 is configured with PMI/RI reporting and the higher layer parameter eMIMO-Type, and eMIMO-Type is set to the 'CLASS B' configured with K > 1 CSI-RS resources and one antenna port for each CSI-RS resource and configured with the higher layer parameter FeCoMPCSIEnabled)

| Field | Bit width |
|---|---|
| CRI | 2 |

B. When FeCoMPCSIEnabled is configured (or FeCoMPCSIEnabled and the aperiodic reporting mode are configured), for higher layer-configured subband CQI reporting, a bit width for CRI and RI (or RI combination) feedback is specifically as follows:

For example, for higher layer-configured subband CQI reporting, the terminal may store at least one item in Table 5.2.2.6.2-3F1 and Table 5.2.2.6.2-3G1. That is, when higher layer configured subband CQI reporting is configured and the first indication information is configured and the quantity of antenna ports is greater than 1, the terminal may use bit quantities of the CRI and the RI in Table 5.2.2.6.2-3F1. When higher layer-configured subband CQI reporting is configured and the first indication information is configured and the quantity of antenna ports is 1, the terminal may use bit quantities of the CRI and the RI in Table 5.2.2.6.2-3G1.

TABLE 5.2.2.6.2-3F1

Scenarios for joint CRI and RI feedback for higher layer-configured subband CQI reporting (Fields for joint CRI and RI feedback for higher layer configured subband CQI reports) (the transmission mode 10 is configured with PMI/RI reporting and the higher layer parameter eMIMO-Type, and eMIMO-Type is set to the 'CLASS B' configured with K > 1 CSI-RS resources and more than one antenna port for at least one CSI-RS resource and configured with the higher layer parameter FeCoMPCSIEnabled)

| Field | Bit width |
|---|---|
| CRI | 2 |
| Rank indication | 4 |

TABLE 5.2.2.6.2-3G1

Scenarios for CRI feedback for higher layer-configured subband CQI reporting (Fields for CRI feedback for higher layer configured subband CQI reports) (the transmission mode 10 is configured with PMI/RI reporting and the higher layer parameter eMIMO-Type, and eMIMO-Type is set to the 'CLASS B' configured with K > 1 CSI-RS resources and one antenna port for each CSI-RS resource and configured with the higher layer parameter FeCoMPCSIEnabled)

| Field | Bit width |
|---|---|
| CRI | 2 |

C. When FeCoMPCSIEnabled is configured (or FeCoMPCSIEnabled and the aperiodic reporting mode are configured), for UE selected subband CQI reporting, a bit width for CRI and RI (or RI combination) feedback is specifically as follows:

For example, for UE selected subband CQI reporting, the terminal may store at least one item in Table 5.2.2.6.3-3F2 and Table 5.2.2.6.3-3G2. That is, when UE selected subband CQI reporting and the first indication information are configured and the quantity of antenna ports is greater than 1, the terminal may use bit quantities of the CRI and the RI in Table 5.2.2.6.3-3F2. When UE selected subband CQI reporting is configured and the first indication information is configured and the quantity of antenna ports is 1, the terminal may use bit quantities of the CRI and the RI in Table 5.2.2.6.3-3G2.

TABLE 5.2.2.6.3-3F2

Scenarios for joint CRI and RI feedback for UE selected subband CQI reporting (Fields for joint CRI and RI feedback for UE selected subband CQI reports) (the transmission mode 10 is configured with PMI/RI reporting and the higher layer parameter eMIMO-Type, and eMIMO-Type is set to the 'CLASS B' configured with K > 1 CSI-RS resources and more than one antenna port for at least one CSI-RS resource and configured with the higher layer parameter FeCoMPCSIEnabled)

| Field | Bit width |
| --- | --- |
| CRI | 2 |
| Rank indication | 4 |

TABLE 5.2.2.6.3-3G2

Scenarios for CRI feedback for UE selected subband CQI reporting (Fields for CRI feedback for UE selected subband CQI reports) (the transmission mode 10 is configured with PMI/RI reporting and the higher layer parameter eMIMO-Type, and eMIMO-Type is set to the 'CLASS B' configured with K > 1 CSI-RS resources and one antenna port for each CSI-RS resource and configured with the higher layer parameter FeCoMPCSIEnabled)

| Field | Bit width |
| --- | --- |
| CRI | 2 |

Through the foregoing implementation, the bit width of the RI may be determined respectively for two cases: the quantity of antenna ports is 1 and the quantity of antenna ports is greater than 1, so that bit overheads of the RI can be reduced and performance can be improved.

The following embodiment is used to describe a method for determining the bit meaning of the RI. This embodiment of the present disclosure may be an independent embodiment, or may be combined with another embodiment. This is not specifically limited herein.

In one embodiment, in this embodiment of the present disclosure, the determining the bit width of the RI may be determining a bit width used when a single RI is reported and/or determining a total quantity of bits occupied by a plurality of RIs (or an RI combination) when the plurality of RIs (or the RI combination) are reported. This is not specifically limited herein.

In one embodiment, for the second implementation, a more detailed solution is further provided.

Method 2.2: The bit width of the RI is determined based on the first indication information and at least one of the quantity of antenna ports for an NZP CSI-RS resource and the capability information of the terminal device (which is referred to as the capability of the terminal device for short).

In one embodiment, in this embodiment of the present disclosure, the determining the bit width of the RI may be determining a bit width of an RI used when a single RI is reported and/or determining a total quantity of bits occupied by a plurality of RIs (or an RI combination) when the plurality of RIs (or the RI combination) are reported. This is not specifically limited herein.

This embodiment may be independently implemented, or may be applied in combination with another embodiment. This is not specifically limited herein.

Specifically, for example, when the quantity of antenna ports for an NZP CSI-RS resource is 1, the RI is not fed back. When the quantity of antenna ports for an NZP CSI-RS resource is greater than 1, the bit width of the RI may be determined based on the first indication information and at least one of the quantity of antenna ports and the capability of the terminal device. For example, when the first indication information is configured and the quantity of antenna ports is 2 and/or the capability of the terminal device is that a supported maximum layer quantity is 2, the bit width of the RI is 2, or when the first indication information is configured and the quantity of antenna ports for an NZP CSI-RS resource is 4 and/or the capability of the terminal device is that a supported maximum layer quantity is 4, the bit width of the RI is 4.

In one embodiment, in this embodiment of the present disclosure, if a plurality of CSI-RS resources are configured, when the bit width of the RI is determined, the quantity of antenna ports for an NZP CSI-RS resource that is based on may be a maximum value of quantities of antenna ports corresponding to the configured NZP CSI-RS resources. For example, two NZP CSI-RS resources are configured, a quantity of antenna ports for one NZP CSI-RS resource is 2, and a quantity of antenna ports for the other NZP CSI-RS resource is 4. In this case, the bit width of the RI is determined based on the quantity of antenna ports that is 4. A quantity of antenna ports corresponding to a resource may be understood as a quantity of antenna ports used to transmit the resource.

In one embodiment, for at least one of the three existing reporting modes (wideband CQI reporting, higher layer-configured subband CQI reporting, and UE selected subband CQI reporting), bit quantities for CRI and/or RI feedback may be respectively defined, or a bit width for CRI and/or RI feedback may be uniformly described. A unified description may mean that the terminal and/or the base station may store one or more mapping tables, mapping sequences, or mapping formulas for different reporting modes. A separate description may mean that the terminal and/or the base station may store mapping relationships such as mapping tables, mapping sequences, or mapping formulas corresponding to different reporting modes for the reporting modes.

Specifically, the reporting mode in this embodiment of the present disclosure may alternatively be a reporting mode in NR, 5G, or a future research system. This is not specifically limited herein.

For example, a unified description manner may include at least one item in Table 5.2.2.6.3-3F3 and Table 5.2.2.6.3-3G3. Table 5.2.2.6.3-3F3 shows a case in which the quantity of antenna ports is greater than 1, and Table 5.2.2.6.1-2G1 shows a case in which the quantity of antenna ports is 1:

For example, for the configured first indication information and the quantity of antenna ports that is greater than 1, the terminal stores at least one item in Table 5.2.2.6.3-3F3. For the configured first indication information and the quantity of antenna ports that is 1, the terminal stores at least one item in Table 5.2.2.6.3-3G3. The terminal may store a total of two tables.

TABLE 5.2.2.6.3-3F3

Scenarios for joint CRI and RI/RI combination feedback (Fields for joint CRI and RI/RI Combination feedback) (the transmission mode 10 is configured with PMI/RI reporting and the higher layer parameter eMIMO-Type, and eMIMO-Type is set to the 'CLASS B' configured with K > 1 CSI-RS resources and more than one antenna port for at least one CSI-RS resource and configured with the higher layer parameter FeCoMPCSIEnabled)

| | Bit width | | | | | |
|---|---|---|---|---|---|---|
| | | 4 antenna ports | | 8 antenna ports | | |
| Field | 2 antenna ports | Max 1 or 2 layers | Max 4 layers | Max 1 or 2 layers | Max 4 layers | Max 8 layers |
| CRI | 2 | 2 | 2 | 2 | 2 | 2 |
| Rank indication | 2 | 2 | 4 | 2 | 4 | 4 |

It can be learned from Table 5.2.2.6.3-3F3 that, for example, when the quantity of antenna ports is 2, the bit width of the CRI is 2, and the bit width of the RI is also 2. Alternatively, when the quantity of antenna ports is 4 and the capability of the terminal device is that the supported maximum layer quantity is 4, the bit width of the CRI is 2, and the bit width of the RI is 4.

TABLE 5.2.2.6.3-3G3

Scenarios for CRI feedback (Fields for CRI feedback) (the transmission mode 10 is configured with PMI/RI reporting and the higher layer parameter eMIMO-Type, and eMIMO-Type is set to the 'CLASS B' configured with K > 1 CSI-RS resources and one antenna port for each CSI-RS resource and configured with the higher layer parameter FeCoMPCSIEnabled)

| Field | Bit width |
|---|---|
| CRI | 2 |

Table 5.2.2.6.3-3G3 indicates a case in which the quantity of antenna ports is 1, and the RI is not fed back. It may be considered that the bit width of the RI is 0.

The unified description manner of at least one of the three reporting modes is described above, and a separate description manner may be at least one of the following. Examples are as follows:

A. When FeCoMPCSIEnabled is configured (or FeCoMPCSIEnabled and the aperiodic reporting mode are configured), for wideband CQI reporting, a bit width for CRI and RI (or RI combination) feedback may include at least one item in Table 5.2.2.6.3-3F4 and Table 5.2.2.6.3-3G4:

For example, for wideband CQI reporting, the terminal may store at least one item in two tables such as Table 5.2.2.6.3-3F4 and Table 5.2.2.6.3-3G4. That is, when wideband CQI reporting is configured and the first indication information is configured and the quantity of antenna ports is greater than 1, the terminal may use bit quantities of the CRI and the RI in Table 5.2.2.6.3-3F4. When wideband CQI reporting is configured and the first indication information is configured and the quantity of antenna ports is 1, the terminal may use bit quantities of the CRI and the RI in Table 5.2.2.6.3-3 G4.

TABLE 5.2.2.6.3-3F4

Fields for joint CRI and RI/RI Combination feedback for wideband CQI reports (transmission mode 10 configured with PMI/RI reporting and higher layer parameter eMIMO-Type, and eMIMO-Type is set to 'CLASS B' with K > 1 CSI-RS resources and more than one port for at least one CSI-RS resource and higher layer parameter FeCoMPCSIEnabled)

| | Bit width | | | | | |
|---|---|---|---|---|---|---|
| | | 4 antenna ports | | 8 antenna ports | | |
| Field | 2 antenna ports | Max 1 or 2 layers | Max 4 layers | Max 1 or 2 layers | Max 4 layers | Max 8 layers |
| CRI | 2 | 2 | 2 | 2 | 2 | 2 |
| Rank indication | 2 | 2 | 4 | 2 | 4 | 4 |

In Table 5.2.2.6.3-3F4, when the bit width of the RI is 2, another correspondence may be obtained by replacing the bit width of the RI with 3 or increasing the bit width of the RI to 3. For example, when the quantity of antenna ports is 2, the bit width of the CRI is 2, and the bit width of the RI may be 2 or 3. Similarly, when the quantity of antenna ports is 4, the capability of the terminal device is that the supported maximum layer quantity is 1 or 2, and the RI bit width may be 2, 3, or the like. Specifically, whether a value is 2 or 3 may be predefined in a protocol, or notified by the base station to the terminal. This is not specifically limited herein.

TABLE 5.2.2.6.3-3G4

Scenarios for CRI feedback for wideband CQI reporting (Fields for CRI feedback for wideband CQI reports) (the transmission mode 10 is configured with PMI/RI reporting and the higher layer parameter eMIMO-Type, and eMIMO-Type is set to the 'CLASS B' configured with K > 1 CSI-RS resources and one antenna port for each CSI-RS resource and configured with the higher layer parameter FeCoMPCSIEnabled)

| Field | Bit width |
|---|---|
| CRI | 2 |

B. When FeCoMPCSIEnabled is configured (or FeCoMPCSIEnabled and the aperiodic reporting mode are configured), for higher layer-configured subband CQI reporting, a bit width for CRI and RI (or RI combination) feedback may include at least one item in Table 5.2.2.6.2-3F5 and Table 5.2.2.6.3-3G5:

For example, for higher layer-configured subband CQI reporting, the terminal may store at least one item in Table 5.2.2.6.2-3F5 and Table 5.2.2.6.3-3G5. That is, when higher layer-configured subband CQI reporting and the first indication information are configured and the quantity of antenna ports is greater than 1, the terminal may use bit quantities of the CRI and the RI in Table 5.2.2.6.2-3F5. When higher layer-configured subband CQI reporting is configured and the first indication information is configured and the quantity of antenna ports is 1, the terminal may use bit quantities of the CRI and the RI in Table 5.2.2.6.3-3G5.

TABLE 5.2.2.6.2-3F5

Fields for joint CRI and RI/RI Combination feedback for higher layer configured subband CQI reports (transmission mode 10 configured with PMI/RI reporting and higher layer parameter eMIMO-Type, and eMIMO-Type is set to 'CLASS B' with K > 1 CSI-RS resources and more than one port for at least one CSI-RS resource and higher layer parameter FeCoMPCSIEnabled)

| | | Bit width | | | | |
|---|---|---|---|---|---|---|
| | | 4 antenna ports | | | 8 antenna ports | |
| Field | 2 antenna ports | Max 1 or 2 layers | Max 4 layers | Max 1 or 2 layers | Max 4 layers | Max 8 layers |
| CRI | 2 | 2 | 2 | 2 | 2 | 2 |
| Rank indication | 2 | 2 | 4 | 2 | 4 | 4 |

TABLE 5.2.2.6.3-3G5

Scenarios for CRI feedback for higher layer-configured subband CQI reporting (Fields for CRI feedback for higher layer configured subband CQI reports) (the transmission mode 10 is configured with PMI/RI reporting and the higher layer parameter eMIMO-Type, and eMIMO-Type is set to the 'CLASS B' configured with K > 1 CSI-RS resources and one antenna port for each CSI-RS resource and configured with the higher layer parameter FeCoMPCSIEnabled)

| Field | Bit width |
|---|---|
| CRI | 2 |

C. When FeCoMPCSIEnabled is configured (or FeCoM-PCSIEnabled and the aperiodic reporting mode are configured), for UE selected subband CQI reporting, a bit width for CRI and RI (or RI combination) feedback may include at least one item in Table 5.2.2.6.3-3F6 and Table 5.2.2.6.3-3G6:

For example, for UE selected subband CQI reporting, the terminal may store at least one item in Table 5.2.2.6.3-3F6 and Table 5.2.2.6.3-3G6. That is, when UE selected subband CQI reporting and the first indication information are configured and the quantity of antenna ports is greater than 1, the terminal may use bit quantities of the CRI and the RI in Table 5.2.2.6.3-3F6. When UE selected subband CQI reporting is configured and the first indication information is configured and the quantity of antenna ports is 1, the terminal may use bit quantities of the CRI and the RI in Table 5.2.2.6.3-3G6.

TABLE 5.2.2.6.3-3F6

Scenarios for joint CRI and RI/RI Combination feedback for UE selected subband CQI reporting (Fields for joint CRI and RI/RI Combination feedback for UE selected subband CQI reports) (the transmission mode 10 is configured with PMI/RI reporting and the higher layer parameter eMIMO-Type, and eMIMO-Type is set to the 'CLASS B' configured with K > 1 CSI-RS resources and more than one antenna port for at least one CSI-RS resource and configured with the higher layer parameter FeCoMPCSIEnabled)

| | | Bit width | | | | |
|---|---|---|---|---|---|---|
| | | 4 antenna ports | | | 8 antenna ports | |
| Field | 2 antenna ports | Max 1 or 2 layers | Max 4 layers | Max 1 or 2 layers | Max 4 layers | Max 8 layers |
| CRI | 2 | 2 | 2 | 2 | 2 | 2 |
| Rank indication | 2 | 2 | 4 | 2 | 4 | 4 |

In one embodiment, in Table 5.2.2.6.3-3F6, the bit width of the RI is 2, and another correspondence may be obtained by replacing the bit width of the RI with 3 or increasing the bit width of the RI to 3. For example, when the quantity of antenna ports is 2, the bit width of the CRI is 2, and the bit width of the RI may be 2 or 3. Similarly, when the quantity of antenna ports is 8, the capability of the terminal device is that a maximum of one layer or two layers are supported, and the RI bit width may be 2, 3, or the like. Specifically, whether a value is 2 or 3 may be predefined in a protocol, or notified by the base station to the terminal. This is not specifically limited herein.

TABLE 5.2.2.6.3-3G6

Scenarios for CRI feedback for UE selected subband CQI reporting (Fields for CRI feedback for UE selected subband CQI reports) (the transmission mode 10 is configured with PMI/RI reporting and the higher layer parameter eMIMO-Type, and eMIMO-Type is set to the 'CLASS B' configured with K > 1 CSI-RS resources and one antenna port for each CSI-RS resource and configured with the higher layer parameter FeCoMPCSIEnabled)

| Field | Bit width |
|---|---|
| CRI | 2 |

Third implementation (namely, Method 3): The bit width of the CRI and/or the bit width of the RI are/is determined based on the first indication information and at least one of the quantity of NZP CSI-RS resources, the quantity of antenna ports for an NZP CSI-RS, the capability information of the terminal device, or the value of the CRI. In an example, the bit width of the RI may be determined based on the first indication information, the value of the CRI, and the quantity of antenna ports for an NZP CSI-RS and/or the capability information of the terminal device. That is, the value of the CRI is distinguished in this case.

In one embodiment, in this embodiment of the present disclosure, the determining the bit width of the RI may be determining a bit width of an RI used when a single RI is reported and/or determining a total quantity of bits occupied by a plurality of RIs (or an RI combination) when the plurality of RIs (or the RI combination) are reported. This is not specifically limited herein.

An example in which two NZP CSI-RS resources are configured is used below to describe determining the bit width of the RI based on the first indication information, the value of the CRI, and the quantity of antenna ports for an NZP CSI-RS and/or the capability information of the terminal device. In this case, the bit width of the CRI is 2.

In one embodiment, if a plurality of NZP CSI-RS resources are configured, the bit width of the RI may be determined as a maximum quantity of antenna ports for the configured NZP CSI-RS resources.

In one embodiment, for at least one of the three existing reporting modes (wideband CQI reporting, higher layer-configured subband CQI reporting, and UE selected subband CQI reporting), respective bit quantities for CRI and/or RI feedback may be defined, or a bit width for CRI and/or RI feedback may be uniformly described. A unified description may mean that the terminal and/or the base station may store one or more one or more mapping tables, mapping sequences, or mapping formulas for different reporting modes. A separate description may mean that the terminal and/or the base station may store mapping relationships such as mapping tables, mapping sequences, or mapping formulas corresponding to different reporting modes.

Specifically, the reporting mode in this embodiment of the present disclosure may alternatively be a reporting mode in NR, 5G, or a future research system. This is not specifically limited herein.

In one embodiment, when the table in this embodiment of the present disclosure is described, only the transmission mode 10 and configuration of a PMI/RI feedback condition are used as an example to describe the bit width of the CRI and/or the bit width of the RI. This condition is merely an example, and may also be another condition, for example, no PMI feedback is configured. This is not specifically limited herein.

For example, for at least one of the three reporting modes, a unified description manner may include at least one item in Table 5.2.2.6.1-2F3 and Table 5.2.2.6.3-3G7. Table 5.2.2.6.1-2F3 shows a case in which the quantity of antenna ports is greater than 1, and Table 5.2.2.6.3-3G7 shows a case in which the quantity of antenna ports is 1:

For example, for the configured first indication information and the quantity of antenna ports that is greater than 1, the terminal may determine the bit quantities of the CRI and the RI by using at least one item in Table 5.2.2.6.1-2F3. For the configured first indication information and the quantity of antenna ports that is 1, the terminal may determine the bit quantities of the CRI and the RI by using at least one item in Table 5.2.2.6.3-3G7. For example, the terminal may store at least one item in two tables.

TABLE 5.2.2.6.1-2F3

Scenarios for CRI and RI feedback (Fields for CRI and RI feedback) (the transmission mode 10 and the configured higher layer parameter FeCoMPCSIEnabled)

| Field | 2 antenna ports | 4 antenna ports | | 8 antenna ports | | |
|---|---|---|---|---|---|---|
| | | Max 1 or 2 layers | Max 4 layers | Max 1 or 2 layers | Max 4 layers | Max 8 layers |
| Bit width for CRI = 0 or 1 | | | | | | |
| CRI | 2 | 2 | 2 | 2 | 2 | 2 |
| Rank indication | 1 | 1 | 2 | 1 | 2 | 3 |
| Bit width for CRI = 2 | | | | | | |
| CRI | 2 | 2 | 2 | 2 | 2 | 2 |
| Rank indication | 2 | 2 | 4 | 2 | 4 | 4 |

It can be learned from Table 5.2.2.6.1-2F3 that, for example, when the quantity of antenna ports is 2, the bit width of the CRI is 2; and when the CRI=0 or 1, the bit width of the RI is 1; or when the CRI=2, the bit width of the RI is 2. Alternatively, when the quantity of antenna ports is 4 and the capability of the terminal device is that the supported maximum layer quantity is 4, the bit width of the CRI is 2; and when the CRI=0 or 1, the bit width of the RI is 2; or when the CRI=21, the bit width of the RI is 4.

TABLE 5.2.2.6.3-3G7

Scenarios for CRI feedback (Fields for CRI feedback) (the transmission mode 10 is configured with PMI/RI reporting and the higher layer parameter eMIMO-Type, and eMIMO-Type is set to the 'CLASS B' configured with K > 1 CSI-RS resources and one antenna port for each CSI-RS resource and configured with the higher layer parameter FeCoMPCSIEnabled)

| Field | Bit width |
|---|---|
| CRI | 2 |

Table 5.2.2.6.3-3G7 indicates a case in which the quantity of antenna ports is 1, and the RI is not fed back. It may be considered that the bit width of the RI is 0.

The unified description manner of at least one of the three reporting modes is described above, and a separate description manner described below may be at least one of the following. Examples are as follows:

A. When FeCoMPCSIEnabled (and the aperiodic reporting mode) is (are) configured, for wideband CQI reporting, a bit width for CRI and RI (or RI combination) feedback may include at least one item in Table 5.2.2.6.1-2F4:

For example, for wideband CQI reporting, the terminal may store at least one item in Table 5.2.2.6.1-2F4 and Table 5.2.2.6.3-3G7-1. That is, when wideband CQI reporting is configured and the first indication information is configured and the quantity of antenna ports is greater than 1, the terminal may use bit quantities of the CRI and the RI in Table 5.2.2.6.1-2F4. When wideband CQI reporting is configured and the first indication information is configured and the quantity of antenna ports is 1, the terminal may use bit quantities of the CRI and the RI in Table 5.2.2.6.3-3G7-1.

TABLE 5.2.2.6.1-2F4

Scenarios for CRI and RI feedback for wideband CQI reporting (Fields for CRI and RI feedback for wideband CQI reports) (the transmission mode 10 and the configured higher layer parameter FeCoMPCSIEnabled)

| Field | 2 antenna ports | 4 antenna ports | | 8 antenna ports | | |
|---|---|---|---|---|---|---|
| | | Max 1 or 2 layers | Max 4 layers | Max 1 or 2 layers | Max 4 layers | Max 8 layers |
| Bit width for CRI = 0 or 1 | | | | | | |
| CRI | 2 | 2 | 2 | 2 | 2 | 2 |
| Rank indication | 1 | 1 | 2 | 1 | 2 | 3 |
| Bit width for CRI = 2 | | | | | | |
| CRI | 2 | 2 | 2 | 2 | 2 | 2 |
| Rank indication | 2 | 2 | 4 | 2 | 4 | 4 |

It can be learned from Table 5.2.2.6.1-2F4 that, for example, when the quantity of antenna ports is 2, the bit width of the CRI is 2; and when the CRI=0 or 1, the bit width of the RI is 1; or when the CRI=2, the bit width of the RI is 2. Alternatively, when the quantity of antenna ports is 4 and the capability of the terminal device is that the supported maximum layer quantity is 4, the bit width of the CRI is 2; and when the CRI=0 or 1, the bit width of the RI is 2; or when the CRI=21, the bit width of the RI is 4.

TABLE 5.2.2.6.3-3G7-1

Scenarios for CRI feedback for wideband CQI reporting (Fields for CRI feedback for wideband CQI reports) (the transmission mode 10 is configured with PMI/RI reporting and the higher layer parameter eMIMO-Type, and eMIMO-Type is set to the 'CLASS B' configured with K > 1 CSI-RS resources and one antenna port for each CSI-RS resource and configured with the higher layer parameter FeCoMPCSIEnabled)

| Field | Bit width |
|---|---|
| CRI | 2 |

Table 5.2.2.6.3-3G7-1 indicates a case in which the quantity of antenna ports is 1, and the RI is not fed back. It may be considered that the bit width of the RI is 0.

In the foregoing table, for example, if the quantity of antenna ports is 2, when the value of the CRI is 0 or 1, the value of the RI is 1 or 2, that is, 1 bit may be used to indicate the RI. When the value of the CRI is 2, the value of the RI or a value of the RI combination is {{1, 1}, {1, 2}, {2, 1}, or {2, 2}. 2 bits may be used to indicate the RI.

For example, when the quantity of antenna ports is 4, and the capability of the terminal device is that the supported maximum layer quantity is 4, when the value of the CRI is that the CRI=0 or 1, the value of the RI is 1, 2, 3, or 4, that is, 2 bits may be used to indicate the RI (the bit width of the RI is 2). When the value of the CRI is 2, the value of the RI or the value of the RI combination is {1, 1}, {1, 2}, {2, 1}, {2, 2}, {2, 3}, {3, 2}, {3, 3}, {3, 4}, {4, 3}, or {4, 4}. 4 bits may be used to indicate the RI (the bit width of the RI is 4).

B. When FeCoMPCSIEnabled (and the aperiodic reporting mode) is (are) configured, for higher layer-configured subband CQI reporting, a bit width for CRI and RI (or RI combination) feedback may include at least one item in Table 5.2.2.6.2-3F2:

For example, for higher layer-configured subband CQI reporting, the terminal may store at least one item in Table 5.2.2.6.2-3F2 and Table 5.2.2.6.3-3G7-2. That is, when higher layer-configured subband CQI reporting and the first indication information are configured and the quantity of antenna ports is greater than 1, the terminal may use bit quantities of the CRI and the RI in Table 5.2.2.6.2-3F2. When higher layer-configured subband CQI reporting is configured and the first indication information is configured and the quantity of antenna ports is 1, the terminal may use bit quantities of the CRI and the RI in Table 5.2.2.6.3-3G7-2.

TABLE 5.2.2.6.2-3F2

Fields for CRI and RI feedback for higher layer configured subband CQI reports (transmission mode 10 and higher layer parameter FeCoMPCSIEnabled)

| | | 4 antenna ports | | 8 antenna ports | | |
|---|---|---|---|---|---|---|
| Field | 2 antenna ports | Max 1 or 2 layers | Max 4 layers | Max 1 or 2 layers | Max 4 layers | Max 8 layers |
| Bit width for CRI = 0 or 1 | | | | | | |
| CRI | 2 | 2 | 2 | 2 | 2 | 2 |
| Rank indication | 1 | 1 | 2 | 1 | 2 | 3 |
| Bit width for CRI = 2 | | | | | | |
| CRI | 2 | 2 | 2 | 2 | 2 | 2 |
| Rank indication | 2 | 2 | 4 | 2 | 4 | 4 |

It can be learned from Table 5.2.2.6.2-3F2 that, for example, when the quantity of antenna ports is 2, the bit width of the CRI is 2; and when the CRI=0 or 1, the bit width of the RI is 1; or when the CRI=2, the bit width of the RI is 2. Alternatively, when the quantity of antenna ports is 4 and the capability of the terminal device is that the supported maximum layer quantity is 4, the bit width of the CRI is 2; and when the CRI=0 or 1, the bit width of the RI is 2; or when the CRI=21, the bit width of the RI is 4.

TABLE 5.2.2.6.3-3G7-2

Scenarios for CRI feedback for higher layer-configured subband CQI reporting (Fields for CRI feedback for higher layer configured subband CQI reports) (the transmission mode 10 is configured with PMI/RI reporting and the higher layer parameter eMIMO-Type, and eMIMO-Type is set to the 'CLASS B' configured with K > 1 CSI-RS resources and one antenna port for each CSI-RS resource and configured with the higher layer parameter FeCoMPCSIEnabled (transmission mode 10 configured with PMI/RI reporting and higher layer parameter eMIMO-Type, and eMIMO-Type is set to 'CLASS B' with K > 1 CSI-RS resources and one port for each CSI-RS resource and higher layer parameter FeCoMPCSIEnabled))

| Field | Bit width |
|---|---|
| CRI | 2 |

Table 5.2.2.6.3-3G7-2 indicates a case in which the quantity of antenna ports is 1, and the RI is not fed back. It may be considered that the bit width of the RI is 0.

C. When FeCoMPCSIEnabled (and the aperiodic reporting mode) is (are) configured, for UE selected subband CQI reporting, a bit width for CRI and RI (or RI combination) feedback may include at least one item in Table 5.2.2.6.3-3F7 and Table 5.2.2.6.3-3G7-3:

For example, for UE selected subband CQI reporting, the terminal may store at least one item in Table 5.2.2.6.3-3F7 and Table 5.2.2.6.3-3G7-3. That is, when UE selected subband CQI reporting is configured and the first indication information is configured and the quantity of antenna ports is greater than 1, the terminal may use bit quantities of the CRI and the RI in Table 5.2.2.6.3-3F7. When UE selected subband CQI reporting is configured and the first indication information is configured and the quantity of antenna ports is 1, the terminal may use bit quantities of the CRI and the RI in Table 5.2.2.6.3-3G7-3.

TABLE 5.2.2.6.3-3F7

Scenarios for CRI and RI feedback for UE selected subband CQI reporting (Fields for CRI and RI feedback for UE selected subband CQI reports) (the transmission mode 10 and the configured higher layer parameter FeCoMPCSIEnabled)

| | | 4 antenna ports | | 8 antenna ports | | |
|---|---|---|---|---|---|---|
| Field | 2 antenna ports | Max 1 or 2 layers | Max 4 layers | Max 1 or 2 layers | Max 4 layers | Max 8 layers |
| Bit width for CRI = 0 or 1 | | | | | | |
| CRI | 2 | 2 | 2 | 2 | 2 | 2 |
| Rank indication Field | 1 | 1 | 2 | 1 | 2 | 3 |
| Bit width for CRI = 2 | | | | | | |
| CRI | 2 | 2 | 2 | 2 | 2 | 2 |
| Rank indication | 2 | 2 | 4 | 2 | 4 | 4 |

It can be learned from Table 5.2.2.6.3-3F7 that, for example, when the quantity of antenna ports is 2, the bit width of the CRI is 2; and when the CRI=0 or 1, the bit width of the RI is 1; or when the CRI=2, the bit width of the RI is 2. Alternatively, when the quantity of antenna ports is 4 and the capability of the terminal device is that the supported maximum layer quantity is 4, the bit width of the CRI is 2; and when the CRI=0 or 1, the bit width of the RI is 2; or when the CRI=21, the bit width of the RI is 4.

TABLE 5.2.2.6.3-3G7-3

Scenarios for CRI feedback for higher layer-configured subband CQI reporting (Fields for CRI feedback for higher layer configured subband CQI reports) (the transmission mode 10 is configured with PMI/RI reporting and the higher layer parameter eMIMO-Type, and eMIMO-Type is set to the 'CLASS B' configured with K > 1 CSI-RS resources and one antenna port for each CSI-RS resource and configured with the higher layer parameter FeCoMPCSIEnabled)

| Field | Bit width |
|---|---|
| CRI | 2 |

Table 5.2.2.6.3-3G7-3 indicates a case in which the quantity of antenna ports is 1, and the RI is not fed back. It may be considered that the bit width of the RI is 0.

Fourth implementation (namely, Method 4): At least one of the bit width of the CRI or the bit width of the RI is determined based on the first indication information and at least one of the quantity of NZP CSI-RS resources, the quantity of antenna ports for an NZP CSI-RS, the capability information of the terminal device, or the value of the CRI. In an example, the bit width of the RI may be determined based on the first indication information and the value of the CRI.

In one embodiment, in this embodiment of the present disclosure, the determining the bit width of the RI may be determining a bit width of an RI used when a single RI is reported and/or determining a total quantity of bits occupied by a plurality of RIs (or an RI combination) when the plurality of RIs (or the RI combination) are reported. This is not specifically limited herein.

An example in which two NZP CSI-RS resources are configured is used below to describe how to determine the bit width of the RI based on the first indication information and the value of the CRI. In this case, the bit width of the CRI is 2.

In one embodiment, for at least one of the three existing reporting modes (wideband CQI reporting, higher layer-configured subband CQI reporting, and UE selected subband CQI reporting), respective bit quantities for CRI and/or RI feedback may be defined, or a bit width for CRI and/or RI feedback may be uniformly described. A unified description and a separate description may mean that the terminal and/or the base station may store one or more mapping tables, mapping sequences, or mapping formulas for different reporting modes, or may store respective mapping tables, mapping sequences, or mapping formulas.

Specifically, the reporting mode in this embodiment of the present disclosure may alternatively be a reporting mode in NR, 5G, or a future research system. This is not specifically limited herein.

In this embodiment of the present disclosure, a transmission mode 10 is used as an example in the table. That is, FeCoMP-based CSI measurement and/or feedback can be applied only to a terminal in the transmission mode 10 in an LTE system, but is not applicable to another transmission mode in the LTE system. In this embodiment of the present disclosure, FeCoMP-based CSI measurement and/or feedback are/is also applicable to a transmission mode in NR, 5G, or a future communications system, and is not limited to the transmission mode 10. In this case, the transmission mode 10 is merely an example, and another transmission mode is not limited herein. Alternatively, FeCoMP-based CSI measurement and/or feedback are/is also applicable to any transmission mode, that is, FeCoMP-based CSI measurement and/or feedback are/is unrelated to a transmission mode.

For example, for at least one of the three reporting modes, a unified description manner includes at least one item in Table 5.2.2.6.1-2F5:

When the terminal configures the transmission mode 10 and the higher layer parameter FeCoMPCSIEnabled, a bit width for CRI and RI feedback is shown in Table 5.2.2.6.3-3F. The terminal may store only one mapping table, mapping sequence, or mapping formula.

TABLE 5.2.2.6.1-2F5

Scenarios for CRI and RI feedback (Fields for CRI and RI feedback) (the transmission mode 10 and the configured higher layer parameter FeCoMPCSIEnabled)

| Field | Bit width |
|---|---|
| CRI | 2 |
| Rank indication for CRI = 0, 1 | 3 |
| Rank indication for CRI = 2 | 4 |

It can be learned from Table 5.2.2.6.1-2F5 that, when the terminal configures the higher layer parameter FeCoMPCSIEnabled, for at least one of the three reporting modes, the bit width of the CRI is 2; and when the CRI=0 or 1, the bit width of the RI is 3; or when the CRI=2, the bit width of the RI is 4. The value of the CRI and the value of the bit width of the RI are merely examples herein, or may be other values. This is not specifically limited herein.

For example, for at least one of the three reporting modes, a separate description manner may be at least one of the following:

A. When FeCoMPCSIEnabled is configured (or FeCoMPCSIEnabled and the aperiodic reporting mode are configured), for wideband CQI reporting, a bit width for CRI and RI (or RI combination) feedback is fixed, and at least one item in Table 5.2.2.6.1-2F6 may be included. For example, for wideband CQI reporting, the terminal may store Table 5.2.2.6.1-2F6, that is, when wideband CQI reporting and the first indication information are configured, the terminal may use bit quantities of the CRI and the RI in Table 5.2.2.6.1-2F6.

TABLE 5.2.2.6.1-2F6

Scenarios for CRI and RI feedback for wideband CQI reporting (Fields for CRI and RI feedback for wideband CQI reports) (the transmission mode 10 and the configured higher layer parameter FeCoMPCSIEnabled)

| Field | Bit width |
|---|---|
| CRI | 2 |
| Rank indication for CRI = 0, 1 | 3 |
| Rank indication for CRI = 2 | 4 |

It can be learned from Table 5.2.2.6.1-2F6 that, when the terminal configures the higher layer parameter FeCoMPCSIEnabled, for the wideband CQI reporting mode, the bit width (also referred to as a bit width or a bit length) of the CRI is 2; and when the CRI=0 or 1, the bit width of the RI is 3; or when the CRI=2, the bit width of the RI is 4. The value of the CRI and the value of the bit width of the RI are merely examples herein, or may be other values. This is not specifically limited herein.

B. When FeCoMPCSIEnabled (and the aperiodic reporting mode) is (are) configured, for subband CQI reporting, a bit width for CRI and RI (or RI combination) feedback is fixed, and at least one item in Table 5.2.2.6.2-3F3 may be included. For example, for higher layer-configured subband CQI reporting, the terminal may store Table 5.2.2.6.2-3F3, that is, when higher layer-configured subband CQI reporting and the first indication information are configured, the terminal may use bit quantities of the CRI and the RI in Table 5.2.2.6.2-3F3.

TABLE 5.2.2.6.2-3F3

Scenarios for CRI and RI feedback for higher layer-configured subband CQI reporting (Fields for CRI and RI feedback for higher layer configured subband CQI reports) (the transmission mode 10 and the configured higher layer parameter FeCoMPCSIEnabled)

| Field | Bit width |
| --- | --- |
| CRI | 2 |
| Rank indication for CRI = 0, 1 | 3 |
| Rank indication for CRI = 2 | 4 |

It can be learned from Table 5.2.2.6.2-3F3 that, when the terminal configures the higher layer parameter FeCoMPCSIEnabled, for the higher layer-configured subband CQI reporting mode, the bit width of the CRI is 2; and when the CRI=0 or 1, the bit width of the RI is 3; or when the CRI=2, the bit width of the RI is 4. The value of the CRI and the value of the bit width of the RI are merely examples herein, or may be other values. This is not specifically limited herein.

C. When FeCoMPCSIEnabled (and the aperiodic reporting mode) is (are) configured, for UE selected subband CQI reporting, a bit width for CRI and RI (or RI combination) feedback is fixed, and at least one item in Table 5.2.2.6.3-3F8 may be included. For example, for UE selected subband CQI reporting, the terminal may store Table 5.2.2.6.3-3F8, that is, when UE selected subband CQI reporting and the first indication information are configured, the terminal may use bit quantities of the CRI and the RI in Table 5.2.2.6.3-3F8.

TABLE 5.2.2.6.3-3F8

Scenarios for CRI and RI feedback for UE selected subband CQI reporting (Fields for CRI and RI feedback for UE selected subband CQI reports) (the transmission mode 10 and the configured higher layer parameter FeCoMPCSIEnabled)

| Field | Bit width |
| --- | --- |
| CRI | 2 |
| RI indication for CRI = 0, 1 | 3 |
| RI indication for CRI = 2 | 4 |

It can be learned from Table 5.2.2.6.3-3F8 that, when the terminal configures the higher layer parameter FeCoMPCSIEnabled, for the higher layer-configured subband CQI reporting mode, the bit width of the CRI is 2; and when the CRI=0 or 1, the bit width of the RI is 3; or when the CRI=2, the bit width of the RI is 4. The value of the CRI and the value of the bit width of the RI are merely examples herein, or may be other values. This is not specifically limited herein.

In the foregoing implementation, the CRI and the RI are jointly encoded, or the CRI and the RI are independently encoded.

The following provides the fifth implementation. In this implementation, if the CSI includes at least two RIs, the CRI and at least one of the RIs are jointly encoded, and a remaining RI is not jointly encoded with the CRI.

This embodiment may be an independent embodiment, or may be combined with another embodiment. This is not specifically limited herein.

In this embodiment of the present disclosure, the CSI feedback related information is determined based on the first indication information, where the CSI feedback related information includes the coding scheme for the CRI and the RI. In the fifth implementation, the coding scheme for the CRI and the RI is that the CSI includes at least two RIs, the CRI and at least one of the RIs are jointly encoded, and a remaining RI is independently encoded.

In one embodiment, that the CSI includes at least two RIs, the CRI and at least one of the RIs are jointly encoded, and a remaining RI is independently encoded may mean that the CRI and one of the RIs are jointly encoded, and the remaining RI changes independently, or may mean that the CRI and two of the RIs are jointly encoded, and the remaining RI changes independently. Another case is also applicable. This is not limited herein.

Further, in one embodiment, in this embodiment of the present disclosure, for the remaining RI, it may be determined, based on the value of the CRI, whether there is an RI other than the at least one RI (namely, the RI that is jointly encoded with the CRI).

Specifically, an example in which two NZP CSI-RS resources are configured is used. That is, an example in which the CRI is of 2 bits is used to describe how to determine, based on the value of the CRI, whether there are an RI other than the at least one RI.

Two NZP CSI-RS resources are configured. In this case, a meaning of CRI may be shown as follows:

The CRI=0 represents CSI measurement and feedback based on the first NZP CSI-RS resource.

The CRI=1 represents CSI measurement and feedback based on the second NZP CSI-RS resource.

The CRI=2 represents CSI measurement and feedback based on the first NZP CSI-RS resource and the second NZP CSI-RS.

When the CRI=0 or 1, CSI measurement and feedback in the prior art may be performed. For example, a set of CSI is fed back, where the CSI may include at least one of an RI, a PMI, and a CQI.

When the CRI=2, two sets of CSI need to be fed back. The first set of CSI may be CSI corresponding to the first NZP CSI-RS resource, and the second set of CSI may be CSI corresponding to the second NZP CSI-RS resource.

In one embodiment, the first set of CSI corresponds to CSI for the first codeword (for example, a codeword 0), and the second set of CSI corresponds to CSI for the second codeword.

In one embodiment, each set of CSI may include at least one of an RI, a PMI, and a CQI.

In one embodiment, when the CRI=2, inter-stream interference or inter-codeword interference in two NZP CSI-RS resources needs to be considered when the CQI is calculated.

Specifically, it is determined, based on the value of the CRI, whether there are an RI other than the at least one RI. An example is as follows:

For example, when the CRI=0 or 1, there is only at least one RI, and the at least one RI is an RI obtained through measurement based on an NZP CSI-RS resource corresponding to the value of the CRI. When the CRI=2, there is also a remaining RI other than the at least one RI.

In this case, the network device and/or the terminal device may receive the RI based on the value of the CRI, including whether to receive the remaining RI other than the at least one RI.

Further, in one embodiment, a quantity of remaining RIs other than the at least one RI may be further determined based on the value of the CRI. The quantity of remaining RIs may be an integer greater than or equal to 0, for example, 0, 1, or 2. This is not specifically limited herein.

In this embodiment of the present disclosure, when a quantity of RIs is 2 or RI feedback is RI combination feedback, the at least one RI is an RI obtained through measurement based on the first NZP CSI-RS resource, and the remaining RI is an RI obtained through measurement based on the second NZP CSI-RS resource.

Alternatively, the at least one RI may be an RI corresponding to the CSI for the first codeword, and the remaining RI is an RI corresponding the CSI for the second codeword. Alternatively, the at least one RI is an RI corresponding to the first set of CSI, and the remaining RI is an RI corresponding to the second set of CSI.

Correspondingly, the fifth implementation (namely, Method 5) of determining the bit width of the CRI and/or the bit width of the RI may be:

determining the bit width of the CRI and/or the bit width of the RI based on the first indication information and at least one of the quantity of NZP CSI-RS resources, the quantity of antenna ports for an NZP CSI-RS, the capability information of the terminal device, or the value of the CRI.

A CRI and at least one RI in CSI in coordinated multipoint transmission/reception mode (or FeCoMP or hybrid transmission mode or non-coherent transmission mode)-based CSI measurement and/or feedback are jointly encoded, and whether there is a remaining RI may be determined based on a value of the CRI. In one embodiment, if there is a remaining RI, the remaining RI is not jointly encoded with CRI.

For example, if the CRI=0 or 1 is fed back/received, it is determined that there is no remaining RI, or if the CRI=2 is fed back/received, it is determined that there is a remaining RI.

In this embodiment of the present disclosure, when the CRI and the at least one RI are jointly encoded, a method for determining the bit width of the RI includes at least one of the following:

In one embodiment, the bit width of the RI may be a bit width of an RI that is jointly encoded with the CRI.

Specifically, for example, when the value of the CRI is 0, the CRI may correspond to an RI of the first NZP CSI-RS resource. When the value of the CRI is 1, the CRI may correspond to an RI of the second NZP CSI-RS resource; or when the value of the CRI is 2, the CRI may correspond to an RI of the first NZP CSI-RS resource.

Specifically, the following methods A to G may be used for determining.

Method A: The bit width of the RI may be determined based on a maximum quantity of antenna ports for two NZP CSI-RS resources and/or the capability information of the terminal device. For example, the bit width of the RI may be determined by using a solution in the prior art, and another manner is not limited either. Details are not described herein.

However, if the maximum quantity of antenna ports for the two NZP CSI-RS resources is 1, the RI does not need to be fed back.

Method B: The bit width of the RI may be determined based on the first indication information. For example, when receiving the first indication information, the terminal may determine, based on the first indication information, that the bit width of the RI is fixed, for example, fixed to 3. A value range of the RI may be [1, 8]. For example, the bit width of the RI is fixed to 2, and the value range of the RI is [1, 4]. A specific value is merely an example herein, and the value may be predefined in a protocol, or notified by the base station to the terminal. This is not specifically limited herein.

In this embodiment of the present disclosure, a method for determining a bit width of an independently encoded RI may include at least one of the following:

In one embodiment, the bit width of the independently encoded RI may be a bit width of the RI corresponding to the second NZP CSI-RS resource, or may be a bit width of the second RI in a plurality of RIs, or may be a bit width of the second RI in an RI combination. A meaning of independent encoding is correspondingly explained in another part, and details are not described herein again.

Method C: The bit width of the RI may be determined based on a maximum value of quantities of antenna ports for two NZP CSI-RS resources and/or the capability information of the terminal device.

Method D: The bit width of the RI may be determined based on a quantity of antenna ports for the second NZP CSI-RS resource (namely, an NZP CSI-RS resource corresponding to the remaining RI).

Method E: The bit width of the RI may be determined based on the first indication information. For example, when receiving the first indication information, the terminal may determine, based on the first indication information, that the bit width of the RI is fixed, for example, fixed to 2.

In one embodiment, for coordinated multipoint transmission/reception or FeCoMP or hybrid transmission mode-based CSI measurement and/or feedback, when two RIs are fed back, a combination of the two RIs is limited, and a limitation is {RI 1, RI 2}={1, 1}, {1, 2}, {2, 1}, {2, 2}, {2, 3}, {3, 2}, {3, 3}, {3, 4}, {4, 3}, or {4, 4}.

That is, values of the two RIs are equal or have a difference of 1. Therefore, three states may be indicated by using two bits. For example, a state 0 indicates that a value of each one of the at least one RI is equal to a value of a remaining RI, that is, the difference is 0. A state 1 indicates that a value of a remaining RI is less than a value of the at least one RI by 1, that is, the difference is -1. A state 2 indicates that a value of a remaining RI is greater than a value of the at least one RI by 1, that is, the difference is 1. For example, bits 00 represent the state 0, bits 01 represent the state 1, and bits 10 represent the state 2. Certainly, the state meaning and the state number herein are merely examples, and there may be another correspondence. A correspondence manner between the bit meaning and the state is also merely an example, and there may be another correspondence. For example, 2 bits may be used to indicate a bit meaning of an independently encoded RI. In one embodiment, the 2-bit meaning may be at least one item shown in the following table:

TABLE 5.2.2.6-6A1-3

| $O_0^{RI}, O_1^{RI}$ to RI mapping | |
| --- | --- |
| $O_0^{RI}, O_1^{RI}$ | $\Delta RI$ |
| 0, 0 | 0 |
| 0, 1 | -1 |

TABLE 5.2.2.6-6A1-3-continued $o_0^{RI}$, $o_1^{RI}$ to RI mapping

| $o_0^{RI}$, $o_1^{RI}$ | ΔRI |
|---|---|
| 1, 0 | 1 |
| 1, 1 | Reserved |

A value of ΔRI may be fed back based on what is shown in the table. If ΔRI=0, it indicates that a value of the second RI is equal to a value of the first RI; if ΔRI=−1, it indicates that a value of the second RI is less than a value of the first RI by 1. For example, if the value of the first RI is 2, the second RI value may be determined as 1 based on the value of the first RI and a value of ΔRI. If ΔRI=1, it indicates that a value of the second RI is greater than the value of the first RI by 1. For example, if the value of the first RI is 2, the second RI value may be determined as 3 based on the value of the first RI and the value of ΔRI. The values in the table in this embodiment of the present disclosure are merely examples, a correspondence between a bit value and a feedback variable value is also merely an example, and another value or correspondence is also feasible. This is not specifically limited herein.

Method F: Determining is performed based on a quantity of antenna ports for the second NZP CSI-RS resource and a rule that a maximum bit width of the RI is 2, that is, a larger value is selected from 2 and the bit width of the RI that is determined based on the quantity of antenna ports for the second NZP CSI-RS resource.

Method G: The bit width of the RI is fixed, for example, fixed to 3. A value range of the RI may be [1, 8].

A plurality of RIs are mentioned above, that is, a sequence of the RIs is involved. For example, if two RIs are determined to be fed back, a sequence of the RIs may be predefined in a protocol, or a sequence of the RIs may be configured by the network device.

For example, the predefined sequence of the RIs is that at least one RI corresponds to the first NZP CSI-RS resource, and a remaining RI corresponds to the second NZP CSI-RS resource, or the sequence of the RIs is determined based on an identifier of an NZP CSI-RS resource or an identifier of a resource set.

Determining of the bit meaning of the RI is described below.

This embodiment provides a method for determining the bit meaning of the RI. The method may be combined with the method for determining the bit width of the RI in the first implementation (Method 1) or Method 2.1 in the second implementation (Method 2) or the fourth implementation (Method 4). A manner of determining bit mapping of the RI, namely, the bit meaning of the RI may include one of the following implementations.

Implementation 1 (or referred to as Method 1.1): The bit meaning of the RI is determined based on the first indication information.

In this embodiment of the present disclosure, when receiving the first indication information, the terminal may determine the bit meaning of the RI based on the first indication information. For example, a specific bit meaning may be at least one item in Table 5.2.2.6-8-1.

When FeCoMPCSIEnabled is configured (or FeCoMPCSIEnabled and the aperiodic reporting mode are configured), a bit meaning of RI (or RI combination) feedback may include at least one item in Table 5.2.2.6-8-1:

TABLE 5.2.2.6-8-1

$o_0^{RI}$, $o_1^{RI}$, $o_2^{RI}$, $o_3^{RI}$ to RI mapping

| $o_0^{RI}$, $o_1^{RI}$, $o_2^{RI}$, $o_3^{RI}$ | RI/RI combination |
|---|---|
| 0, 0, 0, 0 | 1 |
| 0, 0, 0, 1 | 2 |
| 0, 0, 1, 0 | 3 |
| 0, 0, 1, 1 | 4 |
| 0, 1, 0, 0 | 5 |
| 0, 1, 0, 1 | 6 |
| 0, 1, 1, 0 | {1, 1} |
| 0, 1, 1, 1 | {1, 2} |
| 1, 0, 0, 0 | {2, 1} |
| 1, 0, 0, 1 | {2, 2} |
| 1, 0, 1, 0 | {2, 3} |
| 1, 0, 1, 1 | {3, 2} |
| 1, 1, 0, 0 | {3, 3} |
| 1, 1, 0, 1 | {3, 4} |
| 1, 1, 1, 0 | {4, 3} |
| 1, 1, 1, 1 | {4, 4} |

In Table 5.2.2.6-8-1, an example in which the bit width of the RI is 4 is used, and $o_0^{RI}$, $o_1^{RI}$, $o_2^{RI}$, and $o_3^{RI}$ indicate 4 bits of the RI. For example, when the 4 bits of the RI are 0000, it corresponds to one RI, and a value of the RI is 1; or when the 4 bits of the RI are 1000, it corresponds to two RIs or one RI combination, and values of the two RIs are respectively 2 and 1, or a value of the RI combination is {2, 1}, that is, the RI 1=2, and the RI 2=1. A case of another bit width of the RI is similar to this. This is not specifically limited herein.

Implementation 2 (or referred to as Method 1.2): The bit meaning of the RI is determined based on the first indication information and the value of the CRI.

When the first indication information is set to FeCoMPCSIEnabled or a value of FeCoMPCSIEnabled is TRUE, the bit width of the RI may be determined, for example, is 4.

In view of this, Implementation 2 (namely, Method 1.2) may also be understood as follows: The bit meaning of the RI is determined based on the bit width of the RI and the value of the CRI. In other words, the determining the bit meaning of the RI based on the first indication information and a value of the CRI includes: determining the bit width of the RI based on the first indication information, and further determining the bit meaning of the RI based on the bit width of the RI and the value of the CRI.

Therefore, when FeCoMPCSIEnabled is configured (or FeCoMPCSIEnabled and the aperiodic reporting mode are configured), or when the bit width of the RI is a specific value such as 4, a bit meaning of RI (or RI combination) feedback is described below. Herein, an example in which the bit width of the RI is 4 is used for description. When the bit width of the RI is another value, a similar design may also be used:

If the CRI=0 or 1, the mapping mode may include at least one item in Table X21.

TABLE X21

$o_0^{RI}$, $o_1^{RI}$, $o_2^{RI}$, $o_3^{RI}$ to RI mapping

| $o_0^{RI}$, $o_1^{RI}$, $o_2^{RI}$, $o_3^{RI}$ | RI |
|---|---|
| 0, 0, 0, 0 | 1 |
| 0, 0, 0, 1 | 2 |
| 0, 0, 1, 0 | 3 |
| 0, 0, 1, 1 | 4 |
| 0, 1, 0, 0 | 5 |

TABLE X21-continued $o_0^{RI}, o_1^{RI}, o_2^{RI}, o_3^{RI}$ to RI mapping

| $o_0^{RI}, o_1^{RI}, o_2^{RI}, o_3^{RI}$ | RI |
|---|---|
| 0, 1, 0, 1 | 6 |
| 0, 1, 1, 0 | 7 |
| 0, 1, 1, 1 | 8 |
| 1, 0, 0, 0 | Reserved |
| 1, 0, 0, 1 | Reserved |
| 1, 0, 1, 0 | Reserved |
| 1, 0, 1, 1 | Reserved |
| 1, 1, 0, 0 | Reserved |
| 1, 1, 0, 1 | Reserved |
| 1, 1, 1, 0 | Reserved |
| 1, 1, 1, 1 | Reserved |

The CRI=0 indicates that the value of the CRI is 0, which is similar to the following. It can be learned from Table X21 that, if the value of the CRI is 0 or 1, and 4 bits occupied by the RI are 0000, it corresponds to one RI, and a value of the RI is 1. Alternatively, it may correspond to one RI combination, and a value of the RI combination is {1, 0}, that is, a value of the first RI is 1, and a value of the second RI is 0; or it may be considered that the second RI does not exist. Other rows have similar explanations, and it may also be applicable to similar cases in other parts.

If the CRI=2, the mapping mode may include at least one item in Table X31.

TABLE X31

$o_0^{RI}, o_1^{RI}, o_2^{RI}, o_3^{RI}$ to RI/RI combination mapping

| $o_0^{RI}, o_1^{RI}, o_2^{RI}, o_3^{RI}$ | RI/RI combination |
|---|---|
| 0, 0, 0, 0 | {1, 1} |
| 0, 0, 0, 1 | {1, 2} |
| 0, 0, 1, 0 | {2, 1} |
| 0, 0, 1, 1 | {2, 2} |
| 0, 1, 0, 0 | {2, 3} |
| 0, 1, 0, 1 | {3, 2} |
| 0, 1, 1, 0 | {3, 3} |
| 0, 1, 1, 1 | {3, 4} |
| 1, 0, 0, 0 | {4, 3} |
| 1, 0, 0, 1 | {4, 4} |
| 1, 0, 1, 0 | Reserved |
| 1, 0, 1, 1 | Reserved |
| 1, 1, 0, 0 | Reserved |
| 1, 1, 0, 1 | Reserved |
| 1, 1, 1, 0 | Reserved |
| 1, 1, 1, 1 | Reserved |

It can be learned from Table X31 that, if the value of the CRI is 2, and 4 bits occupied by the RI are 0000, it corresponds to two RIs, and values of the two RIs are both 1. Other rows have similar explanations.

Alternatively, the CRI=0, 1, or 2 may be indicated by one table, and the mapping mode may include at least one item in Table X31-1.

TABLE X31-1

$o_0^{RI}, o_1^{RI}, o_2^{RI}, o_3^{RI}$ to RI/RI combination mapping

| $o_0^{RI}, o_1^{RI}, o_2^{RI}, o_3^{RI}$ | RI/RI combination for CRI = 0, or 1 | RI/RI combination for CRI = 2 |
|---|---|---|
| 0, 0, 0, 0 | 1 | {1, 1} |
| 0, 0, 0, 1 | 2 | {1, 2} |
| 0, 0, 1, 0 | 3 | {2, 1} |
| 0, 0, 1, 1 | 4 | {2, 2} |
| 0, 1, 0, 0 | 5 | {2, 3} |
| 0, 1, 0, 1 | 6 | {3, 2} |
| 0, 1, 1, 0 | 7 | {3, 3} |
| 0, 1, 1, 1 | 8 | {3, 4} |
| 1, 0, 0, 0 | Reserved | {4, 3} |
| 1, 0, 0, 1 | Reserved | {4, 4} |
| 1, 0, 1, 0 | Reserved | Reserved |
| 1, 0, 1, 1 | Reserved | Reserved |
| 1, 1, 0, 0 | Reserved | Reserved |
| 1, 1, 0, 1 | Reserved | Reserved |
| 1, 1, 1, 0 | Reserved | Reserved |
| 1, 1, 1, 1 | Reserved | Reserved |

Alternatively,
if the CRI=0 or 1, only one RI is fed back, and the mapping mode may include at least one item in Table X22.

TABLE X22

$o_0^{RI}, o_1^{RI}, o_2^{RI}, o_3^{RI}$ to RI mapping

| $o_0^{RI}, o_1^{RI}, o_2^{RI}, o_3^{RI}$ | RI |
|---|---|
| 0, 0, 0, 0 | 1 |
| 0, 0, 0, 1 | 2 |
| 0, 0, 1, 0 | 3 |
| 0, 0, 1, 1 | 4 |
| 0, 1, 0, 0 | 5 |
| 0, 1, 0, 1 | 6 |
| 0, 1, 1, 0 | 7 |
| 0, 1, 1, 1 | 8 |
| 1, 0, 0, 0 | Reserved |
| 1, 0, 0, 1 | Reserved |
| 1, 0, 1, 0 | Reserved |
| 1, 0, 1, 1 | Reserved |
| 1, 1, 0, 0 | Reserved |
| 1, 1, 0, 1 | Reserved |
| 1, 1, 1, 0 | Reserved |
| 1, 1, 1, 1 | Reserved |

If the CRI=2, two RIs are fed back, and the mapping mode may include at least one item in Table X33.

TABLE X33

$o_0^{RI}, o_1^{RI}, o_2^{RI}, o_3^{RI}$ to RI mapping

| $o_0^{RI}, o_1^{RI}, o_2^{RI}, o_3^{RI}$ | RI 1 | RI 2 |
|---|---|---|
| 0, 0, 0, 0 | 1 | 1 |
| 0, 0, 0, 1 | 1 | 2 |
| 0, 0, 1, 0 | 2 | 1 |
| 0, 0, 1, 1 | 2 | 2 |
| 0, 1, 0, 0 | 2 | 3 |
| 0, 1, 0, 1 | 3 | 2 |
| 0, 1, 1, 0 | 3 | 3 |
| 0, 1, 1, 1 | 3 | 4 |
| 1, 0, 0, 0 | 4 | 3 |
| 1, 0, 0, 1 | 4 | 4 |
| 1, 0, 1, 0 | Reserved | Reserved |
| 1, 0, 1, 1 | Reserved | Reserved |
| 1, 1, 0, 0 | Reserved | Reserved |
| 1, 1, 0, 1 | Reserved | Reserved |
| 1, 1, 1, 0 | Reserved | Reserved |
| 1, 1, 1, 1 | Reserved | Reserved |

The RI 1 and the RI 2 represent the two RIs that are fed back.

In all of Table X21, Table X31, Table X31-1, Table X22, and Table X33 above, 4 bits are used to indicate a value of one RI or values of two RIs, and a joint indication manner is used. The following describes another manner. To be specific, 4 bits of the RI may be split into two parts each including 2 bits. This is equivalent to using two bits to indicate one RI.

For example, for the CRI=2, a mapping mode of 2 bits in the 4 bits of the RI may include at least one item in Table 5.2.2.6-6A, and a 4-bit RI mapping mode may be obtained by combining two 2-bit mapping modes:

TABLE 5.2.2.6-6A

| $o_0^{RI}, o_1^{RI}$ to RI mapping | |
|---|---|
| $o_0^{RI}, o_1^{RI}$ | RI |
| 0, 0 | 1 |
| 0, 1 | 2 |
| 1, 0 | 3 |
| 1, 1 | 4 |

In this embodiment of the present disclosure, a correspondence between a value of at least one of the bits $o_0^{RI}$, $o_1^{RI}$, $o_2^{RI}$, and $o_3^{RI}$ and the value of the RI is merely an example, and another correspondence is also applicable. This is not specifically limited herein.

This embodiment provides another method for determining the bit meaning of the RI. The determining method may be combined with another method for determining the bit width of the RI in this embodiment, for example, combined with the method for determining the bit width of the RI in Method 2.2 or Method 3, or may be combined with another method for determining the bit width of the RI. Details are not described herein.

In one embodiment, in this embodiment of the present disclosure, the determining the bit width of the RI may be determining a bit width of an RI used when a single RI is reported and/or determining a total quantity of bits occupied by a plurality of RIs (or an RI combination) when the plurality of RIs (or the RI combination) are reported. This is not specifically limited herein.

This embodiment may be independently implemented, or may be applied in combination with another embodiment. This is not specifically limited herein.

A. A Case in which the Bit Width of the RI is 2:

The bit meaning of the CRI and/or the bit meaning of the RI are/is determined based on the first indication information and at least one of the quantity of NZP CSI-RS resources, the quantity of antenna ports for an NZP CSI-RS, the capability information of the terminal device, the bit width of the RI, or the value of the CRI. In an example, the bit meaning of the RI may be determined based on the value of the CRI, the first indication information, and at least one of the quantity of antenna ports for an NZP CSI-RS, the capability information of the terminal device, or the bit width of the RI.

In one embodiment, the terminal determines the bit meaning of the RI based on the quantity of antenna ports for an NZP CSI-RS resource, the value of the CRI, and the first indication information. For example, the terminal may determine the bit width of the RI based on the quantity of antenna ports for an NZP CSI-RS resource, and then determine the bit meaning of the RI based on the bit width of the RI, the value of the CRI, and the first indication information.

In one embodiment, the terminal determines the bit meaning of the RI based on the quantity of antenna ports for an NZP CSI-RS resource, the capability information of the terminal device, the value of the CRI, and the first indication information. For example, the terminal may determine the bit width of the RI based on the quantity of antenna ports for an NZP CSI-RS resource and the capability information of the terminal device, and then determine the bit meaning of the RI based on the bit width of the RI, the value of the CRI, and the first indication information.

In one embodiment, the terminal determines the bit meaning of the RI based on the bit width of the RI, the value of the CRI, and the first indication information.

For example, the terminal may determine the bit width of the RI, for example, as 2 bits, based on the first indication information and at least one of the quantity of antenna ports for an NZP CSI-RS resource and the capability information of the terminal device, and determine the bit meaning of the RI based on the value of the CRI and the first indication information. An example is as follows:

For example, when FeCoMPCSIEnabled (and the aperiodic reporting mode) is (are) configured, a bit meaning of RI (or RI combination) feedback is as follows:

When the CRI=0 or 1, the mapping mode may include at least one item in Table 5.2.2.6-6A1.

When the CRI=0 or 1, the bit meaning of the RI may mean that one RI is fed back.

TABLE 5.2.2.6-6A1

| $o_0^{RI}$, to $o_1^{RI}$ mapping for CRI = 0, 1 | |
|---|---|
| $o_0^{RI}, o_1^{RI}$ | RI |
| 0, 0 | 1 |
| 0, 1 | 2 |
| 1, 0 | 3 |
| 1, 1 | 4 |

Alternatively, when the CRI=2, the mapping mode may include at least one item in Table 5.2.2.6-6A2.

When the CRI=2, the bit meaning of the RI may mean that two RIs are fed back or an RI combination is fed back.

TABLE 5.2.2.6-6A2

| $o_0^{RI}, o_1^{RI}$ to RI mapping for CRI = 2 | |
|---|---|
| $o_0^{RI}, o_1^{RI}$ | RI/RI combination |
| 0, 0 | {1, 1} |
| 0, 1 | {1, 2} |
| 1, 0 | {2, 1} |
| 1, 1 | {2, 2} |

Alternatively, the CRI=0, 1, or 2 may be indicated by one table, for example, at least one item in the following Table 5.2.2.6-6A2-1.

When the CRI=0 or 1, the bit meaning of the RI may mean that one RI is fed back.

When the CRI=2, the bit meaning of the RI may mean that two RIs are fed back or an RI combination is fed back.

TABLE 5.2.2.6-6A2-1

| $o_0^{RI}, o_1^{RI}$ to RI mapping for CRI = 2 | | |
|---|---|---|
| $o_0^{RI}, o_1^{RI}$ | RI for CRI = 0 or 1 | RI/RI combination for CRI = 2 |
| 0, 0 | 1 | {1, 1} |
| 0, 1 | 2 | {1, 2} |
| 1, 0 | 3 | {2, 1} |
| 1, 1 | 4 | {2, 2} |

Alternatively, when the CRI=2, the mapping mode may include at least one item in Table 5.2.2.6-6A3.

When the CRI=2, the bit meaning of the RI may mean that two RIs are fed back or an RI combination is fed back.

TABLE 5.2.2.6-6A3

$o_0^{RI}, o_1^{RI}$ to RI mapping for CRI = 2

| $o_0^{RI}, o_1^{RI}$ | RI 1 | RI 2 |
|---|---|---|
| 0, 0 | 1 | 1 |
| 0, 1 | 1 | 2 |
| 1, 0 | 2 | 1 |
| 1, 1 | 2 | 2 |

Alternatively, when the CRI=2, the mapping mode may include at least one item in Table 5.2.2.6-6A4. In Table 5.2.2.6-6A4, 2 bits of the RI are split into two parts each including 1 bit, and a mapping mode of each bit may include at least one item in Table 5.2.2.6-6A4:

TABLE 5.2.2.6-6A4

$o_0^{RI}$ or $o_1^{RI}$ to RI mapping for CRI = 2

| $o_0^{RI}, o_1^{RI}$ | RI |
|---|---|
| 0 | 1 |
| 1 | 2 |

In one embodiment, the terminal may store at least one item in the foregoing table, and determine the bit width of the RI, for example, 2, based on the first indication information and at least one of the quantity of antenna ports for an NZP CSI-RS resource and the capability information of the terminal device, and determine the bit meaning of the RI from the foregoing table based on the value of the CRI and the first indication information. It may be understood that, when the bit width of the RI is determined as 2 in another manner, the foregoing bit meaning of the RI is also applicable.

B. A Case in which the Bit Width of the RI is 3:

At least one of the bit meaning of the CRI or the bit meaning of the RI is determined based on the first indication information and at least one of the quantity of NZP CSI-RS resources, the quantity of antenna ports for an NZP CSI-RS, the capability information of the terminal device, the bit width of the RI, or the value of the CRI. In an example, the bit meaning of the RI may be determined based on the first indication information and the bit width of the RI.

In one embodiment, when FeCoMPCSIEnabled is configured (or FeCoMPCSIEnabled and the aperiodic reporting mode are configured), when the bit width of the RI is 3, a bit meaning of RI (or RI combination) feedback may include at least one item in Table 5.2.2.6-8-2:

TABLE 5.2.2.6-8-2

$o_0^{RI}, o_1^{RI}, o_2^{RI}$ to RI mapping

| $o_0^{RI}, o_1^{RI}, o_2^{RI}$ | RI/RI combination |
|---|---|
| 0, 0, 0 | 1 |
| 0, 0, 1 | 2 |
| 0, 1, 0 | {1, 1} |
| 0, 1, 1 | {1, 2} |
| 1, 0, 0 | {2, 1} |
| 1, 0, 1 | {2, 2} |

TABLE 5.2.2.6-8-2-continued $o_0^{RI}, o_1^{RI}, o_2^{RI}$ to RI mapping

| $o_0^{RI}, o_1^{RI}, o_2^{RI}$ | RI/RI combination |
|---|---|
| 1, 1, 0 | Reserved |
| 1, 1, 1 | Reserved |

In one embodiment, the terminal may store at least one item in the foregoing table, and determine the bit width of the RI, for example, 3, based on the first indication information and at least one of the quantity of antenna ports for an NZP CSI-RS resource and the capability information of the terminal device, and determine the bit meaning of the RI from the foregoing table based on the bit width of the RI and the first indication information. It may be understood that, when the bit width of the RI is determined as 3 in another manner, the foregoing bit meaning of the RI is also applicable.

C. A Case in which the Bit Width of the RI is 4:

Possible Manner 1:

At least one of the bit meaning of the CRI or the bit meaning of the RI is determined based on the first indication information and at least one of the quantity of NZP CSI-RS resources, the quantity of antenna ports for an NZP CSI-RS, the capability information of the terminal device, the bit width of the RI, or the value of the CRI. In an example, the bit meaning of the RI may be determined based on the value of the CRI, the first indication information, and at least one of the quantity of antenna ports for an NZP CSI-RS, the capability information of the terminal device, or the bit width of the RI. For example, when FeCoMPCSIEnabled is configured (or FeCoMPCSIEnabled and the aperiodic reporting mode are configured), a bit meaning of RI (or RI combination) feedback is as follows:

When the CRI=0 or 1, the mapping mode may include at least one item in Table X24.

When the CRI=0 or 1, the bit meaning of the RI may mean that one RI is fed back.

TABLE X24

$o_0^{RI}, o_1^{RI}, o_2^{RI}, o_4^{RI}$ to RI mapping for CRI = 0, 1

| $o_0^{RI}, o_1^{RI}, o_2^{RI}, o_3^{RI}$ | RI/RI combination |
|---|---|
| 0, 0, 0, 0 | 1 |
| 0, 0, 0, 1 | 2 |
| 0, 0, 1, 0 | 3 |
| 0, 0, 1, 1 | 4 |
| 0, 1, 0, 0 | 5 |
| 0, 1, 0, 1 | 6 |
| 0, 1, 1, 0 | 7 |
| 0, 1, 1, 1 | 8 |
| 1, 0, 0, 0 | Reserved |
| 1, 0, 0, 1 | Reserved |
| 1, 0, 1, 0 | Reserved |
| 1, 0, 1, 1 | Reserved |
| 1, 1, 0, 0 | Reserved |
| 1, 1, 0, 1 | Reserved |
| 1, 1, 1, 0 | Reserved |
| 1, 1, 1, 1 | Reserved |

Alternatively, when the CRI=0 or 2, the mapping mode may include at least one item in Table X34.

When the CRI=2, the bit meaning of the RI may mean that two RIs are fed back or an RI combination is fed back.

TABLE X34

$o_0^{RI}, o_1^{RI}, o_2^{RI}, o_3^{RI}$ to RI mapping for CRI = 2

| $o_0^{RI}, o_1^{RI}, o_2^{RI}, o_3^{RI}$ | RI/RI combination |
|---|---|
| 0, 0, 0, 0 | {1, 1} |
| 0, 0, 0, 1 | {1, 2} |
| 0, 0, 1, 0 | {2, 1} |
| 0, 0, 1, 1 | {2, 2} |
| 0, 1, 0, 0 | {2, 3} |
| 0, 1, 0, 1 | {3, 2} |
| 0, 1, 1, 0 | {3, 3} |
| 0, 1, 1, 1 | {3, 4} |
| 1, 0, 0, 0 | {4, 3} |
| 1, 0, 0, 1 | {4, 4} |
| 1, 0, 1, 0 | Reserved |
| 1, 0, 1, 1 | Reserved |
| 1, 1, 0, 0 | Reserved |
| 1, 1, 0, 1 | Reserved |
| 1, 1, 1, 0 | Reserved |
| 1, 1, 1, 1 | Reserved |

Alternatively, the CRI=0, 1, or 2 may be indicated by one table, and the mapping mode may include at least one item in Table X34-1.

In this case, in one embodiment, the terminal determines the bit meaning of the RI based on the bit width of the RI and the value of the CRI. Specifically, for example, the terminal determines that the bit width of the RI is 4, and then may determine the bit meaning of the RI based on the value of the CRI, which, for example, may be at least one item the following Table X34-1.

When the CRI=0 or 1, the bit meaning of the RI may mean that one RI is fed back.

When the CRI=2, the bit meaning of the RI may mean that two RIs are fed back or an RI combination is fed back.

TABLE X34-1

$o_0^{RI}, o_1^{RI}, o_2^{RI}, o_3^{RI}$ to RI mapping

| $o_0^{RI}, o_1^{RI}, o_2^{RI}, o_3^{RI}$ | RI for CRI = 0 or 1 | RI/RI combination for CRI = 2 |
|---|---|---|
| 0, 0, 0, 0 | 1 | {1, 1} |
| 0, 0, 0, 1 | 2 | {1, 2} |
| 0, 0, 1, 0 | 3 | {2, 1} |
| 0, 0, 1, 1 | 4 | {2, 2} |
| 0, 1, 0, 0 | 5 | {2, 3} |
| 0, 1, 0, 1 | 6 | {3, 2} |
| 0, 1, 1, 0 | 7 | {3, 3} |
| 0, 1, 1, 1 | 8 | {3, 4} |
| 1, 0, 0, 0 | Reserved | {4, 3} |
| 1, 0, 0, 1 | Reserved | {4, 4} |
| 1, 0, 1, 0 | Reserved | Reserved |
| 1, 0, 1, 1 | Reserved | Reserved |
| 1, 1, 0, 0 | Reserved | Reserved |
| 1, 1, 0, 1 | Reserved | Reserved |
| 1, 1, 1, 0 | Reserved | Reserved |
| 1, 1, 1, 1 | Reserved | Reserved |

Possible Manner 2:

The bit meaning of the RI is determined based on the first indication information and at least one of the quantity of NZP CSI-RS resources, the quantity of antenna ports for an NZP CSI-RS, the capability information of the terminal device, the bit width of the RI, or the value of the CRI. In an example, the bit meaning of the RI may be determined based on the first indication information and the bit width of the RI.

In one embodiment, the terminal may determine the bit meaning of the RI based on the first indication information and the bit width of the RI. For example, when FeCoMPC-SIEnabled is configured (or FeCoMPCSIEnabled and the aperiodic reporting mode are configured), when the bit width of the RI is 4, a bit meaning of RI (or RI combination) feedback may include at least one item in Table 5.2.2.6-8-3:

TABLE 5.2.2.6-8-3

$o_0^{RI}, o_1^{RI}, o_2^{RI}, o_3^{RI}$ to RI mapping

| $o_0^{RI}, o_1^{RI}, o_2^{RI}, o_3^{RI}$ | RI/RI combination |
|---|---|
| 0, 0, 0, 0 | 1 |
| 0, 0, 0, 1 | 2 |
| 0, 0, 1, 0 | 3 |
| 0, 0, 1, 1 | 4 |
| 0, 1, 0, 0 | 5 or reserved |
| 0, 1, 0, 1 | 6 or reserved |
| 0, 1, 1, 0 | {1, 1} |
| 0, 1, 1, 1 | {1, 2} |
| 1, 0, 0, 0 | {2, 1} |
| 1, 0, 0, 1 | {2, 2} |
| 1, 0, 1, 0 | {2, 3} |
| 1, 0, 1, 1 | {3, 2} |
| 1, 1, 0, 0 | {3, 3} |
| 1, 1, 0, 1 | {3, 4} |
| 1, 1, 1, 0 | {4, 3} |
| 1, 1, 1, 1 | {4, 4} |

In one embodiment, the terminal may determine the bit meaning of the RI based on the bit width of the RI.

For example, when determining that the bit width of the RI is 4, the terminal may determine that the bit meaning of the RI is at least one item in Table 5.2.2.6-8-3 above. It may be understood that, when the bit width of the RI is determined as 4, the foregoing bit meaning of the RI is also applicable without considering another factor such as the value of the CRI.

In this embodiment of the present disclosure, a correspondence between a value of at least one of the bits $o_0^{RI}, o_1^{RI}, o_2^{RI},$ and $o_3^{RI}$ and the value of the RI is merely an example, and another correspondence is also applicable. This is not specifically limited herein.

Possible Manner 2: When the RI and the CRI are jointly fed back or jointly encoded, the bit width of the RI is enabled to be independent of the value of the CRI, to be specific, it can be ensured that the bit width of the CRI and the bit width of the RI are known by both the network device and the terminal device, so that the network device can correctly receive or decode the CRI and the RI. In addition, because the bit width of the RI is related to the quantity of antenna ports and/or the capability of the terminal device, overheads for the bit width of the RI are relatively low.

In the solution described above, if there are a plurality of CSI-RS resources, a maximum value of quantities of antenna ports corresponding to these resources is used as a determined quantity of antenna ports for the RI. Another method for determining the quantity of antenna ports for the RI is described below. This embodiment may be used as an independent embodiment, or may be combined with another embodiment. This is not specifically limited herein. It may be understood that a more detailed determining method is described below:

For coordinated multipoint transmission/reception mode (or FeCoMP or hybrid transmission mode or non-coherent transmission mode)-based CSI measurement and/or feedback, the bit width of the RI is determined based on a quantity of antenna ports for each CSI-RS resource.

In one embodiment, when a quantity of antenna ports for one CSI-RS resource is 1, and a quantity of antenna ports for another CSI-RS resource is M, the bit width of the RI may be 1 or $\lceil \log_2 M \rceil$. Whether a specific bit width of the RI is 1 or $\lceil \log_2 M \rceil$ may be predefined in a protocol, or notified by the base station by using signaling. This is not specifically limited herein.

For example, there are two CSI-RS resources, a quantity of antenna ports for one CSI-RS resource is 1, and a quantity of antenna ports for the other CSI-RS resource is M, where M is greater than 1. In this case, the bit width of the RI may be 1 or $\lceil \log_2 M \rceil$.

When the bit width of the RI is 1, the 1 bit may be used to respectively indicate two values of the RI (or an RI combination) when the CRI=0, 1, or 2. For example, the RI=1 or 2 when the CRI=0 or 1 and the RI={1, 1} or {1, 2} when the CRI=2 are supported.

When the bit width of the RI is $\lceil \log_2 M \rceil$, the $\lceil \log_2 M \rceil$ bits may be used to respectively indicate M values of the RI (or an RI combination) when the CRI=0, 1, or 2. For example, the RI=1, 2, . . . , or M when the CRI=0 is supported, the RI=1, 2, . . . , or M when the CRI=1 is supported, and the RI={1, 1}, {1, 2}, . . . , or {1, M} when the CRI=2 is supported.

In one embodiment, when a quantity of antenna ports for one CSI-RS resource is M1, and a quantity of antenna ports for at least one CSI-RS resource is M2, the bit width of the RI may be a maximum bit width of the RI in consideration of various values of the CRI.

Specifically, the terminal and/or the base station may determine the maximum bit width of the RI in the case of various values of the CRI based on a bit width of the RI that corresponds to each CSI-RS resource, and then determine the bit width of the RI that is fed back.

For example, there are two CSI-RS resources, a quantity of antenna ports for one CSI-RS resource is 2, and a quantity of antenna ports for the other CSI-RS resource is 4. In this case, the bit width of the RI may be 2 or 3, which meets the maximum bit width of the RI in the case of various values of the CRI. Whether a specific bit width of the RI is 2 or 3 may be predefined in a protocol, or notified by the base station by using signaling. This is not specifically limited herein.

A case in which the bit width of the RI is 2:

When a quantity of antenna ports for the first CSI-RS resource is 2, and CSI corresponding to the first CSI-RS resource is fed back (for example, the CRI=0), a corresponding RI needs to be fed back by using 1 bit, and the 1 bit may be used to indicate that the RI=1 or 2. An example in which a quantity of antenna ports for the second CSI-RS resource is 4 is used. When CSI corresponding to the second CSI-RS resource is fed back (for example, the CRI=1), a corresponding RI needs to be fed back by using 2 bits, and the 2 bits may be used to indicate that the RI=1, 2, 3, or 4. When CSI corresponding to the first CSI-RS resource and CSI corresponding to the second CSI-RS resource are fed back (for example, the CRI=2), corresponding RIs need to be fed back by using 2 bits, and the 2 bits may be used to indicate that the RIs={1, 1}, {1, 2}, {2, 1}, or {2, 3}. Therefore, in consideration of the maximum bit width of the RI in the case of various values of the CRI, it may be determined that the bit width for RI feedback is 2 bits. For example, the RI=1 or 2 when the CRI=0, the RI=1, 2, 3, or 4 when the CRI=1, and {1, 1}, {1, 2}, {2, 1}, or {2, 3} when the CRI=2 are supported.

A case in which the bit width of the RI is 3:

When a quantity of antenna ports for the first CSI-RS resource is 2, and CSI corresponding to the first CSI-RS resource is fed back (for example, the CRI=0), a corresponding RI needs to be fed back by using 1 bit, and the 1 bit may be used to indicate that the RI=1 or 2. An example in which a quantity of antenna ports for the second CSI-RS resource is 4 is used. When CSI corresponding to the second CSI-RS resource is fed back (for example, the CRI=1), a corresponding RI needs to be fed back by using 2 bits, and the 2 bits may be used to indicate that the RI=1, 2, 3, or 4. When CSI corresponding to the first CSI-RS resource and CSI corresponding to the second CSI-RS resource are fed back (for example, the CRI=2), corresponding RIs need to be fed back by using 3 bits, and the 3 bits may be used to indicate that the RIs={1, 1}, {1, 2}, {2, 1}, {2, 3}, {1, 3}, {1, 4}, or {2, 4}. Therefore, in consideration of the maximum bit width of the RI in the case of various values of the CRI, it may be determined that the bit width for RI feedback that is 3 bits can be supported. For example, the RI=1 or 2 when the CRI=0, the RI=1, 2, 3, or 4 when the CRI=1, and {1, 1}, {1, 2}, {2, 1}, {2, 3}, {1, 3}, {1, 4}, or {2, 4} when the CRI=2 are supported.

In one embodiment, in this embodiment of the present disclosure, unless otherwise specified, a resource, a CRI-RS resource, and an NZP CSI-RS resource all refer to an NZP CSI-RS resource. Any description related to a quantity of antenna ports such as a quantity of antenna ports, a quantity of antenna ports for an NZP CSI-RS, or a quantity of antenna ports for a CSI-RS resource refers to a quantity of antenna ports for an NZP CSI-RS resource.

The solution of determining CSI measurement and feedback is described above. The CSI may include at least one of a PMI, an RI, or a CQI, so that reporting of the CSI is related to reporting of at least one of the PMI, the RI, or the CQI. In this case, there is a reporting sequence of at least one of the PMI, the RI, or the CQI during reporting. The following describes an embodiment of a reporting sequence of the PMI and the CQI and a method for determining a bit width of content included in the CSI, for example, the PMI or the CQI. Methods for determining the reporting sequence and the bit width of the content included in the CSI in this embodiment may be independently implemented, or may be applied in combination, or may be separately combined with other embodiments in the present disclosure. This is not specifically limited herein.

In one embodiment, in this embodiment of the present disclosure, a first set may be the CSI corresponding to the first NZP CSI-RS resource, and a second set may be the CSI corresponding to the second NZP CSI-RS resource.

In one embodiment, in this embodiment of the present disclosure, a first set may be CSI corresponding to the first codeword (for example, the codeword 0), and a second set may be CSI corresponding to the second codeword (for example, a codeword 1).

In one embodiment, in this embodiment of the present disclosure, the first set, the first set, the first CSI set, the first set, and the first CSI set may have a same meaning, and may be replaced with each other. In addition, the first set may be replaced with the CSI for the first codeword (for example, the codeword 0), the CSI corresponding to the first NZP CSI-RS resource, or the like. This is not specifically limited herein.

In one embodiment, in this embodiment of the present disclosure, the second set, the second set, the second CSI set, the second set, and the second CSI set may have a same meaning, and may be replaced with each other. In addition, the second set may be replaced with the CSI for the second codeword (for example, the codeword 1), the CSI corresponding to the second NZP CSI-RS resource, or the like. This is not specifically limited herein.

There may be different reporting sequences (in this embodiment of the present disclosure, the reporting sequence may also be referred to as a feedback sequence) of PMIs and CQIs in a first set and a second set in one CSI process (or CSI reporting). For example, the terminal device determines, based on the first indication information, to feed back at least two CSI sets, where the at least two CSI sets include a first set of CSI and a second set of CSI, the first set of CSI includes a CQI of the first set and/or a PMI of the first set, and the second set of CSI includes a CQI of the second set and/or a PMI of the second set. Reporting method 1: A CQI (including the CQI of the first set and/or the CQI of the second set) is first reported, and then a PMI (including the PMI of the first set and/or the PMI of the second set) is reported. The method 1 further includes at least one of the following several methods:

Method 1.1: If the first set includes only the CQI, and the second set also includes only the CQI, the CQI of the first set and the CQI of the second set are sequentially reported.

Method 1.2: If the first set includes the CQI and the PMI, and the second set includes only the CQI, the CQI of the first set, the CQI of the second set, and the PMI of the first set are sequentially reported.

Method 1.3: If the first set includes the CQI and the PMI, and the second set includes the CQI and the PMI, the CQI of the first set, the CQI of the second set, the PMI of the first set, and the PMI of the second set are sequentially reported.

Method 1.4: If PMIs of each set include a first PMI and a second PMI, the first PMI (including the first PMI of the first set and/or the first PMI of the second set) is first reported, and then the second PMI (including the second PMI of the first set and/or the second PMI of the second set) is reported.

Method 1.5: If PMIs of each set include a first PMI and a second PMI, the first PMI and/or the second PMI of the first set are/is first reported, and then the first PMI and/or the second PMI of the second set are/is reported.

An example is used for description for the aperiodic reporting mode.

|  |  | PMI feedback type | | |
| --- | --- | --- | --- | --- |
|  |  | No PMI | Single PMI | Plurality of (Multiple) PMIs |
| Physical uplink shared channel (PUSCH) CQI Feedback Type | Wideband (wideband CQI) | Mode 1-0 | Mode 1-1 | Mode 1-2 |
|  | UE selected (subband CQI) | Mode 2-0 |  | Mode 2-2 |
|  | Higher layer-configured (subband CQI) | Mode 3-0 | Mode 3-1 | Mode 3-2 |

For example, in a wideband CQI reporting mode, if no PMI is fed back, a corresponding mode is the mode 1-0.

A specific mode to be used may be predefined in a protocol, or may be determined through interaction between a base station and the terminal, for example, notified by the base station to the terminal by using signaling.

The following describes cases in the three reporting modes for Reporting method 1. The three reporting modes are: the wideband CQI reporting mode, the higher layer-configured subband CQI reporting mode, and the UE selected subband CQI reporting mode. In one embodiment, at least one of the following methods may be used for at least one of the three reporting mode.

Specifically, the reporting mode in this embodiment of the present disclosure may alternatively be a reporting mode in NR, 5G, or a future research system. This is not specifically limited herein.

In one embodiment, the table in this embodiment of the present disclosure is used to determine a bit width of CSI feedback content, for example, may be a bit width for CQI and/or PMI feedback.

In one embodiment, a sequence of the PMI and/or the CQI in the table may also be a reporting sequence of the CSI. For example, the terminal may perform feedback from top to bottom based on the bit width indicated in the table. Alternatively, the base station may determine information indicated by the received CSI based on a sequence of the bit quantities indicated in the table. Specifically, a correspondence between a sequence and a reporting sequence in the table may be predefined in a protocol, or preconfigured on the base station and/or the terminal. This is not limited herein.

A. Wideband CQI Reporting Mode:

For wideband CQI reporting, when two CSI sets need to be reported, an example of a reporting sequence in which a CQI (including a CQI of the first set and/or a CQI of the second set) is first reported and then a PMI (including a PMI of the first set and/or a PMI of the second set) is reported is used below for description. Specifically, at least one of the following manners may be used: (A1) For the mode 1-2, the reporting manner may include at least one item in all tables shown in (A1).

In one embodiment, the mode 1-2 in the wideband CQI reporting mode may be a feedback mode of a wideband CQI and a subband PMI.

For example, the following Table 5.2.2.6.1-1L-1 may be used to indicate a bit width for CSI feedback and/or a CSI feedback sequence in the mode 1-2 when the first indication information is configured and when the quantity of antenna ports is 2 or 4 and no R12 codebook enhancement is configured. At least one of Table 5.2.2.6.1-1L-2-1 and Table 5.2.2.6.1-1L-2-2 may be used to indicate a bit width for CSI feedback and/or a CSI feedback sequence in the mode 1-2 when the first indication information is configured and when the quantity of antenna ports is 8. At least one of Table 5.2.2.6.1-1L-3-1 and Table 5.2.2.6.1-1L-3-2 may be used to indicate a bit width for CSI feedback and/or a CSI feedback sequence in the mode 1-2 when the first indication information is configured and when the quantity of antenna ports is 4 and R12 codebook enhancement is configured. CSI feedback in another configuration is also applicable. This is not specifically limited herein.

In one embodiment, the terminal may store at least one item in the following table. When the terminal configures a corresponding parameter, the terminal may determine a bit width for CSI feedback and/or a CSI feedback sequence based on a table corresponding to the parameter.

TABLE 5.2.2.6.1-1L-1

Scenarios for channel quality information feedback for wideband
CQI and subband PMI reporting (Fields for channel quality
information feedback for wideband CQI and subband PMI reports)
(the transmission mode 10 is configured with PMI/RI reporting
and the higher layer parameter eMIMO-Type, and eMIMO-Type
is set to the 'CLASS B' configured with two or four
antenna ports with K > 1 CSI-RS resources and configured
with the higher layer parameter FeCoMPCSIEnabled except with
configured R12 codebook enhancement)

| | 2 antenna ports | | 4 antenna ports | |
|---|---|---|---|---|
| Field | Rank = 1 | Rank = 2 | Rank = 1 | Rank > 1 |
| | Bit width for CRI = 0 or 1 | | | |
| Wideband CQI codeword 0 | 4 | 4 | 4 | 4 |
| Wideband CQI codeword 1 | 0 | 4 | 0 | 4 |
| Precoding matrix indicator | 2N | N | 4N | 4N |
| | Bit width for CRI = 2 | | | |
| Wideband CQI of first CSI set | 4 | 4 | 4 | 4 |
| Wideband CQI of second CSI set | 4 | 4 | 4 | 4 |
| Precoding matrix indicator of first CSI set | 2N | N | 4N | 4N |
| Precoding matrix indicator of second CSI set | 2N | N | 4N | 4N |

In the part "a bit width and/or a reporting sequence of content included in the CSI", N in the table is a quantity of subbands. Meanings in the following tables are similar to this, and details are not described again.

Through the foregoing table, the terminal may determine, based on the quantity of antenna ports, the value of the CRI, and a rank value, a bit width for CQI and/or PMI feedback, for example, a bit width of a wideband CQI corresponding to the codeword 0, a bit width of a wideband CQI corresponding to the codeword 1, and a bit width of the PMI when the CRI=0 or 1, for example, a bit width of a wideband CQI corresponding to the first CSI set, a bit width of a wideband CQI corresponding to the second CSI set, a bit width of a PMI corresponding to the first CSI set, and a bit width of a PMI corresponding to the second CSI set when the CRI=2.

In one embodiment, the terminal may determine the CSI feedback sequence based on content of the CSI in the table. For example, through the foregoing table, when the CRI=2, a feedback sequence of the two CSI sets is: a wideband CQI of the first set, a wideband CQI of the second set, the PMI of the first set, and the PMI of the second set. Explanations in other tables are similar to this, and details are not described again.

TABLE 5.2.2.6.1-1L-2-1

Scenarios for channel quality information feedback for wideband
CQI and subband PMI reporting (Fields for channel quality
information feedback for wideband CQI and subband PMI reports)
(the transmission mode 10 is configured with PMI/RI reporting
and the higher layer parameter eMIMO-Type, and eMIMO-Type
is set to the 'CLASS B' configured with eight antenna
ports with K > 1 CSI-RS resources and configured with
the higher layer parameter FeCoMPCSIEnabled)

| | Bit width for CRI = 0 or 1 | | | |
|---|---|---|---|---|
| Field | Rank = 1 | Rank = 2 | Rank = 3 | Rank = 4 |
| Wideband CQI codeword 0 | 4 | 4 | 4 | 4 |
| Wideband CQI codeword 1 | 0 | 4 | 4 | 4 |
| Wideband first PMI i1 | 4 | 4 | 2 | 2 |
| Subband second PMI i2 | 4N | 4N | 4N | 3N |

TABLE 5.2.2.6.1-1L-2-1-continued

Scenarios for channel quality information feedback for wideband
CQI and subband PMI reporting (Fields for channel quality
information feedback for wideband CQI and subband PMI reports)
(the transmission mode 10 is configured with PMI/RI reporting
and the higher layer parameter eMIMO-Type, and eMIMO-Type
is set to the 'CLASS B' configured with eight antenna
ports with K > 1 CSI-RS resources and configured with
the higher layer parameter FeCoMPCSIEnabled)

| | Bit width for CRI = 0 or 1 | | | |
|---|---|---|---|---|
| Field | Rank = 5 | Rank = 6 | Rank = 7 | Rank = 8 |
| Wideband CQI codeword 0 | 4 | 4 | 4 | 4 |
| Wideband CQI codeword 1 | 4 | 4 | 4 | 4 |
| Wideband first PMI i1 | 2 | 2 | 2 | 0 |
| Subband second PMI i2 | 0 | 0 | 0 | 0 |

| | Bit width for CRI = 2 | | | |
|---|---|---|---|---|
| Field | Rank = 1 | Rank = 2 | Rank = 3 | Rank = 4 |
| Wideband CQI of first set | 4 | 4 | 4 | 4 |
| Wideband CQI of second set | 4 | 4 | 4 | 4 |
| Wideband first PMI i1 of first set | 4 | 4 | 2 | 2 |
| Wideband first PMI i1 of second set | 4 | 4 | 2 | 2 |
| Subband second PMI i2 of first set | 4N | 4N | 4N | 3N |
| Subband second PMI i2 of second set | 4N | 4N | 4N | 3N |

The PMI i1 is the first PMI described above, and the PMI i2 is the second PMI described above. Meanings in the following tables are similar to this, and details are not described again.

Alternatively, Table 5.2.2.6.1-1L-2-1 may be replaced with the following Table 5.2.2.6.1-1L-2-2:

| | Bit width for CRI = 0 or 1 | | | |
|---|---|---|---|---|
| Field | Rank = 1 | Rank = 2 | Rank = 3 | Rank = 4 |
| Wideband CQI codeword 0 | 4 | 4 | 4 | 4 |
| Wideband CQI codeword 1 | 0 | 4 | 4 | 4 |
| Wideband first PMI i1 | 4 | 4 | 2 | 2 |
| Subband second PMI i2 | 4N | 4N | 4N | 3N |

| | Bit width for CRI = 0 or 1 | | | |
|---|---|---|---|---|
| Field | Rank = 5 | Rank = 6 | Rank = 7 | Rank = 8 |
| Wideband CQI codeword 0 | 4 | 4 | 4 | 4 |
| Wideband CQI codeword 1 | 4 | 4 | 4 | 4 |
| Wideband first PMI i1 | 2 | 2 | 2 | 0 |
| Subband second PMI i2 | 0 | 0 | 0 | 0 |

| | Bit width for CRI = 2 | | | |
|---|---|---|---|---|
| Field | Rank = 1 | Rank = 2 | Rank = 3 | Rank = 4 |
| Wideband CQI of first set | 4 | 4 | 4 | 4 |
| Wideband CQI of second set | 4 | 4 | 4 | 4 |
| Wideband first PMI i1 of first set | 4 | 4 | 2 | 2 |
| Subband second PMI i2 of first set | 4N | 4N | 4N | 3N |

-continued

| | | | | |
|---|---|---|---|---|
| Wideband first PMI i1 of second set | 4 | 4 | 2 | 2 |
| Subband second PMI i2 of second set | 4N | 4N | 4N | 3N |

A difference between Table 5.2.2.6.1-1L-2-1 and Table 5.2.2.6.1-1L-2-2 lies in that, in Table 5.2.2.6.1-1L-2-1, the first PMI of the first set and the first PMI of the second set are first reported, and then the second PMI of the first set and the second PMI of the second set are reported, while in Table 5.2.2.6.1-1L-2-2, the first PMI and the second PMI of the first set are first reported, and then the first PMI and the second PMI of the second set are reported.

TABLE 5.2.2.6.1-1L-3-1

Scenarios for channel quality information feedback for wideband CQI and subband PMI reporting with four antenna ports (Fields for channel quality information feedback for wideband CQI and subband PMI reports with 4 antenna ports) (the transmission mode 10 is configured with PMI/RI reporting and the higher layer parameter eMIMO-Type, eMIMO-Type is set to the 'CLASS B' configured with four antenna ports with K > 1 CSI-RS resources and configured with the higher layer parameter FeCoMPCSIEnabled with configured R12 codebook enhancement)

| Field | Rank = 1 | Rank = 2 | Rank = 3 | Rank = 4 |
|---|---|---|---|---|
| | Bit width for CRI = 0 or 1 | | | |
| Wideband CQI codeword 0 | 4 | 4 | 4 | 4 |
| Wideband CQI codeword 1 | 0 | 4 | 4 | 4 |
| Wideband first PMI i1 | 4 | 4 | 0 | 0 |
| Subband second PMI i2 | 4N | 4N | 4N | 4N |
| | Bit width for CRI = 2 | | | |
| Wideband CQI of first set | 4 | 4 | 4 | 4 |
| Wideband CQI of second set | 4 | 4 | 4 | 4 |
| Wideband first PMI i1 of first set | 4 | 4 | 0 | 0 |
| Wideband first PMI i1 of second set | 4 | 4 | 0 | 0 |
| Subband second PMI i2 of first set | 4N | 4N | 4N | 4N |
| Subband second PMI i2 of second set | 4N | 4N | 4N | 4N |

Alternatively, Table 5.2.2.6.1-1L-3-1 may be replaced with the following Table 5.2.2.6.1-1L-3-2:

| Field | Rank = 1 | Rank = 2 | Rank = 3 | Rank = 4 |
|---|---|---|---|---|
| | Bit width for CRI = 0 or 1 | | | |
| Wideband CQI codeword 0 | 4 | 4 | 4 | 4 |
| Wideband CQI codeword 1 | 0 | 4 | 4 | 4 |
| Wideband first PMI i1 | 4 | 4 | 0 | 0 |
| Subband second PMI i2 | 4N | 4N | 4N | 4N |
| | Bit width for CRI = 2 | | | |
| Wideband CQI of first set | 4 | 4 | 4 | 4 |
| Wideband CQI of second set | 4 | 4 | 4 | 4 |
| Wideband first PMI i1 of first set | 4 | 4 | 0 | 0 |
| Subband second PMI i2 of first set | 4N | 4N | 4N | 4N |
| Wideband first PMI i1 of second set | 4 | 4 | 0 | 0 |
| Subband second PMI i2 of second set | 4N | 4N | 4N | 4N |

A difference between Table 5.2.2.6.1-1L-3-1 and Table 5.2.2.6.1-1L-3-2 lies in that, in Table 5.2.2.6.1-1L-3-1-1, the first PMI of the first set and the first PMI of the second set are first reported, and then the second PMI of the first set and the second PMI of the second set are reported, while in Table 5.2.2.6.1-1L-3-2, the first PMI and the second PMI of the first set are first reported, and then the first PMI and the second PMI of the second set are reported.

(A2) For the mode 1-0, the reporting manner may include at least one item in Table 5.2.2.6.1-1L-6 and Table 5.2.2.6.1-1L-7.

In one embodiment, the mode 1-0 in the wideband CQI reporting mode may be a feedback mode of feedback of a wideband CQI and no feedback of a PMI.

For example, the following Table 5.2.2.6.1-1L-6 may be used to indicate a bit width for CSI feedback and/or a CSI feedback sequence in the mode 1-0 when the first indication information is configured and when the quantity of antenna ports is 1. Table 5.2.2.6.1-1L-7 may be used to indicate a bit width for CSI feedback and/or a CSI feedback sequence in the mode 1-0 when with the first indication information is configured and when the quantity of antenna ports is 2/4/8 and no PMI feedback is configured. CSI feedback in another configuration is also applicable. This is not specifically limited herein.

In one embodiment, the terminal may store at least one item in the following table. When the terminal configures a corresponding parameter, the terminal may determine a bit width for CSI feedback and/or a CSI feedback sequence based on a table corresponding to the parameter.

TABLE 5.2.2.6.1-1L-6

Scenarios for channel quality information feedback for wideband CQI reporting (Fields for channel quality information feedback for wideband CQI reports) (the transmission mode 10 is configured without PMI/RI reporting or configured with one antenna port and configured with the higher layer parameter FeCoMPCSIEnabled)

| Field | |
|---|---|
| | Bit width for CRI = 0 or 1 |
| Wide-band CQI | 4 |
| | Bit width for CRI = 2 |
| Wide-band CQI of first set | 4 |
| Wide-band CQI of second set | 4 |

TABLE 5.2.2.6.1-1L-7

Scenarios for channel quality information feedback for wideband CQI reporting (Fields for channel quality information feedback forwideband CQI reports) (the transmission mode 10 is configured without PMI reporting and configured with the higher layer parameter eMIMO-Type, and eMIMO-Type is set to the 'CLASS B' configured with two/four/eight antenna ports and configured with the higher layer parameter FeCoMPCSIEnabled)

| Field | Rank = 1 | Rank > 1 |
|---|---|---|
| | Bit width for CRI = 0 or 1 | |
| Wide-band CQI codeword 0 | 4 | 4 |
| Wide-band CQI codeword 1 | 0 | 4 |
| | Bit width for CRI = 2 | |
| Wide-band CQI of first set | 4 | 4 |
| Wide-band CQI of second set | 4 | 4 |

(A3) For the mode 1-1, the reporting manner may include at least one item in all tables shown in (A3).

In one embodiment, the mode 1-1 in the wideband CQI reporting mode may be a feedback mode of a wideband CQI and a wideband PMI.

For example, the following Table 5.2.2.6.1-1L-7 may be used to indicate a bit width for CSI feedback and/or a CSI feedback sequence in the mode 1-1 when the first indication information is configured and when the quantity of antenna ports is 2 or 4 and no R12 codebook enhancement is configured. At least one of Table 5.2.2.6.1-1L-8-1 and Table 5.2.2.6.1-1L-8-2 may be used to indicate a bit width for CSI feedback and/or a CSI feedback sequence in the mode 1-1 when the first indication information is configured and when the quantity of antenna ports is 8. At least one of Table 5.2.2.6.1-1L-9-1 and Table 5.2.2.6.1-1L-9-2 may be used to indicate a bit width for CSI feedback and/or a CSI feedback sequence in the mode 1-1 when the first indication information is configured and when the quantity of antenna ports is 4 and R12 codebook enhancement is configured. CSI feedback in another configuration is also applicable. This is not specifically limited herein.

In one embodiment, the terminal may store at least one item in the following table. When the terminal configures a corresponding parameter, the terminal may determine a bit width for CSI feedback and/or a CSI feedback sequence based on a table corresponding to the parameter.

TABLE 5.2.2.6.1-1L-7

Scenarios for channel quality information feedback for wideband CQI reporting (Fields for channel quality information feedback for wideband CQI reports) (the transmission mode 10 is configured with PMI/RI reporting with two/four antenna ports and the higher layer parameter eMIMO-Type, and eMIMO-Type is set to the 'CLASS B' with K > 1 and configured with the higher layer parameter FeCoMPCSIEnabled except with configured R12 codebook enhancement)

| | 2 antenna ports | | 4 antenna ports | |
|---|---|---|---|---|
| Field | Rank = 1 | Rank = 2 | Rank = 1 | Rank > 1 |
| | Bit width for CRI = 0 or 1 | | | |
| Wide-band CQI codeword 0 | 4 | 4 | 4 | 4 |
| Wide-band CQI codeword 1 | 0 | 4 | 0 | 4 |
| Precoding matrix indicator | 2 | 1 | 4 | 4 |
| | Bit width for CRI = 2 | | | |
| Wide-band CQI of first set | 4 | 4 | 4 | 4 |
| Wide-band CQI of second set | 4 | 4 | 4 | 4 |
| Precoding matrix indicator of first set | 2 | 1 | 4 | 4 |
| Precoding matrix indicator of second set | 2 | 1 | 4 | 4 |

TABLE 5.2.2.6.1-1L-8-1

Scenarios for channel quality information feedback for wideband CQI reporting (Fields for channel quality information feedback for wideband CQI reports) (the transmission mode 10 is configured with PMI/RI reporting with eight antenna ports and the higher layer parameter eMIMO-Type, and eMIMO-Type is set to the 'CLASS B' with K > 1 and configured with the higher layer parameter FeCoMPCSIEnabled)

| | Bit width for CRI = 0 or 1 | | | |
|---|---|---|---|---|
| Field | Rank = 1 | Rank = 2 | Rank = 3 | Rank = 4 |
| Wideband CQI codeword 0 | 4 | 4 | 4 | 4 |
| Wideband CQI codeword 1 | 0 | 4 | 4 | 4 |

TABLE 5.2.2.6.1-1L-8-1-continued

Scenarios for channel quality information feedback for wideband CQI reporting (Fields for channel quality information feedback for wideband CQI reports) (the transmission mode 10 is configured with PMI/RI reporting with eight antenna ports and the higher layer parameter eMIMO-Type, and eMIMO-Type is set to the 'CLASS B' with K > 1 and configured with the higher layer parameter FeCoMPCSIEnabled)

| | | | | |
|---|---|---|---|---|
| Wideband first PMI i1 | 4 | 4 | 2 | 2 |
| Wideband second PMI i2 | 4 | 4 | 4 | 3 |
| | Bit width for CRI = 0 or 1 | | | |
| Field | Rank = 5 | Rank = 6 | Rank = 7 | Rank = 8 |
| Wideband CQI codeword 0 | 4 | 4 | 4 | 4 |
| Wideband CQI codeword 1 | 4 | 4 | 4 | 4 |
| Wideband first PMI i1 | 2 | 2 | 2 | 0 |
| Wideband second PMI i2 | 0 | 0 | 0 | 0 |
| | Bit width for CRI = 2 | | | |
| Field | Rank = 1 | Rank = 2 | Rank = 3 | Rank = 4 |
| Wideband CQI of first set | 4 | 4 | 4 | 4 |
| Wideband CQI of second set | 4 | 4 | 4 | 4 |
| Wideband first PMI i1 of first set | 4 | 4 | 2 | 2 |
| Wideband second PMI i2 of first set | 4 | 4 | 4 | 3 |
| Wideband first PMI i1 of second set | 4 | 4 | 2 | 2 |
| Wideband second PMI i2 of second set | 4 | 4 | 4 | 3 |

Alternatively, Table 5.2.2.6.1-1L-8-1 may be replaced with the following Table 5.2.2.6.1-1L-8-2:

| | Bitwidth for CRI = 0 or 1 | | | |
|---|---|---|---|---|
| Field | Rank = 1 | Rank = 2 | Rank = 3 | Rank = 4 |
| Wideband CQI codeword 0 | 4 | 4 | 4 | 4 |
| Wideband CQI codeword 1 | 0 | 4 | 4 | 4 |
| Wideband first PMI i1 | 4 | 4 | 2 | 2 |
| Wideband second PMI i2 | 4 | 4 | 4 | 3 |
| | Bitwidth for CRI = 0 or 1 | | | |
| Field | Rank = 5 | Rank = 6 | Rank = 7 | Rank = 8 |
| Wideband CQI codeword 0 | 4 | 4 | 4 | 4 |
| Wideband CQI codeword 1 | 4 | 4 | 4 | 4 |
| Wideband first PMI i1 | 2 | 2 | 2 | 0 |
| Wideband second PMI i2 | 0 | 0 | 0 | 0 |
| | Bitwidth for CRI = 2 | | | |
| Field | Rank = 1 | Rank = 2 | Rank = 3 | Rank = 4 |
| Wideband CQI of first set | 4 | 4 | 4 | 4 |
| Wideband CQI of second set | 4 | 4 | 4 | 4 |
| Wideband first PMI i1 of first set | 4 | 4 | 2 | 2 |
| Wideband first PMI i1 of second set | 4 | 4 | 2 | 2 |
| Wideband second PMI i2 of first set | 4 | 4 | 4 | 3 |
| Wideband second PMI i2 of second set | 4 | 4 | 4 | 3 |

A difference between Table 5.2.2.6.1-1L-8-1 and Table 5.2.2.6.1-1L-8-2 lies in that, in Table 5.2.2.6.1-1L-8-1, the first PMI and the second PMI of the first set are first reported, and then the first PMI and the second PMI of the second set are reported, while in Table 5.2.2.6.1-1L-8-2, the first PMI of the first set and the first PMI of the second set are first reported, and then the second PMI of the first set and the second PMI of the second set are reported.

TABLE 5.2.2.6.1-1L-9-1

Scenarios for channel quality information feedback for wideband CQI reporting with four antenna ports (Fields for channel quality information feedback for wideband CQI reports with 4 antenna ports) (the transmission mode 10 is configured with PMI/RI reporting with four antenna ports and the higher layer parameter eMIMO-Type, and eMIMO-Type is set to the 'CLASS B' with K > 1 and configured with the higher layer parameter FeCoMPCSIEnabled with configured R12 codebook enhancement)

| Field | Rank = 1 | Rank = 2 | Rank = 3 | Rank = 4 |
|---|---|---|---|---|
| Bitwidth for CRI = 0 or 1 | | | | |
| Wideband CQI codeword 0 | 4 | 4 | 4 | 4 |
| Wideband CQI codeword 1 | 0 | 4 | 4 | 4 |
| Wideband first PMI i1 | 4 | 4 | 0 | 0 |
| Wideband second PMI i2 | 4 | 4 | 4 | 4 |
| Bitwidth for CRI = 2 | | | | |
| Wideband CQI of first set | 4 | 4 | 4 | 4 |
| Wideband CQI of second set | 4 | 4 | 4 | 4 |
| Wideband first PMI i1 of first set | 4 | 4 | 0 | 0 |
| Wideband second PMI i2 of first set | 4 | 4 | 4 | 4 |
| Wideband first PMI i1 of second set | 4 | 4 | 0 | 0 |
| Wideband second PMI i2 of second set | 4 | 4 | 4 | 4 |

Alternatively, Table 5.2.2.6.1-1L-9-1 may be replaced with the following Table 5.2.2.6.1-1L-9-2:

| Field | Rank = 1 | Rank = 2 | Rank = 3 | Rank = 4 |
|---|---|---|---|---|
| Bitwidth for CRI = 0 or 1 | | | | |
| Wideband CQI codeword 0 | 4 | 4 | 4 | 4 |
| Wideband CQI codeword 1 | 0 | 4 | 4 | 4 |
| Wideband first PMI i1 | 4 | 4 | 0 | 0 |
| Wideband second PMI i2 | 4 | 4 | 4 | 4 |
| Bitwidth for CRI = 2 | | | | |
| Wideband CQI of first set | 4 | 4 | 4 | 4 |
| Wideband CQI of second set | 4 | 4 | 4 | 4 |
| Wideband first PMI i1 of first set | 4 | 4 | 0 | 0 |
| Wideband first PMI i1 of second set | 4 | 4 | 0 | 0 |
| Wideband second PMI i2 of first set | 4 | 4 | 4 | 4 |
| Wideband second PMI i2 of second set | 4 | 4 | 4 | 4 |

A difference between Table 5.2.2.6.1-1L-9-1 and Table 5.2.2.6.1-1L-9-2 lies in that, in Table 5.2.2.6.1-1L-9-1, the first PMI and the second PMI of the first set are first reported, and then the first PMI and the second PMI of the second set are reported, while in Table 5.2.2.6.1-1L-9-2, the first PMI of the first set and the first PMI of the second set are first reported, and then the second PMI of the first set and the second PMI of the second set are reported.

B. Higher Layer-Configured Subband CQI Reporting Mode:

For higher layer-configured subband CQI reporting, when two CSI sets need to be reported, an example of a reporting sequence in which a CQI (including a CQI of the first set and/or a CQI of the second set) is first reported and then a PMI (including a PMI of the first set and/or a PMI of the second set) is reported is used below for description. Specifically, at least one of the following manners may be used: (B1) For the mode 3-0, the reporting manner may include at least one item in Table 5.2.2.6.2-1B-1 and Table 5.2.2.6.2-1B-2.

In one embodiment, the mode 3-0 in the higher layer-configured subband CQI reporting mode may be a feedback mode of feedback of a higher layer-configured subband CQI and no feedback of a PMI.

For example, the following Table 5.2.2.6.2-1B-1 may be used to indicate a bit width for CSI feedback and/or a CSI feedback sequence in the mode 3-0 when the first indication information is configured and when the quantity of antenna ports is 1. Table 5.2.2.6.2-1B-2 may be used to indicate a bit width for CSI feedback and/or a CSI feedback sequence in the mode 3-0 when the first indication information is configured and when the quantity of antenna ports is 2/4/8 and no PMI feedback is configured. CSI feedback in another configuration is also applicable. This is not specifically limited herein.

In one embodiment, the terminal may store at least one item in the following table. When the terminal configures a corresponding parameter, the terminal may determine a bit width for CSI feedback and/or a CSI feedback sequence based on a table corresponding to the parameter. CSI feedback in another configuration is also applicable. This is not specifically limited herein.

TABLE 5.2.2.6.2-1B-1

Scenarios for channel quality information feedback for higher layer-configured subband CQI reporting (Fields for channel quality information feedback for higher layer configured subband CQI reports) (the transmission mode 10 is configured with PMI/RI reporting or configured with one antenna port and configured with the higher layer parameter FeCoMPCSIEnabled)

| Field | |
|---|---|
| | Bit width for CRI = 0 or 1 |
| Wide-band CQI codeword | 4 |
| Subband differential CQI | 2N |
| | Bit width for CRI = 2 |
| Wide-band CQI of first set | 4 |
| Subband differential CQI of first set | 2N |
| Wide-band CQI of second set | 4 |
| Subband differential CQI of second set | 2N |

TABLE 5.2.2.6.2-1B-2

Scenarios for channel quality information feedback for higher
layer-configured subband CQI reporting (Fields for channel
quality information feedback for higher layer configured
subband CQI reports) (the transmission mode 10 is configured
without PMI reporting and configured with the higher layer
parameter eMIMO-Type, and eMIMO-Type is set to the 'CLASS
B' configured with two/four/eight antenna ports and configured
with the higher layer parameter FeCoMPCSIEnabled)

| Field | Rank = 1 | Rank > 1 |
|---|---|---|
| | Bit width for CRI = 0 or 1 | |
| Wide-band CQI codeword 0 | 4 | 4 |
| Subband differential CQI codeword 0 | 2N | 2N |
| Wide-band CQI codeword 1 | 0 | 4 |
| Subband differential CQI codeword 1 | 0 | 2N |
| | Bit width for CRI = 2 | |
| Wide-band CQI of first set | 4 | 4 |
| Subband differential CQI of first set | 2N | 2N |
| Wide-band CQI of second set | 4 | 4 |
| Subband differential CQI of second set | 2N | 2N |

(B2) For the mode 3-1, the reporting manner may include at least one item in all tables shown in (B2).

In one embodiment, the mode 3-1 in the higher layer-configured subband CQI reporting mode may be a feedback mode of a higher layer-configured subband CQI and a wideband PMI.

For example, the following Table 5.2.2.6.2-2F-1 may be used to indicate a bit width for CSI feedback and/or a CSI feedback sequence in the mode 3-1 when the first indication information is configured and when the quantity of antenna ports is 2 or 4 and no R12 codebook enhancement is configured. At least one of Table 5.2.2.6.2-2F-2-1 and Table 5.2.2.6.2-2F-2-2 may be used to indicate a bit width for CSI feedback and/or a CSI feedback sequence in the mode 3-1 when the first indication information is configured and when the quantity of antenna ports is 8. At least one of Table 5.2.2.6.2-2F-3-1 and Table 5.2.2.6.2-2F-3-2 may be used to indicate a bit width for CSI feedback and/or a CSI feedback sequence in the mode 3-1 when the first indication information is configured and when the quantity of antenna ports is 4 and R12 codebook enhancement is configured. CSI feedback in another configuration is also applicable. This is not specifically limited herein.

In one embodiment, the terminal may store at least one item in the following table. When the terminal configures a corresponding parameter, the terminal may determine a bit width for CSI feedback and/or a CSI feedback sequence based on a table corresponding to the parameter.

TABLE 5.2.2.6.2-2F-1

Scenarios for channel quality information feedback for higher
layer-configured subband CQI reporting (Fields for channel
quality information feedback for higher layer configured
subband CQI reports) (the transmission mode 10 is configured
with PMI/RI reporting with two/four antenna ports and the
higher layer parameter eMIMO-Type, and eMIMO-Type is set
to the 'CLASS B' with K > 1 and configured with
the higher layer parameter FeCoMPCSIEnabled except with
configured R12 codebook enhancement)

| | 2 antenna ports | | 4 antenna ports | |
|---|---|---|---|---|
| Field | Rank = 1 | Rank = 2 | Rank = 1 | Rank > 1 |
| | Bit width for CRI = 0 or 1 | | | |
| Wide-band CQI codeword 0 | 4 | 4 | 4 | 4 |
| Subband differential CQI codeword 0 | 2N | 2N | 2N | 2N |
| Wide-band CQI codeword 1 | 0 | 4 | 0 | 4 |
| Subband differential CQI codeword 1 | 0 | 2N | 0 | 2N |
| Precoding matrix indicator | 2 | 1 | 4 | 4 |
| | Bit width for CRI = 2 | | | |
| Wide-band CQI of first set | 4 | 4 | 4 | 4 |
| Subband differential CQI of first set | 2N | 2N | 2N | 2N |
| Wide-band CQI of second set | 4 | 4 | 0 | 4 |
| Subband differential CQI of second set | 2N | 2N | 0 | 2N |
| Precoding matrix indicator of first set | 2 | 1 | 4 | 4 |
| Precoding matrix indicator of second set | 2 | 1 | 4 | 4 |

TABLE 5.2.2.6.2-2F-2-1

Scenarios for channel quality information feedback for higher layer-
configured subband CQI reporting (Fields for channel quality information
feedback for higher layer configured subband CQI reports) (the
transmission mode 10 is configured with PMI/RI reporting with
eight antenna ports and the higher layer parameter eMIMO-Type,
and eMIMO-Type is set to the 'CLASS B' with K > 1 and
configured with the higher layer parameter FeCoMPCSIEnabled)

| | Bitwidth for CRI = 0 or 1 | | | |
|---|---|---|---|---|
| Field | Rank = 1 | Rank = 2 | Rank = 3 | Rank = 4 |
| Wideband CQI codeword 0 | 4 | 4 | 4 | 4 |
| Subband differential CQI codeword 0 | 2N | 2N | 2N | 2N |
| Wideband CQI codeword 1 | 0 | 4 | 4 | 4 |
| Subband differential CQI codeword 1 | 0 | 2N | 2N | 2N |
| Wideband first PMI i1 | 4 | 4 | 2 | 2 |
| Wideband second PMI i2 | 4 | 4 | 4 | 3 |
| | Bitwidth for CRI = 0 or 1 | | | |
| Field | Rank = 5 | Rank = 6 | Rank = 7 | Rank = 8 |
| Wideband CQI codeword 0 | 4 | 4 | 4 | 4 |
| Subband differential CQI codeword 0 | 2N | 2N | 2N | 2N |
| Wideband CQI codeword 1 | 4 | 4 | 4 | 4 |
| Subband differential CQI codeword 1 | 2N | 2N | 2N | 2N |
| Wideband first PMI i1 | 2 | 2 | 2 | 0 |
| Wideband second PMI i2 | 0 | 0 | 0 | 0 |

TABLE 5.2.2.6.2-2F-2-1-continued

Scenarios for channel quality information feedback for higher layer-configured subband CQI reporting (Fields for channel quality information feedback for higher layer configured subband CQI reports) (the transmission mode 10 is configured with PMI/RI reporting with eight antenna ports and the higher layer parameter eMIMO-Type, and eMIMO-Type is set to the 'CLASS B' with K > 1 and configured with the higher layer parameter FeCoMPCSIEnabled)

| Field | Bitwidth for CRI = 2 | | | |
|---|---|---|---|---|
| | Rank = 1 | Rank = 2 | Rank = 3 | Rank = 4 |
| Wideband CQI of first set | 4 | 4 | 4 | 4 |
| Subband differential CQI of first set | 2N | 2N | 2N | 2N |
| Wideband CQI of second set | 0 | 4 | 4 | 4 |
| Subband differential CQI of second set | 0 | 2N | 2N | 2N |
| Wideband first PMI i1 of first set | 4 | 4 | 2 | 2 |
| Wideband first PMI i1 of second set | 4 | 4 | 2 | 2 |
| Wideband second PMI i2 of first set | 4 | 4 | 4 | 3 |
| Wideband second PMI i2 of second set | 4 | 4 | 4 | 3 |

Alternatively, Table 5.2.2.6.2-2F-2-1 may be replaced with the following Table 5.2.2.6.2-2F-2-2:

| Field | Bitwidth for CRI = 0 or 1 | | | |
|---|---|---|---|---|
| | Rank = 1 | Rank = 2 | Rank = 3 | Rank = 4 |
| Wideband CQI codeword 0 | 4 | 4 | 4 | 4 |
| Subband differential CQI codeword 0 | 2N | 2N | 2N | 2N |
| Wideband CQI codeword 1 | 0 | 4 | 4 | 4 |
| Subband differential CQI codeword 1 | 0 | 2N | 2N | 2N |
| Wideband first PMI i1 | 4 | 4 | 2 | 2 |
| Wideband second PMI i2 | 4 | 4 | 4 | 3 |

| Field | Bitwidth for CRI = 0 or 1 | | | |
|---|---|---|---|---|
| | Rank = 5 | Rank = 6 | Rank = 7 | Rank = 8 |
| Wideband CQI codeword 0 | 4 | 4 | 4 | 4 |
| Subband differential CQI codeword 0 | 2N | 2N | 2N | 2N |
| Wideband CQI codeword 1 | 4 | 4 | 4 | 4 |
| Subband differential CQI codeword 1 | 2N | 2N | 2N | 2N |
| Wideband first PMI i1 | 2 | 2 | 2 | 0 |
| Wideband second PMI i2 | 0 | 0 | 0 | 0 |

| Field | Bitwidth for CRI = 2 | | | |
|---|---|---|---|---|
| | Rank = 1 | Rank = 2 | Rank = 3 | Rank = 4 |
| Wideband CQI of first set | 4 | 4 | 4 | 4 |
| Subband differential CQI of first set | 2N | 2N | 2N | 2N |
| Wideband CQI of second set | 0 | 4 | 4 | 4 |
| Subband differential CQI of second set | 0 | 2N | 2N | 2N |
| Wideband first PMI i1 of first set | 4 | 4 | 2 | 2 |
| Wideband second PMI i2 of first set | 4 | 4 | 4 | 3 |
| Wideband first PMI i1 of second set | 4 | 4 | 2 | 2 |
| Wideband second PMI i2 of second set | 4 | 4 | 4 | 3 |

TABLE 5.2.2.6.2-2F-3-1

Scenarios for channel quality information feedback for higher layer-configured subband CQI reporting with four antenna ports (Fields for channel quality information feedback for higher layer configured subband CQI reports with 4 antenna ports) (the transmission mode 10 is configured with PMI/RI reporting with four antenna ports and the higher layer parameter eMIMO-Type, and eMIMO-Type is set to the 'CLASS B' with K > 1 and configured with the higher layer parameter FeCoMPCSIEnabled with configured R12 codebook enhancement)

| Field | Rank = 1 | Rank = 2 | Rank = 3 | Rank = 4 |
|---|---|---|---|---|
| | Bitwidth for CRI = 0 or 1 | | | |
| Wideband CQI codeword 0 | 4 | 4 | 4 | 4 |
| Subband differential CQI codeword 0 | 2N | 2N | 2N | 2N |
| Wideband CQI codeword 1 | 0 | 4 | 4 | 4 |
| Subband differential CQI codeword 1 | 0 | 2N | 2N | 2N |
| Wideband first PMI i1 | 4 | 4 | 0 | 0 |
| Wideband second PMI i2 | 4 | 4 | 4 | 4 |
| | Bitwidth for CRI = 2 | | | |
| Wideband CQI of first set | 4 | 4 | 4 | 4 |
| Subband differential CQI of first set | 2N | 2N | 2N | 2N |
| Wideband CQI of second set | 4 | 4 | 4 | 4 |
| Subband differential CQI of second set | 2N | 2N | 2N | 2N |
| Wideband first PMI i1 of first set | 4 | 4 | 0 | 0 |
| Wideband first PMI i1 of second set | 4 | 4 | 0 | 0 |
| Wideband second PMI i2 of first set | 4 | 4 | 4 | 4 |
| Wideband second PMI i2 of second set | 4 | 4 | 4 | 4 |

Alternatively, Table 5.2.2.6.2-2F-3-1 may be replaced with the following Table 5.2.2.6.2-2F-3-2:

| Field | Rank = 1 | Rank = 2 | Rank = 3 | Rank = 4 |
|---|---|---|---|---|
| | Bitwidth for CRI = 0 or 1 | | | |
| Wideband CQI codeword 0 | 4 | 4 | 4 | 4 |
| Subband differential CQI codeword 0 | 2N | 2N | 2N | 2N |
| Wideband CQI codeword 1 | 0 | 4 | 4 | 4 |
| Subband differential CQI codeword 1 | 0 | 2N | 2N | 2N |
| Wideband first PMI i1 | 4 | 4 | 0 | 0 |
| Wideband second PMI i2 | 4 | 4 | 4 | 4 |
| | Bitwidth for CRI = 2 | | | |
| Wideband CQI of first set | 4 | 4 | 4 | 4 |
| Subband differential CQI of first set | 2N | 2N | 2N | 2N |
| Wideband CQI of second set | 4 | 4 | 4 | 4 |
| Subband differential CQI of second set | 2N | 2N | 2N | 2N |
| Wideband first PMI i1 of first set | 4 | 4 | 0 | 0 |
| Wideband second PMI i2 of first set | 4 | 4 | 4 | 4 |

-continued

| Field | Rank = 1 | Rank = 2 | Rank = 3 | Rank = 4 |
|---|---|---|---|---|
| Wideband first PMI i1 of second set | 4 | 4 | 0 | 0 |
| Wideband second PMI i2 of second set | 4 | 4 | 4 | 4 |

A difference between Table 5.2.2.6.2-2F-3-2 and Table 5.2.2.6.2-2F-3-1 lies in that, in Table 5.2.2.6.2-2F-3-2, the first PMI and the second PMI of the first set are first reported, and then the first PMI and the second PMI of the second set are reported, while in Table 5.2.2.6.2-2F-3-1, the first PMI of the first set and the first PMI of the second set are first reported, and then the second PMI of the first set and the second PMI of the second set are reported.

(B3) For the mode 3-2, the reporting manner may include at least one item in all tables shown in (B3).

In one embodiment, the mode 3-2 in the higher layer-configured subband CQI reporting mode may be a feedback mode of a higher layer-configured subband CQI and a subband PMI.

For example, the following Table 5.2.2.6.2-2G may be used to indicate a bit width for CSI feedback and/or a CSI feedback sequence in the mode 3-2 when the first indication information is configured and when the quantity of antenna ports is 2 or 4 and no R12 codebook enhancement is configured. At least one of Table 5.2.2.6.2-2G-1-1 and Table 5.2.2.6.2-2G-1-2 may be used to indicate a bit width for CSI feedback and/or a CSI feedback sequence in the mode 3-2 when the first indication information is configured and when the quantity of antenna ports is 8. At least one of Table 5.2.2.6.2-2G-2-1 and Table 5.2.2.6.2-2G-2-2 may be used to indicate a bit width for CSI feedback and/or a CSI feedback sequence in the mode 3-2 when the first indication information is configured and when the quantity of antenna ports is 4 and R12 codebook enhancement is configured. CSI feedback in another configuration is also applicable. This is not specifically limited herein.

In one embodiment, the terminal may store at least one item in the following table. When the terminal configures a corresponding parameter, the terminal may determine a bit width for CSI feedback and/or a CSI feedback sequence based on a table corresponding to the parameter.

TABLE 5.2.2.6.2-2G

Scenarios for channel quality information feedback for higher layer-configured subband CQI and subband PMI reporting (Fields for channel quality information feedback for higher layer configured subband CQI and subband PMI reports) (the transmission mode 10 is configured with subband PMI/RI reporting with two/four antenna ports and configured with the higher layer parameter eMIMO-Type, and eMIMO-Type is set to the 'CLASS B' with K > 1 and configured with the higher layer parameter FeCoMPCSIEnabled except with configured R12 codebook enhancement)

| Field | 2 antenna ports | | 4 antenna ports | | | |
|---|---|---|---|---|---|---|
| | Rank = 1 | Rank = 2 | Rank = 1 | Rank = 2 | Rank = 3 | Rank = 4 |
| | Bit width for CRI = 0 or 1 | | | | | |
| Wide-band CQI codeword 0 | 4 | 4 | 4 | 4 | 4 | 4 |
| Subband differential CQI codeword 0 | 2N | 2N | 2N | 2N | 2N | 2N |

TABLE 5.2.2.6.2-2G-continued

Scenarios for channel quality information feedback for higher layer-configured subband CQI and subband PMI reporting (Fields for channel quality information feedback for higher layer configured subband CQI and subband PMI reports) (the transmission mode 10 is configured with subband PMI/RI reporting with two/four antenna ports and configured with the higher layer parameter eMIMO-Type, and eMIMO-Type is set to the 'CLASS B' with K > 1 and configured with the higher layer parameter FeCoMPCSIEnabled except with configured R12 codebook enhancement)

| Field | 2 antenna ports | | 4 antenna ports | | | |
|---|---|---|---|---|---|---|
| | Rank = 1 | Rank = 2 | Rank = 1 | Rank = 2 | Rank = 3 | Rank = 4 |
| Wide-band CQI codeword 1 | 0 | 4 | 0 | 4 | 4 | 4 |
| Subband differential CQI codeword 1 | 0 | 2N | 0 | 2N | 2N | 2N |
| Subband precoding matrix indicator | 2N | N | 4N | 4N | 4N | 4N |
| | Bit width for CRI = 2 | | | | | |
| Wide-band CQI of first set | 4 | 4 | 4 | 4 | 4 | 4 |
| Subband differential CQI of first set | 2N | 2N | 2N | 2N | 2N | 2N |
| Wide-band CQI of second set | 4 | 4 | 4 | 4 | 4 | 4 |
| Subband differential CQI of second set | 2N | 2N | 2N | 2N | 2N | 2N |
| Subband precoding matrix indicator of first set | 2N | N | 4N | 4N | 4N | 4N |
| Subband precoding matrix indicator of second set | 2N | N | 4N | 4N | 4N | 4N |

TABLE 5.2.2.6.2-2G-1-1

Scenarios for channel quality information feedback for higher layer-configured subband CQI and subband PMI reporting with eight antenna ports (Fields for channel quality information feedback for higher layer configured subband CQI and subband PMI reports with 8 antenna ports) (the transmission mode 10 is configured with subband PMI/RI reporting and configured with the higher layer parameter eMIMO-Type, and eMIMO-Type is set to the 'CLASS B' with K > 1 and configured with the higher layer parameter FeCoMPCSIEnabled)

| Field | Bitwidth for CRI = 0 or 1 | | | |
|---|---|---|---|---|
| | Rank = 1 | Rank = 2 | Rank = 3 | Rank = 4 |
| Wideband CQI codeword 0 | 4 | 4 | 4 | 4 |
| Subband differential CQI codeword 0 | 2N | 2N | 2N | 2N |
| Wideband CQI codeword 1 | 0 | 4 | 4 | 4 |
| Subband differential CQI codeword 1 | 0 | 2N | 2N | 2N |

TABLE 5.2.2.6.2-2G-1-1-continued

Scenarios for channel quality information feedback for higher layer-configured subband CQI and subband PMI reporting with eight antenna ports (Fields for channel quality information feedback for higher layer configured subband CQI and subband PMI reports with 8 antenna ports) (the transmission mode 10 is configured with subband PMI/RI reporting and configured with the higher layer parameter eMIMO-Type, and eMIMO-Type is set to the 'CLASS B' with K > 1 and configured with the higher layer parameter FeCoMPCSIEnabled)

| | | | | |
|---|---|---|---|---|
| Wideband first PMI i1 | 4 | 4 | 2 | 2 |
| Subband second PMI i2 | 4N | 4N | 4N | 3N |

| | Bitwidth for CRI = 0 or 1 | | | |
|---|---|---|---|---|
| Field | Rank = 5 | Rank = 6 | Rank = 7 | Rank = 8 |
| Wideband CQI codeword 0 | 4 | 4 | 4 | 4 |
| Subband differential CQI codeword 0 | 2N | 2N | 2N | 2N |
| Wideband CQI codeword 1 | 4 | 4 | 4 | 4 |
| Subband differential CQI codeword 1 | 2N | 2N | 2N | 2N |
| Wideband first PMI i1 | 2 | 2 | 2 | 0 |
| Subband second PMI i2 | 0 | 0 | 0 | 0 |

| | Bitwidth for CRI = 2 | | | |
|---|---|---|---|---|
| Field | Rank = 1 | Rank = 2 | Rank = 3 | Rank = 4 |
| Wideband CQI of first set | 4 | 4 | 4 | 4 |
| Subband differential CQI of first set | 2N | 2N | 2N | 2N |
| Wideband CQI of second set | 4 | 4 | 4 | 4 |
| Subband differential CQI of second set | 2N | 2N | 2N | 2N |
| Wideband first PMI i1 of first set | 4 | 4 | 2 | 2 |
| Subband second PMI i2 of first set | 4N | 4N | 4N | 3N |
| Wideband first PMI i1 of second set | 4 | 4 | 2 | 2 |
| Subband second PMI i2 of second set | 4N | 4N | 4N | 3N |

Alternatively, Table 5.2.2.6.2-2G-1-1 may be replaced with the following Table 5.2.2.6.2-2G-1-2:

| | Bitwidth for CRI = 0 or 1 | | | |
|---|---|---|---|---|
| Field | Rank = 1 | Rank = 2 | Rank = 3 | Rank = 4 |
| Wideband CQI codeword 0 | 4 | 4 | 4 | 4 |
| Subband differential CQI codeword 0 | 2N | 2N | 2N | 2N |
| Wideband CQI codeword 1 | 0 | 4 | 4 | 4 |
| Subband differential CQI codeword 1 | 0 | 2N | 2N | 2N |
| Wideband first PMI i1 | 4 | 4 | 2 | 2 |
| Subband second PMI i2 | 4N | 4N | 4N | 3N |

| | Bitwidth for CRI = 0 or 1 | | | |
|---|---|---|---|---|
| Field | Rank = 5 | Rank = 6 | Rank = 7 | Rank = 8 |
| Wideband CQI codeword 0 | 4 | 4 | 4 | 4 |
| Subband differential CQI codeword 0 | 2N | 2N | 2N | 2N |
| Wideband CQI codeword 1 | 4 | 4 | 4 | 4 |
| Subband differential CQI codeword 1 | 2N | 2N | 2N | 2N |
| Wideband first PMI i1 | 2 | 2 | 2 | 0 |
| Subband second PMI i2 | 0 | 0 | 0 | 0 |

| | Bitwidth for CRI = 2 | | | |
|---|---|---|---|---|
| Field | Rank = 1 | Rank = 2 | Rank = 3 | Rank = 4 |
| Wideband CQI of first set | 4 | 4 | 4 | 4 |
| Subband differential CQI of first set | 2N | 2N | 2N | 2N |
| Wideband CQI of second set | 4 | 4 | 4 | 4 |
| Subband differential CQI of second set | 2N | 2N | 2N | 2N |
| Wideband first PMI i1 of first set | 4 | 4 | 2 | 2 |
| Wideband first PMI i1 of second set | 4 | 4 | 2 | 2 |
| Subband second PMI i2 of first set | 4N | 4N | 4N | 3N |
| Subband second PMI i2 of second set | 4N | 4N | 4N | 3N |

TABLE 5.2.2.6.2-2G-2-1

Scenarios for channel quality information feedback for higher layer-configured subband CQI and subband PMI reporting with four antenna ports (Fields for channel quality information feedback for higher layer configured subband CQI and subband PMI reports with 4 antenna ports) (the transmission mode 10 is configured with subband PMI/RI reporting with four antenna ports and configured with the higher layer parameter eMIMO-Type, and eMIMO-Type is set to the 'CLASS B' with K > 1 and configured with the higher layer parameter FeCoMPCSIEnabled with configured R12 codebook enhancement (transmission mode 10 configured with subband PMI/RI reporting with 4 antenna ports and higher layer parameter eMIMO-Type, and eMIMO-Type is set to 'CLASS B' with K > 1 and higher layer parameter FeCoMPCSIEnabled with alternativeCodeBookEnabledFor4TX-r12 = TRUE))

| | Rank = | Rank = | Rank = | Rank = |
|---|---|---|---|---|
| Field | 1 | 2 | 3 | 4 |
| | Bitwidth for CRI = 0 or 1 | | | |
| Wideband CQI codeword 0 | 4 | 4 | 4 | 4 |
| Subband differential CQI codeword 0 | 2N | 2N | 2N | 2N |
| Wideband CQI codeword 1 | 0 | 4 | 4 | 4 |
| Subband differential CQI codeword 1 | 0 | 2N | 2N | 2N |
| Wideband first PMI i1 | 4 | 4 | 0 | 0 |
| Subband second PMI i2 | 4N | 4N | 4N | 4N |
| | Bitwidth for CRI = 2 | | | |
| Wideband CQI of first set | 4 | 4 | 4 | 4 |
| Subband differential CQI of first set | 2N | 2N | 2N | 2N |
| Wideband CQI of second set | 4 | 4 | 4 | 4 |
| Subband differential CQI of second set | 2N | 2N | 2N | 2N |
| Wideband first PMI i1 of first set | 4 | 4 | 0 | 0 |
| Subband second PMI i2 of first set | 4N | 4N | 4N | 4N |
| Wideband first PMI i1 of second set | 4 | 4 | 0 | 0 |
| Subband second PMI i2 of second set | 4N | 4N | 4N | 4N |

Alternatively, Table 5.2.2.6.2-2G-2-1 may be replaced with the following Table 5.2.2.6.2-2G-2-2:

| Field | Rank = 1 | Rank = 2 | Rank = 3 | Rank = 4 |
|---|---|---|---|---|
| Bitwidth for CRI = 0 or 1 | | | | |
| Wideband CQI codeword 0 | 4 | 4 | 4 | 4 |
| Subband differential CQI codeword 0 | 2N | 2N | 2N | 2N |
| Wideband CQI codeword 1 | 0 | 4 | 4 | 4 |
| Subband differential CQI codeword 1 | 0 | 2N | 2N | 2N |
| Wideband first PMI i1 | 4 | 4 | 0 | 0 |
| Subband second PMI i2 | 4N | 4N | 4N | 4N |
| Bitwidth for CRI = 2 | | | | |
| Wideband CQI of first set | 4 | 4 | 4 | 4 |
| Subband differential CQI of first set | 2N | 2N | 2N | 2N |
| Wideband CQI of second set | 4 | 4 | 4 | 4 |
| Subband differential CQI of second set | 2N | 2N | 2N | 2N |
| Wideband first PMI i1 of first set | 4 | 4 | 0 | 0 |
| Wideband first PMI i1 of second set | 4 | 4 | 0 | 0 |
| Subband second PMI i2 of first set | 4N | 4N | 4N | 4N |
| Subband second PMI i2 of second set | 4N | 4N | 4N | 4N |

C. UE Selected Subband CQI Reporting Mode

For UE selected subband CQI reporting, for example, if UE selects M subbands, feedback of positions of the M selected subbands may be finally performed, that is, after all CQIs and/or PMIs are fed back in the UE selected subband CQI reporting mode; or may be performed after CQI feedback and before PMI feedback in the UE selected subband CQI reporting mode; or may be first performed for CSI in the UE selected subband CQI reporting mode, that is, performed before CQI and/or PMI feedback in the UE selected subband CQI reporting mode. This is not specifically limited.

In one embodiment, for the positions of the M selected subbands, only one reporting parameter may be fed back for two CSI sets, and the parameter is used to indicate the positions of the M selected subbands. Alternatively, each of the CSI sets may include one reporting parameter, and the reporting parameter is used to feed back the positions of the M selected subbands. This is not specifically limited herein.

An example of a reporting sequence of reporting a CQI (including a CQI of the first set and a CQI of the second set), the positions of the M selected subbands, and a PMI (including a PMI of the first set and a PMI of the second set) is used below for description.

(C1) For the mode 2-0, the reporting manner may include at least one item in Table 5.2.2.6.3-1B-1 and Table 5.2.2.6.3-1B-2.

In one embodiment, the mode 2-0 in the UE selected subband CQI reporting mode may be a feedback mode of feedback of a UE selected subband CQI and no feedback of a PMI.

For example, the following Table 5.2.2.6.3-1B-1 may be used to indicate a bit width for CSI feedback and/or a CSI feedback sequence in the mode 1-0 when the first indication information is configured and when the quantity of antenna ports is 1. Table 5.2.2.6.3-1B-2 may be used to indicate a bit width for CSI feedback and/or a CSI feedback sequence in the mode 1-0 when with the first indication information is configured and when the quantity of antenna ports is 2/4/8 and no PMI feedback is configured. CSI feedback in another configuration is also applicable. This is not specifically limited herein.

In one embodiment, the terminal may store at least one item in the following table. When the terminal configures a corresponding parameter, the terminal may determine a bit width for CSI feedback and/or a CSI feedback sequence based on a table corresponding to the parameter.

TABLE 5.2.2.63-1B-1

Scenarios for channel quality information feedback for UE selected subband CQI reporting (Fields for channel quality information feedback for UE selected subband CQI reports) (the transmission mode 10 is configured with PMI/RI reporting with one antenna port and configured with the higher layer parameter FeCoMPCSIEnabled)

| Field | |
|---|---|
| Bit width for CRI = 0 or 1 | |
| Wide-band CQI codeword | 4 |
| Subband differential CQI | 2 |
| Position of the M selected subbands | L |
| Bit width for CRI = 2 | |
| Wide-band CQI of first set | 4 |
| Subband differential CQI of first set | 2 |
| Wide-band CQI of second set | 4 |
| Subband differential CQI of second set | 2 |
| Position of the M selected subbands | L |

L indicates a quantity of bits occupied by feedback of the M subbands. Meanings in the following tables are similar to this, and details are not described again.

TABLE 5.2.2.63-1B-2

Scenarios for channel quality information feedback for UE selected subband CQI reporting (Fields for channel quality information feedback for UE selected subband CQI reports) (the transmission mode 10 is configured without PMI reporting and configured with the higher layer parameter eMIMO-Type, and eMIMO-Type is set to the 'CLASS B' with two/four/eight antenna ports and configured with the higher layer parameter FeCoMPCSIEnabled)

| Field | Rank = 1 | Rank > 1 |
|---|---|---|
| Bit width for CRI = 0 or 1 | | |
| Wide-band CQI codeword 0 | 4 | 4 |
| Subband differential CQI codeword 0 | 2 | 2 |
| Wide-band CQI codeword 1 | 0 | 4 |
| Subband differential CQI codeword 1 | 0 | 2 |
| Position of the M selected subbands | L | L |
| Bit width for CRI = 2 | | |
| Wide-band CQI of first set | 4 | 4 |
| Subband differential CQI of first set | 2 | 2 |
| Wide-band CQI of second set | 4 | 4 |
| Subband differential CQI of second set | 2 | 2 |
| Position of the M selected subbands | L | L |

(C2) For the mode 2-2, the reporting manner may include at least one item in all tables shown in (C2).

In one embodiment, the mode 2-2 in the UE selected subband CQI reporting mode may be a feedback mode of a wideband CQI and a subband PMI.

For example, the following Table 5.2.2.6.3-2K may be used to indicate a bit width for CSI feedback and/or a CSI feedback sequence in the mode 2-2 when the first indication information is configured and when the quantity of antenna ports is 2 or 4 and no R12 codebook enhancement is configured. At least one of Table 5.2.2.6.3-2K-1-1, Table 5.2.2.6.3-2K-1-2, and Table 5.2.2.6.3-2K-1-3 may be used to indicate a bit width for CSI feedback and/or a CSI feedback sequence in the mode 2-2 when the first indication information is configured and when the quantity of antenna ports is 8. At least one of Table 5.2.2.6.3-2K-2-1, Table 5.2.2.6.3-2K-2-2, and Table 5.2.2.6.3-2K-2-3 may be used to indicate a bit width for CSI feedback and/or a CSI feedback sequence in the mode 2-2 when the first indication information is configured and when the quantity of antenna ports is 4 and R12 codebook enhancement is configured. CSI feedback in another configuration is also applicable. This is not specifically limited herein.

In one embodiment, the terminal may store at least one item in the following table. When the terminal configures a corresponding parameter, the terminal may determine a bit width for CSI feedback and/or a CSI feedback sequence based on a table corresponding to the parameter.

TABLE 5.2.2.6.3-2K

Scenarios for channel quality information feedback for UE selected subband CQI reporting (Fields for channel quality information feedback for UE selected subband CQI reports) (the transmission mode 10 is configured with PMI/RI reporting with two/four antenna ports and configured with the higher layer parameter eMIMO-Type, and eMIMO-Type is set to 'CLASS B' with K > 1 and configured with the higher layer parameter FeCoMPCSIEnabled except with configured R12 codebook enhancement (transmission mode 10 configured with PMI/RI reporting with 2/4 antenna ports and higher layer parameter eMIMO-Type, and eMIMO-Type is set to 'CLASS B' with K > 1, and higher layer parameter FeCoMPCSIEnabled except with alternativeCodeBookEnabledFor4TX-r12 = TRUE))

| | 2 antenna ports | | 4 antenna ports | |
|---|---|---|---|---|
| Field | Rank = 1 | Rank = 2 | Rank = 1 | Rank > 1 |
| | Bit width for CRI = 0 or 1 | | | |
| Wide-band CQI codeword 0 | 4 | 4 | 4 | 4 |
| Subband differential CQI codeword 0 | 2 | 2 | 2 | 2 |
| Wide-band CQI codeword 1 | 0 | 4 | 0 | 4 |
| Subband differential CQI codeword 1 | 0 | 2 | 0 | 2 |
| Position of the M selected subbands | L | L | L | L |
| Precoding matrix indicator | 4 | 2 | 8 | 8 |
| | Bit width for CRI = 2 | | | |
| Wide-band CQI of first set | 4 | 4 | 4 | 4 |
| Subband differential CQI of first set | 2 | 2 | 2 | 2 |
| Wide-band CQI of second set | 4 | 4 | 4 | 4 |
| Subband differential CQI of second set | 2 | 2 | 2 | 2 |
| Position of the M selected subbands | L | L | L | L |
| Precoding matrix indicator of first set | 4 | 2 | 8 | 8 |
| Precoding matrix indicator of second set | 4 | 2 | 8 | 8 |

TABLE 5.2.2.6.3-2K-1-1

Scenarios for channel quality information feedback for UE selected subband CQI reporting (Fields for channel quality information feedback for UE selected subband CQI reports) (the transmission mode 10 is configured with PMI/RI reporting with eight antenna ports and configured with the higher layer parameter eMIMO-Type, and eMIMO-Type is set to the 'CLASS B' with K > 1 and configured with the higher layer parameter FeCoMPCSIEnabled)

| Field | Rank = 1 | Rank = 2 | Rank = 3 | Rank = 4 | Rank = 5 | Rank = 6 | Rank = 7 | Rank = 8 |
|---|---|---|---|---|---|---|---|---|
| | Bit width for CRI = 0 or 1 | | | | | | | |
| Wide-band CQI codeword 0 | 4 | 4 | 4 | 4 | 4 | 4 | 4 | 4 |
| Subband differential CQI codeword 0 | 2 | 2 | 2 | 2 | 2 | 2 | 2 | 2 |
| Wide-band CQI codeword 1 | 0 | 4 | 4 | 4 | 4 | 4 | 4 | 4 |
| Subband differential CQI codeword 1 | 0 | 2 | 2 | 2 | 2 | 2 | 2 | 2 |

TABLE 5.2.2.6.3-2K-1-1-continued

Scenarios for channel quality information feedback for UE selected subband CQI reporting (Fields for channel quality information feedback for UE selected subband CQI reports) (the transmission mode 10 is configured with PMI/RI reporting with eight antenna ports and configured with the higher layer parameter eMIMO-Type, and eMIMO-Type is set to the 'CLASS B' with K > 1 and configured with the higher layer parameter FeCoMPCSIEnabled)

|  | Bit width for CRI = 0 or 1 | | | | | | | |
|---|---|---|---|---|---|---|---|---|
| Position of the M selected subbands | L | L | L | L | L | L | L | L |
| Wideband first PMI i1 | 4 | 4 | 2 | 2 | 2 | 2 | 2 | 0 |
| Wideband second PMI i2 | 4 | 4 | 4 | 3 | 0 | 0 | 0 | 0 |
| Subband second PMI i2 | 4 | 4 | 4 | 3 | 0 | 0 | 0 | 0 |

|  | Bit width for CRI = 2 | | | |
|---|---|---|---|---|
| Field | Rank = 1 | Rank = 2 | Rank = 3 | Rank = 4 |
| Wide-band CQI of first set | 4 | 4 | 4 | 4 |
| Subband differential CQI of first set | 2 | 2 | 2 | 2 |
| Wide-band CQI of second set | 4 | 4 | 4 | 4 |
| Subband differential CQI of second set | 2 | 2 | 2 | 2 |
| Position of the M selected subbands | L | L | L | L |
| Wideband first PMI i1 of first set | 4 | 4 | 2 | 2 |
| Wideband first PMI i1 of second set | 4 | 4 | 2 | 2 |
| Wideband second PMI i2 of first set | 4 | 4 | 4 | 3 |
| Wideband second PMI i2 of second set | 4 | 4 | 4 | 3 |
| Subband second PMI i2 of first set | 4 | 4 | 4 | 3 |
| Subband second PMI i2 of second set | 4 | 4 | 4 | 3 |

Alternatively, Table 5.2.2.6.3-2K-1-1 may be replaced with the following Table 5.2.2.6.3-2K-1-2:

|  | Bit width for CRI = 0 or 1 | | | | | | | |
|---|---|---|---|---|---|---|---|---|
| Field | Rank = 1 | Rank = 2 | Rank = 3 | Rank = 4 | Rank = 5 | Rank = 6 | Rank = 7 | Rank = 8 |
| Wide-band CQI codeword 0 | 4 | 4 | 4 | 4 | 4 | 4 | 4 | 4 |
| Subband differential CQI codeword 0 | 2 | 2 | 2 | 2 | 2 | 2 | 2 | 2 |
| Wide-band CQI codeword 1 | 0 | 4 | 4 | 4 | 4 | 4 | 4 | 4 |
| Subband differential CQI codeword 1 | 0 | 2 | 2 | 2 | 2 | 2 | 2 | 2 |
| Position of the M selected subbands | L | L | L | L | L | L | L | L |
| Wideband first PMI i1 | 4 | 4 | 2 | 2 | 2 | 2 | 2 | 0 |
| Wideband second PMI i2 | 4 | 4 | 4 | 3 | 0 | 0 | 0 | 0 |
| Subband second PMI i2 | 4 | 4 | 4 | 3 | 0 | 0 | 0 | 0 |

|  | Bit width for CRI = 2 | | | |
| --- | --- | --- | --- | --- |
| Field | Rank = 1 | Rank = 2 | Rank = 3 | Rank = 4 |
| Wide-band CQI of first set | 4 | 4 | 4 | 4 |
| Subband differential CQI of first set | 2 | 2 | 2 | 2 |
| Wide-band CQI of second set | 4 | 4 | 4 | 4 |
| Subband differential CQI of second set | 2 | 2 | 2 | 2 |
| Position of the M selected subbands | L | L | L | L |
| Wideband first PMI i1 of first set | 4 | 4 | 2 | 2 |
| Wideband second PMI i2 of first set | 4 | 4 | 4 | 3 |
| Subband second PMI i2 of first set | 4 | 4 | 4 | 3 |
| Wideband first PMI i1 of second set | 4 | 4 | 2 | 2 |
| Wideband second PMI i2 of second set | 4 | 4 | 4 | 3 |
| Subband second PMI i2 of second set | 4 | 4 | 4 | 3 |

Alternatively, Table 5.2.2.6.3-2K-1-1 or Table 5.2.2.6.3-2K-1-2 may be replaced with the following Table 5.2.2.6.3-2K-1-3:

| Field | Rank = 1 | Rank = 2 | Rank = 3 | Rank = 4 | Rank = 5 | Rank = 6 | Rank = 7 | Rank = 8 |
| --- | --- | --- | --- | --- | --- | --- | --- | --- |
| Bit width for CRI = 0 or 1 | | | | | | | | |
| Wide-band CQI codeword 0 | 4 | 4 | 4 | 4 | 4 | 4 | 4 | 4 |
| Subband differential CQI codeword 0 | 2 | 2 | 2 | 2 | 2 | 2 | 2 | 2 |
| Wide-band CQI codeword 1 | 0 | 4 | 4 | 4 | 4 | 4 | 4 | 4 |
| Subband differential CQI codeword 1 | 0 | 2 | 2 | 2 | 2 | 2 | 2 | 2 |
| Bit width for CRI = 0 or 1 | | | | | | | | |
| Position of the M selected subbands | L | L | L | L | L | L | L | L |
| Wideband first PMI i1 | 4 | 4 | 2 | 2 | 2 | 2 | 2 | 0 |
| Wideband second PMI i2 | 4 | 4 | 4 | 3 | 0 | 0 | 0 | 0 |
| Subband second PMI i2 | 4 | 4 | 4 | 3 | 0 | 0 | 0 | 0 |

|  | Bit width for CRI = 2 | | | |
| --- | --- | --- | --- | --- |
| Field | Rank = 1 | Rank = 2 | Rank = 3 | Rank = 4 |
| Wide-band CQI of first set | 4 | 4 | 4 | 4 |
| Subband differential CQI of first set | 2 | 2 | 2 | 2 |
| Wide-band CQI of second set | 4 | 4 | 4 | 4 |
| Subband differential CQI of second set | 2 | 2 | 2 | 2 |
| Position of the M selected subbands | L | L | L | L |
| Wideband first PMI i1 of first set | 4 | 4 | 2 | 2 |
| Wideband second PMI i2 of first set | 4 | 4 | 4 | 3 |
| Wideband first PMI i1 of second set | 4 | 4 | 2 | 2 |
| Wideband second PMI i2 of second set | 4 | 4 | 4 | 3 |
| Subband second PMI i2 of first set | 4 | 4 | 4 | 3 |
| Subband second PMI i2 of second set | 4 | 4 | 4 | 3 |

TABLE 5.2.2.6.3-2K-2-1

Scenarios for channel quality information feedback for UE selected subband CQI reporting with four antenna ports (Fields for channel quality information feedback for UE selected subband CQI reports with 4 antenna ports) (the transmission mode 10 is configured with PMI/RI reporting with four antenna ports and configured with the higher layer parameter eMIMO-Type, and eMIMO-Type is set to the 'CLASS B' with K > 1 and configured with the higher layer parameter FeCoMPCSIEnabled with configured R12 codebook enhancement (transmission mode 10 configured with PMI/RI reporting with 4 antenna ports and higher layer parameter eMIMO-Type, and eMIMO-Type is set to 'CLASS B' with K > 1, and higher layer parameter FeCoMPCSIEnabled with alternativeCodeBookEnabledFor4TX-r12 = TRUE))

| Field | Rank = 1 | Rank = 2 | Rank = 3 | Rank = 4 |
|---|---|---|---|---|
| Bit width for CRI = 0 or 1 | | | | |
| Wide-band CQI codeword 0 | 4 | 4 | 4 | 4 |
| Subband differential CQI codeword 0 | 2 | 2 | 2 | 2 |
| Wide-band CQI codeword 1 | 0 | 4 | 4 | 4 |
| Subband differential CQI codeword 1 | 0 | 2 | 2 | 2 |
| Position of the M selected subbands | L | L | L | L |
| Wideband first PMI i1 | 4 | 4 | 0 | 0 |
| Wideband second PMI i2 | 4 | 4 | 4 | 4 |
| Subband second PMI i2 | 4 | 4 | 4 | 4 |
| Bit width for CRI = 2 | | | | |
| Wide-band CQI of first set | 4 | 4 | 4 | 4 |
| Subband differential CQI of first set | 2 | 2 | 2 | 2 |
| Wide-band CQI of second set | 4 | 4 | 4 | 4 |
| Subband differential CQI of second set | 2 | 2 | 2 | 2 |
| Position of the M selected subbands | L | L | L | L |
| Wideband first PMI i1 of first set | 4 | 4 | 0 | 0 |
| Wideband first PMI i1 of second set | 4 | 4 | 0 | 0 |
| Wideband second PMI i2 of first set | 4 | 4 | 4 | 4 |
| Wideband second PMI i2 of second set | 4 | 4 | 4 | 4 |
| Subband second PMI i2 of first set | 4 | 4 | 4 | 4 |
| Subband second PMI i2 of second set | 4 | 4 | 4 | 4 |

Alternatively, Table 5.2.2.6.3-2K-2-1 may be replaced with the following Table 5.2.2.6.3-2K-2-2:

| Field | Rank = 1 | Rank = 2 | Rank = 3 | Rank = 4 |
|---|---|---|---|---|
| Bit width for CRI = 0 or 1 | | | | |
| Wide-band CQI codeword 0 | 4 | 4 | 4 | 4 |
| Subband differential CQI codeword 0 | 2 | 2 | 2 | 2 |
| Wide-band CQI codeword 1 | 0 | 4 | 4 | 4 |
| Subband differential CQI codeword 1 | 0 | 2 | 2 | 2 |
| Position of the M selected subbands | L | L | L | L |
| Wideband first PMI i1 | 4 | 4 | 0 | 0 |
| Wideband second PMI i2 | 4 | 4 | 4 | 4 |
| Subband second PMI i2 | 4 | 4 | 4 | 4 |
| Bit width for CRI = 2 | | | | |
| Wide-band CQI of first set | 4 | 4 | 4 | 4 |
| Subband differential CQI of first set | 2 | 2 | 2 | 2 |
| Wide-band CQI of second set | 4 | 4 | 4 | 4 |
| Subband differential CQI of second set | 2 | 2 | 2 | 2 |
| Position of the M selected subbands | L | L | L | L |
| Wideband first PMI i1 of first set | 4 | 4 | 0 | 0 |
| Wideband second PMI i2 of first set | 4 | 4 | 4 | 4 |
| Subband second PMI i2 of first set | 4 | 4 | 4 | 4 |
| Wideband first PMI i1 of second set | 4 | 4 | 0 | 0 |
| Wideband second PMI i2 of second set | 4 | 4 | 4 | 4 |
| Subband second PMI i2 of second set | 4 | 4 | 4 | 4 |

Alternatively, Table 5.2.2.6.3-2K-2-1 or Table 5.2.2.6.3-2K-2-2 may be replaced with the following Table 5.2.2.6.3-2K-2-3:

| Field | Rank = 1 | Rank = 2 | Rank = 3 | Rank = 4 |
|---|---|---|---|---|
| Bit width for CRI = 0 or 1 | | | | |
| Wide-band CQI codeword 0 | 4 | 4 | 4 | 4 |
| Subband differential CQI codeword 0 | 2 | 2 | 2 | 2 |
| Wide-band CQI codeword 1 | 0 | 4 | 4 | 4 |
| Subband differential CQI codeword 1 | 0 | 2 | 2 | 2 |
| Position of the M selected subbands | L | L | L | L |
| Wideband first PMI i1 | 4 | 4 | 0 | 0 |
| Wideband second PMI i2 | 4 | 4 | 4 | 4 |
| Subband second PMI i2 | 4 | 4 | 4 | 4 |
| Bit width for CRI = 2 | | | | |
| Wide-band CQI of first set | 4 | 4 | 4 | 4 |
| Subband differential CQI of first set | 2 | 2 | 2 | 2 |
| Wide-band CQI of second set | 4 | 4 | 4 | 4 |
| Subband differential CQI of second set | 2 | 2 | 2 | 2 |
| Position of the M selected subbands | L | L | L | L |
| Wideband first PMI i1 of first set | 4 | 4 | 0 | 0 |
| Wideband second PMI i2 of first set | 4 | 4 | 4 | 4 |
| Wideband first PMI i1 of second set | 4 | 4 | 0 | 0 |
| Wideband second PMI i2 of second set | 4 | 4 | 4 | 4 |
| Subband second PMI i2 of first set | 4 | 4 | 4 | 4 |
| Subband second PMI i2 of second set | 4 | 4 | 4 | 4 |

For the reporting sequence of the PMI and the CQI, refer to the reporting method 1 described above. To be specific, the CQI (including the CQI of the first set and the CQI of the second set) is first reported, and then the PMI (including the PMI of the first set and the PMI of the second set) is reported. A reporting method 2 is described below.

Reporting method 2: The first set (including the CQI and/or the PMI of the first set) is first reported, and then the second set (including the CQI and/or the PMI of the second set) is reported. The method 2 further includes at least one of the following several specific methods:

Method 2.1: If the first set includes the CQI and the PMI, and the second set includes only the CQI, the CQI of the first set, the PMI of the first set, and the CQI of the second set are sequentially reported.

Method 2.2: If the first set includes the CQI, and the second set includes the CQI and the PMI, the CQI of the first set, the CQI of the second set, and the PMI of the second set are sequentially reported.

Method 2.3: If the first set includes the CQI and the PMI, and the second set includes the CQI and the PMI, the CQI of the first set, the PMI of the first set, the CQI of the second set, and the PMI of the second set are sequentially reported.

The following describes cases in the three reporting modes for Reporting method 2. The three reporting modes are: the wideband CQI reporting mode, the higher layer-configured subband CQI reporting mode, and the UE selected subband CQI reporting mode. In one embodiment, at least one of the following methods may be used for at least one of the three reporting mode.

D. Wideband CQI Reporting Mode:

For wideband CQI reporting, when two CSI sets need to be reported, an example of a reporting sequence in which the first set (including a CQI/PMI) is first reported, and then the second set (including a CQI/PMI) is reported is used below for description. Specifically, at least one of the following manners may be used:

(D1) For the mode 1-2, the reporting manner may include at least one item in all tables shown in (D1).

In one embodiment, the mode 1-2 in the wideband CQI reporting mode may be a feedback mode of a wideband CQI and a subband PMI.

For example, the following Table 5.2.2.6.1-1L-1-1 may be used to indicate a bit width for CSI feedback and/or a CSI feedback sequence in the mode 1-2 when the first indication information is configured and when the quantity of antenna ports is 2 or 4 and no R12 codebook enhancement is configured. Table 5.2.2.6.1-1L-2-3 may be used to indicate a bit width for CSI feedback and/or a CSI feedback sequence in the mode 1-2 when the first indication information is configured and when the quantity of antenna ports is 8. Table 5.2.2.6.1-1L-3-3 may be used to indicate a bit width for CSI feedback and/or a CSI feedback sequence in the mode 1-2 when the first indication information is configured and when the quantity of antenna ports is 4 and R12 codebook enhancement is configured. CSI feedback in another configuration is also applicable. This is not specifically limited herein.

In one embodiment, the terminal may store at least one item in the following table. When the terminal configures a corresponding parameter, the terminal may determine a bit width for CSI feedback and/or a CSI feedback sequence based on a table corresponding to the parameter.

TABLE 5.2.2.6.1-1L-1-1

Scenarios for channel quality information feedback for wideband CQI and subband PMI reporting (Fields for channel quality information feedback for wideband CQI and subband PMI reports) (the transmission mode 10 is configured with PMI/RI reporting and the higher layer parameter eMIMO-Type, and eMIMO-Type is set to the 'CLASS B' with two/four antenna ports 2/4 with K > 1 and configured with the higher layer parameter FeCoMPCSIEnabled except with configured R12 codebook enhancement (transmission mode 10 configured with PMI/RI reporting and higher layer parameter eMIMO-Type, and eMIMO-Type is set to 'CLASS B' with 2/4 antenna ports with K > 1 and higher layer parameter FeCoMPCSIEnabled except with alternativeCodeBookEnabledFor4TX- r12 = TRUE))

| | 2 antenna ports | | 4 antenna ports | |
|---|---|---|---|---|
| Field | Rank = 1 | Rank = 2 | Rank = 1 | Rank > 1 |
| | Bit width for CRI = 0 or 1 | | | |
| Wideband CQI codeword 0 | 4 | 4 | 4 | 4 |
| Wideband CQI codeword 1 | 0 | 4 | 0 | 4 |
| Precoding matrix indicator | 2N | N | 4N | 4N |
| | Bit width for CRI = 2 | | | |
| Wideband CQI of first CSI set | 4 | 4 | 4 | 4 |
| Precoding matrix indicator of first CSI set | 2N | N | 4N | 4N |
| Wideband CQI of second CSI set | 4 | 4 | 4 | 4 |
| Precoding matrix indicator of second CSI set | 2N | N | 4N | 4N |

TABLE 5.2.2.6.1-1L-2-3

Scenarios for channel quality information feedback for wideband CQI and subband PMI reporting (Fields for channel quality information feedback for wideband CQI and subband PMI reports) (the transmission mode 10 is configured with PMI/RI reporting and the higher layer parameter eMIMO-Type, and eMIMO-Type is set to the 'CLASS B' with eight antenna ports with K > 1 and configured with the higher layer parameter FeCoMPCSIEnabled)

| | Bit width for CRI = 0 or 1 | | | |
|---|---|---|---|---|
| Field | Rank = 1 | Rank = 2 | Rank = 3 | Rank = 4 |
| Wideband CQI codeword 0 | 4 | 4 | 4 | 4 |
| Wideband CQI codeword 1 | 0 | 4 | 4 | 4 |
| Wideband first PMI i1 | 4 | 4 | 2 | 2 |
| Subband second PMI i2 | 4N | 4N | 4N | 3N |
| | Bit width for CRI = 0 or 1 | | | |
| Field | Rank = 5 | Rank = 6 | Rank = 7 | Rank = 8 |
| Wideband CQI codeword 0 | 4 | 4 | 4 | 4 |
| Wideband CQI codeword 1 | 4 | 4 | 4 | 4 |
| Wideband first PMI i1 | 2 | 2 | 2 | 0 |
| Subband second PMI i2 | 0 | 0 | 0 | 0 |
| | Bit width for CRI = 2 | | | |
| Field | Rank = 1 | Rank = 2 | Rank = 3 | Rank = 4 |
| Wideband CQI of first set | 4 | 4 | 4 | 4 |
| Wideband first PMI i1 of first set | 4 | 4 | 2 | 2 |
| Subband second PMI i2 of first set | 4N | 4N | 4N | 3N |
| Wideband CQI of second set | 4 | 4 | 4 | 4 |
| Wideband first PMI i1 of second set | 4 | 4 | 2 | 2 |

TABLE 5.2.2.6.1-1L-2-3-continued

Scenarios for channel quality information feedback for wideband CQI and subband PMI reporting (Fields for channel quality information feedback for wideband CQI and subband PMI reports) (the transmission mode 10 is configured with PMI/RI reporting and the higher layer parameter eMIMO-Type, and eMIMO-Type is set to the 'CLASS B' with eight antenna ports with K > 1 and configured with the higher layer parameter FeCoMPCSIEnabled)

| | | | | |
|---|---|---|---|---|
| Subband second PMI i2 of second set | 4N | 4N | 4N | 3N |

TABLE 5.2.2.6.1-1L-3-3

Scenarios for channel quality information feedback for wideband CQI and subband PMI reporting with four antenna ports (Fields for channel quality information feedback for wideband CQI and subband PMI reports with 4 antenna ports) (the transmission mode 10 is configured with PMI/RI reporting and the higher layer parameter eMIMO-Type, and eMIMO-Type is set to the 'CLASS B' with four antenna ports with K > 1 and configured with the higher layer parameter FeCoMPCSIEnabled with configured R12 codebook enhancement (transmission mode 10 configured with PMI/RI reporting and higher layer parameter eMIMO-Type, and eMIMO-Type is set to 'CLASS B' with 4 antenna ports with K > 1, and higher layer parameter FeCoMPCSIEnabled with alternativeCodeBookEnabledFor4TX-r12 = TRUE))

| Field | Rank = 1 | Rank = 2 | Rank = 3 | Rank = 4 |
|---|---|---|---|---|
| | Bit width for CRI = 0 or 1 | | | |
| Wideband CQI codeword 0 | 4 | 4 | 4 | 4 |
| Wideband CQI codeword 1 | 0 | 4 | 4 | 4 |
| Wideband first PMI i1 | 4 | 4 | 0 | 0 |
| Subband second PMI i2 | 4N | 4N | 4N | 4N |
| | Bit width for CRI = 2 | | | |
| Wideband CQI of first set | 4 | 4 | 4 | 4 |
| Wideband first PMI i1 of first set | 4 | 4 | 0 | 0 |
| Subband second PMI i2 of first set | 4N | 4N | 4N | 4N |
| Wideband CQI of second set | 4 | 4 | 4 | 4 |
| Wideband first PMI i1 of second set | 4 | 4 | 0 | 0 |
| Subband second PMI i2 of second set | 4N | 4N | 4N | 4N |

(D2) For the mode 1-0, the reporting manner may include at least one item in Table 5.2.2.6.1-1L-6-1 and Table 5.2.2.6.1-1L-7-1.

In one embodiment, the mode 1-0 in the wideband CQI reporting mode may be a feedback mode of feedback of a wideband CQI and no feedback of a PMI.

For example, the following Table 5.2.2.6.1-1L-6-1 may be used to indicate a bit width for CSI feedback and/or a CSI feedback sequence in the mode 1-0 when the first indication information is configured and when the quantity of antenna ports is 1. Table 5.2.2.6.1-1L-7-1 may be used to indicate a bit width for CSI feedback and/or a CSI feedback sequence in the mode 1-0 when the first indication information is configured and when the quantity of antenna ports is 2/4/8 and no PMI/RI feedback is configured. CSI feedback in another configuration is also applicable. This is not specifically limited herein.

In one embodiment, the terminal may store at least one item in the following table. When the terminal configures a corresponding parameter, the terminal may determine a bit width for CSI feedback and/or a CSI feedback sequence based on a table corresponding to the parameter.

TABLE 5.2.2.6.1-1L-6-1

Scenarios for channel quality information feedback for wideband CQI reporting (Fields for channel quality information feedback for wideband CQI reports) (the transmission mode 10 is configured without PMI/RI reporting or configured with one antenna port and configured with the higher layer parameter FeCoMPCSIEnabled)

| Field | |
|---|---|
| | Bit width for CRI = 0 or 1 |
| Wide-band CQI | 4 |
| | Bit width for CRI = 2 |
| Wide-band CQI of first set | 4 |
| Wide-band CQI of second set | 4 |

TABLE 5.2.2.6.1-1L-7-1

Scenarios for channel quality information feedback for wideband CQI reporting (Fields for channel quality information feedback for wideband CQI reports) (the transmission mode 10 is configured without PMI reporting and configured with the higher layer parameter eMIMO-Type, and eMIMO-Type is set to the 'CLASS B' with two/four/eight antenna ports and configured with the higher layer parameter FeCoMPCSIEnabled)

| Field | Rank = 1 | Rank > 1 |
|---|---|---|
| | Bit width for CRI = 0 or 1 | |
| Wide-band CQI codeword 0 | 4 | 4 |
| Wide-band CQI codeword 1 | 0 | 4 |
| | Bit width for CRI = 2 | |
| Wide-band CQI of first set | 4 | 4 |
| Wide-band CQI of second set | 4 | 4 |

(D3) For the mode 1-1, the reporting manner may include at least one item in all tables shown in (D3).

In one embodiment, the mode 1-1 in the wideband CQI reporting mode may be a feedback mode of a wideband CQI and a wideband PMI.

For example, the following Table 5.2.2.6.1-1L-8 may be used to indicate a bit width for CSI feedback and/or a CSI feedback sequence in the mode 1-1 when the first indication information is configured and when the quantity of antenna ports is 2 or 4 and no R12 codebook enhancement is configured. Table 5.2.2.6.1-1L-9 may be used to indicate a bit width for CSI feedback and/or a CSI feedback sequence in the mode 1-1 when the first indication information is configured and when the quantity of antenna ports is 8. Table 5.2.2.6.1-1L-10 may be used to indicate a bit width for CSI feedback and/or a CSI feedback sequence in the mode 1-1 when the first indication information is configured and when the quantity of antenna ports is 4 and R12 codebook enhancement is configured. CSI feedback in another configuration is also applicable. This is not specifically limited herein.

In one embodiment, the terminal may store at least one item in the following table. When the terminal configures a corresponding parameter, the terminal may determine a bit width for CSI feedback and/or a CSI feedback sequence based on a table corresponding to the parameter.

TABLE 5.2.2.6.1-1L-8

Scenarios for channel quality information feedback for wideband CQI reporting (Fields for channel quality information feedback for wideband CQI reports) (the transmission mode 10 is configured with PMI/RI reporting with two/four antenna ports and configured with the higher layer parameter eMIMO-Type, and eMIMO-Type is set to the 'CLASS B' with K > 1 and configured with the higher layer parameter FeCoMPCSIEnabled except with configured R12 codebook enhancement (transmission mode 10 configured with PMI/RI reporting with 2/4 antenna ports and higher layer parameter eMIMO-Type, and eMIMO-Type is set to 'CLASS B' with K > 1 and higher layer parameter FeCoMPCSIEnabled except with alternativeCodeBookEnabledFor4TX-r12 = TRUE))

|  | 2 antenna ports | | 4 antenna ports | |
| --- | --- | --- | --- | --- |
| Field | Rank = 1 | Rank = 2 | Rank = 1 | Rank > 1 |
| Bit width for CRI = 0 or 1 | | | | |
| Wide-band CQI codeword 0 | 4 | 4 | 4 | 4 |
| Wide-band CQI codeword 1 | 0 | 4 | 0 | 4 |
| Precoding matrix indicator | 2 | 1 | 4 | 4 |
| Bit width for CRI = 2 | | | | |
| Wide-band CQI of first set | 4 | 4 | 4 | 4 |
| Precoding matrix indicator of first set | 2 | 1 | 4 | 4 |
| Wide-band CQI of second set | 4 | 4 | 4 | 4 |
| Precoding matrix indicator of second set | 2 | 1 | 4 | 4 |

TABLE 5.2.2.6.1-1L-9

Scenarios for channel quality information feedback for wideband CQI reporting (Fields for channel quality information feedback for wideband CQI reports) (the transmission mode 10 is configured with PMI/RI reporting with eight antenna ports and configured with the higher layer parameter eMIMO-Type, and eMIMO-Type is set to the 'CLASS B' with K > 1 and configured with the higher layer parameter FeCoMPCSIEnabled)

|  | Bitwidth for CRI = 0 or 1 | | | |
| --- | --- | --- | --- | --- |
| Field | Rank = 1 | Rank = 2 | Rank = 3 | Rank = 4 |
| Wideband CQI codeword 0 | 4 | 4 | 4 | 4 |
| Wideband CQI codeword 1 | 0 | 4 | 4 | 4 |
| Wideband first PMI i1 | 4 | 4 | 2 | 2 |
| Wideband second PMI i2 | 4 | 4 | 4 | 3 |

|  | Bitwidth for CRI = 0 or 1 | | | |
| --- | --- | --- | --- | --- |
| Field | Rank = 5 | Rank = 6 | Rank = 7 | Rank = 8 |
| Wideband CQI codeword 0 | 4 | 4 | 4 | 4 |
| Wideband CQI codeword 1 | 4 | 4 | 4 | 4 |
| Wideband first PMI i1 | 2 | 2 | 2 | 0 |
| Wideband second PMI i2 | 0 | 0 | 0 | 0 |

|  | Bitwidth for CRI = 2 | | | |
| --- | --- | --- | --- | --- |
| Field | Rank = 1 | Rank = 2 | Rank = 3 | Rank = 4 |
| Wideband CQI of first set | 4 | 4 | 4 | 4 |
| Wideband first PMI i1 of first set | 4 | 4 | 2 | 2 |
| Wideband second PMI i2 of first set | 4 | 4 | 4 | 3 |
| Wideband CQI of second set | 4 | 4 | 4 | 4 |
| Wideband first PMI i1 of second set | 4 | 4 | 2 | 2 |

TABLE 5.2.2.6.1-1L-9-continued

Scenarios for channel quality information feedback for wideband CQI reporting (Fields for channel quality information feedback for wideband CQI reports) (the transmission mode 10 is configured with PMI/RI reporting with eight antenna ports and configured with the higher layer parameter eMIMO-Type, and eMIMO-Type is set to the 'CLASS B' with K > 1 and configured with the higher layer parameter FeCoMPCSIEnabled)

| Wideband second PMI i2 of second set | 4 | 4 | 4 | 3 |
| --- | --- | --- | --- | --- |

TABLE 5.2.2.6.1-1L-10

Scenarios for channel quality information feedback for wideband CQI reporting with four antenna ports (Fields for channel quality information feedback for wideband CQI reports with 4 antenna ports) (the transmission mode 10 is configured with PMI/RI reporting with four antenna ports and configured with the higher layer parameter eMIMO-Type, and eMIMO-Type is set to the 'CLASS B' with K > 1 and configured with the higher layer parameter FeCoMPCSIEnabled with configured R12 codebook enhancement (transmission mode 10 configured with PMI/RI reporting with 4 antenna ports and higher layer parameter eMIMO-Type, and eMIMO-Type is set to 'CLASS B' with K > 1 and higher layer parameter FeCoMPCSIEnabled with alternativeCodeBookEnabledFor4TX-r12 = TRUE))

| Field | Rank = 1 | Rank = 2 | Rank = 3 | Rank = 4 |
| --- | --- | --- | --- | --- |
| Bitwidth for CRI = 0 or 1 | | | | |
| Wideband CQI codeword 0 | 4 | 4 | 4 | 4 |
| Wideband CQI codeword 1 | 0 | 4 | 4 | 4 |
| Wideband first PMI i1 | 4 | 4 | 0 | 0 |
| Wideband second PMI i2 | 4 | 4 | 4 | 4 |
| Bitwidth for CRI = 2 | | | | |
| Wideband CQI of first set | 4 | 4 | 4 | 4 |
| Wideband first PMI i1 of first set | 4 | 4 | 0 | 0 |
| Wideband second PMI i2 of first set | 4 | 4 | 4 | 4 |
| Wideband CQI of second set | 4 | 4 | 4 | 4 |
| Wideband first PMI i1 of second set | 4 | 4 | 0 | 0 |
| Wideband second PMI i2 of second set | 4 | 4 | 4 | 4 |

E. Higher Layer-Configured Subband CQI Reporting Mode:

For higher layer-configured subband CQI reporting, when two CSI sets need to be reported, an example of a reporting sequence in which the first set (including a CQI/PMI) is first reported, and then the second set (including a CQI/PMI) is reported is used below for description. Specifically, at least one of the following manners may be used:

(E1) For the mode 3-0, the reporting manner may include at least one item in Table 5.2.2.6.2-1B-1-1 and Table 5.2.2.6.2-1B-2-1.

In one embodiment, the mode 3-0 in the higher layer-configured subband CQI reporting mode may be a feedback mode of feedback of a higher layer-configured subband CQI and no feedback of a PMI.

For example, the following Table 5.2.2.6.2-1B-1-1 may be used to indicate a bit width for CSI feedback and/or a CSI feedback sequence in the mode 3-0 when the first indication information is configured and when the quantity of antenna ports is 1. Table 5.2.2.6.2-1B-2-1 may be used to indicate a bit width for CSI feedback and/or a CSI feedback sequence in the mode 3-0 when the first indication information is configured and when the quantity of antenna ports is 2/4/8 and no PMI/RI feedback is configured. CSI feedback in another configuration is also applicable. This is not specifically limited herein.

In one embodiment, the terminal may store at least one item in the following table. When the terminal configures a corresponding parameter, the terminal may determine a bit width for CSI feedback and/or a CSI feedback sequence based on a table corresponding to the parameter. CSI feedback in another configuration is also applicable. This is not specifically limited herein.

TABLE 5.2.2.6.2-1B-1-1

Scenarios for channel quality information feedback for higher layer-configured subband CQI reporting (Fields for channel quality information feedback for higher layer configured subband CQI reports) (the transmission mode 10 is configured without PMI/RI reporting or configured with one antenna port and configured with the higher layer parameter FeCoMPCSIEnabled)

| Field | Bit width for CRI = 0 or 1 |
|---|---|
| Wide-band CQI codeword | 4 |
| Subband differential CQI | 2N |
| | Bit width for CRI = 2 |
| Wide-band CQI of first set | 4 |
| Subband differential CQI of first set | 2N |
| Wide-band CQI of second set | 4 |
| Subband differential CQI of second set | 2N |

TABLE 5.2.2.6.2-1B-2-1

Scenarios for channel quality information feedback for higher layer-configured subband CQI reporting (Fields for channel quality information feedback for higher layer configured subband CQI reports) (the transmission mode 10 is configured without PMI/RI reporting and configured with the higher layer parameter eMIMO-Type, and eMIMO-Type is set to the 'CLASS B' with two/four/eight antenna ports and configured with the higher layer parameter FeCoMPCSIEnabled)

| Field | Rank = 1 | Rank > 1 |
|---|---|---|
| | Bit width for CRI = 0 or 1 | |
| Wide-band CQI codeword 0 | 4 | 4 |
| Subband differential CQI codeword 0 | 2N | 2N |
| Wide-band CQI codeword 1 | 0 | 4 |
| Subband differential CQI codeword 1 | 0 | 2N |
| | Bit width for CRI = 2 | |
| Wide-band CQI of first set | 4 | 4 |
| Subband differential CQI of first set | 2N | 2N |
| Wide-band CQI of second set | 4 | 4 |
| Subband differential CQI of second set | 2N | 2N |

(E2) For the mode 3-1, the reporting manner may include at least one item in all tables shown in (E2).

In one embodiment, the mode 3-1 in the higher layer-configured subband CQI reporting mode may be a feedback mode of a higher layer-configured subband CQI and a wideband PMI.

For example, the following Table 5.2.2.6.2-2F-2 may be used to indicate a bit width for CSI feedback and/or a CSI feedback sequence in the mode 3-1 when the first indication information is configured and when the quantity of antenna ports is 2 or 4 and no R12 codebook enhancement is configured. Table 5.2.2.6.2-2F-2-3 may be used to indicate a bit width for CSI feedback and/or a CSI feedback sequence in the mode 3-1 when the first indication information is configured and when the quantity of antenna ports is 8. Table 5.2.2.6.2-2F-2-4 may be used to indicate a bit width for CSI feedback and/or a CSI feedback sequence in the mode 3-1 when the first indication information is configured and when the quantity of antenna ports is 4 and R12 codebook enhancement is configured. CSI feedback in another configuration is also applicable. This is not specifically limited herein.

In one embodiment, the terminal may store at least one item in the following table. When the terminal configures a corresponding parameter, the terminal may determine a bit width for CSI feedback and/or a CSI feedback sequence based on a table corresponding to the parameter.

TABLE 5.2.2.6.2-2F-2

Scenarios for channel quality information feedback for higher layer-configured subband CQI reporting (Fields for channel quality information feedback for higher layer configured subband CQI reports) (the transmission mode 10 is configured with PMI/RI reporting with two/four antenna ports and configured with the higher layer parameter eMIMO-Type, and eMIMO-Type is set to the 'CLASS B' and configured with the higher layer parameter FeCoMPCSIEnabled except with configured R12 codebook enhancement (transmission mode 10 configured with PMI/RI reporting with 2/4 antenna ports and higher layer parameter eMIMO-Type, and eMIMO-Type is set to 'CLASS B' with K > 1 and higher layer parameter FeCoMPCSIEnabled except with alternativeCodeBookEnabledFor4TX-r12 = TRUE))

| | 2 antenna ports | | 4 antenna ports | |
|---|---|---|---|---|
| Field | Rank = 1 | Rank = 2 | Rank = 1 | Rank > 1 |
| | Bit width for CRI = 0 or 1 | | | |
| Wide-band CQI codeword 0 | 4 | 4 | 4 | 4 |
| Subband differential CQI codeword 0 | 2N | 2N | 2N | 2N |
| Wide-band CQI codeword 1 | 0 | 4 | 0 | 4 |
| Subband differential CQI codeword 1 | 0 | 2N | 0 | 2N |
| Precoding matrix indicator | 2 | 1 | 4 | 4 |
| | Bit width for CRI = 2 | | | |
| Wide-band CQI of first set | 4 | 4 | 4 | 4 |
| Subband differential CQI of first set | 2N | 2N | 2N | 2N |
| Precoding matrix indicator of first set | 2 | 1 | 4 | 4 |
| Wide-band CQI of second set | 4 | 4 | 0 | 4 |
| Subband differential CQI of second set | 2N | 2N | 0 | 2N |
| Precoding matrix indicator of second set | 2 | 1 | 4 | 4 |

TABLE 5.2.2.6.2-2F-2-3

Scenarios for channel quality information feedback for higher layer-configured subband CQI reporting (Fields for channel quality information feedback for higher layer configured subband CQI reports) (the transmission mode 10 is configured with PMI/RI reporting with eight antenna ports and configured with the higher layer parameter eMIMO-Type, and eMIMO-Type is set to the 'CLASS B' with K > 1 and configured with the higher layer parameter FeCoMPCSIEnabled)

| | Bitwidth for CRI = 0 or 1 | | | |
|---|---|---|---|---|
| Field | Rank = 1 | Rank = 2 | Rank = 3 | Rank = 4 |
| Wideband CQI codeword 0 | 4 | 4 | 4 | 4 |
| Subband differential CQI codeword 0 | 2N | 2N | 2N | 2N |
| Wideband CQI codeword 1 | 0 | 4 | 4 | 4 |
| Subband differential CQI codeword 1 | 0 | 2N | 2N | 2N |

TABLE 5.2.2.6.2-2F-2-3-continued

Scenarios for channel quality information feedback for higher layer-configured subband CQI reporting (Fields for channel quality information feedback for higher layer configured subband CQI reports) (the transmission mode 10 is configured with PMI/RI reporting with eight antenna ports and configured with the higher layer parameter eMIMO-Type, and eMIMO-Type is set to the 'CLASS B' with K > 1 and configured with the higher layer parameter FeCoMPCSIEnabled)

| | | | | |
|---|---|---|---|---|
| Wideband first PMI i1 | 4 | 4 | 2 | 2 |
| Wideband second PMI i2 | 4 | 4 | 4 | 3 |

| | Bitwidth for CRI = 0 or 1 | | | |
|---|---|---|---|---|
| Field | Rank = 5 | Rank = 6 | Rank = 7 | Rank = 8 |
| Wideband CQI codeword 0 | 4 | 4 | 4 | 4 |
| Subband differential CQI codeword 0 | 2N | 2N | 2N | 2N |
| Wideband CQI codeword 1 | 4 | 4 | 4 | 4 |
| Subband differential CQI codeword 1 | 2N | 2N | 2N | 2N |
| Wideband first PMI i1 | 2 | 2 | 2 | 0 |
| Wideband second PMI i2 | 0 | 0 | 0 | 0 |

| | Bitwidth for CRI = 2 | | | |
|---|---|---|---|---|
| Field | Rank = 1 | Rank = 2 | Rank = 3 | Rank = 4 |
| Wideband CQI of first set | 4 | 4 | 4 | 4 |
| Subband differential CQI of first set | 2N | 2N | 2N | 2N |
| Wideband first PMI i1 of first set | 4 | 4 | 2 | 2 |
| Wideband second PMI i2 of first set | 4 | 4 | 4 | 3 |
| Wideband CQI of second set | 0 | 4 | 4 | 4 |
| Subband differential CQI of second set | 0 | 2N | 2N | 2N |
| Wideband first PMI i1 of second set | 4 | 4 | 2 | 2 |
| Wideband second PMI i2 of second set | 4 | 4 | 4 | 3 |

TABLE 5.2.2.6.2-2F-2-4

Scenarios for channel quality information feedback for higher layer-configured subband CQI reporting with four antenna ports (Fields for channel quality information feedback for higher layer configured subband CQI reports with 4 antenna ports) (the transmission mode 10 is configured with PMI/RI reporting with four antenna ports and configured with the higher layer parameter eMIMO-Type, and eMIMO-Type is set to the 'CLASS B' with K > 1 and configured with the higher layer parameter FeCoMPCSIEnabled with configured R12 codebook enhancement (transmission mode 10 configured with PMI/RI reporting with 4 antenna ports and higher layer parameter eMIMO- Type, and eMIMO-Type is set to 'CLASS B' with K > 1 and higher layer parameter FeCoMPCSIEnabled with alternativeCodeBookEnabledFor4TX-r12 = TRUE))

| Field | Rank = 1 | Rank = 2 | Rank = 3 | Rank = 4 |
|---|---|---|---|---|
| | Bitwidth for CRI = 0 or 1 | | | |
| Wideband CQI codeword 0 | 4 | 4 | 4 | 4 |
| Subband differential CQI codeword 0 | 2N | 2N | 2N | 2N |
| Wideband CQI codeword 1 | 0 | 4 | 4 | 4 |
| Subband differential CQI codeword 1 | 0 | 2N | 2N | 2N |
| Wideband first PMI i1 | 4 | 4 | 0 | 0 |
| Wideband second PMI i2 | 4 | 4 | 4 | 4 |

TABLE 5.2.2.6.2-2F-2-4-continued

Scenarios for channel quality information feedback for higher layer-configured subband CQI reporting with four antenna ports (Fields for channel quality information feedback for higher layer configured subband CQI reports with 4 antenna ports) (the transmission mode 10 is configured with PMI/RI reporting with four antenna ports and configured with the higher layer parameter eMIMO-Type, and eMIMO-Type is set to the 'CLASS B' with K > 1 and configured with the higher layer parameter FeCoMPCSIEnabled with configured R12 codebook enhancement (transmission mode 10 configured with PMI/RI reporting with 4 antenna ports and higher layer parameter eMIMO- Type, and eMIMO-Type is set to 'CLASS B' with K > 1 and higher layer parameter FeCoMPCSIEnabled with alternativeCodeBookEnabledFor4TX-r12 = TRUE))

| Field | Rank = 1 | Rank = 2 | Rank = 3 | Rank = 4 |
|---|---|---|---|---|
| | Bitwidth for CRI = 2 | | | |
| Wideband CQI of first set | 4 | 4 | 4 | 4 |
| Subband differential CQI of first set | 2N | 2N | 2N | 2N |
| Wideband first PMI i1 of first set | 4 | 4 | 0 | 0 |
| Wideband second PMI i2 of first set | 4 | 4 | 4 | 4 |
| Wideband CQI of second set | 4 | 4 | 4 | 4 |
| Subband differential CQI of second set | 2N | 2N | 2N | 2N |
| Wideband first PMI i1 of second set | 4 | 4 | 0 | 0 |
| Wideband second PMI i2 of second set | 4 | 4 | 4 | 4 |

(E3) For the mode 3-2, the reporting manner may include at least one item in all tables shown in (E3).

In one embodiment, the mode 3-2 in the higher layer-configured subband CQI reporting mode may be a feedback mode of a higher layer-configured subband CQI and a subband PMI.

For example, the following Table 5.2.2.6.2-2G-1-3 may be used to indicate a bit width for CSI feedback and/or a CSI feedback sequence in the mode 3-2 when the first indication information is configured and when the quantity of antenna ports is 2 or 4 and no R12 codebook enhancement is configured. Table 5.2.2.6.2-2G-2-3 may be used to indicate a bit width for CSI feedback and/or a CSI feedback sequence in the mode 3-2 when the first indication information is configured and when the quantity of antenna ports is 8. Table 5.2.2.6.2-2G-3-3 may be used to indicate a bit width for CSI feedback and/or a CSI feedback sequence in the mode 3-2 when the first indication information is configured and when the quantity of antenna ports is 4 and R12 codebook enhancement is configured. CSI feedback in another configuration is also applicable. This is not specifically limited herein.

In one embodiment, the terminal may store at least one item in the following table. When the terminal configures a corresponding parameter, the terminal may determine a bit width for CSI feedback and/or a CSI feedback sequence based on a table corresponding to the parameter.

TABLE 5.2.2.6.2-2G-1-3

Scenarios for channel quality information feedback for higher layer-configured subband CQI and subband PMI reporting (Fields for channel quality information feedback for higher layer configured subband CQI and subband PMI reports) (the transmission mode 10 is configured with subband PMI/RI reporting with two/four antenna ports and configured with the higher layer parameter eMIMO-Type, and eMIMO-Type is set to 'CLASS B' with K > 1 and configured with the higher layer parameter FeCoMPCSIEnabled except with configured R12 codebook enhancement (transmission mode 10 configured with subband PMI/RI reporting with 2/4 antenna ports and higher layer parameter eMIMO-Type, and eMIMO-Type is set to 'CLASS B' with K > 1 and higher layer parameter FeCoMPCSIEnabled except with alternativeCodeBookEnabledFor4TX-r12 = TRUE))

| Field | 2 antenna ports | | 4 antenna ports | | | |
|---|---|---|---|---|---|---|
| | Rank = 1 | Rank = 2 | Rank = 1 | Rank = 2 | Rank = 3 | Rank = 4 |
| Bit width for CRI = 0 or 1 | | | | | | |
| Wide-band CQI codeword 0 | 4 | 4 | 4 | 4 | 4 | 4 |
| Subband differential CQI codeword 0 | 2N | 2N | 2N | 2N | 2N | 2N |
| Wide-band CQI codeword 1 | 0 | 4 | 0 | 4 | 4 | 4 |
| Subband differential CQI codeword 1 | 0 | 2N | 0 | 2N | 2N | 2N |
| Subband precoding matrix indicator | 2N | N | 4N | 4N | 4N | 4N |
| Bit width for CRI = 2 | | | | | | |
| Wide-band CQI of first set | 4 | 4 | 4 | 4 | 4 | 4 |
| Subband differential CQI of first set | 2N | 2N | 2N | 2N | 2N | 2N |
| Subband precoding matrix indicator of first set | 2N | N | 4N | 4N | 4N | 4N |
| Wide-band CQI of second set | 4 | 4 | 4 | 4 | 4 | 4 |
| Subband differential CQI of second set | 2N | 2N | 2N | 2N | 2N | 2N |
| Subband precoding matrix indicator of second set | 2N | N | 4N | 4N | 4N | 4N |

TABLE 5.2.2.6.2-2G-2-3

Scenarios for channel quality information feedback for higher layer-configured subband CQI and subband PMI reporting with eight antenna ports (Fields for channel quality information feedback for higher layer configured subband CQI and subband PMI reports with 8 antenna ports) (the transmission mode 10 is configured with PMI/RI reporting and configured with the higher layer parameter eMIMO-Type, and eMIMO-Type is set to the 'CLASS B' with K > 1 and configured with the higher layer parameter FeCoMPCSIEnabled)

| Field | Bitwidth for CRI = 0 or 1 | | | |
|---|---|---|---|---|
| | Rank = 1 | Rank = 2 | Rank = 3 | Rank = 4 |
| Wideband CQI codeword 0 | 4 | 4 | 4 | 4 |
| Subband differential CQI codeword 0 | 2N | 2N | 2N | 2N |
| Wideband CQI codeword 1 | 0 | 4 | 4 | 4 |
| Subband differential CQI codeword 1 | 0 | 2N | 2N | 2N |
| Wideband first PMI i1 | 4 | 4 | 2 | 2 |
| Subband second PMI i2 | 4N | 4N | 4N | 3N |

| Field | Bitwidth for CRI = 0 or 1 | | | |
|---|---|---|---|---|
| | Rank = 5 | Rank = 6 | Rank = 7 | Rank = 8 |
| Wideband CQI codeword 0 | 4 | 4 | 4 | 4 |
| Subband differential CQI codeword 0 | 2N | 2N | 2N | 2N |
| Wideband CQI codeword 1 | 4 | 4 | 4 | 4 |
| Subband differential CQI codeword 1 | 2N | 2N | 2N | 2N |
| Wideband first PMI i1 | 2 | 2 | 2 | 0 |
| Subband second PMI i2 | 0 | 0 | 0 | 0 |

| Field | Bitwidth for CRI = 2 | | | |
|---|---|---|---|---|
| | Rank = 1 | Rank = 2 | Rank = 3 | Rank = 4 |
| Wideband CQI of first set | 4 | 4 | 4 | 4 |
| Subband differential CQI of first set | 2N | 2N | 2N | 2N |
| Wideband first PMI i1 of first set | 4 | 4 | 2 | 2 |
| Subband second PMI i2 of first set | 4N | 4N | 4N | 3N |
| Wideband CQI of second set | 4 | 4 | 4 | 4 |
| Subband differential CQI of second set | 2N | 2N | 2N | 2N |
| Wideband first PMI i1 of second set | 4 | 4 | 2 | 2 |
| Subband second PMI i2 of second set | 4N | 4N | 4N | 3N |

TABLE 5.2.2.6.2-2G-3-3

Scenarios for channel quality information feedback for higher layer-configured subband CQI and subband PMI reporting with four antenna ports (Fields for channel quality information feedback for higher layer configured subband CQI and subband PMI reports with 4 antenna ports) (the transmission mode 10 is configured with PMI/RI reporting with two/four antenna ports and configured with the higher layer parameter eMIMO-Type, and eMIMO-Type is set to the 'CLASS B' with K > 1 and configured with the higher layer parameter FeCoMPCSIEnabled with configured R12 codebook enhancement (transmission mode 10 configured with subband PMI/RI reporting with 2/4 antenna ports and higher layer parameter eMIMO-Type, and eMIMO-Type is set to 'CLASS B' with K > 1 and higher layer parameter FeCoMPCSIEnabled with alternativeCodeBookEnabledFor4TX-r12 = TRUE))

| Field | Rank = 1 | Rank = 2 | Rank = 3 | Rank = 4 |
|---|---|---|---|---|
| Bitwidth for CRI = 0 or 1 | | | | |
| Wideband CQI codeword 0 | 4 | 4 | 4 | 4 |
| Subband differential CQI codeword 0 | 2N | 2N | 2N | 2N |
| Wideband CQI codeword 1 | 0 | 4 | 4 | 4 |
| Subband differential CQI codeword 1 | 0 | 2N | 2N | 2N |
| Wideband first PMI i1 | 4 | 4 | 0 | 0 |
| Subband second PMI i2 | 4N | 4N | 4N | 4N |
| Bitwidth for CRI = 2 | | | | |
| Wideband CQI of first set | 4 | 4 | 4 | 4 |
| Subband differential CQI of first set | 2N | 2N | 2N | 2N |
| Wideband first PMI i1 of first set | 4 | 4 | 0 | 0 |
| Subband second PMI i2 of first set | 4N | 4N | 4N | 4N |
| Wideband CQI of second set | 4 | 4 | 4 | 4 |
| Subband differential CQI of second set | 2N | 2N | 2N | 2N |
| Wideband first PMI i1 of second set | 4 | 4 | 0 | 0 |
| Subband second PMI i2 of second set | 4N | 4N | 4N | 4N |

F. UE Selected Subband CQI Reporting Mode:

For UE selected subband CQI reporting, for example, if UE selects M subbands, feedback of positions of the M selected subbands may be finally performed after two CSI sets, may be performed after the first CSI set and before the second CSI set, or may be performed before the two CSI sets. This is not specifically limited.

In one embodiment, for the positions of the M selected subbands, only one reporting parameter may be fed back for two CSI sets, and the parameter is used to indicate the positions of the M selected subbands. Alternatively, each of the CSI sets may include one reporting parameter, and the reporting parameter is used to indicate the positions of the M selected subbands. This is not specifically limited herein.

An example of a reporting sequence of the first set (including a CQI/PMI), the second set (including a CQI/PMI), and the positions of the M selected subbands is used below for description.

(F1) For the mode 2-0, the reporting manner may include at least one item in Table 5.2.2.6.3-1B-1-1 and Table 5.2.2.6.3-1B-2-1.

In one embodiment, the mode 2-0 in the UE selected subband CQI reporting mode may be a feedback mode of feedback of a UE selected subband CQI and no feedback of a PMI.

For example, the following Table 5.2.2.6.3-1B-1-1 may be used to indicate a bit width for CSI feedback and/or a CSI feedback sequence in the mode 1-0 when the first indication information is configured and when the quantity of antenna ports is 1. Table 5.2.2.6.3-1B-2-1 may be used to indicate a bit width for CSI feedback and/or a CSI feedback sequence in the mode 1-0 when the first indication information is configured and when the quantity of antenna ports is 2/4/8 and no PMI/RI feedback is configured. CSI feedback in another configuration is also applicable. This is not specifically limited herein.

In one embodiment, the terminal may store at least one item in the following table. When the terminal configures a corresponding parameter, the terminal may determine a bit width for CSI feedback and/or a CSI feedback sequence based on a table corresponding to the parameter.

TABLE 5.2.2.6.3-1B-1-1

Scenarios for channel quality information feedback for UE selected subband CQI reporting (Fields for channel quality information feedback for UE selected subband CQI reports) (the transmission mode 10 is configured without PMI/RI reporting or configured with one antenna port and configured with the higher layer parameter FeCoMPCSIEnabled)

| Field | |
|---|---|
| Bit width for CRI = 0 or 1 | |
| Wide-band CQI codeword | 4 |
| Subband differential CQI | 2 |
| Position of the M selected subbands | L |
| Bit width for CRI = 2 | |
| Wide-band CQI of first set | 4 |
| Subband differential CQI of first set | 2 |
| Wide-band CQI of second set | 4 |
| Subband differential CQI of second set | 2 |
| Position of the M selected subbands | L |

TABLE 5.2.2.6.3-1B-2-1

Scenarios for channel quality information feedback for UE selected subband CQI reporting (Fields for channel quality information feedback for UE selected subband CQI reports) (the transmission mode 10 is configured without PMI reporting or configured with one antenna port and configured with the higher layer parameter eMIMO-Type, and eMIMO-Type is set to the 'CLASS B' with two/four/eight antenna ports and configured with the higher layer parameter FeCoMPCSIEnabled)

| Field | Rank = 1 | Rank > 1 |
|---|---|---|
| Bit width for CRI = 0 or 1 | | |
| Wide-band CQI codeword 0 | 4 | 4 |
| Subband differential CQI codeword 0 | 2 | 2 |
| Wide-band CQI codeword 1 | 0 | 4 |
| Subband differential CQI codeword 1 | 0 | 2 |
| Position of the M selected subbands | L | L |
| Bit width for CRI = 2 | | |
| Wide-band CQI of first set | 4 | 4 |
| Subband differential CQI of first set | 2 | 2 |
| Wide-band CQI of second set | 4 | 4 |
| Subband differential CQI of second set | 2 | 2 |
| Position of the M selected subbands | L | L |

(F2) For the mode 2-2, the reporting manner may include at least one item in all tables shown in (F2).

In one embodiment, the mode 2-2 in the UE selected subband CQI reporting mode may be a feedback mode of a wideband CQI and a subband PMI.

For example, the following Table 5.2.2.6.3-2K-1-4 may be used to indicate a bit width for CSI feedback and/or a CSI feedback sequence in the mode 2-2 when the first indication information is configured and when the quantity of antenna ports is 2 or 4 and no R12 codebook enhancement is configured. At least one of Table 5.2.2.6.3-2K-2-4 may be used to indicate a bit width for CSI feedback and/or a CSI feedback sequence in the mode 2-2 when the first indication information is configured and when the quantity of antenna ports is 8. At least one of Table 5.2.2.6.3-2K-3-4 may be used to indicate a bit width for CSI feedback and/or a CSI feedback sequence in the mode 2-2 when the first indication information is configured and when the quantity of antenna ports is 4 and R12 codebook enhancement is configured. CSI feedback in another configuration is also applicable. This is not specifically limited herein.

In one embodiment, the terminal may store at least one item in the following table. When the terminal configures a corresponding parameter, the terminal may determine a bit width for CSI feedback and/or a CSI feedback sequence based on a table corresponding to the parameter.

TABLE 5.2.2.6.3-2K-1-4

Scenarios for channel quality information feedback for UE selected subband CQI reporting (Fields for channel quality information feedback for UE selected subband CQI reports) (the transmission mode 10 is configured with PMI/RI reporting with two/four antenna ports and configured with the higher layer parameter eMIMO-Type, and eMIMO-Type is set to the 'CLASS B' with K > 1 and configured with the higher layer parameter FeCoMPCSIEnabled except with configured R12 codebook enhancement (transmission mode 10 configured with PMI/RI reporting with 2/4 antenna ports and higher layer parameter eMIMO-Type, and eMIMO-Type is set to 'CLASS B' with K > 1, and higher layer parameter FeCoMPCSIEnabled except with alternativeCodeBookEnabledFor4TX-r12 = TRUE))

| | 2 antenna ports | | 4 antenna ports | |
|---|---|---|---|---|
| Field | Rank = 1 | Rank = 2 | Rank = 1 | Rank > 1 |
| | Bit width for CRI = 0 or 1 | | | |
| Wide-band CQI codeword 0 | 4 | 4 | 4 | 4 |
| Subband differential CQI codeword 0 | 2 | 2 | 2 | 2 |
| Wide-band CQI codeword 1 | 0 | 4 | 0 | 4 |
| Subband differential CQI codeword 1 | 0 | 2 | 0 | 2 |
| Position of the M selected subbands | L | L | L | L |
| Precoding matrix indicator | 4 | 2 | 8 | 8 |
| | Bit width for CRI = 2 | | | |
| Wide-band CQI of first set | 4 | 4 | 4 | 4 |
| Subband differential CQI of first set | 2 | 2 | 2 | 2 |
| Precoding matrix indicator of first set | 4 | 2 | 8 | 8 |
| Wide-band CQI of second set | 4 | 4 | 4 | 4 |
| Subband differential CQI of second set | 2 | 2 | 2 | 2 |
| Precoding matrix indicator of second set | 4 | 2 | 8 | 8 |
| Position of the M selected subbands | L | L | L | L |

TABLE 5.2.2.6.3-2K-2-4

Scenarios for channel quality information feedback for UE selected subband CQI reporting (Fields for channel quality information feedback for UE selected subband CQI reports) (the transmission mode 10 is configured with PMI/RI reporting with eight antenna ports and configured with the higher layer parameter eMIMO-Type, and eMIMO-Type is set to the 'CLASS B' with K > 1 and configured with the higher layer parameter FeCoMPCSIEnabled)

| Field | Rank = 1 | Rank = 2 | Rank = 3 | Rank = 4 | Rank = 5 | Rank = 6 | Rank = 7 | Rank = 8 |
|---|---|---|---|---|---|---|---|---|
| | Bit width for CRI = 0 or 1 | | | | | | | |
| Wide-band CQI codeword 0 | 4 | 4 | 4 | 4 | 4 | 4 | 4 | 4 |
| Subband differential CQI codeword 0 | 2 | 2 | 2 | 2 | 2 | 2 | 2 | 2 |
| Wide-band CQI codeword 1 | 0 | 4 | 4 | 4 | 4 | 4 | 4 | 4 |
| | Bit width for CRI = 0 or 1 | | | | | | | |
| Subband differential CQI codeword 1 | 0 | 2 | 2 | 2 | 2 | 2 | 2 | 2 |

TABLE 5.2.2.6.3-2K-2-4-continued

Scenarios for channel quality information feedback for UE selected subband CQI reporting (Fields for channel quality information feedback for UE selected subband CQI reports) (the transmission mode 10 is configured with PMI/RI reporting with eight antenna ports and configured with the higher layer parameter eMIMO-Type, and eMIMO-Type is set to the 'CLASS B' with K > 1 and configured with the higher layer parameter FeCoMPCSIEnabled)

| | | | | | | | | |
|---|---|---|---|---|---|---|---|---|
| Position of the M selected subbands | L | L | L | L | L | L | L | L |
| Wideband first PMI i1 | 4 | 4 | 2 | 2 | 2 | 2 | 2 | 0 |
| Wideband second PMI i2 | 4 | 4 | 4 | 3 | 0 | 0 | 0 | 0 |
| Subband second PMI i2 | 4 | 4 | 4 | 3 | 0 | 0 | 0 | 0 |

| Field | Bit width for CRI = 2 | | | |
|---|---|---|---|---|
| | Rank = 1 | Rank = 2 | Rank = 3 | Rank = 4 |
| Wide-band CQI of first set | 4 | 4 | 4 | 4 |
| Subband differential CQI of first set | 2 | 2 | 2 | 2 |
| Wideband first PMI i1 of first set | 4 | 4 | 2 | 2 |
| Wideband second PMI i2 of first set | 4 | 4 | 4 | 3 |
| Subband second PMI i2 of first set | 4 | 4 | 4 | 3 |
| Wide-band CQI of second set | 4 | 4 | 4 | 4 |
| Subband differential CQI of second set | 2 | 2 | 2 | 2 |
| Wideband first PMI i1 of second set | 4 | 4 | 2 | 2 |
| Wideband second PMI i2 of second set | 4 | 4 | 4 | 3 |
| Subband second PMI i2 of second set | 4 | 4 | 4 | 3 |
| Position of the M selected subbands | L | L | L | L |

TABLE 5.2.2.6.3-2K-3-4

Scenarios for channel quality information feedback for UE selected subband CQI reporting with four antenna ports (Fields for channel quality information feedback for UE selected subband CQI reports with 4 antenna ports) (the transmission mode 10 is configured with PMI/RI reporting with four antenna ports and configured with the higher layer parameter eMIMO-Type, and eMIMO-Type is set to the 'CLASS B' with K > 1 and configured with the higher layer parameter FeCoMPCSIEnabled with configured R12 codebook enhancement (transmission mode 10 configured with PMI/RI reporting with 4 antenna ports and higher layer parameter eMIMO-Type, and eMIMO-Type is set to 'CLASS B' with K > 1, and higher layer parameter FeCoMPCSIEnabled with alternativeCodeBookEnabledFor4TX-r12 = TRUE))

| Field | Rank = 1 | Rank = 2 | Rank = 3 | Rank = 4 |
|---|---|---|---|---|
| Bit width for CRI = 0 or 1 | | | | |
| Wide-band CQI codeword 0 | 4 | 4 | 4 | 4 |
| Subband differential CQI codeword 0 | 2 | 2 | 2 | 2 |
| Wide-band CQI codeword 1 | 0 | 4 | 4 | 4 |
| Subband differential CQI codeword 1 | 0 | 2 | 2 | 2 |
| Position of the M selected subbands | L | L | L | L |
| Wideband first PMI i1 | 4 | 4 | 0 | 0 |
| Wideband second PMI i2 | 4 | 4 | 4 | 4 |
| Subband second PMI i2 | 4 | 4 | 4 | 4 |
| Bit width for CRI = 2 | | | | |
| Wide-band CQI of first set | 4 | 4 | 4 | 4 |
| Subband differential CQI of first set | 2 | 2 | 2 | 2 |
| Wideband first PMI i1 of first set | 4 | 4 | 0 | 0 |
| Wideband second PMI i2 of first set | 4 | 4 | 4 | 4 |
| Subband second PMI i2 of first set | 4 | 4 | 4 | 4 |
| Wide-band CQI of second set | 4 | 4 | 4 | 4 |
| Subband differential CQI of second set | 2 | 2 | 2 | 2 |
| Wideband first PMI i1 of second set | 4 | 4 | 0 | 0 |
| Wideband second PMI i2 of second set | 4 | 4 | 4 | 4 |
| Subband second PMI i2 of second set | 4 | 4 | 4 | 4 |
| Position of the M selected subbands | L | L | L | L |

In addition, the CSI measurement behavior in this embodiment of the present disclosure includes FeCoMP (or non-coherent transmission, for example, non-coherent joint transmission NCJT)-based CSI measurement. A FeCoMP (or non-coherent transmission) feature is introduced to the protocol release R15. In this case, for terminal devices supporting the protocol release R15, because of different capabilities of the terminal devices, some terminal devices may not support FeCoMP (or non-coherent transmission) due to limitations of capabilities such as hardware storage or processing capabilities, and some terminal devices have a strong capability and can support FeCoMP (or non-coherent transmission). Therefore, this embodiment of the present disclosure provides a solution: When accessing a network, the terminal device may report whether FeCoMP (or non-coherent transmission)-based CSI measurement and/or feedback are/is supported, as a capability of the terminal device to the network device, so that the network device can learn whether the terminal supports FeCoMP (or non-coherent transmission)-based CSI measurement and/or feedback or supports FeCoMP (or non-coherent transmission)-based transmission. This embodiment may be implemented in combination with another embodiment provided in the present disclosure, or may be separately implemented. This is not specifically limited.

In addition, this embodiment of the present disclosure further provides another solution: When accessing a network, the terminal device may report a QCL type supported by the terminal device, as a capability of the terminal device to the network device, so that the network device can learn whether the terminal device supports FeCoMP (or non-coherent transmission)-based transmission. For example, in the protocol release R15, in addition to the QCL types A and B, the QCL type C is further introduced. The terminal device may report, by using RRC signaling, a QCL type supported by the terminal device. If the terminal device reports that the QCL type C is supported, it indicates that the terminal device supports FeCoMP (or non-coherent transmission)-based transmission. If the terminal reports that the QCL type A or B is supported, it indicates that the terminal device supports single-cell transmission or CoMP dynamic point selection/blanking (DPS/DPB) single-point transmission. This embodiment may be implemented in combination with another embodiment provided in the present disclosure, or may be separately implemented. This is not specifically limited.

Figure 10B:
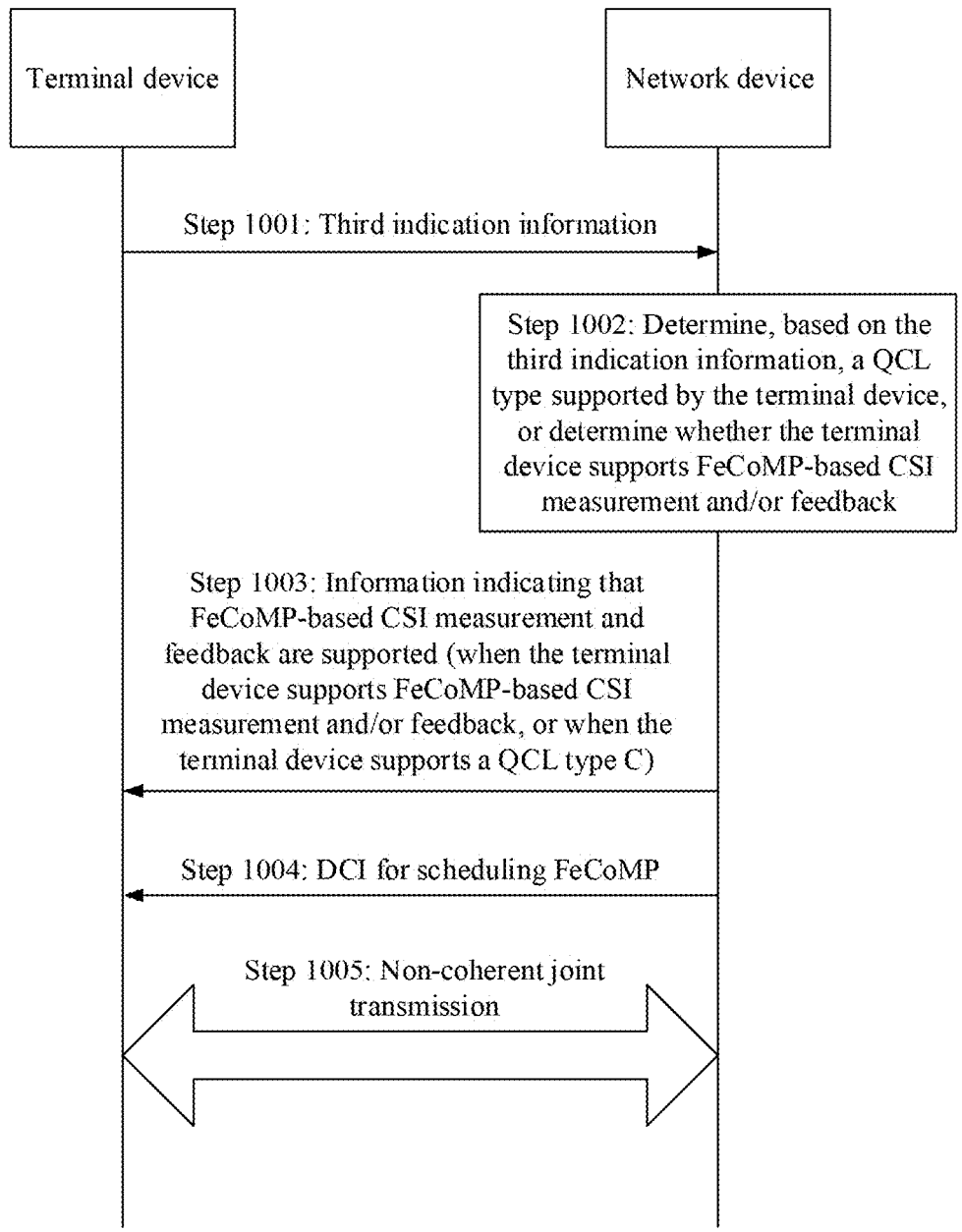
FIG. 10B is a schematic flowchart of a communications method according to an embodiment of the present disclosure.

FIG. 10B is a flowchart of a method for reporting a capability of a terminal device.

Operation 1001: The terminal device sends third indication information to a network device, and the network device receives the third indication information from the terminal device. The third indication information is used to indicate whether the terminal device supports FeCoMP-based CSI measurement and/or feedback.

For example, when accessing a network, the terminal device may send the third indication information to the network device. In an implementation, the terminal device may send the third indication information by using RRC signaling.

Operation 1002: The network device determines, based on the third indication information, a QCL type supported by the terminal device, and/or determines whether the terminal device supports FeCoMP-based CSI measurement and/or feedback. If the terminal device supports FeCoMP-based CSI measurement and/or feedback, operation 1003 is performed; otherwise, this procedure ends.

For example, in the third indication information, information used to indicate whether the terminal device supports FeCoMP-based CSI measurement and/or feedback is 1 bit carried in RRC signaling. If a value of the 1 bit is "1" or "TRUE", it indicates that the terminal device supports FeCoMP-based CSI measurement and/or feedback; or if the value of the 1 bit is "0" or "FALSE", it indicates that the terminal device does not support FeCoMP-based CSI measurement and/or feedback.

Alternatively, if RRC signaling carries the 1-bit third indication information, it indicates that the terminal device supports FeCoMP-based CSI measurement and/or feedback. If RRC signaling does not carry the third indication information, or carried third indication information does not include information used to indicate whether the terminal device supports FeCoMP-based CSI measurement and/or feedback, it indicates that the terminal device does not support FeCoMP-based CSI measurement and/or feedback. Certainly, the 1 bit herein is merely an example, and a quantity of bits used for capability indication information is not limited in this embodiment of the present disclosure.

For another information, in the third indication information, information used to indicate the QCL type supported by the terminal device is two bits carried in RRC signaling. If a value of the 2 bits is "00", it indicates that the QCL type supported by the terminal device is a QCL type A; if a value of the 2 bits is "01", it indicates that the QCL type supported by the terminal device is a QCL type B; or if a value of the 2 bits is "10", it indicates that the QCL type supported by the terminal device is a QCL type C. A mapping relationship between the bit value and the indicated QCL type herein is merely an example, and that the information used to indicate the QCL type supported by the terminal device is 2 bits is also merely an example, which are not limited in this embodiment of the present disclosure.

Operation 1003: When the network device determines that the terminal device supports FeCoMP-based CSI measurement and/or feedback, or determines that the QCL type supported by the terminal device is the QCL type C (which also indicates that the terminal device supports FeCoMP-based CSI measurement and/or feedback), the network device sends, to the terminal device, information indicating that FeCoMP-based CSI measurement and feedback are supported, and the terminal device receives, from the network device, the information indicating that FeCoMP-based CSI measurement feedback is supported. For example, the indication information is the first indication information described in the foregoing embodiment.

Further, the method further includes the following operations:

Operation 1004: The network device sends DCI for scheduling data transmission in FeCoMP to the terminal device, and the terminal device receives the DCI, where indication information in the DCI includes at least two groups of QCL parameters, or a QCL quantity indicated in the DCI is greater than 1.

Operation 1005: The network device and the terminal device perform NCJT transmission.

According to the technical solution provided in this embodiment of the present disclosure, the network device can learn whether the terminal device supports FeCoMP (or non-coherent transmission, for example, NCJT)-based CSI measurement, so that the network device can perform NCJT transmission with the terminal device that supports FeCoMP-based CSI measurement, thereby improving a transmission success rate.

Figure 11:
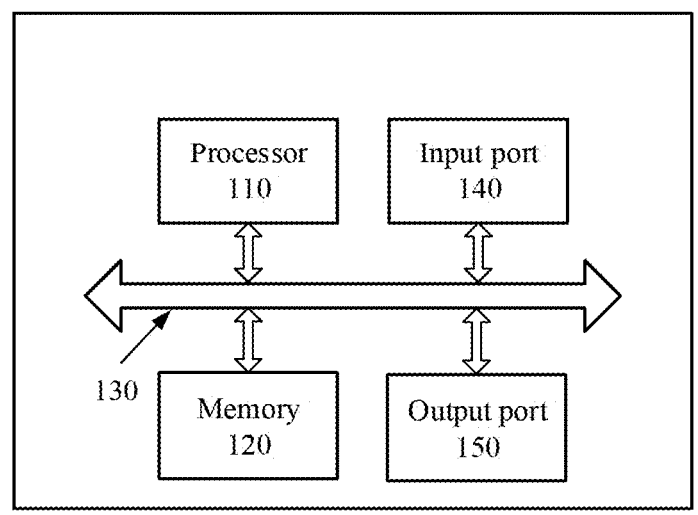
FIG. 11 is a first schematic diagram of a device according to an embodiment of the present disclosure.

According to the foregoing method, FIG. 11 is a first schematic diagram of a device according to an embodiment of the present disclosure. As shown in FIG. 11, the device may be a terminal device 10, or may be a chip or a circuit, for example, a chip or a circuit that can be disposed in a terminal device. The terminal device 10 may correspond to the terminal device in the foregoing method.

The device may include a processor 110 and a memory 120. The memory 120 is configured to store an instruction, and the processor 110 is configured to execute the instruction stored in the memory 120, to implement the operations in the foregoing method, for example, the method corresponding to at least one of FIG. 5-1, FIG. 5-3, or FIG. 10B.

Further, the device may include an input port 140 and an output port 150. Further, the device may further include a bus system 130. The processor 110, the memory 120, the input port 140, and the output port 150 may be connected by using the bus system 130.

The processor 110 is configured to execute the instruction stored in the memory 120, to control the input port 140 to receive a signal and control the output port 150 to send a signal, to complete the operations of the terminal device in the foregoing method. The input port 140 and the output port 150 may be a same physical entity or different physical entities. When the input port 140 and the output port 150 are the same physical entity, the input port 140 and the output port 150 may be collectively referred to as an input/output port. The memory 120 may be integrated into the processor 110, or may be separated from the processor 110.

In an implementation, it may be considered that functions of the input port 140 and the output port 150 are implemented by a transceiver circuit or a dedicated transceiver chip. It may be considered that the processor 110 is implemented by a dedicated processing chip, processing circuit, or processor, or a general-purpose chip.

In another implementation, it may be considered that the terminal device provided in this embodiment of the present disclosure is implemented by a general-purpose computer. To be specific, program code that implements functions of the processor 110, the input port 140, and the output port 150 is stored in the memory, and a general-purpose processor implements the functions of the processor 110, the input port 140, and the output port 150 by executing the code in the memory.

For concepts, explanations, detailed descriptions, and other operations that are related to the technical solutions provided in this embodiment of the present disclosure and that are related to the device, refer to related descriptions of the content in the foregoing method or another embodiment. Details are not described herein again.

Figure 12:
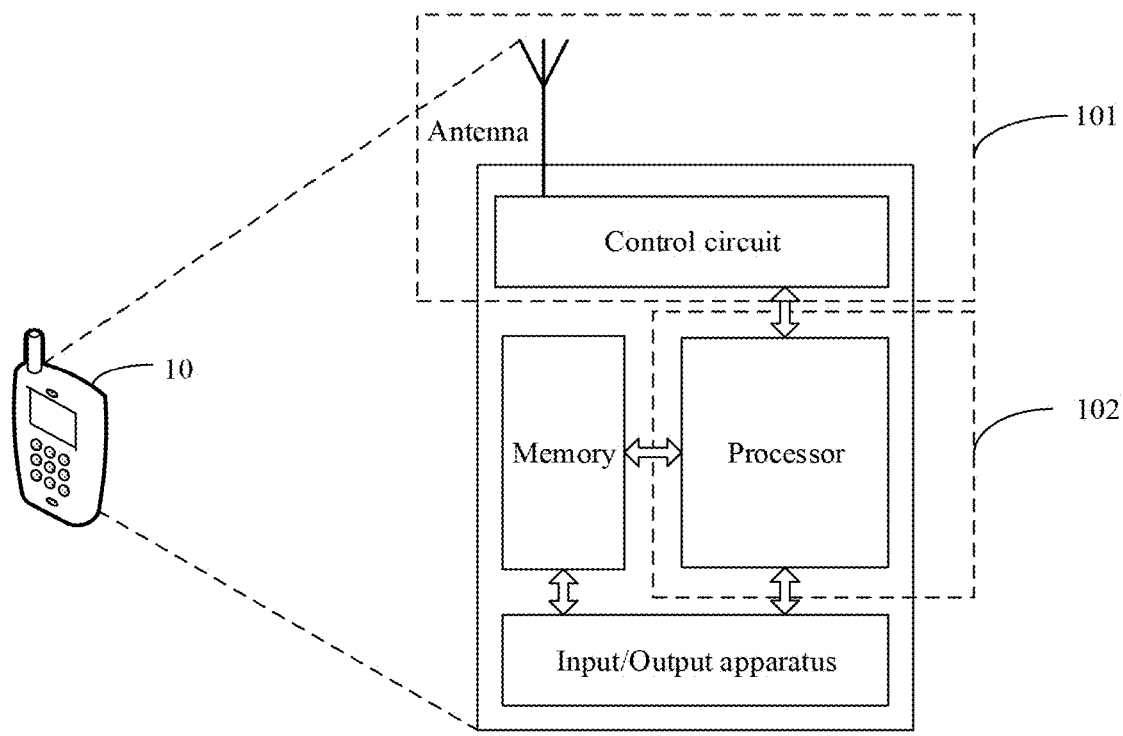
FIG. 12 is a schematic structural diagram of a terminal device according to an embodiment of the present disclosure.

FIG. 12 is a schematic structural diagram of a terminal device according to the present disclosure. The terminal device is applicable to the communications system to which the embodiments of the present disclosure are applicable, for example, the 5G communications system shown in FIG. 3 or FIG. 4; for another example, an LTE communications system. For ease of description, FIG. 12 shows only main components of the terminal device. As shown in FIG. 12, the terminal device 10 includes a processor, a memory, a control circuit, an antenna, and an input/output apparatus. The processor is mainly configured to: process a communication protocol and communication data, control the entire terminal device, execute a software program, and process data of the software program, for example, is configured to support the terminal device in performing the action described in the foregoing embodiment of the communications method. The memory is mainly configured to store the software program and the data, for example, store predefined related information described in the foregoing embodiments. The control circuit is mainly configured to: perform conversion between a baseband signal and a radio frequency signal and process the radio frequency signal. The control circuit, together with an antenna, may also be referred to as a transceiver that is mainly configured to send and receive a radio frequency signal in an electromagnetic wave form. The input/output apparatus, such as a touchscreen, a display screen, or a keyboard, is mainly configured to: receive data entered by a user, and output data to the user.

After the terminal device is powered on, the processor may read a software program in a storage unit, explain and execute an instruction of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends a radio frequency signal in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 12 shows only one memory and one processor. Actually, the terminal device may include a plurality of processors and a plurality of memories. The memory may also be referred to as a storage medium, a storage device, or the like. This is not limited in this embodiment of the present disclosure.

In one embodiment, the processor may include a baseband processor and a central processing unit. The baseband processor is mainly configured to process the communication protocol and the communication data, and the central processing unit is mainly configured to: control the entire terminal device, execute the software program, and process the data of the software program. The processor in FIG. 12 is integrated with functions of the baseband processor and the central processing unit. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in a storage unit in a form of a software program, so that the processor executes the software program to implement a baseband processing function.

For example, in this embodiment of the present disclosure, the antenna and the control circuit that have receiving and sending functions may be considered as a transceiver unit 101 of the terminal device 10, and the processor having a processing function may be considered as a processing unit 102 of the terminal device 10. As shown in FIG. 12, the terminal device 10 includes the transceiver unit 101 and the processing unit 102. The transceiver unit may also be referred to as a transceiver, a transceiver apparatus, or the like. In one embodiment, a component that is in the transceiver unit 101 and that is configured to implement a receiving function is considered as a receiving unit, and a component that is in the transceiver unit 101 and that is configured to implement a sending function is considered as a sending unit. In other words, the transceiver unit 101 includes the receiving unit and the sending unit. For example, the receiving unit may also be referred to as a receiver, a receiver, a receiver circuit, or the like, and the sending unit may also be referred to as a transmitter, a transmitter, a transmit circuit, or the like.

Figure 13:
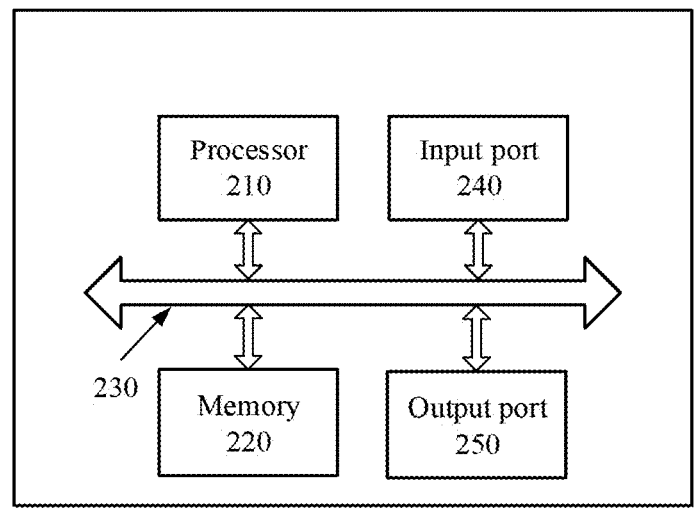
FIG. 13 is a second schematic diagram of a device according to an embodiment of the present disclosure.

According to the foregoing method, FIG. 13 is a second schematic diagram of a device according to an embodiment of the present disclosure. As shown in FIG. 13, the device may be a network device 20, or may be a chip or a circuit, for example, a chip or a circuit that can be disposed in a network device. The network device 20 corresponds to the network device in the foregoing method. The device may include a processor 210 and a memory 220. The memory 220 is configured to store an instruction, and the processor 210 is configured to execute the instruction stored in the memory 220, so that the device implements the foregoing method, for example, the method corresponding to at least one of FIG. 5-1, FIG. 5-3, or FIG. 10B.

Further, the network device may further include an input port 240 and an output port 250. Further, the network may further include a bus system 230.

The processor 210, the memory 220, the input port 240, and the output port 250 are connected by using the bus system 230. The processor 210 is configured to execute the instruction stored in the memory 220, to control the input port 240 to receive a signal and control the output port 250 to send a signal, to complete the operations of the network device in at least one of the foregoing methods. The input port 240 and the output port 250 may be a same physical entity or different physical entities. When the input port 240 and the output port 250 are the same physical entity, the input port 240 and the output port 250 may be collectively referred to as an input/output port. The memory 220 may be integrated into the processor 210, or may be separated from the processor 210.

In an implementation, it may be considered that functions of the input port 240 and the output port 250 are implemented by a transceiver circuit or a dedicated transceiver chip. It may be considered that the processor 210 is implemented by a dedicated processing chip, processing circuit, or processor, or a general-purpose chip.

In another implementation, it may be considered that the network device provided in this embodiment of the present disclosure is implemented by a general-purpose computer. To be specific, program code that implements functions of the processor 210, the input port 240, and the output port 250 is stored in the memory, and a general-purpose processor implements the functions of the processor 210, the input port 240, and the output port 250 by executing the code in the memory.

For concepts, explanations, detailed descriptions, and other operations that are related to the technical solutions provided in this embodiment of the present disclosure and that are related to the device, refer to related descriptions of the content in the foregoing method or another embodiment. Details are not described herein again.

Figure 14:
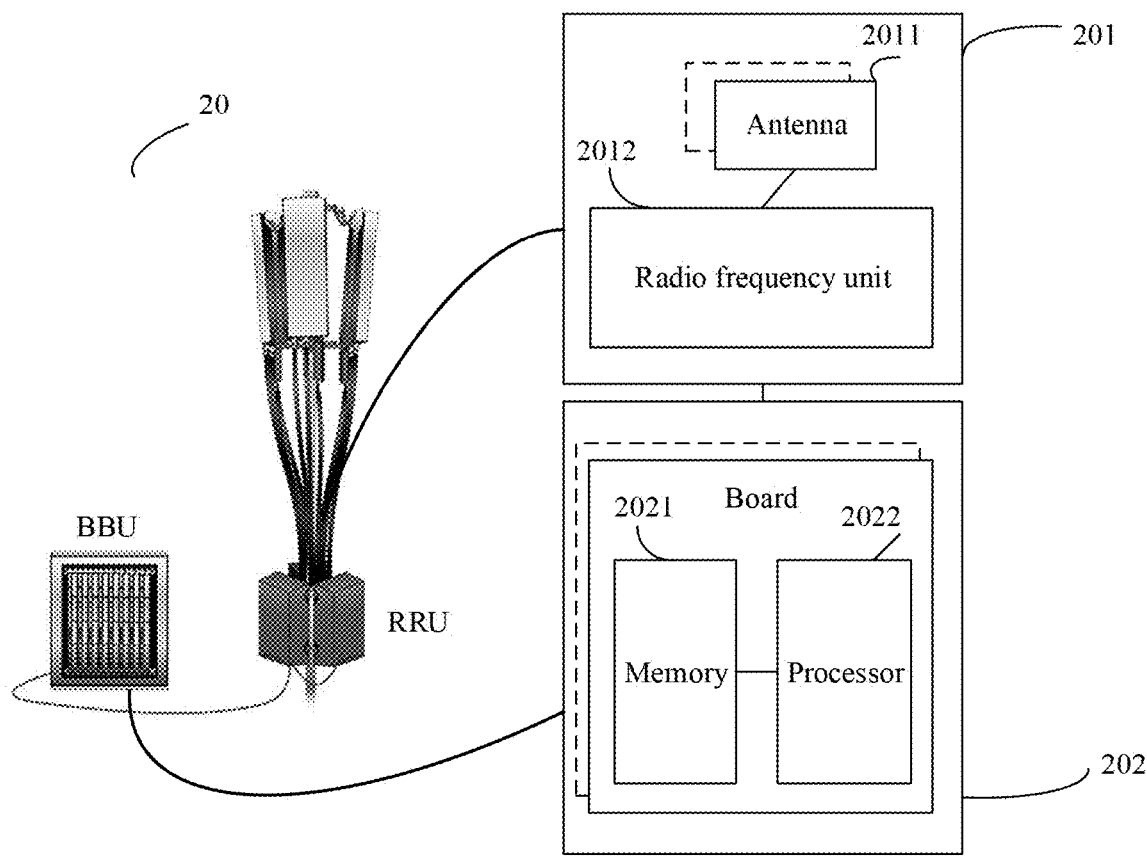
FIG. 14 is a schematic structural diagram of a network device according to an embodiment of the present disclosure.

According to the foregoing method, FIG. 14 is a schematic structural diagram of a network device according to an embodiment of the present disclosure, for example, may be a schematic structural diagram of a base station. As shown in FIG. 14, the base station is applicable to the communications system to which the embodiments of the present disclosure are applicable, for example, the 5G communications system shown in FIG. 3 or FIG. 4; for another example, an LTE communications system. The base station 20 includes one or more radio frequency units, for example, an RRU 201 and one or more baseband units (BBU) (which may also be referred to as a digital unit, DU) 202. The RRU 201 may be referred to as a transceiver unit, a transceiver, a transceiver circuit, a transceiver, or the like, and may include at least one antenna 2011 and at least one radio frequency unit 2012. The RRU 201 is mainly configured to: send and receive a radio frequency signal and perform conversion between a radio frequency signal and a baseband signal, for example, configured to send the signaling message in the foregoing embodiments to a terminal device. The BBU 202 is mainly configured to: perform baseband processing, control the network device, and so on. The RRU 201 and the BBU 202 may be physically disposed together, or may be physically separated, namely, a distributed base station.

The BBU 202 is a control center of the base station, or may be referred to as a processing unit, and is mainly configured to complete baseband processing functions such as channel coding, multiplexing, modulation, and spectrum spreading. For example, the BBU (the processing unit) may be configured to control the base station to perform an operation procedure of the network device in the foregoing method embodiments.

For example, the BBU 202 may include one or more boards, and a plurality of boards may jointly support a radio access network (such as an LTE network) of a single access standard, or may separately support radio access networks of different access standards. The BBU 202 further includes a memory 2021 and a processor 2022. The memory 2021 is configured to store an instruction and data that are suitable. For example, the memory 2021 stores predefined related information in the foregoing embodiments. The processor 2022 is configured to control the base station to perform a suitable action, for example, is configured to control the base station to perform an operation procedure related to the network device in the foregoing method embodiments. The memory 2021 and the processor 2022 may serve the one or more boards. In other words, a memory and a processor may be independently disposed on each board. Alternatively, the plurality of boards may share a same memory and a same processor. In addition, each board may further be provided with a suitable circuit.

According to the method provided in the embodiments of the present disclosure, an embodiment of the present disclosure further provides a communications system. The system includes the foregoing network device and one or more terminal devices.

It should be understood that in the embodiments of the present disclosure, the processor may be a central processing unit (CPU), or the processor may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

The memory may include a read-only memory and a random access memory, and provide an instruction and data to the processor. A part of the memory may further include a non-volatile random access memory.

The bus system may further include a power bus, a control bus, a status signal bus, and the like, in addition to a data bus. However, for clear description, various types of buses in the figure are marked as the bus system.

In an implementation process, the operations in the foregoing methods can be implemented by a hardware integrated logic circuit in the processor, or by using instructions in a form of software. The operations of the method disclosed with reference to the embodiments of the present disclosure may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor. To avoid repetition, details are not described herein again.

It should be further understood that "first", "second", "third", "fourth", and various numerical symbols in this specification are merely used for differentiation for ease of description, and are not construed as a limitation on the scope of the embodiments of the present disclosure.

It should be understood that sequence numbers of the foregoing processes do not mean execution sequences in various embodiments of the present disclosure. The execution sequences of the processes should be determined based on functions and internal logic of the processes, and should not be construed as any limitation on the implementation processes of the embodiments of the present disclosure.

A person of ordinary skill in the art may be aware that, in combination with illustrative logical blocks described in the embodiments disclosed in this specification and operations (operation) may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present disclosure, it should be understood that the disclosed systems, apparatuses, and methods may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of the present disclosure are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communications method, comprising:
    receiving first indication information from a network device; and
    determining channel state information (CSI) feedback related information based on the first indication information, wherein the CSI feedback related information comprises bit meaning of a CSI-reference signal resource indicator (CRI), wherein
    the first indication information is used to enable further enhancements to coordinated multi point based CSI feedback.

2. The method according to claim 1, wherein the CSI feedback related information further comprises at least one of a bit width of a CRI, a bit width of a rank indicator (RI), a bit meaning of a CRI, or a bit meaning of an RI.

3. The method according to claim 2, wherein the determining CSI feedback related information based on the first indication information comprises:
    determining at least one of the bit width of the CRI, or the bit meaning of the CRI based on the first indication information; or determining the bit width of the RI based on the first indication information and at least one of a quantity of antenna ports for a non-zero power (NZP) CSI-reference signal (CSI-RS), capability information of a terminal device; or determining the bit meaning of the RI based on the first indication information and at least one of the bit width of the RI, or a value of the CRI.

4. The method according to claim 3, wherein the determining at least one of the bit width of the CRI, or the bit meaning of the CRI based on the first indication information comprises:

determining the bit width of the CRI is 2 based on the first indication information; or, determining the bit meaning of the CRI based on the first indication information as follows:

CRI=0 indicating that reported CSI is obtained through measurement based on a first NZP CSI-RS resource; or, CRI=1 indicating that reported CSI is obtained through measurement based on a second NZP CSI-RS resource; or, CRI=2 indicating that reported CSI is obtained through measurement based on the first NZP CSI-RS resource and the second NZP CSI-RS resource.

5. The method according to claim 3, wherein determining the bit meaning of the RI based on the first indication information and the value of the CRI comprises:

when the first indication information is used to enable further enhancements to coordinated multi point based CSI feedback, when CRI=0 or 1, determining one RI is fed back;

when CRI=2, determining two RIs are fed back.

6. The method according to claim 2, further comprising:

determining, based on the first indication information, to feed back at least two CSI sets, wherein the at least two CSI sets comprise a first set of CSI and a second set of CSI, and the CSI comprises a channel quality indicator (CQI) and/or a precoding matrix indicator (PMI);

a feedback sequence of the at least two CSI sets is that a CQI of the first set, a CQI of the second set, a PMI of the first set, and a PMI of the second set are sequentially fed back; and the first set of CSI corresponds to CSI for a first NZP CSI-RS resource, and the second set of CSI corresponds to CSI for a second NZP CSI-RS resource; or the first set of CSI corresponds to CSI for a first codeword, and the second set of CSI corresponds to CSI for a second codeword.

7. The method according to claim 2, wherein the method further comprises:

sending third indication information to the network device, wherein the third indication information indicates a quasi-co-location (QCL) type supported by a terminal device, or indicates that further enhancements to coordinated multi point based CSI feedback is supported.

8. A communications method, comprising:

sending first indication information; and determining channel state information (CSI) feedback related information and receiving, based on the CSI feedback related information, CSI feedback from a terminal device, wherein the CSI feedback related information is related to the first indication information, wherein the CSI feedback related information comprises bit meaning of a CSI-reference signal resource indicator (CRI), and wherein the first indication information is used to enable further enhancements to coordinated multi point based CSI feedback.

9. The method according to claim 8, wherein the CSI feedback related information further comprises at least one of a bit width of a CRI, a bit width of a rank indicator (RI), a bit meaning of a CRI, or a bit meaning of an RI.

10. The method according to claim 9, wherein that the CSI feedback related information is related to the first indication information comprises:

at least one of the bit width of the CRI, or the bit meaning of the CRI is related to the first indication information; or the bit width of the RI is related to the first indication information and at least one of a quantity of antenna ports for a non-zero power (NZP) CSI-reference signal (CSI-RS), capability information of the terminal device; or the bit meaning of the RI is related to the first indication information and at least one of the bit width of the RI, or a value of the CRI.

11. The method according to claim 10, wherein at least one of the bit width of the CRI, or the bit meaning of the CRI is related to the first indication information comprises:

when the first indication information is used to enable FeCoMP-based CSI feedback, the bit width of the CRI is 2; or, when the first indication information is used to enable FeCoMP-based CSI feedback, the bit meaning of the CRI is as follows:

CRI=0 indicating that reported CSI is obtained through measurement based on a first NZP CSI-RS resource; or, CRI=1 indicating that reported CSI is obtained through measurement based on a second NZP CSI-RS resource; or, CRI=2 indicating that reported CSI is obtained through measurement based on the first NZP CSI-RS resource and the second NZP CSI-RS resource.

12. The method according to claim 10, wherein the bit meaning of the RI is related to the first indication information and the value of the CRI comprises:

when the first indication information is used to enable further enhancements to coordinated multi point based CSI feedback, when CRI=0 or 1, one RI is fed back;

when CRI=2, two RIs are fed back.

13. The method according to claim 10, further comprising:

determining that at least two CSI sets fed back by the terminal device are related to the first indication information, wherein the at least two CSI sets comprise a first set of CSI and a second set of CSI, and the CSI comprises a channel quality indicator (CQI) and/or a precoding matrix indicator (PMI);

a feedback sequence of the at least two CSI sets is that a CQI of the first set, a CQI of the second set, a PMI of the first set, and a PMI of the second set are sequentially fed back; and the first set of CSI corresponds to CSI for a first NZP CSI-RS resource, and the second set of CSI corresponds to CSI for a second NZP CSI-RS resource; or the first set of CSI corresponds to CSI for a first codeword, and the second set of CSI corresponds to CSI for a second codeword.

14. The method according to claim 9, further comprising:

receiving third indication information from the terminal device, wherein the third indication information indicates a quasi-co-location (QCL) type supported by the terminal device, or indicates that further enhancements to coordinated multi point based CSI feedback is supported.

15. A communications apparatus, comprising:
a receiver configured to receive first indication information from a network device; and
a processor configured to determine channel state information (CSI) feedback related information based on the first indication information, wherein the CSI feedback related information comprises bit meaning of a CSI-reference signal resource indicator (CRI), and wherein
the first indication information is used to enable further enhancements to coordinated multi point based CSI feedback.

16. The communications apparatus according to claim 15, wherein the CSI feedback related information further comprises at least one of a bit width of a CRI, a bit width of a rank indicator (RI), a bit meaning of a CRI, or a bit meaning of an RI.

17. The communications apparatus according to claim 16, wherein in determining CSI feedback related information based on the first indication information, the processor is configured to:
determine at least one of the bit width of the CRI, or the bit meaning of the CRI based on the first indication information; or
determine the bit width of the RI based on the first indication information and at least one of a quantity of antenna ports for a non-power (NZP) CSI-reference signal (CSI-RS), capability information of a terminal device; or
determine the bit meaning of the RI based on the first indication information and at least one of the bit width of the RI, or a value of the CRI.

18. The communications apparatus according to claim 17, wherein in determining at least one of the bit width of the CRI, or the bit meaning of the CRI based on the first indication information, the processor is configured to:
determine the bit width of the CRI is 2, when the first indication information is used to enable FeCoMP-based CSI feedback; or,
determine the bit meaning of the CRI, when the first indication information is used to enable FeCoMP-based CSI feedback, as follows:
CRI=0 indicating that reported CSI is obtained through measurement based on a first NZP CSI-RS resource; or,
CRI=1 indicating that reported CSI is obtained through measurement based on a second NZP CSI-RS resource; or,
CRI=2 indicating that reported CSI is obtained through measurement based on the first NZP CSI-RS resource and the second NZP CSI-RS resource.

19. The communications apparatus according to claim 17, wherein in determining the bit meaning of the RI based on the first indication information and the value of the CRI, the processor is configured to:
determine one RI is fed back, when CRI=0 or 1;
determine two RIs are fed back, when CRI=2;
when the first indication information is used to enable further enhancements to coordinated multi point based CSI feedback.

20. The communications apparatus according to claim 16, the processor is further configured to:
determine, based on the first indication information, to feed back at least two CSI sets, wherein the at least two CSI sets comprise a first set of CSI and a second set of CSI, and the CSI comprises a channel quality indicator (CQI) and/or a precoding matrix indicator (PMI);
a feedback sequence of the at least two CSI sets is that a CQI of the first set, a CQI of the second set, a PMI of the first set, and a PMI of the second set are sequentially fed back; and
the first set of CSI corresponds to CSI for a first NZP CSI-RS resource, and the second set of CSI corresponds to CSI for a second NZP CSI-RS resource; or the first set of CSI corresponds to CSI for a first codeword, and the second set of CSI corresponds to CSI for a second codeword.

21. The communications apparatus according to claim 16, further comprising:
a transmitter, configured to send third indication information to the network device, wherein the third indication information indicates a quasi-co-location (QCL) type supported by a terminal device, or indicates that further enhancements to coordinated multi point based CSI feedback is supported.

22. A communication apparatus, comprising:
a transmitter configured to send first indication information;
a processor configured to determine channel state information (CSI) feedback related information; and
a receiver configured to receive, based on the CSI feedback related information, CSI feedback from a terminal device, wherein the CSI feedback related information is related to the first indication information, wherein
the CSI feedback related information comprises bit meaning of a CSI-reference signal resource indicator (CRI), and wherein
the first indication information is used to enable further enhancements to coordinated multi point based CSI feedback.

23. The communication apparatus according to claim 22, wherein the CSI feedback related information further comprises at least one of a bit width of a CRI, a bit width of a rank indicator (RI), a bit meaning of a CRI, or a bit meaning of an RI.

24. The communication apparatus according to claim 23, wherein the CSI feedback related information is related to the first indication information comprises:
at least one of the bit width of the CRI, or the bit meaning of the CRI is related to the first indication information; or
the bit width of the RI is related to the first indication information and at least one of a quantity of antenna ports for a non-zero power (NZP) CSI-reference signal (CSI-RS), capability information of the terminal device; or
the bit meaning of the RI is related to the first indication information and at least one of the bit width of the RI, or a value of the CRI.

25. The communication apparatus according to claim 24, wherein at least one of the bit width of the CRI, or the bit meaning of the CRI is related to the first indication information comprises:
when the first indication information is used to enable further enhancements to coordinated multi point based CSI feedback, the bit width of the CRI is 2; or,
when the first indication information is used to enable further enhancements to coordinated multi point based CSI feedback, the bit meaning of the CRI is as follows:
CRI=0 indicating that reported CSI is obtained through measurement based on a first NZP CSI-RS resource; or, CRI=1 indicating that reported CSI is obtained through measurement based on a second NZP CSI-RS resource; or, CRI=2 indicating that reported CSI is obtained through measurement based on the first NZP CSI-RS resource and the second NZP CSI-RS resource.

26. The communication apparatus according to claim 24, wherein the bit meaning of the RI is related to the first indication information and the value of the CRI comprises:

when the first indication information is used to enable further enhancements to coordinated multi point based CSI feedback, when CRI=0 or 1, one RI is fed back;

when CRI=2, two RIs are fed back.

27. The communication apparatus according to claim 23, the processor is further configured to:

determine that at least two CSI sets fed back by the terminal device are related to the first indication information, wherein the at least two CSI sets comprise a first set of CSI and a second set of CSI, and the CSI comprises a channel quality indicator (CQI) and/or a precoding matrix indicator (PMI);

a feedback sequence of the at least two CSI sets is that a CQI of the first set, a CQI of the second set, a PMI of the first set, and a PMI of the second set are sequentially fed back; and the first set of CSI corresponds to CSI for a first NZP CSI-RS resource, and the second set of CSI corresponds to CSI for a second NZP CSI-RS resource; or the first set of CSI corresponds to CSI for a first codeword, and the second set of CSI corresponds to CSI for a second codeword.

28. The communication apparatus according to claim 23, the receiver is further configured to:

receive third indication information from the terminal device, wherein the third indication information indicates a quasi-co-location (QCL) type supported by the terminal device, or indicates that further enhancements to coordinated multi point based CSI feedback is supported.

* * * * *